US010895976B2

(12) United States Patent
Kim et al.

(10) Patent No.: US 10,895,976 B2
(45) **Date of Patent: *Jan. 19, 2021**

(54) SYSTEMS AND METHODS FOR USING ANALYTIC OBJECTS IN A DYNAMIC DATA VISUALIZATION INTERFACE

(71) Applicant: Tableau Software Inc., Seattle, WA (US)

(72) Inventors: Jun Kim, Sammamish, WA (US); Christopher Richard Stolte, Seattle, WA (US); Jock Douglas Mackinlay, Clyde Hill, WA (US); Robin Stewart, Seattle, WA (US); Bora Beran, Santa Fe, NM (US); Justin Talbot, Seattle, WA (US); Marc Rueter, Bothell, WA (US)

(73) Assignee: Tableau Software, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/286,559

(22) Filed: Feb. 26, 2019

(65) Prior Publication Data

US 2019/0196684 A1 Jun. 27, 2019

Related U.S. Application Data

(63) Continuation of application No. 14/628,187, filed on Feb. 20, 2015.

(Continued)

(51) Int. Cl.
*G06F 3/0486* (2013.01)
*G06F 3/0481* (2013.01)
(Continued)

(52) U.S. Cl.
CPC .......... *G06F 3/0486* (2013.01); *G06F 3/0482* (2013.01); *G06F 3/04817* (2013.01);
(Continued)

(58) Field of Classification Search
CPC ... G06F 3/0486; G06F 3/0482; G06F 3/04817
See application file for complete search history.

(56) References Cited

U.S. PATENT DOCUMENTS 5,727,161 A * 3/1998 Purcell, Jr. ............ G06F 17/246 705/7.36
5,894,311 A * 4/1999 Jackson ................ G06T 11/206 345/440

(Continued)

FOREIGN PATENT DOCUMENTS

EP 2098966 A1 8/2008
WO WO 97/06492 A1 2/1997

OTHER PUBLICATIONS

Beran, Office Action, U.S. Appl. No. 14/996,140, dated Apr. 6, 2018, 17 pgs.

(Continued)

*Primary Examiner* — Seth A Silverman
(74) *Attorney, Agent, or Firm* — Morgan, Lewis & Bockius LLP

(57) ABSTRACT

A method displays a chart including visual marks representing a dataset. The chart is displayed according to contents of multiple shelf regions. The shelf regions determine characteristics of the chart. The method generates a visual analytic object by applying an analytic operation to the set of data represented by the visual marks, and displays the visual analytic object superimposed over the chart. The method detects user input to select the displayed visual analytic object and place an icon representing the visual analytic object onto a first shelf region. In response, the method updates the content of the first shelf region to associate it (Continued)

with the analytic operation corresponding to the visual analytic object and updates the chart according to the updated content of the first shelf region. This includes updating the chart based on values of the dataset represented by the visual marks relative to the analytic operation.

20 Claims, 116 Drawing Sheets

Related U.S. Application Data

(60) Provisional application No. 62/047,579, filed on Sep. 8, 2014.

(51) Int. Cl.
*G06F 3/0482* (2013.01)
*G06F 16/26* (2019.01)
*G06T 11/20* (2006.01)
*G06T 11/60* (2006.01)

(52) U.S. Cl.
CPC ............ *G06F 16/26* (2019.01); *G06T 11/206* (2013.01); *G06T 11/60* (2013.01)

(56) References Cited

U.S. PATENT DOCUMENTS

| | | | | |
|---|---|---|---|---|
| 6,057,844 | A | 5/2000 | Strauss | |
| 6,222,540 | B1 | 4/2001 | Sacerdoti | |
| 6,411,313 | B1 | 6/2002 | Conlon et al. | |
| 7,457,785 | B1 | 11/2008 | Greitzer et al. | |
| 8,006,187 | B1 | 8/2011 | Bailey et al. | |
| 9,348,881 | B1 | 5/2016 | Hao et al. | |
| 2005/0004911 | A1 | 1/2005 | Goldberg et al. | |
| 2005/0039170 | A1* | 2/2005 | Cifra | G06F 3/0486 717/125 |
| 2007/0250523 | A1* | 10/2007 | Beers | G06F 3/0481 |
| 2008/0189634 | A1 | 8/2008 | Tevanian et al. | |
| 2009/0076974 | A1 | 3/2009 | Berg et al. | |
| 2009/0210430 | A1 | 8/2009 | Averbuch et al. | |
| 2009/0252436 | A1 | 10/2009 | Eidenson et al. | |
| 2009/0292190 | A1 | 11/2009 | Miyashita | |
| 2010/0119053 | A1 | 5/2010 | Goeldi | |
| 2010/0122194 | A1 | 5/2010 | Rogers | |
| 2010/0235771 | A1 | 9/2010 | Gregg, III | |
| 2010/0315431 | A1 | 12/2010 | Smith et al. | |
| 2011/0087954 | A1 | 4/2011 | Dickerman et al. | |
| 2011/0115814 | A1 | 5/2011 | Heimendinger et al. | |
| 2011/0239165 | A1 | 9/2011 | Peebler | |
| 2012/0023429 | A1 | 1/2012 | Medhi | |
| 2012/0167006 | A1 | 6/2012 | Tillert et al. | |
| 2013/0300743 | A1 | 11/2013 | Degrell et al. | |
| 2014/0075380 | A1 | 3/2014 | Milirud et al. | |
| 2015/0029194 | A1 | 1/2015 | Ruble | |
| 2015/0213631 | A1 | 7/2015 | Vander Broek | |

OTHER PUBLICATIONS

Beran, Final Office Action, U.S. Appl. No. 14/996,140, dated Aug. 9, 2018, 18 pgs.
Beran, Office Action, U.S. Appl. No. 14/996,140, dated Feb. 4, 2019, 18 pgs.
Beran, Final Office Action, U.S. Appl. No. 14/996,140, dated Apr. 30, 2019, 19 pgs.
Beran, Notice of Allowance, U.S. Appl. No. 14/996,140, dated Aug. 21, 2019, 13 pgs.
"Change the display on a 3-D chart," by Microsoft Office in 2007, from https://support.office.com/en-us/article/Change-the-display-of-a-3-D-chart-60c13909-d2a1-4e06-8b8c-bccba7868c9b, 6 pgs.
Demo this Wednesday: Drag-and-drop to create R-based workflows, Office Supply Retail Chain Case Study: http://blog.revolutionanalytics.com/2014/01/demo-this-wednesday-drag-and-drop-to-create-r-based-workflows.html, Jan. 24, 2014, 2 pgs.
"2-D Line Plot," by MATLAB on Feb. 17, 2014, from http://www.mathworks.com/help/matlab/ref/plot.html, 8 pgs.
FutureSource, Version 3.7, Release Date: Dec. 13, 2013, Drag and Drop Studies to Quotes, http://download.esignal.com/products/workstatio/help/quotes/studies/drag_drop_study.htm, Webpage tutorial for sogtware including current (at the time of the first office action), version 3.7.
EasyBI, easyBI Documentation, Getting Started, Create Reports, https://docs.eazybi.com/display/EAZYBI/Create+reports, downloaded Mar. 10, 2016, 1 pg.
ExcelFunctions.net, "Excel Statistical Functions," Published Feb. 17, 2012, 4 pgs.
Harris, Gigaom, Data for dummies: 6 data-analysis tools anyone can use, http://gigaom.com/2013/01/31/data-for-dummies-5-data-analysis-tools-anyone-can-use/, Jan. 31, 2013, 11 pgs.
"Keynote—Tableau Conference 2014—theCUBE," Sep. 10, 2014, retrieved from https://www.youtube.com/watch?v=bZKqljFm2dU, 1 pg.
Kim, Office Action, U.S. Appl. No. 14/628,170, dated Jun. 9, 2016, 26 pgs.
Kim, Final Office Action, U.S. Appl. No. 14/628,170, dated Jan. 23, 2017, 34 pgs.
Kim, Office Action, U.S. Appl. No. 14/628,170, dated Jul. 10, 2017, 32 pgs.
Kim, Final Office Action, U.S. Appl. No. 14/628,170, dated Nov. 17, 2017, 35 pgs.
Kim, Office Action, U.S. Appl. No. 14/628,170, dated Apr. 19, 2018, 32 pgs.
Kim, Notice of Allowance, U.S. Appl. No. 14/628,170, dated Oct. 26, 2018, 11 pgs.
Kim, Final Office Action, U.S. Appl. No. 14/628,176, dated Mar. 10, 2017, 15 pgs.
Kim, Final Office Action, U.S. Appl. No. 14/628,176, dated Aug. 23, 2017, 18 pgs.
Kim, Office Action, U.S. Appl. No. 14/628,176, dated Feb. 26, 2018, 22 pgs.
Kim, Final Office Action, U.S. Appl. No. 14/628,176, dated Aug. 14, 2018, 24 pgs.
Kim, Notice of Allowance, U.S. Appl. No. 14/628,176, dated Feb. 27, 2019, 7 pgs.
Kim, Office Action, U.S. Appl. No. 14/628,181, dated May 30, 2017, 26 pgs.
Kim, Final Office Action, U.S. Appl. No. 14/628,181, dated Nov. 16, 2017, 31 pgs.
Kim, Office Action, U.S. Appl. No. 14/628,181, dated May 4, 2018, 36 pgs.
Kim, Notice of Allowance, U.S. Appl. No. 14/628,181, dated Oct. 11, 2018, 12 pgs.
Kim, Office Action, U.S. Appl. No. 14/628,187, dated Jan. 9, 2017, 23 pgs.
Kim, Office Action, U.S. Appl. No. 14/628,187, dated Jun. 29, 2017, 27 pgs.
Kim, Office Action, U.S. Appl. No. 14/628,187, dated Jan. 12, 2018, 39 pgs.
Kim, Final Office Action, U.S. Appl. No. 14/628,187, dated Jun. 7, 2018, 39 pgs.
Lurie, Profit Bricks, The laaS-Company, 39 Data Visualization Tools for Big Data, http://blog.profitbricks.com/39-data-visualization-tools-for-big-data/, Feb. 13, 2014, 37 pgs.
Martinez, Tableau Public, What the Tableau Public Community is Making, http://www.tableausoftware.com/public/, downloaded Mar. 10, 2016, 6 pgs.
Mathematica Beta—Stack Exchange. "How can I make an X-Y scatter-plot-with-histograms-next-to-the X-Y axes?" Mathematica, Jun. 12, 2012 [retrieved on Nov. 3, 2017]. Retrieved from the Internet: <URL: https://mathematica.stackexchange.com/questions/2984/how-can-i-make-an-x-y-scatter-plot-with-histograms-next-to-the-x-y- axes>.
Matlab Documentation. "Interacting with Graphed Data—MATLAB & Simulink". MathWorks, Feb. 15, 2013 [retrieved on

(56) References Cited

OTHER PUBLICATIONS

Nov. 1, 2017]. Retrieved from the Internet: <URL: https://www.mathworks.com/help/matlab/data_analysis/interacting-with-graphed- data.html>.
Microsoft, "Create a Box Plot," Applied to Excel, Date: year 2013, 11 pgs.
Rafi, "Glossy medical pills PSD template," Published: May 24, 2011, graphicsfuel.com, https://www.graphicsfuel.com/2011/05/glossy-medical-pills-psd-template/ (Year: 2011), 5 pgs.
Sisense, Business Analytics Software Built for Complex Data, http://www.sisense.com/features/, 2016, 13 pgs.
The Tools, D4 Software Ltd, http://querytreeapp.com/help/tools/, downloaded Mar. 10, 2016, 3 pgs.
Tableau Software, Inc., International Search Report and Written Opinion, PCTUS2015/048991, dated Feb. 25, 2016, 25 pgs.
Tableau Software, Inc., International Preliminary Report on Patentability PCTUS2015/048991, dated Mar. 14, 2017, 17 pgs.
Tableau Software, Inc., Communication Pursuant to Rules 161(1) and 162-EP15778078.4, dated Apr. 24, 2017, 2 pgs.
Tableau Software, Inc., Examination Report No. 1, AU2015315277, dated Jan. 8, 2018, 2 pgs.
Thompson, Data Driven Journalism, Hate Spreadsheets Formulas? Meet Drag and Drop Data Analysis Tool 'Query Tree', http://datadrivenjournalism.net/resources/Hate_Spreadsheets_Formulas_Meet_Drag_and_Drop_Data_Tool_QueryTree, Jun. 14, 2013, 3 pgs.

* cited by examiner

Custom Analytic Dialog 1064

1096

1134

SYSTEMS AND METHODS FOR USING ANALYTIC OBJECTS IN A DYNAMIC DATA VISUALIZATION INTERFACE

RELATED APPLICATIONS

This application is a continuation of U.S. patent application Ser. No. 14/628,187, filed Feb. 20, 2015, entitled "Systems and Methods for Using Displayed Data Marks in a Dynamic Data Visualization Interface," which claims priority to U.S. Provisional Application Ser. No. 62/047,579, filed Sep. 8, 2014, entitled "Systems and Methods for Providing Drag and Drop Analytics in a Data Visualization User Interface," each of which is incorporated by reference herein in its entirety.

This application is related to U.S. patent application Ser. No. 14/628,170, filed Feb. 20, 2015, entitled "Systems and Methods for Providing Adaptive Analytics in a Dynamic Data Visualization Interface," U.S. patent application Ser. No. 14/628,176, filed Feb. 20, 2015, entitled "Systems and Methods for Providing Drag and Drop Analytics in a Dynamic Data Visualization Interface," and U.S. patent application Ser. No. 14/628,181, filed Feb. 20, 2015, entitled "Systems and Methods for Using Analytic Objects in a Dynamic Data Visualization Interface," each of which is incorporated by reference herein in its entirety.

TECHNICAL FIELD

The disclosed implementations relate generally to data visualization and more specifically to systems, methods, and user interfaces that provide analytic functions for interactively exploring and investigating a data set.

BACKGROUND

Data visualization applications enable a user to understand a data set visually, including distribution, trends, outliers, and other factors that are important to making business decisions. Some data sets are very large or complex. Various analytic tools can be used to help understand the data, such as regression lines, average lines, and percentile bands. However, analytic functionality may be difficult to use or hard to find within a complex user interface. In addition, analysis sometimes requires using analytic functions on two or more subsets of data at the same time

SUMMARY

Disclosed implementations address the above deficiencies and other problems associated with data visualizations that use analytic functions. Some implementations simplify the complexity of using analytic functions by providing a palette of analytic options that may be dragged and dropped to display corresponding analytic data on a visual graphic. In some implementations, an analytic function has sub-options, which are displayed in a drop area, and the user selects a sub-option by dropping an icon for the analytic function onto the sub-option in the drop area. For example, a trend line (regression line) is an analytic function, which has several sub-options that may be displayed for user selection: a linear trend line, an exponential trend line, a logarithmic trend line, or a polynomial trend line.

Some implementations simplify the process of comparing analytic data for different subsets of data from a data source. When an analytic function has been selected (e.g., an average line, a trend line, or quartile bands), a user may select any subset of data points (or visual marks, which may represent more than a single data point), and the user interface displays that analytic function based on the selected subset, while still continuing to display the analytic data for the entire subset. This allows a user to quickly compare a subset to the whole set. In some implementations, the user may continue to modify the set of selected points or marks, and the analytic data for the selected subset adjusts according to the selection.

Disclosed implementations make experimenting with analytic techniques easier. Exemplary analytical operations or functions include summarizing the data, modeling the data, or performing custom operations specified by a user. For example, analytic functions may provide references lines, reference bands, statistical bands (e.g., averages, medians with quartiles, average with predefined confidence interval (e.g., 95%), box plots, trend lines, totals, subtotals, and forecasts).

Some implementations provide a drag and drop user interface for analytic icons. This functionality has various benefits for users, including: allowing users to easily experiment and iterate; drop spots where a user may drag an analytic icon show options that a user will most likely want to experiment with; it becomes easy to pick up and re-drop an object/analytic icon to try a different analytic function; analytic functions that are commonly used together are grouped as a single "analytic icon," and thus can be selected in one step; and the analytic techniques are not buried in pull down menus.

Some implementations provide instant/adaptive analytics. This functionality has various benefits for users. For visualizations with a reference line, a reference band, a trend line, or other analytic function applied, a user may want to compare the analytic data for the set of data to an identified subset. When the user selects a subset of the marks, the user will see a new line or band corresponding to just the selected items. The user can instantly view the analytic data for just the selected marks (sample group), and compare the analytic data to the same analytic functionality applied to all marks (e.g., the "population"). This provides an interactive experience for comparing a sample group to the overall data set. In particular, implementations show an instant, selection-based reference line, band, trend line, or other analytic function alongside the original analytic line or band.

Some implementations with instant/adaptive analytics display the difference between the analytic data for the selected subset and the analytic data for the whole set in a tooltip when hovering over the selected subset or when the subset is selected. The instant/adaptive analytics are calculated and shown for each selection event, so as the user adds or removes marks from the selection, the analytic data updates on the fly, providing immediate feedback. The analytic data for the selected subset is displayed using the same formula or definition as the analytic data for the whole set of displayed data. For example, if an "average" line has been applied to the whole set, then an average line is created for the selected subset. In addition, the scope of the analytic data for the selected subset is inherited from the scope of the original line (e.g. table, pane, or cell).

In some implementations, the analytic data created for the selected subset is referred to as the "instant" line or band, and the analytic data for the entire set of data is referred to as the "original" line or band. In some instances, the instant and original items are close together on the display, and thus labels for some of the items may be obscured. In some implementations, the items are ordered in layers (e.g., like layers in a drawing program). In some implementations, the items are drawn from top to bottom as follows: (top) the instant label, the original label, the instant line, the original line, the instant band, and the original band (bottom). This layering helps users to understand the data visualization and the analytic data displayed in the data visualization. In particular, this allows the user to distinguish visually between the original and the instant line or band. Some implementations de-emphasize the original line, original band, and/or original label to distinguish them from the instant line, instant band, and/or instant label. This may be implemented by dimming, changing color, graying out, or other techniques.

In accordance with some implementations, a method executes at an electronic device with a display. For example, the electronic device can be a smart phone, a tablet, a notebook computer, or a desktop computer. The method concurrently displays a chart that displays visual marks that represent a set of data (e.g., bars in a bar chart or geometric shapes such as circles, squares, triangles, or other representations of data points in a scatter plot) and a plurality of analytic icons. In some implementations, the analytic icons are displayed in a panel that toggles between data that may be used to make the chart and analytic icons that correspond to analytical operations that may be performed on the data used to make the chart.

The method detects a first portion of a user input on a first analytic icon in the plurality of analytic icons (e.g., a mouse click down, finger down, or other selection of the first analytic icon and/or an initial mouse drag or finger drag on the first analytic icon) and in response, displays one or more option icons that correspond to options for performing a first analytical operation that corresponds to the first analytic icon.

The method also detects a second portion of the user input on the first analytic icon. For example, after a mouse click or finger down on the first analytic icon, a mouse drag or finger drag on the first analytic icon moves the first analytic icon across the display and over a respective option icon and/or a mouse up or finger up that "drops" the first analytic icon on the respective option icon. In some implementations, the option icons are "drop-targets" for the respective analytic icon. In response to detecting the second portion of the user input, the first analytic icon moves over a respective option icon in the one or more option icons that are displayed such that the first analytic icon is over the respective option icon immediately prior to ceasing to detect the input. The method then adds one or more graphics to the chart (e.g., analytic lines and/or bands) that correspond to the first analytical operation and a respective option that corresponds to the respective option icon.

In some implementations, the second portion of the input results in dropping the first analytic icon on the respective option icon and displays one or more graphics in the chart that correspond to the first analytical operation and the respective option in response to the dropping. In some implementations, the second portion of the input results in hovering the first analytic icon over the respective option icon and displaying one or more graphics (e.g., an average line) in the chart that corresponds to the first analytical operation and the respective option in response to the hovering (i.e., providing a preview of the analytic operation). In some implementations, if the input ends while the first analytic icon is hovering over the respective option icon, the first analytic icon is "dropped" on the respective option icon and the one or more graphics in the chart that correspond to the first analytical operation and the respective option remain displayed. In some implementations, the added graphics include reference lines, reference bands, statistical bands (e.g., averages, medians with quartiles, averages with predefined confidence intervals (e.g., 95%), box plots, trend lines, totals, subtotals, and/or forecasts).

In some implementations, the input comprises a drag and drop operation. For example, with a mouse or other pointing device, the user moves a pointer over the first analytic icon, presses and holds down a button on the pointing device to select the first analytic icon, "drags" the first analytic icon over the respective option icon by moving the pointer, and "drops" the first analytic icon by releasing the button. With a touch screen, the user can contact the first analytic icon with a finger (e.g., a long press), "drag" the first analytic icon over the respective option icon by moving the finger, and "drop" the first analytic icon by lifting off the finger from the touch screen.

In some implementations, the options that correspond to the one or more option icons are specific to the first analytical operation. That is, there is a different set of displayed option icons depending on the selected analytic icon.

In some implementations, in response to detecting the first portion of the input on the first analytic icon (e.g., when the first analytic icon is hovered over or selected), the method visually distinguishes the first analytic icon from other analytic icons in the plurality of analytic icons (e.g., by outlining or highlighting).

In some implementations, in response to detecting the first portion of the input on the first analytic icon, the method visually distinguishes the first analytic icon from other analytic icons in the plurality of analytic icons and concurrently dims the chart. In some implementations, the device visually deemphasizes the chart when the one or more options icons are displayed, to indicate to the user the need to select an option icon.

In some implementations, an image is displayed on a respective option icon that illustrates a type of analytic graphic that will be added to the chart if the respective option icon is selected.

In some implementations, in response to detecting the second portion of the input on the first analytic icon, the method performs the first analytical operation that corresponds to the first analytic icon on at least part of the data in the set of data in accordance with the respective option and displays the result. In some implementations, the analytical operation includes summarizing the data, modeling the data, and/or performing custom predefined operations specified by a user. In some implementations, the analytical operation includes determining averages, medians with quartiles, averages with predefined confidence intervals (e.g., 95%), box plots, trend lines, totals, subtotals, and/or forecasts.

In some implementations, the first analytical operation includes a plurality of analytical operations. For example, a single analytic icon may provide both a median and quartile bands, or a single analytic icon may provide both a mean average and a 95% confidence interval.

In some implementations, in response to detecting the second portion of the input on the first analytic icon, the method ceases to display the first analytic icon over the respective option icon and ceases to display the one or more option icons.

In some implementations, while displaying the chart with one or more added graphics, the method detects a first portion of a second input on a second analytic icon (e.g., a mouse click down, finger down, or other selection of the second analytic icon and/or an initial mouse drag or finger drag on the second analytic icon). In response, one or more option icons are displayed that correspond to options for performing a second analytical operation that corresponds to the second analytic icon. The method also detects a second portion of the second input on the second analytic icon and in response, moves the second analytic icon over a respective option icon in the one or more option icons such that the second analytic icon is over the respective option icon immediately prior to ceasing to detect the input. The method also adds one or more graphics to the chart that correspond to the second analytical operation and a respective option that corresponds to the respective option icon. In some implementations, the one or more added graphics that correspond to the second analytical operation replace the one or more added graphics that correspond to the first analytical operation. In some implementations the one or more added graphics that correspond to the second analytical operation are displayed concurrently with the one or more added graphics that correspond to the first analytical operation.

In accordance with some implementations, a method executes at an electronic device with a display. For example, the electronic device may be a smart phone, a tablet computer, a notebook computer, or a desktop computer. The method displays a chart, which includes visual marks that represent a set of data and a first line and/or first band (e.g., statistical lines or bands, such as averages, medians with quartiles, averages with predefined confidence intervals, box plots, trend lines, totals, subtotals, and/or forecasts) based on (e.g., calculated using) data in the set of data that corresponds to the displayed visual marks. The method detects one or more inputs that select a plurality (but less than all) of the displayed visual marks in the chart. In response to detecting the one or more inputs, the method displays a second line and/or second band (e.g., analogous statistical lines or bands to the first line and/or first band) based on (e.g., calculated using) data in the set of data that corresponds to the selected plurality of the displayed visual marks. The method maintains display of the chart and the first line and/or first band in the chart while the second line and/or second band are displayed.

In some implementations, the one or more inputs are detected on the displayed chart.

In some implementations, the one or more inputs include a separate input on each visual mark (e.g., a finger tap gesture or mouse click) in the plurality of the displayed visual marks.

In some implementations, the one or more inputs used to select the plurality of the displayed visual marks in the chart are made with a selection box or lasso tool.

In some implementations, the first line and/or first band displayed in the chart are calculated using data in the set of data that correspond the displayed visual marks, independent of whether or not a respective displayed visual mark is selected, and the second line and/or second band displayed in the chart are calculated in an analogous manner using just data in the set of data that correspond to the selected displayed visual marks. In some implementations, the second line and/or second band is based on an original formula (e.g. "average") calculated for the selected marks, and the scope of the second line and/or second band is inherited from the scope of the first line and/or first band (e.g. table, pane, or cell, as illustrated in some of the figures).

In some implementations, while displaying the chart, the first line and/or first band, and the second line and/or second band, the method detects one or more inputs that modify the plurality of selected visual marks. For example, the inputs may select additional displayed visual marks and/or deselect displayed visual marks that were previously selected. In response to detecting the one or more inputs, the method modifies the second line and/or second band based on (e.g., calculated using) data in the set of data that corresponds to the modified plurality of the displayed visual marks in the chart that are selected and maintains display of the chart and the first line and/or first band in the chart. In some implementations, the second line and/or second band is recalculated and the updated second line and/or second band displays in response to each selection event.

In some implementations, in response to detecting the one or more inputs that select the plurality of the displayed visual marks in the chart, the method displays a third line and/or third band based on (e.g., calculated using) data in the set of data that corresponds to displayed visual marks other than the selected plurality of the displayed visual marks.

In some implementations, a third line and/or third band is calculated based on the data that corresponds to visual marks that are not selected. In some implementations, the third line and/or third band is displayed concurrently with the first line and/or first band and the second line and/or second band (not shown).

In some implementations, the third line and/or third band replaces the first line and/or first band, and is displayed concurrently with the second line and/or second band (not shown). For example, if the selected visual marks correspond to suspect data points or outliers, then the third line and/or third band (which excludes the suspect data points) may be more informative than the first line and/or first band (which includes the suspect data points).

In some implementations, in response to detecting the one or more inputs that select the plurality of the displayed visual marks in the chart, the method visually deemphasizes (e.g., by dimming) the first line and/or first band relative to the second line and/or second band. In some implementations, visually deemphasizing the first (original) line or band helps the user to distinguish visually between the first (original) line or band and the second (instant) line or band.

In some implementations, the second line is displayed above the first line in a z-height order on the display (e.g., the elements in the graphical user interface can be thought of as "layers" coming out from the display, and the layers for the z-height order).

In some implementations, the second band is displayed above the first band in a z-height order on the display (e.g., layer ordering). In some implementations, the graphics in the chart are drawn from top to bottom as follows: (top) instant label, original label, instant line, original line, instant band, original band (bottom).

Some implementations provide both drag and drop analytics as well as adaptive analytics. In accordance with some implementations, a method executes at an electronic device with a display, concurrently displaying a chart that displays visual marks (e.g., bars in a bar chart or geometric shapes such as circles, squares, triangles, or other representations of data points in a scatter plot) that represent a set of data and a plurality of analytic icons. The method detects a first portion of an input on a first analytic icon in the plurality of analytic icons and in response, displays one or more option icons that correspond to options for performing a first analytical operation that corresponds to the first analytic icon. The method also detects a second portion of the input on the first analytic icon and in response, moves the first analytic icon over a respective option icon in the one or more displayed option icons such that the first analytic icon is over the respective option icon immediately prior to ceasing to detect the input. The method then adds a first line and/or first band to the chart that correspond to the first analytical operation and a respective option that corresponds to the respective option icon. While displaying the chart and the first line and/or first band, the method detects one or more inputs that select a plurality of the displayed visual marks in the chart. In response to detecting the one or more inputs, the method displays a second line and/or second band based on data in the set of data that corresponds to the selected plurality of the displayed visual marks and maintains display of the chart and the first line and/or first band in the chart.

Implementations may provide drag and drop analytics, adaptive analytics, or both. The descriptions above for implementing these features individually apply as well when these features are combined. Furthermore, implementations may provide additional features, some of which are illustrated in the figures, including FIGS. 95-117.

In accordance with some implementations, a method executes at an electronic device with a display. The method concurrently displays a chart and a visual analytic object. In some implementations, the chart is a bar chart, a line chart, or a scatter plot. The chart displays visual marks representing a set of data, displayed in accordance with contents of a plurality of displayed shelf regions. For example, some implementations include a columns shelf region 120 and a rows shelf region 122 as illustrated in FIG. 1. In addition, some implementations include a filters shelf region 1392, a color shelf region (or icon) 1394, a label shelf region (or icon) 1396 and/or a tooltip shelf region (or icon) 1398, as illustrated in FIG. 111. Each shelf region determines a respective characteristic of the chart. For example, the rows and columns self regions determine the rows and columns for displayed visual graphics, the color shelf region determines how colors are assigned to marks (if at all), and so on.

The method displays the visual analytic object superimposed on the chart. For example, as illustrated in FIG. 101, the visual analytic object 1346 is superimposed on the visual graphic 1356. The visual analytic object corresponds to a first analytical operation applied to the set of data displayed in the chart as visual marks. For example, the visual analytic object 1346 in FIG. 101, is computed as a average of the values for the bars in the chart.

The method detects a first portion of an input on top of the visual analytic object (e.g., clicking, performing a mouse down, touching the display, or tapping the display). In response, the method displays a moveable icon corresponding to the visual analytic object while maintaining display of the visual analytic object. For example, in FIG. 100, the moveable icon 1350 corresponds to the average line 1346, and the average line 1346 remains displayed as the moveable icon 1350 is moved.

The method detects a second portion of the input on the moveable icon (e.g., a "dragging" input) and in response, moves the moveable icon over a first shelf region of the plurality of shelf regions such that the moveable icon is over the first shelf region immediately prior to ceasing to detect the input. For example, in FIG. 100, the user has moved the moveable icon 1350 to the filters shelf region 1348.

When the input ceases to be detected, the method updates the content of the first shelf region based on the first analytic operation corresponding to the visual analytic object. For example, after dragging the moveable icon 1350 to the filters shelf region 1348 (as shown in FIG. 100), the user ceases the drag operation (e.g., by releasing the mouse button), and the filters shelf region 1348 is updated with a filter pill 1352 as illustrated in FIG. 101.

The method then updates the chart in accordance with updated content of the first shelf region. For example, in FIG. 105, the user has dragged the moveable icon 1368 to the color shelf region (or icon) 1370, and after the dragging operation is complete, the chart is updated, as shown in FIG. 106, to show the bars in different colors. One color is used for the first set of bars 1376 that are greater than the average and a second color is used for the second set of bars 1378 that are below the average.

In some implementations, the input is a drag and drop operation.

In some implementations, an image is displayed on the moveable icon that identifies the type of the visual analytic object. For example, in FIG. 105, the moveable icon 1368 for the visual analytic object 1366 displays "Average Line."

In some implementations, the visual analytic object is an average line, a trend line, a median line, a constant reference line, a distribution band, or a quartile band. Although many of the examples provided herein use average line, the same techniques apply to other types of lines (which may be straight lines or curved lines, such as an exponential curve), as well as some analytic bands (such as quartile bands or confidence bands). For example, when an analytic band is dropped on the filters shelf region, some implementations create a filter based on which marks are inside or outside of the band.

In some instances, updating the content of the first shelf region based on the first analytic operation modifies a formula for a data element in the first shelf region. This is illustrated in FIG. 97, where the user modifies the original data element (i.e., SUM(Total Emissions)) to create the formula SUM(Total Emissions)−[Average Emissions]. This is an example of modifying the formula for the data element by adding to the formula a mathematical operator and a reference to the analytic object.

In some implementations, updating the content of the first shelf region using the first analytic operation comprises placing in the first shelf region a data element whose formula is based on the first analytic operation. This is illustrated in FIGS. 101 and 106, where the new data elements 1352 and 1372 are created on the shelves.

In some implementations, the first shelf region is a color encoding shelf, and updating the chart in accordance with updated content of the first shelf region includes displaying a first subset of the visual marks in a first color based on positioning of the first set of visual marks in the chart relative to the visual analytic object, and displaying the remaining visual marks in a second color distinct from the first color. This is illustrated in FIG. 106.

In some implementations, the first shelf region is a label encoding shelf, and updating the chart in accordance with updated content of the first shelf region includes displaying labels for a first subset of the visual marks based on positioning of the first set of visual marks in the chart relative to the visual analytic object (e.g., similar to the labels 1400 shown in FIG. 112).

In some implementations, the first shelf region is a filter shelf, and updating the chart in accordance with updated content of the first shelf region comprises displaying a first subset of the visual marks based on positioning of the first set of visual marks in the chart relative to the visual analytic object, and filtering out the remaining visual marks from the chart. This is illustrated in FIGS. 100-103. In some implementations, the visual analytic object is a line (such as the average line 1346 in FIG. 101), which partitions the chart into a first region and a second region. The first subset of visual marks is the set of visual marks positioned in the first region, as illustrated in FIG. 102.

In some implementations where the first shelf region is a filter shelf, the method displays a quick filter box that enables a user to select displaying display all of the visual marks, displaying only the first subset of visual marks, or displaying only visual marks not in the first subset. This is illustrated by the quick filter box 1354 in FIG. 101.

In accordance with some implementations, a method executes at an electronic device with a display. The method displays a chart that includes visual marks representing a set of data, displayed in accordance with contents of a plurality of displayed shelf regions. Each shelf region determines a respective characteristic of the chart. The method detects selection of a plurality of visual marks, as illustrated by the selection 1382 in FIG. 108. In response to detecting selection of a plurality of visual marks, the method visually emphasizes the selected plurality of visual marks, as illustrated in FIG. 108.

The method detects a first portion of an input on one of the selected marks, and in response displays a moveable icon corresponding to the selected visual marks while maintaining display of the visual marks. This is illustrated by the moveable icon 1384 in FIG. 111. The selected bars are still displayed.

The method detects a second portion of the input on the moveable icon; and in response, moves the moveable icon over a first shelf region of the plurality of shelf regions such that the moveable icon is over the first shelf region immediately prior to ceasing to detect the input. This is illustrated by the moveable icon 1384 in FIG. 111, which has been moved over the filters shelf region 1392.

When the method ceases to detect the input, the method updates the content of the first shelf region based on the selected visual marks. This is analogous to the filter designation pill 1352 in FIG. 101. The method updates the chart in accordance with updated content of the first shelf region. For example, FIG. 112 illustrates updating the chart based on dragging the selected set of visual marks to the label shelf, creating labels 1400 for just the selected set of visual marks.

In some implementations, the input comprises a drag and drop operation.

In some implementations, an image is displayed on the moveable icon that identifies the selected visual marks, as illustrated by the moveable icon 1384 in FIG. 111.

In some implementations, updating the content of the first shelf region based on the selected visual marks includes placing in the first shelf region a group data element whose elements are the selected visual marks. This is illustrated by the group data element (pill) 1412 in FIG. 115. In some implementations, updating the chart in accordance with updated content of the first shelf region comprises subdividing the chart into two separate charts, wherein one of the separate charts includes the visual marks from the selected visual marks and the other separate chart includes all visual marks other than the selected visual marks. This is illustrated by the two panes 1414 and 1416 in FIG. 115.

In some implementations, the first shelf region is a color encoding shelf, and wherein updating the chart in accordance with updated content of the first shelf region comprises displaying the selected visual marks in a first color, and displaying the remaining visual marks in a second color distinct from the first color. This is illustrated in FIG. 113.

In some implementations, the first shelf region is a label encoding shelf, and wherein updating the chart in accordance with updated content of the first shelf region comprises displaying labels for the selected visual marks and not displaying labels for visual marks not selected. This is illustrated in FIG. 112.

In some implementations, the first shelf region is a filter shelf, and updating the chart in accordance with updated content of the first shelf region includes displaying only the selected visual marks and filtering out the remaining visual marks from the chart. This is analogous to the filtering example illustrated in FIGS. 100-103. In some implementations, the method displays a quick filter box that enables a user to select displaying display all of the visual marks, displaying only the selected visual marks, or displaying only visual marks not included in the selected visual marks. This is analogous to the filtering example illustrated in FIGS. 100-103.

Thus methods, systems, and graphical user interfaces are disclosed that provide data visualization analytic functions, enabling a user to apply analytic functions quickly with a drag and drop interface, and to quickly compare analytic functions for a subset of data against analytic functions for the entire data set. When analytic objects are created, they can be dragged to other locations to create or modify other elements. Similarly, displayed visual marks can be selected and dragged to other locations to create or modify the display.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
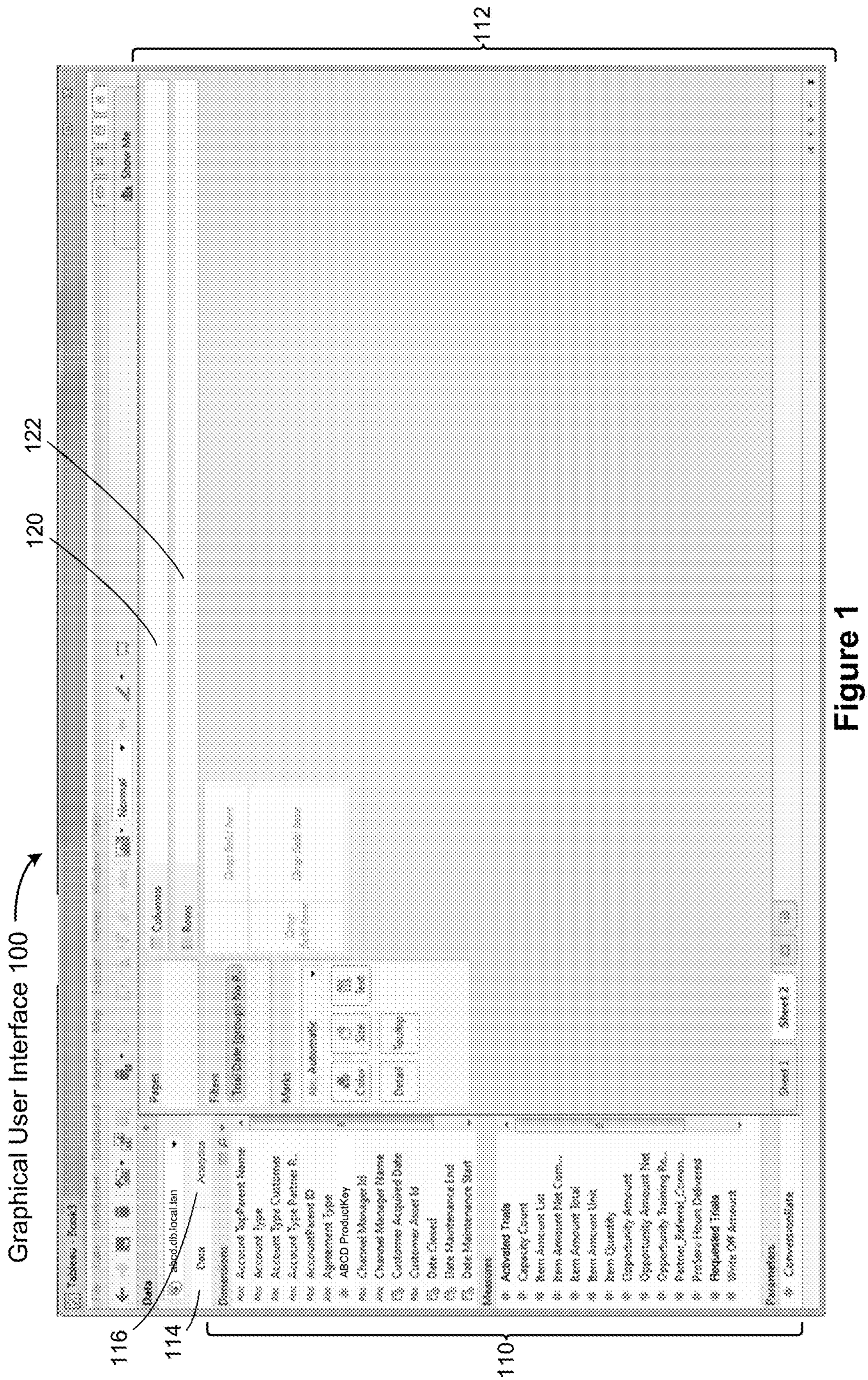
FIG. 1 illustrates a graphical user interface used in some implementations.
Figure 4:
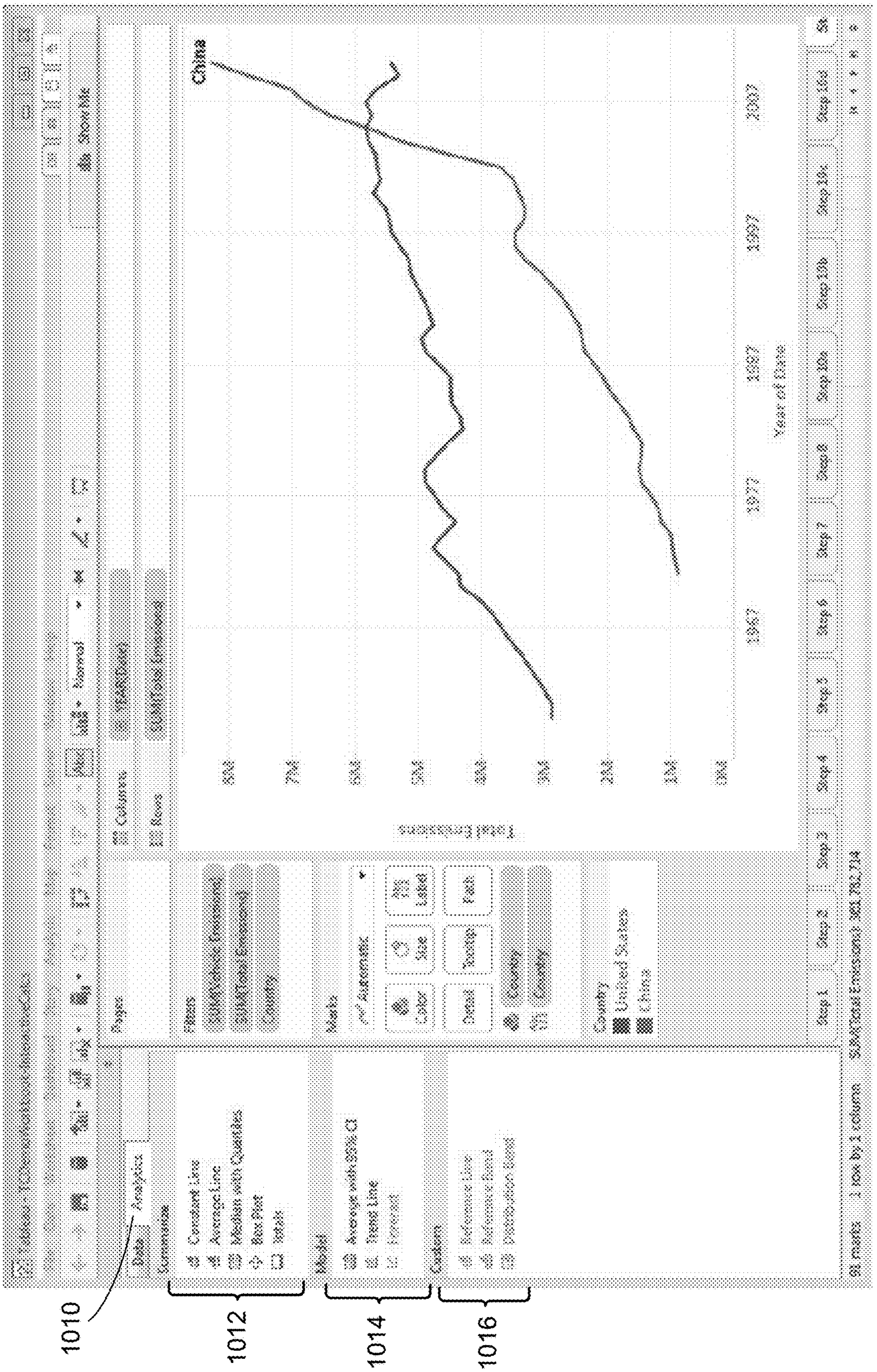

FIG. 1 illustrates a graphical user interface 100 in accordance with some implementations. When the Data tab 114 is selected, the user interface 100 displays a schema information region 110, which is also referred to as a data pane. The schema information region 110 provides named data elements (field names) that may be selected and used to build a data visualization. In some implementations, the list of field names is separated into a group of dimensions and a group of measures (typically numeric quantities). Some implementations also include a list of parameters. When the Analytics tab 116 is selected, the user interface displays a list of analytic functions instead of data elements, as illustrated in FIG. 4 and many of the subsequent figures.

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic. Because no data elements have been selected yet, the space initially has no visual graphic. In some implementations, the data visualization region 112 has multiple layers that are referred to as sheets.

Figure 2:
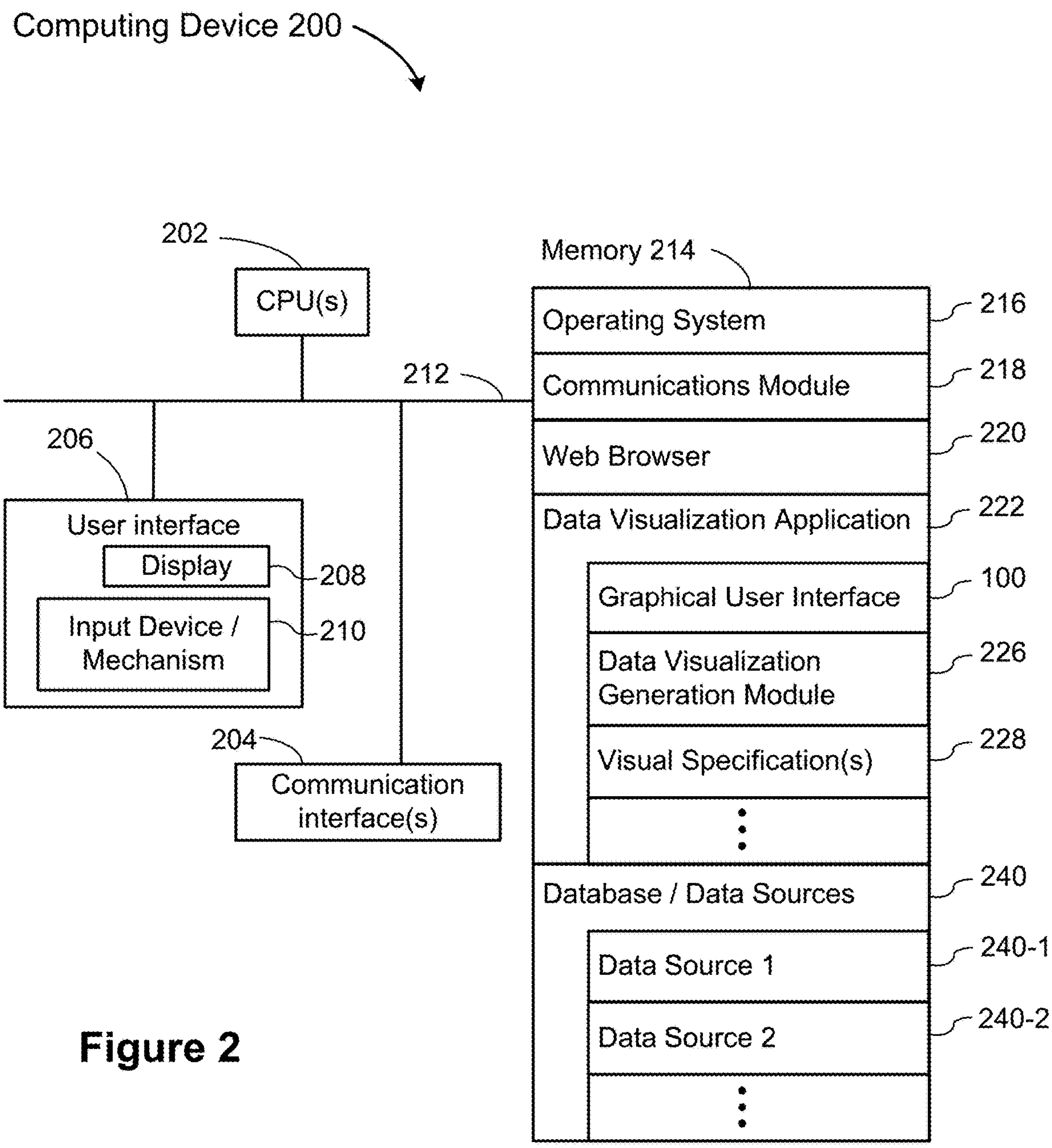
FIG. 2 is a block diagram of a computing device according to some implementations.

FIG. 2 is a block diagram illustrating a computing device 200 that can display the graphical user interface 100 in accordance with some implementations. Computing devices 200 include desktop computers, laptop computers, tablet computers, and other computing devices with a display and a processor capable of running a data visualization application. A computing device 200 typically includes one or more processing units/cores (CPUs) 202 for executing modules, programs, and/or instructions stored in the memory 214 and thereby performing processing operations; one or more network or other communications interfaces 204; memory 214; and one or more communication buses 212 for interconnecting these components. The communication buses 212 may include circuitry that interconnects and controls communications between system components. A computing device 200 includes a user interface 206 comprising a display device 208 and one or more input devices or mechanisms 210. In some implementations, the input device/mechanism includes a keyboard; in some implementations, the input device/mechanism includes a "soft" keyboard, which is displayed as needed on the display device 208, enabling a user to "press keys" that appear on the display 208. In some implementations, the display 208 and input device/mechanism 210 comprise a touch screen display (also called a touch sensitive display).

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within the memory 214, comprises a non-transitory computer readable storage medium. In some implementations, the memory 214, or the computer readable storage medium of the memory 214, stores the following programs, modules, and data structures, or a subset thereof:

- an operating system 216, which includes procedures for handling various basic system services and for performing hardware dependent tasks;
- a communications module 218, which is used for connecting the computing device 200 to other computers and devices via the one or more communication network interfaces 204 (wired or wireless) and one or more communication networks, such as the Internet, other wide area networks, local area networks, metropolitan area networks, and so on;
- a web browser 220 (or other client application), which enables a user to communicate over a network with remote computers or devices;
- a data visualization application 222, which provides a graphical user interface 100 for a user to construct visual graphics. A user selects one or more data sources 240 (which may be stored on the computing device 200 or stored remotely), selects data fields from the data source(s), and uses the selected fields to define a visual graphic. In some implementations, the information the user provides is stored as a visual specification 228. The data visualization application 222 includes a data visualization generation module 226, which takes the user input (e.g., the visual specification 228), and generates a corresponding visual graphic (also referred to as a "data visualization" or a "data viz"). The data visualization application 222 then displays the generated visual graphic in the user interface 100. In some implementations, the data visualization application 222 executes as a standalone application (e.g., a desktop application). In some implementations, the data visualization application 222 executes within the web browser 220 or another application; and
- zero or more databases or data sources 240 (e.g., a first data source 240-1 and a second data source 240-2), which are used by the data visualization application 222. In some implementations, the data sources can be stored as spreadsheet files, CSV files, XML files, or flat files, or stored in a relational database.

Each of the above identified executable modules, applications, or set of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 214 may store a subset of the modules and data structures identified above. Furthermore, the memory 214 may store additional modules or data structures not described above.

Although FIG. 2 shows a computing device 200, FIG. 2 is intended more as functional description of the various features that may be present rather than as a structural schematic of the implementations described herein. In practice, and as recognized by those of ordinary skill in the art, items shown separately could be combined and some items could be separated.

Figure 3:
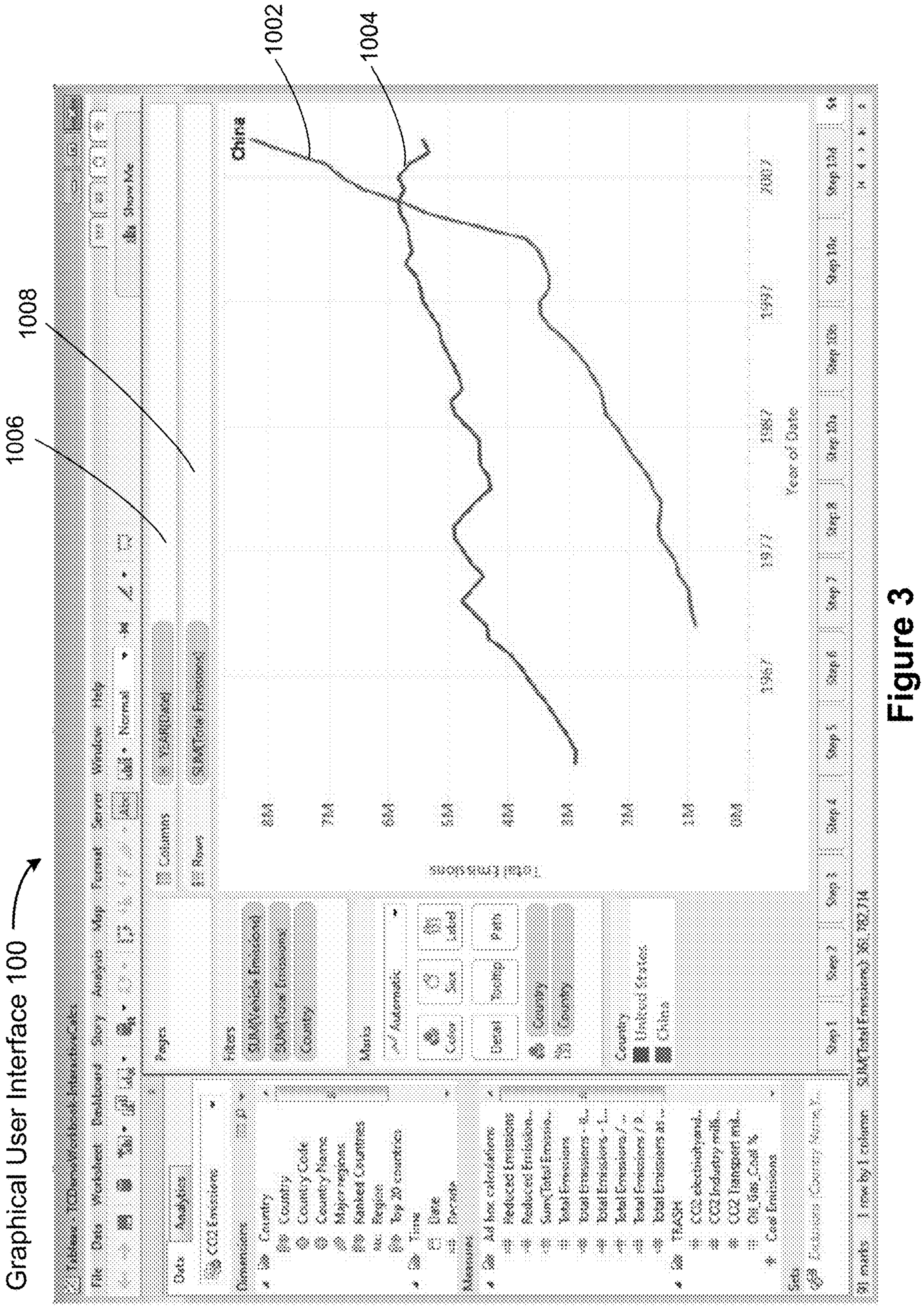
FIGS. 3-117 are screen shots illustrating various features of some disclosed implementations.
Figure 117:
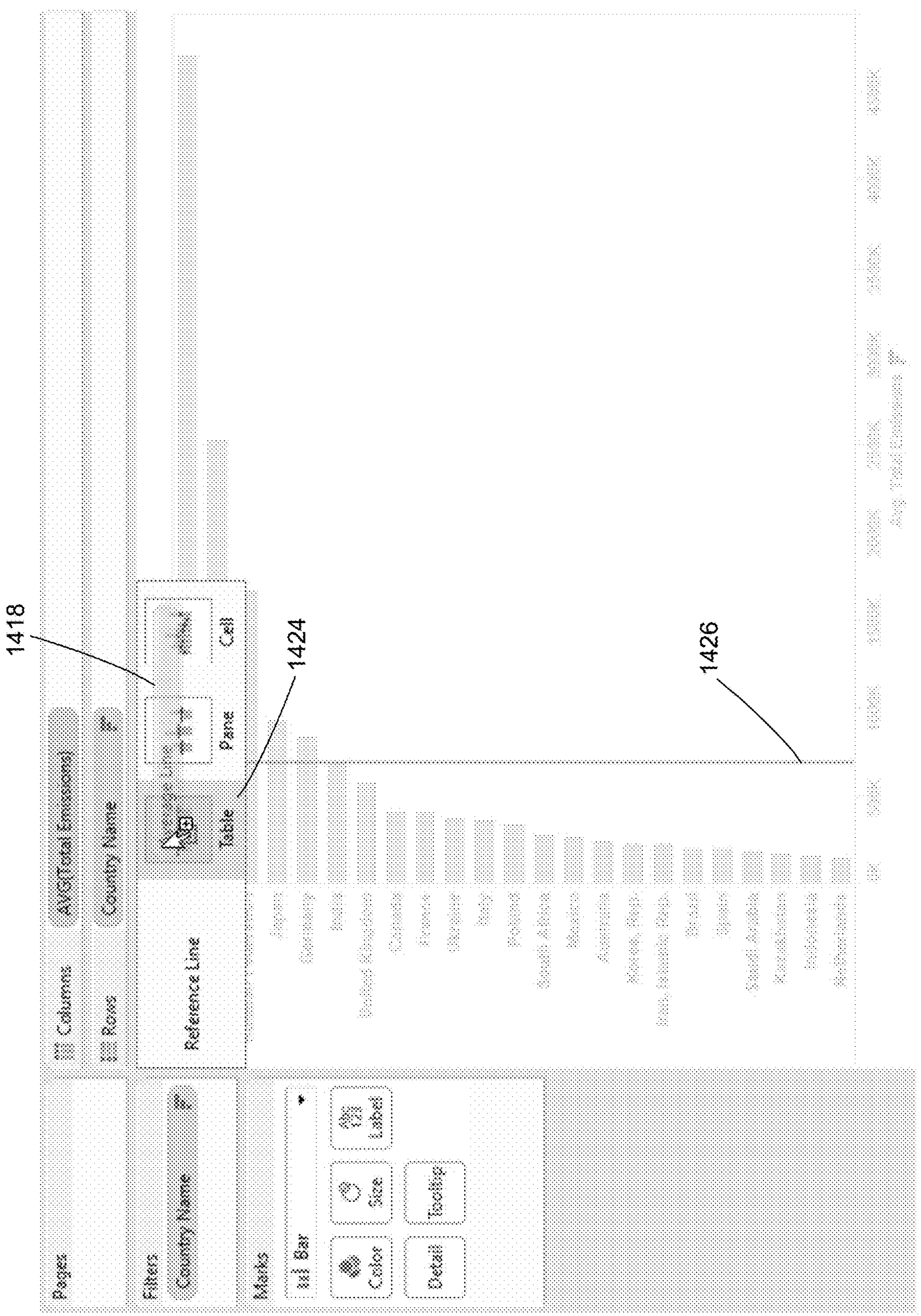

FIGS. 3-117 illustrate various features of some disclosed implementations.

FIG. 3 shows a graphical user interface 100 for exploring a data set using visual graphics. In this example, the underlying data provides information about carbon dioxide emissions for various countries. In this example, each column represents a year, as shown by the YEAR(date) data element in the columns shelf region 1006. For each year, the height of each mark in the graphs is specified by the data element SUM(Total Emissions) in the rows shelf region 1008. In this example, the data is filtered to shown only China and the United States, with color encoding to distinguish them. This line chart includes a China line 1002 that represents the total carbon dioxide emissions in China, and a United States line 1004, representing the total carbon dioxide emissions in the United States. At this time the visual graphic is displaying the data visually, but no analytic operations have been applied.

In FIG. 4, the user has selected the Analytics tab 1010, and thus the interface 100 displays analytic operations. In some implementations, the analytic operations are grouped together. In the illustrated implementation, there is a first group 1012 of analytic operations that can be used to summarize the data in various ways. As illustrated here, the "Summarize" group includes: constant lines (e.g., a horizontal line with a fixed value); average lines (e.g., a line whose height is the average height of the individual data points); an analytic operation that includes both a median value and quartiles; box plots; and totals.

In some implementations, there is a second group 1014 of analytic operations that perform statistical modeling. In some implementations, the "Model" group 1014 includes an analytic operation to show both an average line and a 95% confidence interval, an analytic operation to compute a trend line (a regression line), and an analytic operation to compute a forecast line. In some implementations, a forecast line is implemented by extending a trend line on a temporal axis.

Some implementations also provide a third group 1016 of custom analytic operations, which may be reference lines, reference bands, or distribution bands. When used, the user can specify various parameters of the custom reference analytics.

In some implementations, analytic operations that are not currently applicable are dimmed, grayed out, displayed in a different color and/or otherwise de-emphasized.

The analytic operators available on the Analytics tab are displayed as selectable icons or "pills." The term "pill" is sometimes used because of the pill shape displayed when an analytic operator icon is selected or dragged in some implementations.

Figure 5:
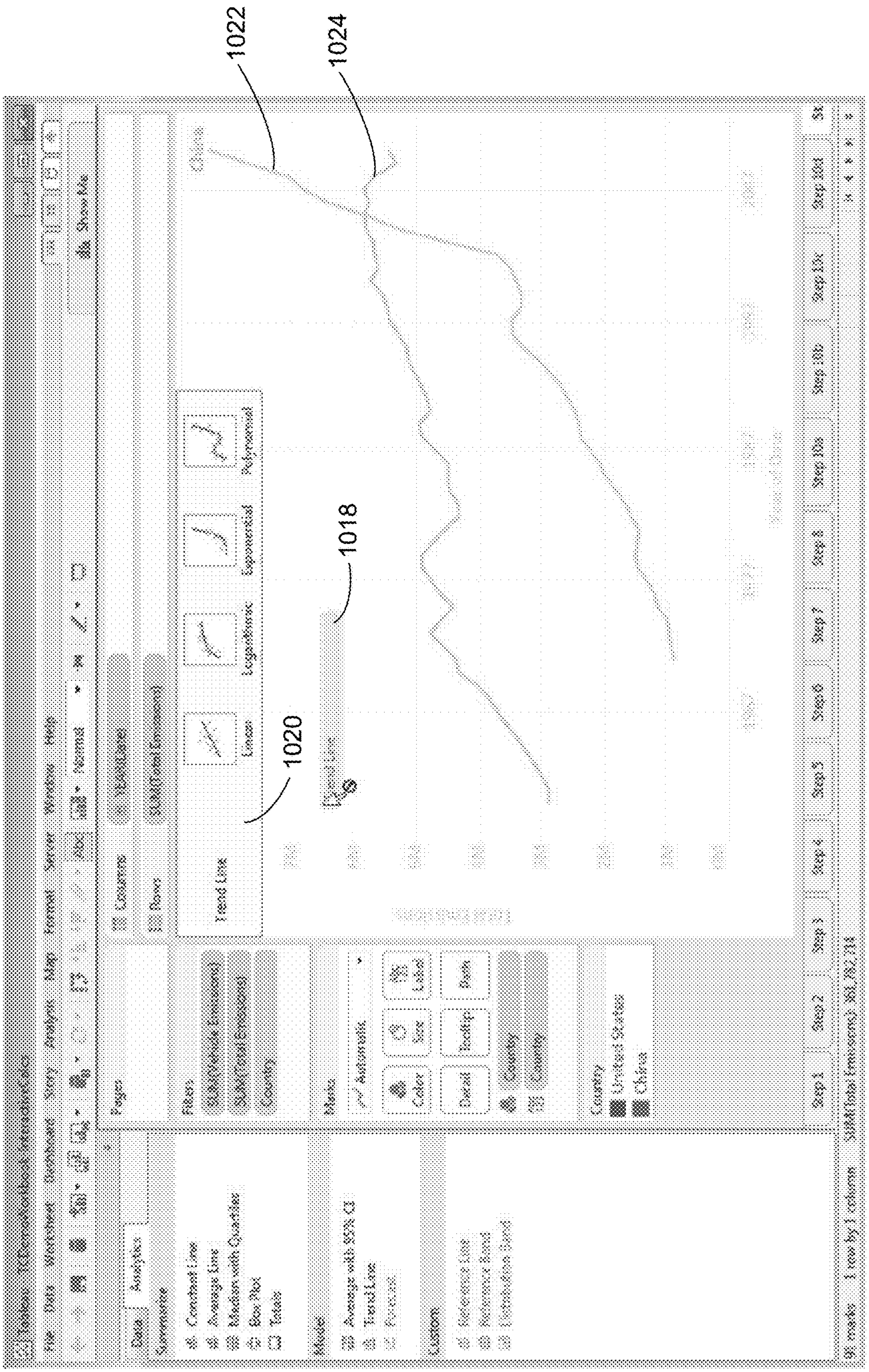

FIG. 5 illustrates that a user has selected the trend line icon 1018, and is dragging the trend line icon 1018 to the drop spot 1020. In this implementation, the drop spot appeared when the user dragged the icon 1018 from the analytic pane. The drop spot 1020 includes four option icons, each representing a different type of trend line. In this example, the four options include both labels ("Linear," "Logarithmic," etc.) as well as visual graphics that illustrate the trend line options. The user can select which type of trend line to create by dropping the trend line pill 1018 on the appropriate option icon. During the drag operation, the China line 1022 and United States line 1024 in the visual graphic have been dimmed.

Figure 6:
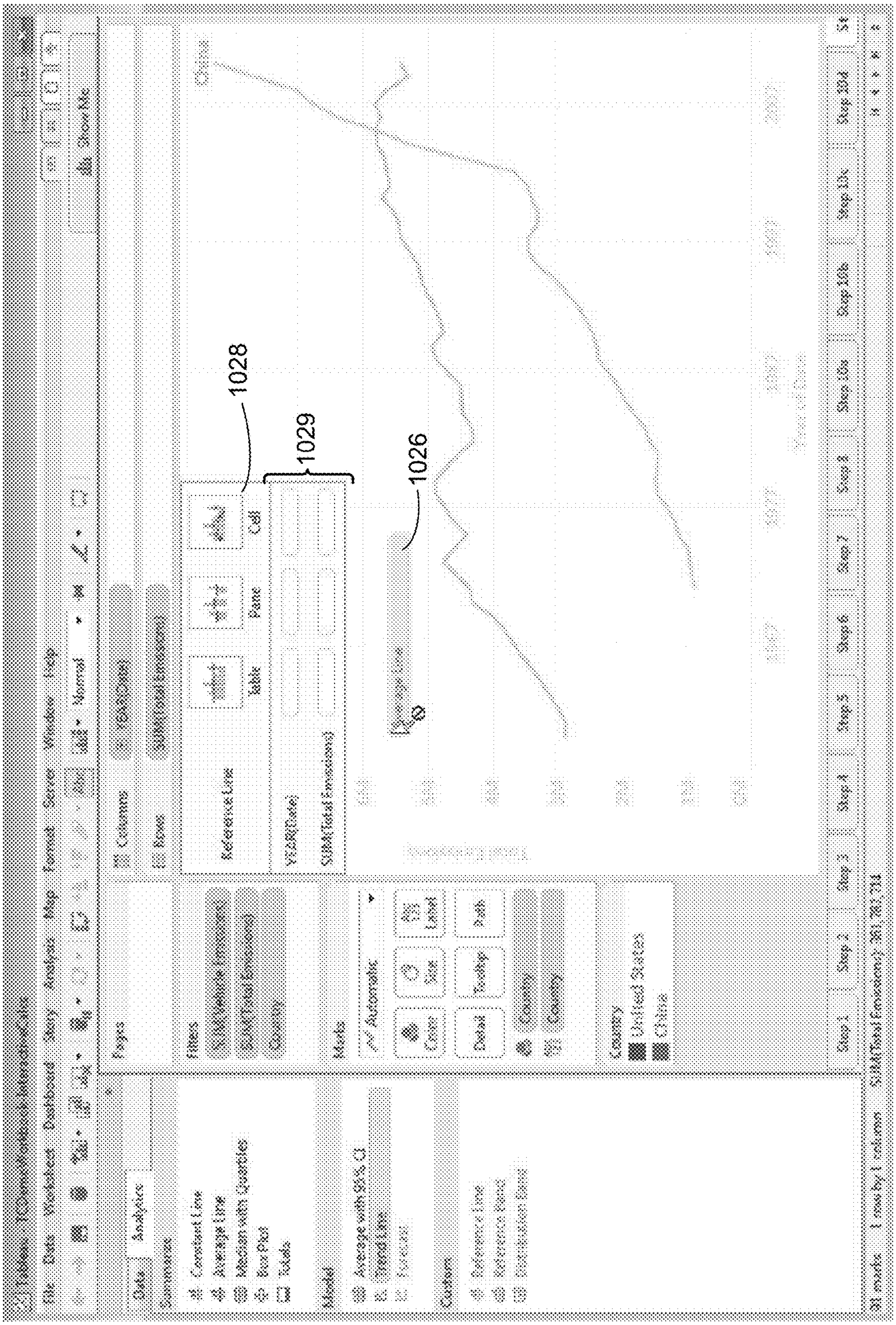
Figure 89:
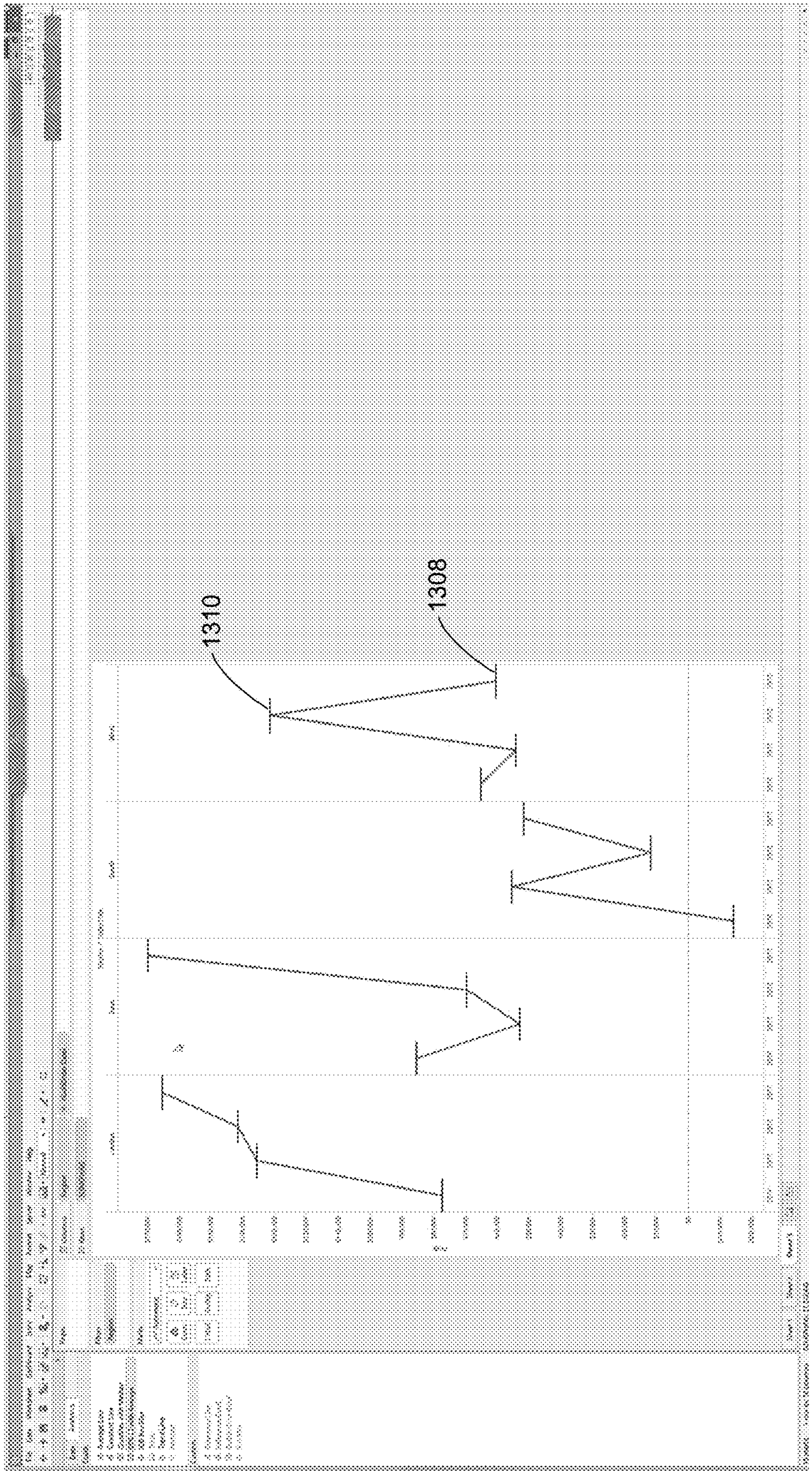

In FIG. 6, the user has selected the average line icon 1026, and is dragging the average line icon 1026 to the drop spot 1028. This drop spot appeared when the user dragged the average line icon 1026 away from the analytic pane. The drop spot 1028 includes three option icons, which provide three different ways that average lines may be applied. In this case, the options are: a single average line for the entire table, an average line for each pane, or an average line for each cell. In this example there is only one pane, but in some instances a data visualization is subdivided into two or more panes (like a window for a house). For example, in FIG. 33 there are two panes 1116 and 1118. When there are multiple panes, the user can choose to have a separate average line for each pane. A "cell" here is an individual data point, so creating an average line for each cell would produce a small horizontal line for each year. An example of this is shown in FIG. 89.

In some instances, an analytic operation can be applied to the data visualization based on two or more different data elements, such as creating a horizontal average line for one data element or a vertical average line for a different data element. This is sometimes referred to as a multi-axis or multi-measure scenario. In FIG. 6, both of the axes use a numeric quantity (Year(Date) for the x-axis and SUM(Total Emissions) for the y-axis). To address which reference object(s) to create, some implementations provide a list region 1029 that identifies each of the choices. In this example, if the user wants both average lines (horizontal and vertical), the user can use the drop targets in the main drop area 1028. However, if the user wants only one of the choices, the user can drop the average line pill 1026 onto one of the individual drop boxes in the list region 1029. The list region is a two-dimensional grid because the user must choose an option that identifies both the data element (Year(Date) or SUM(Total Emissions)) as well as a scope (table, pane, or cell).

In some implementations, the list region 1029 illustrated in FIG. 6 has more than two data elements because a user may place two or more data elements on the columns shelf 120 or the rows shelf 122. For example, the user could include both SUM(Total Emissions) as well as SUM(Vehicle Emissions) on the rows shelf 122, creating a data visualization with two vertical panes (one showing Total Emissions by year and the other showing Vehicle Emissions by year). In this example, when dragging the average line pill 1026, there would be three data elements in the list region 1029.

The list region 1029 illustrated here applies to other analytic operations as well when they can apply to more than one axis and/or more than one data element. Analytic operations are generally available only for numeric data elements (e.g., measures), so the analytic operations that can be applied depend on the data types of the data elements placed in the columns shelf 120 and the rows shelf 122.

Figure 7:
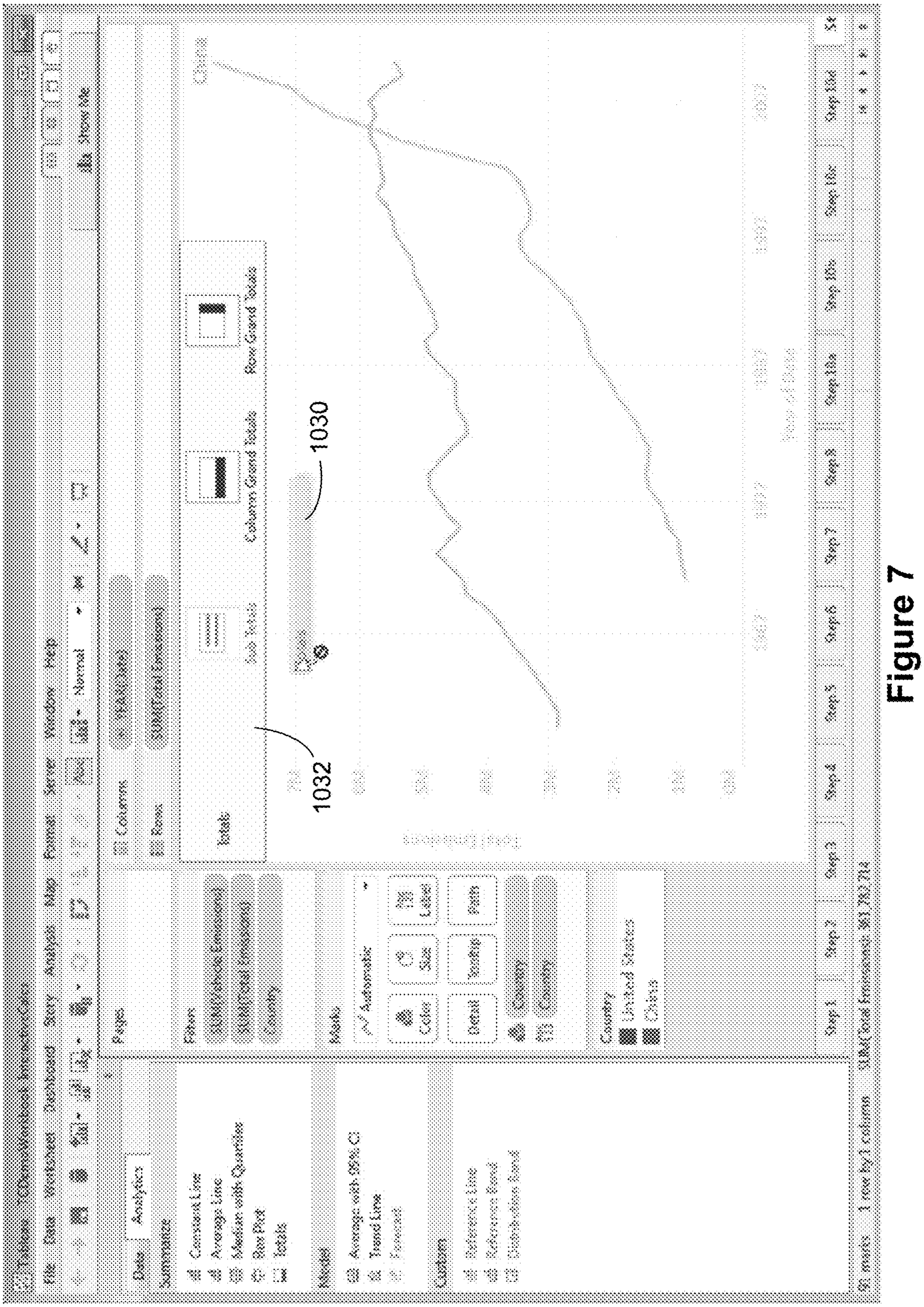

In FIG. 7, the user has selected the totals icon 1030, and is dragging the totals icon 1030 to the totals drop location 1032, which appeared in the data visualization region once the totals icon was dragged from the analytics pane. As illustrated in this example, there are three totals option icons. The first option ("Sub Totals") is dimmed to show that it is not available. The other two icon options can be used to generate grand totals by column or by row.

Figure 8:
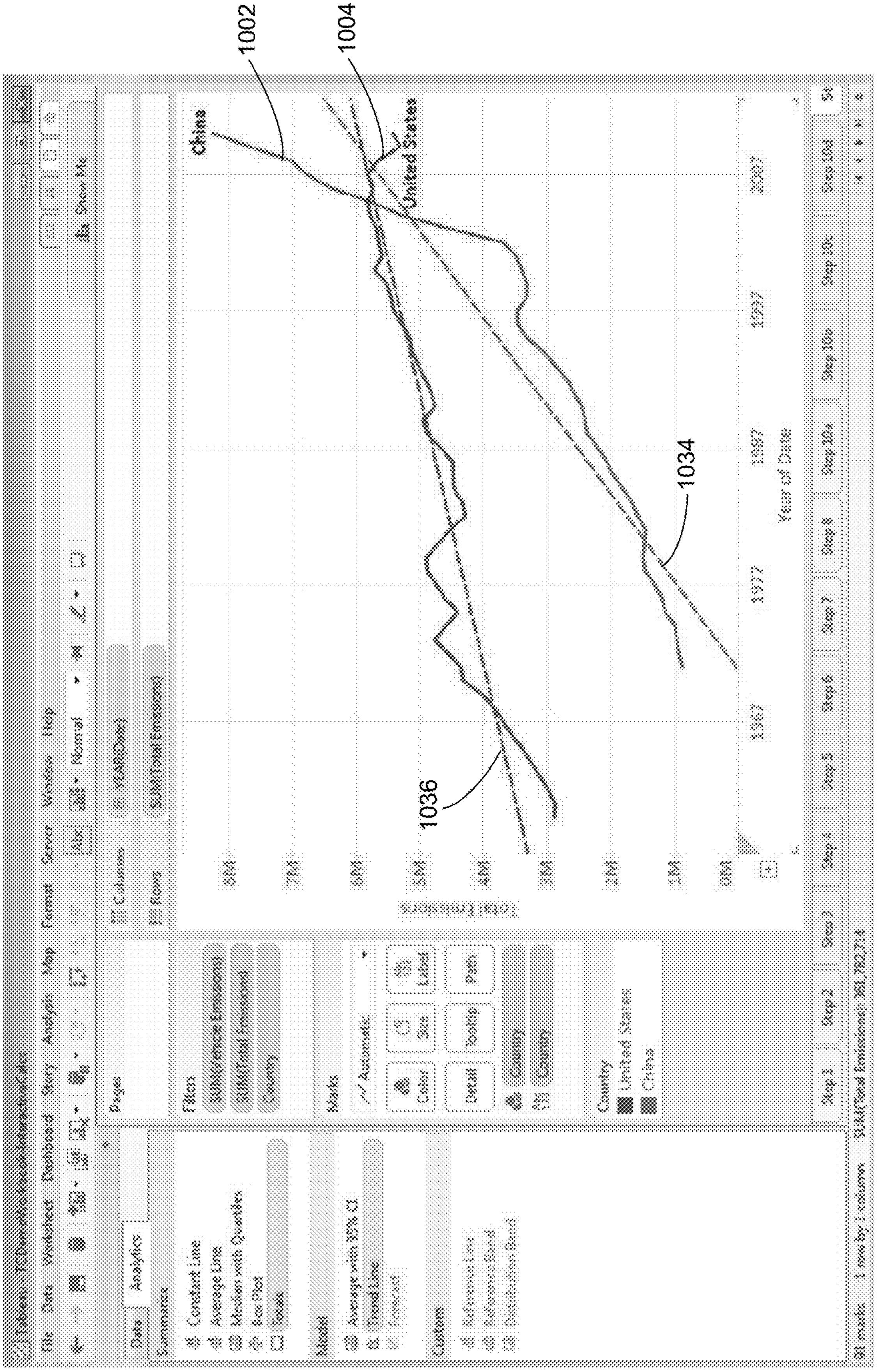

FIG. 8 illustrates linear trend lines. This is displayed after the user drops the trend line icon 1018 into the drop location 1020 on top of the "Linear" option icon. Because the graphic displays separate lines for China and for the United States, a separate trend line is created for each. Specifically, the United States trend line 1036 and the China trend line 1034 show the trends in usage for the two countries.

Figure 9:
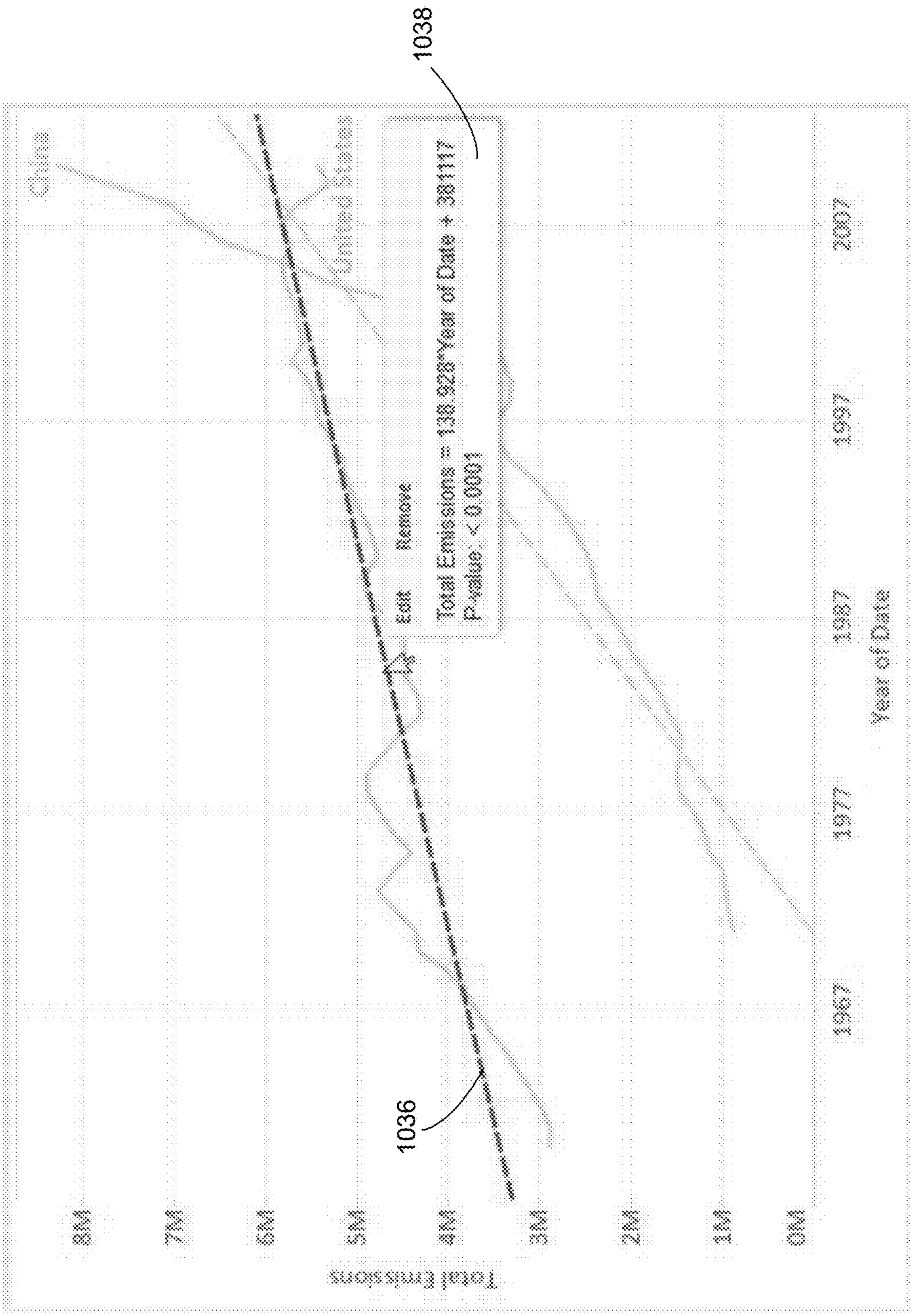

As illustrated in FIG. 9, some implementations display a tooltip box 1038 when a user hovers (e.g., leaving the cursor at the same location for a predefined period of time, such as a second) over an analytic element (e.g., the trend line 1036 here). The tooltip box 1038 for an analytic element can provide information about the analytic element, such as a formula.

Figure 10:
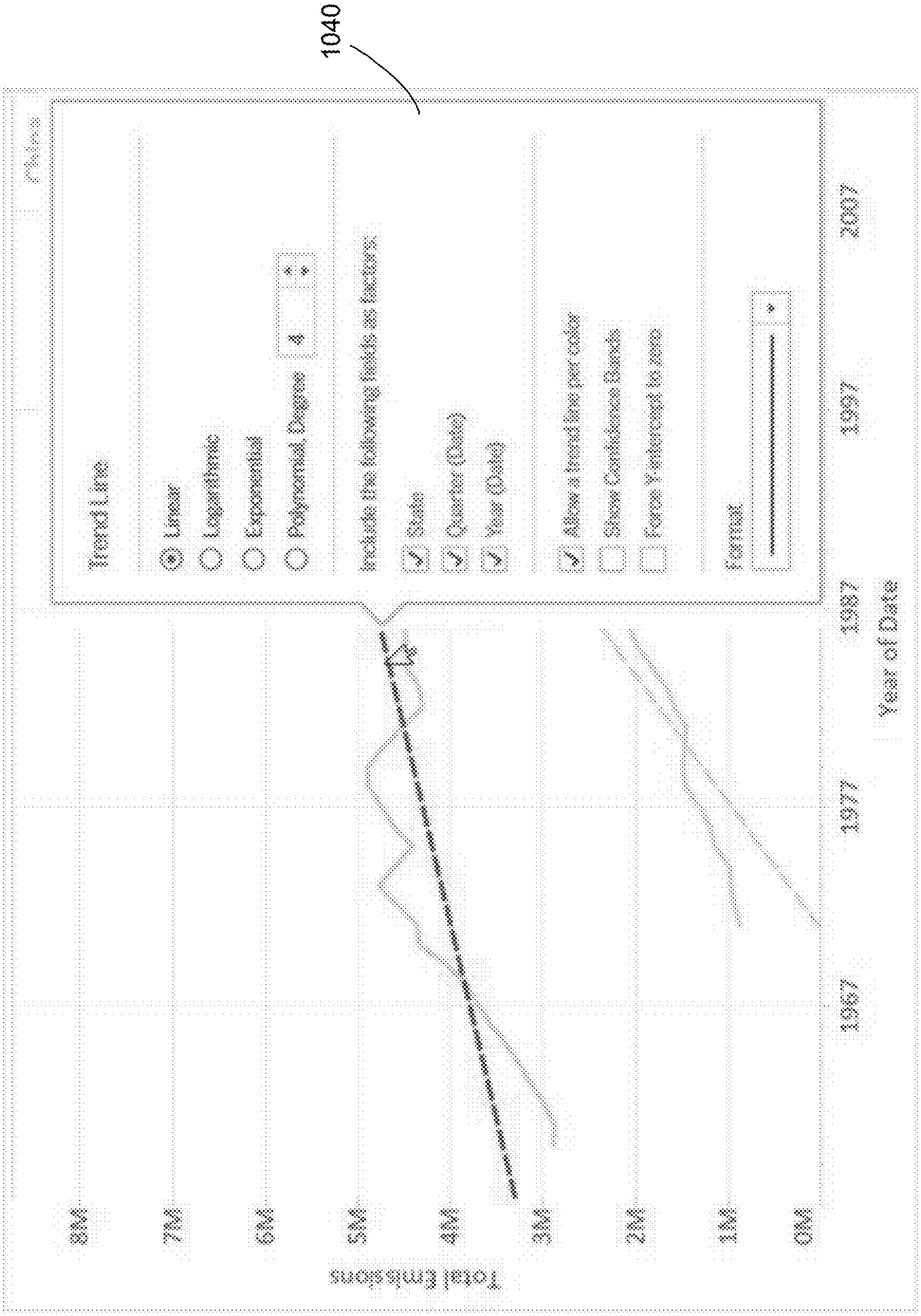

FIG. 10 illustrates that some implementations allow a user to edit a trend line or other analytic object. In some implementations, a user can initiate editing an analytic object by double clicking on it, or by selecting the object and using a context sensitive menu (e.g., using a right click). When editing is initiated, the user interface 100 brings up an edit box 1040, such as the one illustrated in FIG. 10.

Figure 11:
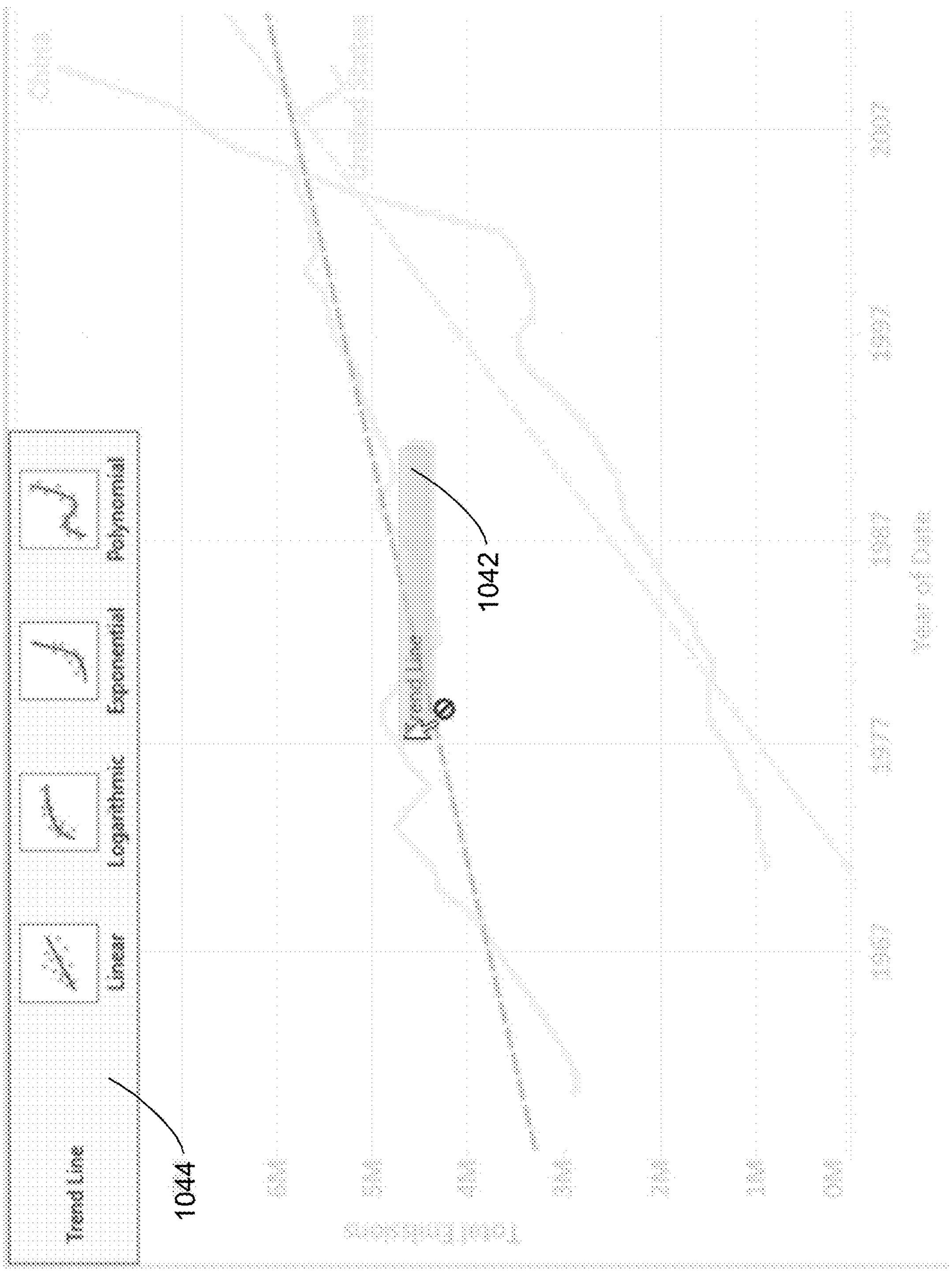

Some implementations allow a user to drag a trend line 1042 (or other analytic object), as illustrated in FIG. 11. The user can drag the existing analytic object 1042 to the drop spot 1044, and select a different option for the analytic object (e.g., select a different type of trend line).

Figure 12:
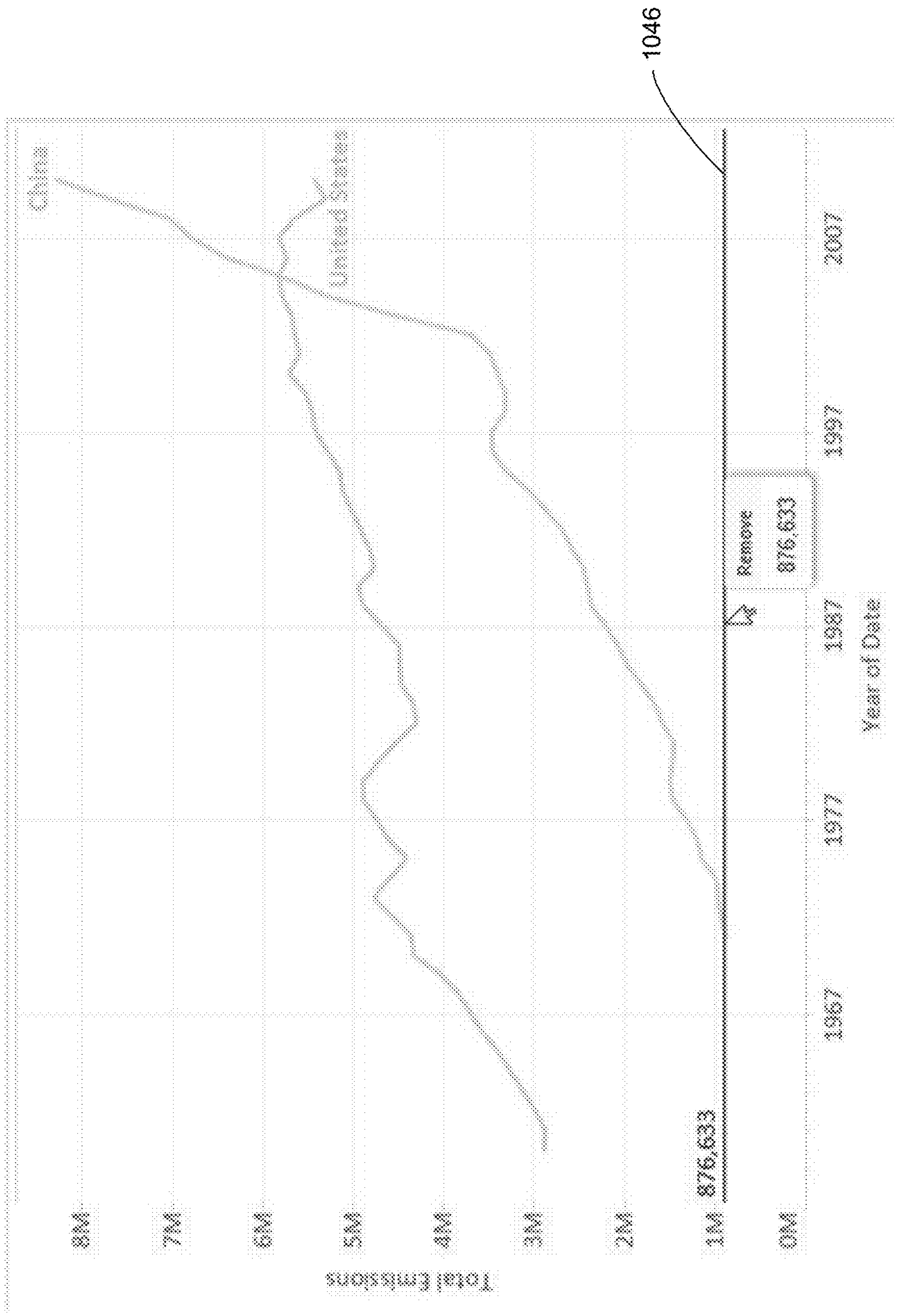
Figure 13:
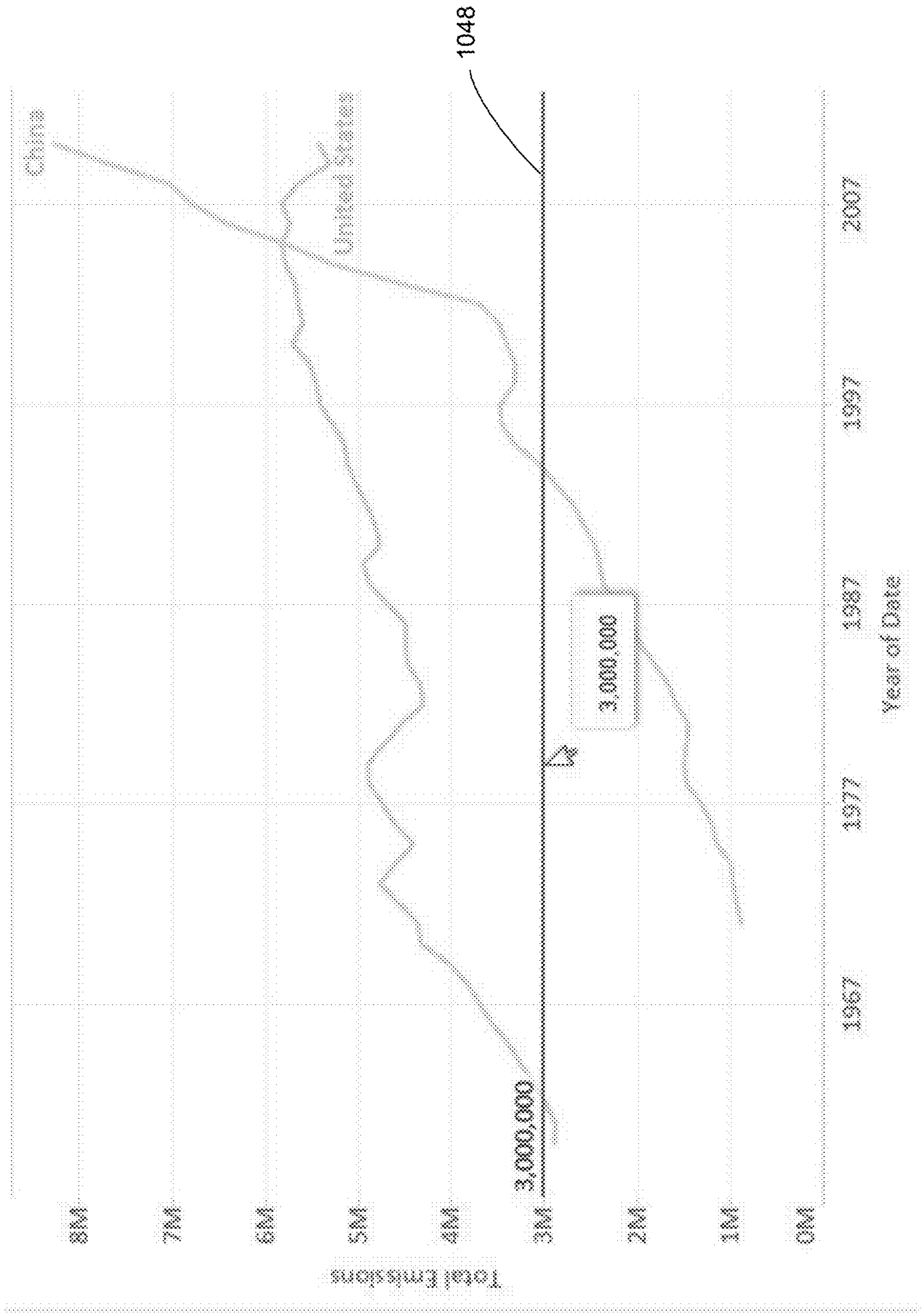
Figure 14:
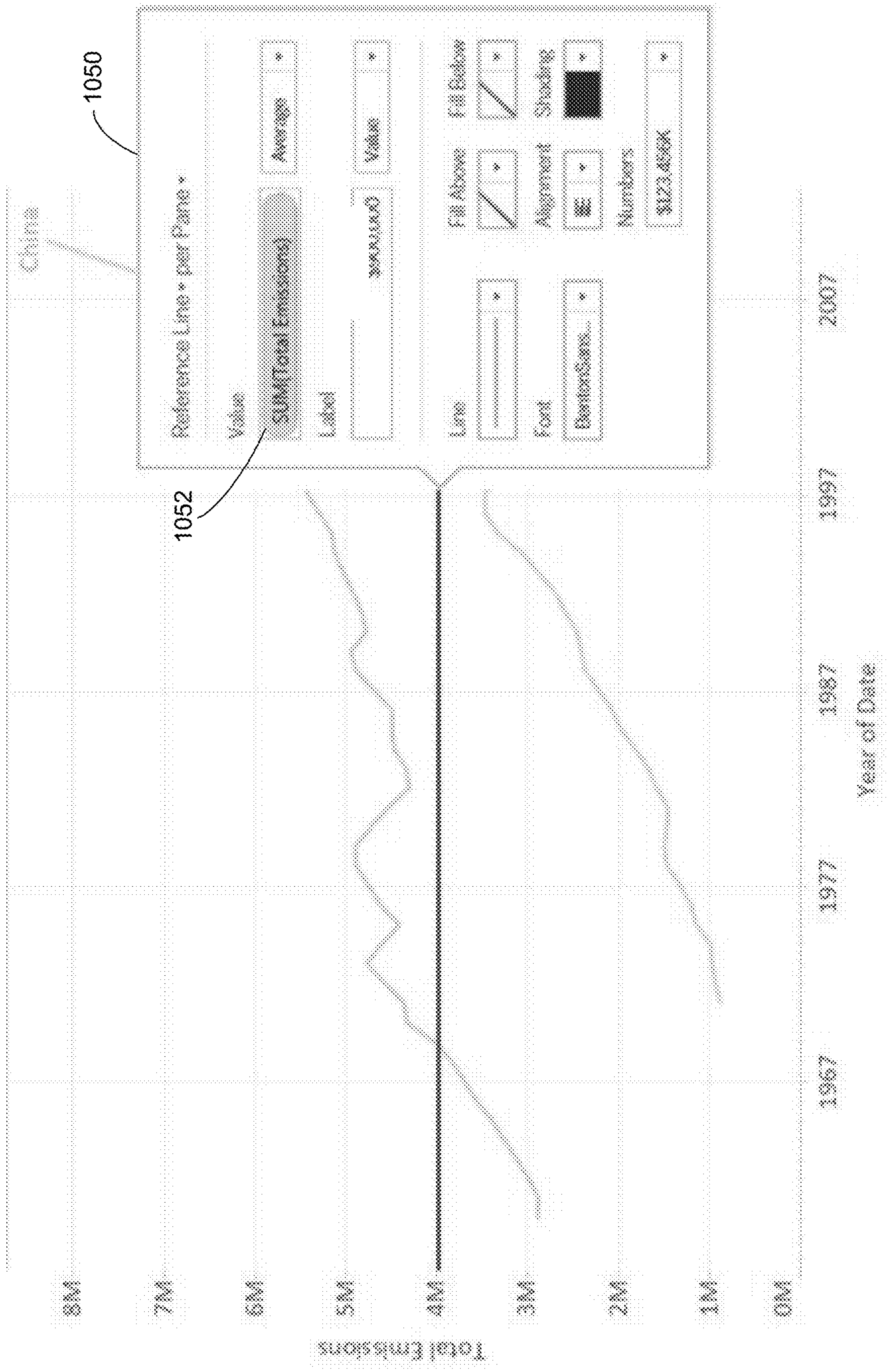
Figure 15:
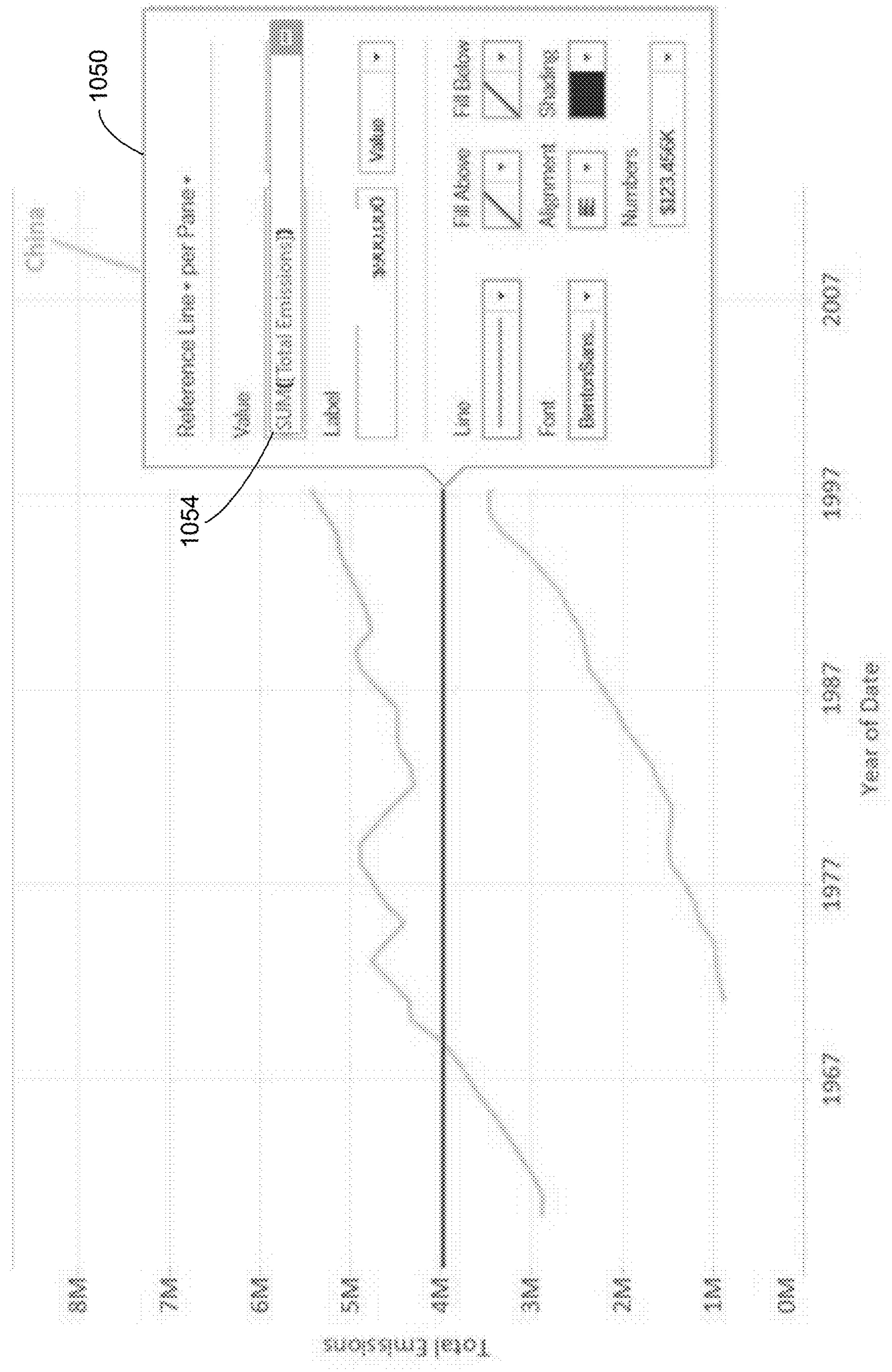

As illustrated in FIGS. 12 and 13, a user can drag a constant line (such as the constant line 1046) to a different location, which results in displaying a new constant line 1048 with a different constant value.

Figure 16:
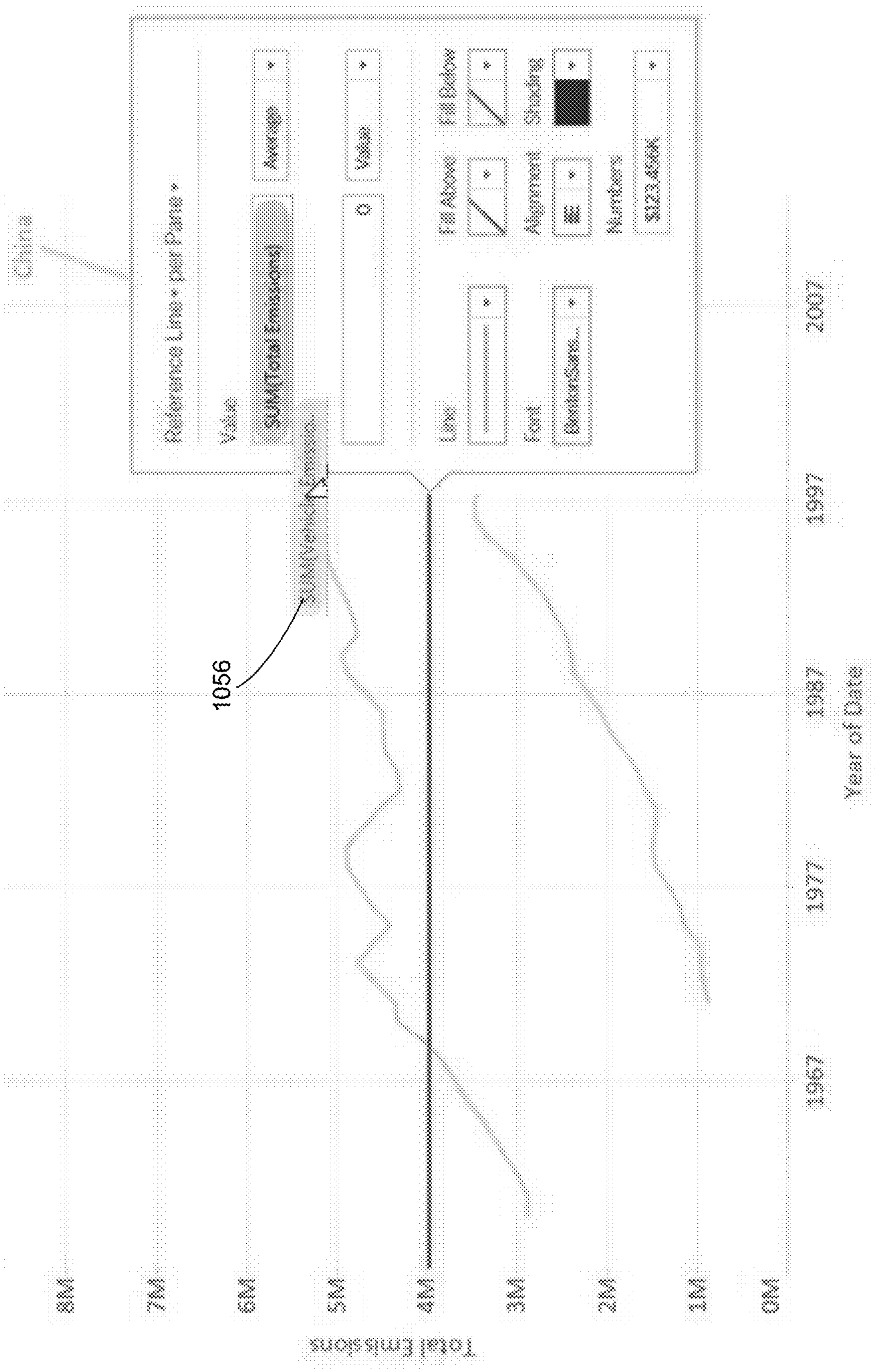
Figure 17:
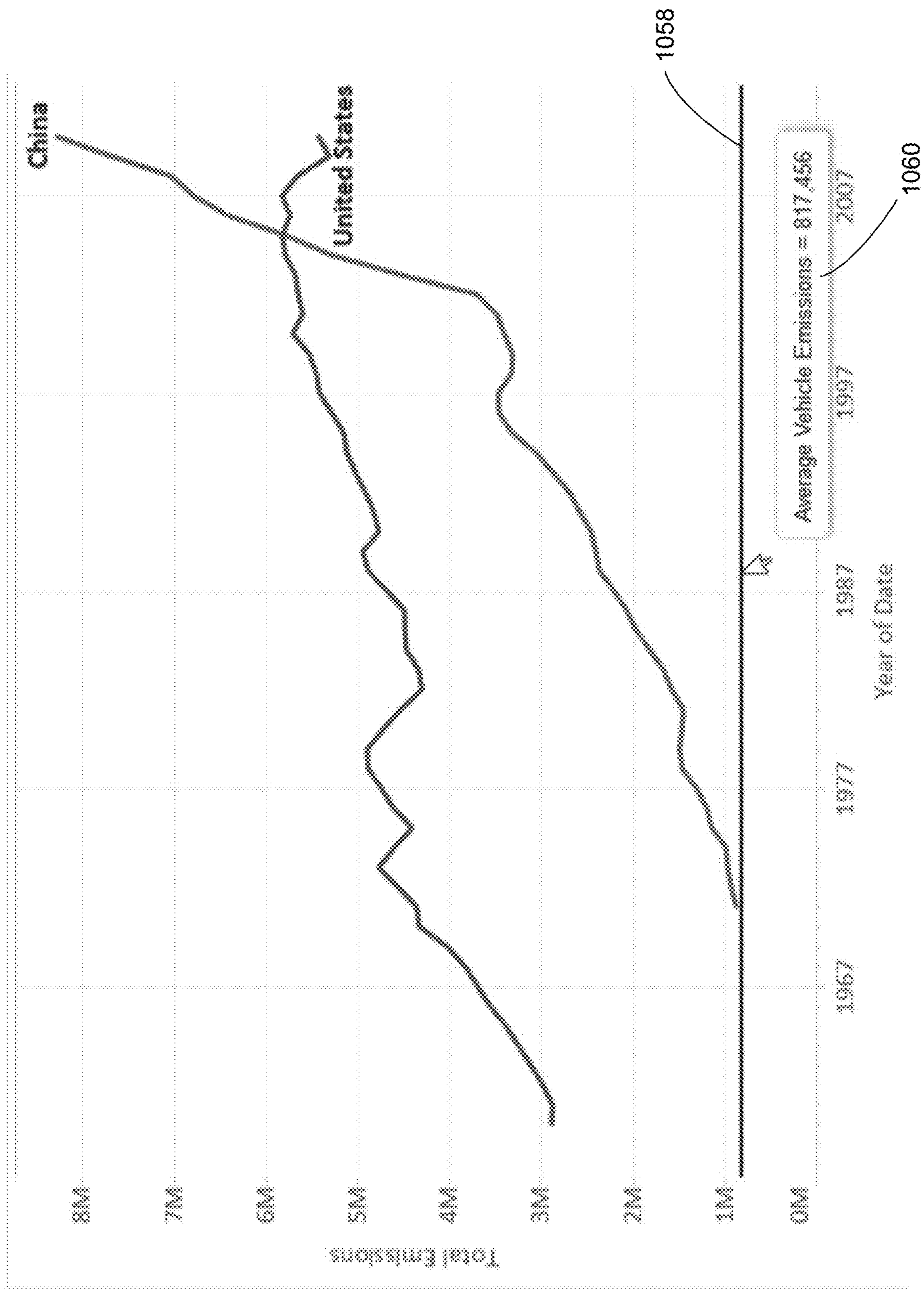

FIGS. 14-17 illustrate editing properties of an average line. Like other analytic objects, a user can bring up an edit box 1050 by double clicking on it, using a context sensitive menu, using a pull down menu, or using a toolbar icon. In this case, the average line computes the average of the sum of total emissions, as illustrated in the value box 1052. In some implementations, the user can edit the expression 1054. As illustrated in FIG. 16, some implementations allow a user to drop a data element pill 1056 into the value box 1054 to edit the expression. In this case, the user is changing the average from total emissions to just emissions from vehicles. The resulting average line 1058 is displayed in FIG. 17. The user is hovering over this line, so the tooltip 1060 displays.

Figure 18:
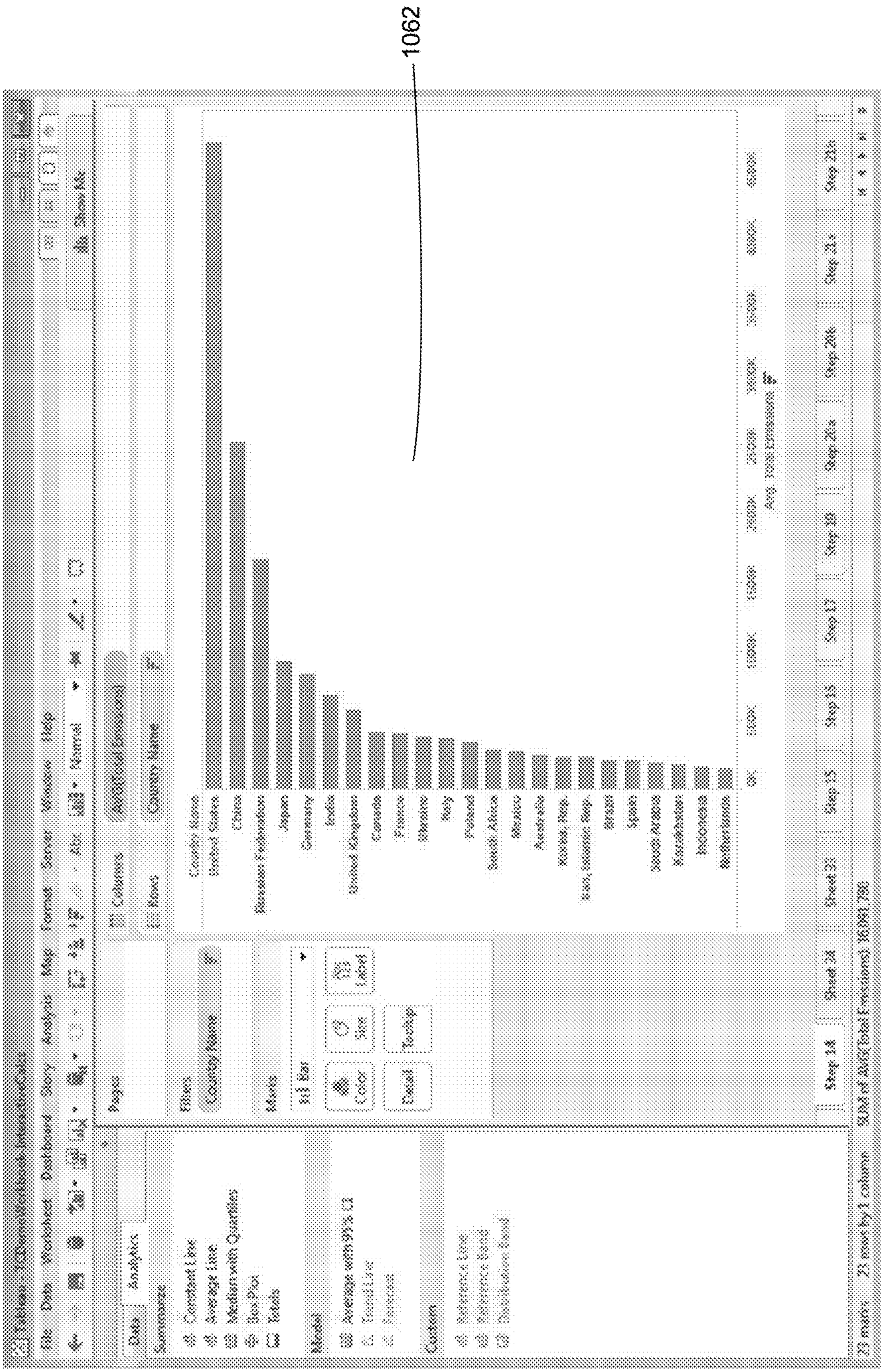

In FIG. 18, the user has switched to a bar chart 1062 to display the carbon dioxide emissions data, and has removed the filter so that the data is displayed for more countries. In this case, there is a single bar for each country, representing the average total emissions for that country.

Figure 19:
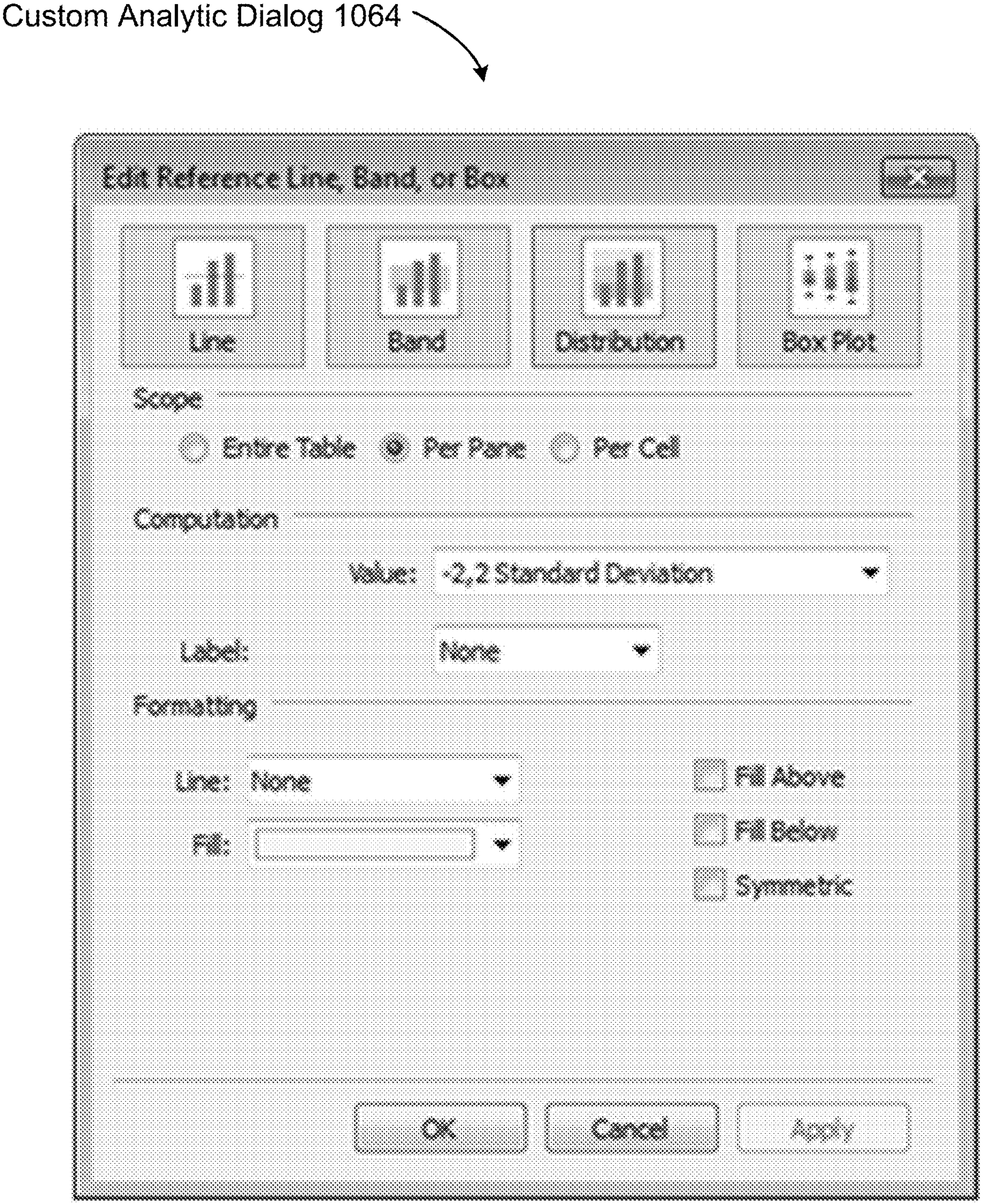
Figure 20:
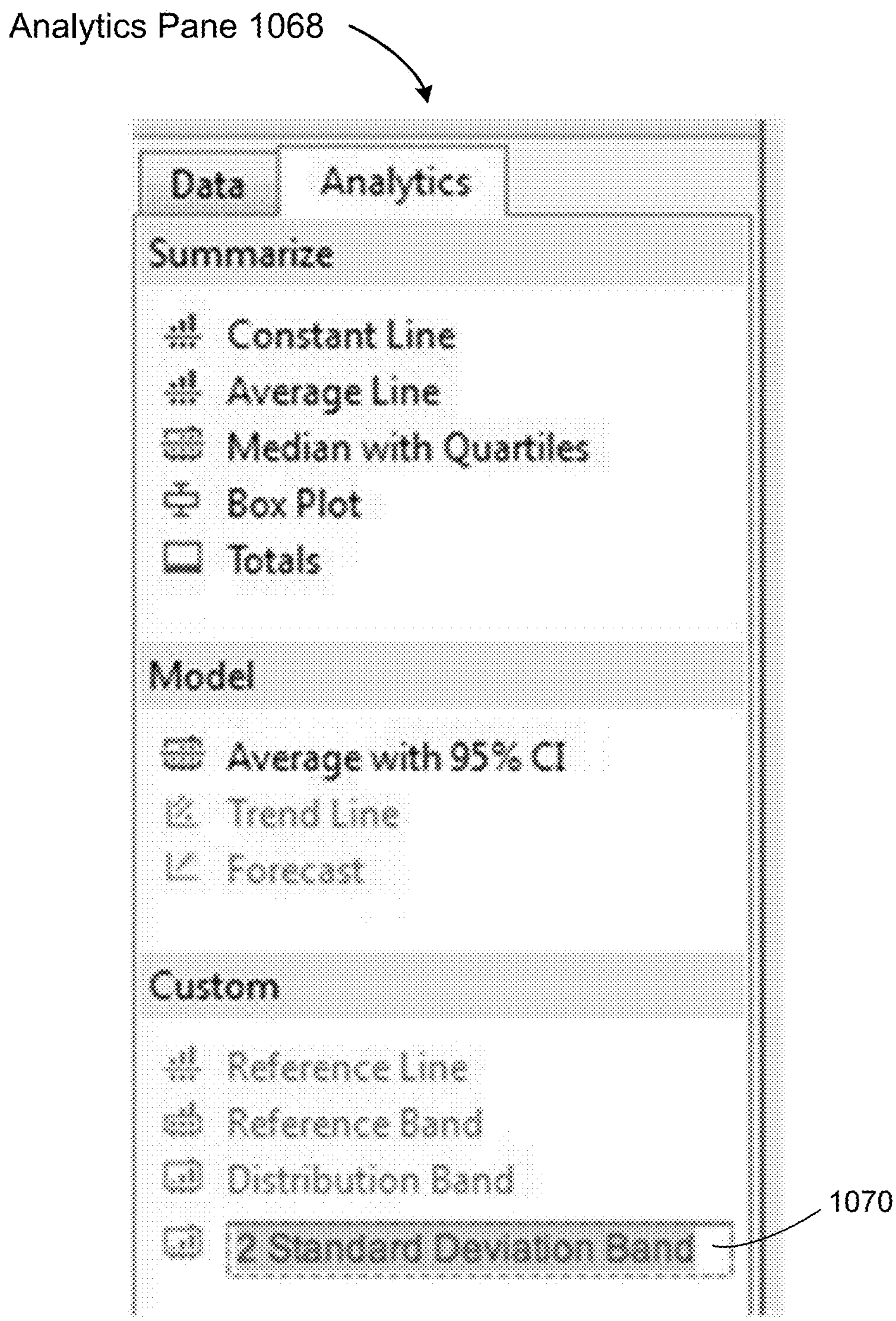
Figure 21:
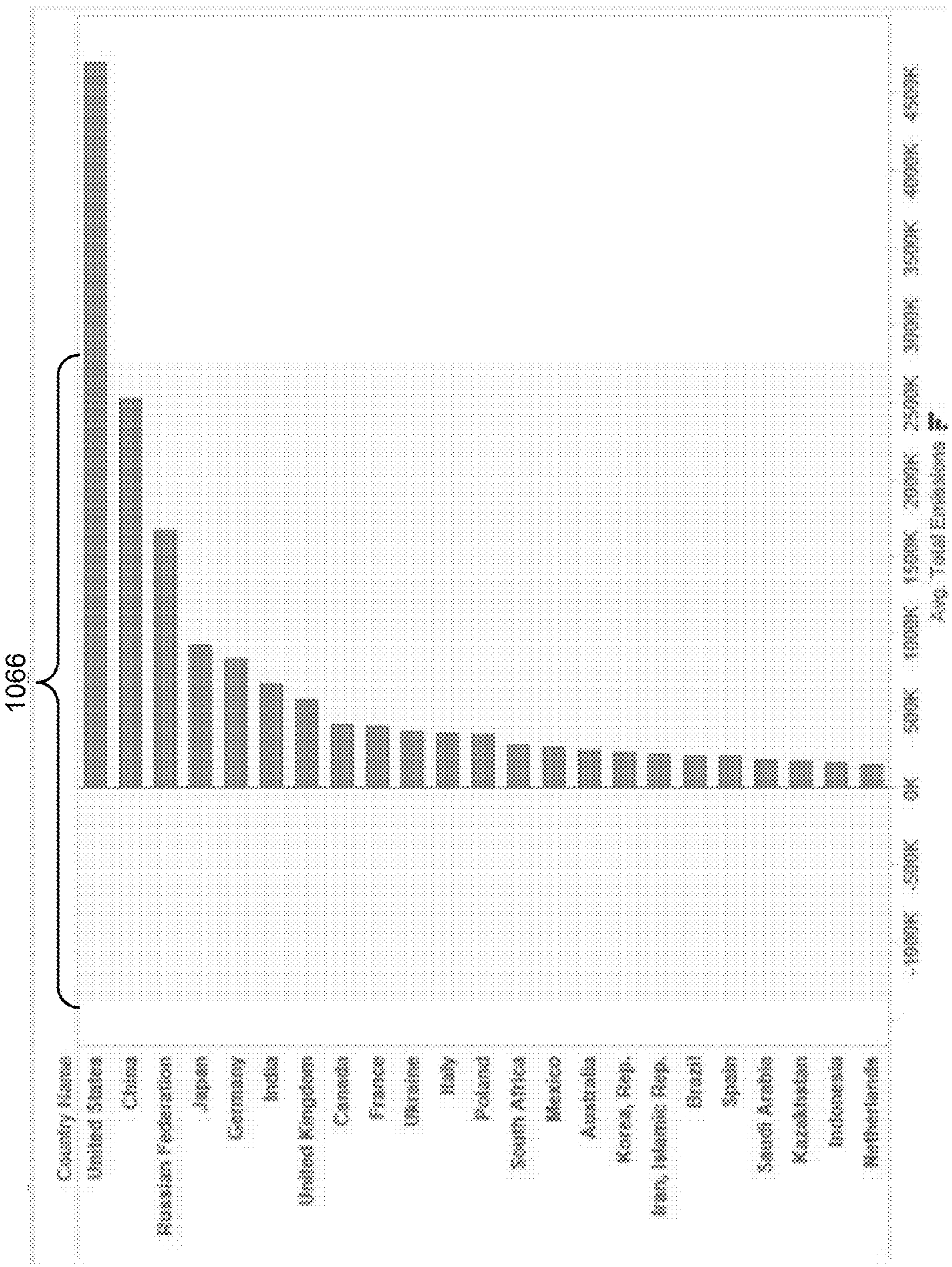

FIG. 19 illustrates a dialog box 1064 for creating a custom analytic operation. When the user saves this custom analytic operation, it appears as a custom analytic icon 1070 in the analytics pane 1068, as illustrated in FIG. 20. Once this analytic operation is defined, the user can apply it, as illustrated in FIG. 21. When this is applied to the graphic in FIG. 18, a distribution band 1066 is displayed.

Figure 22:
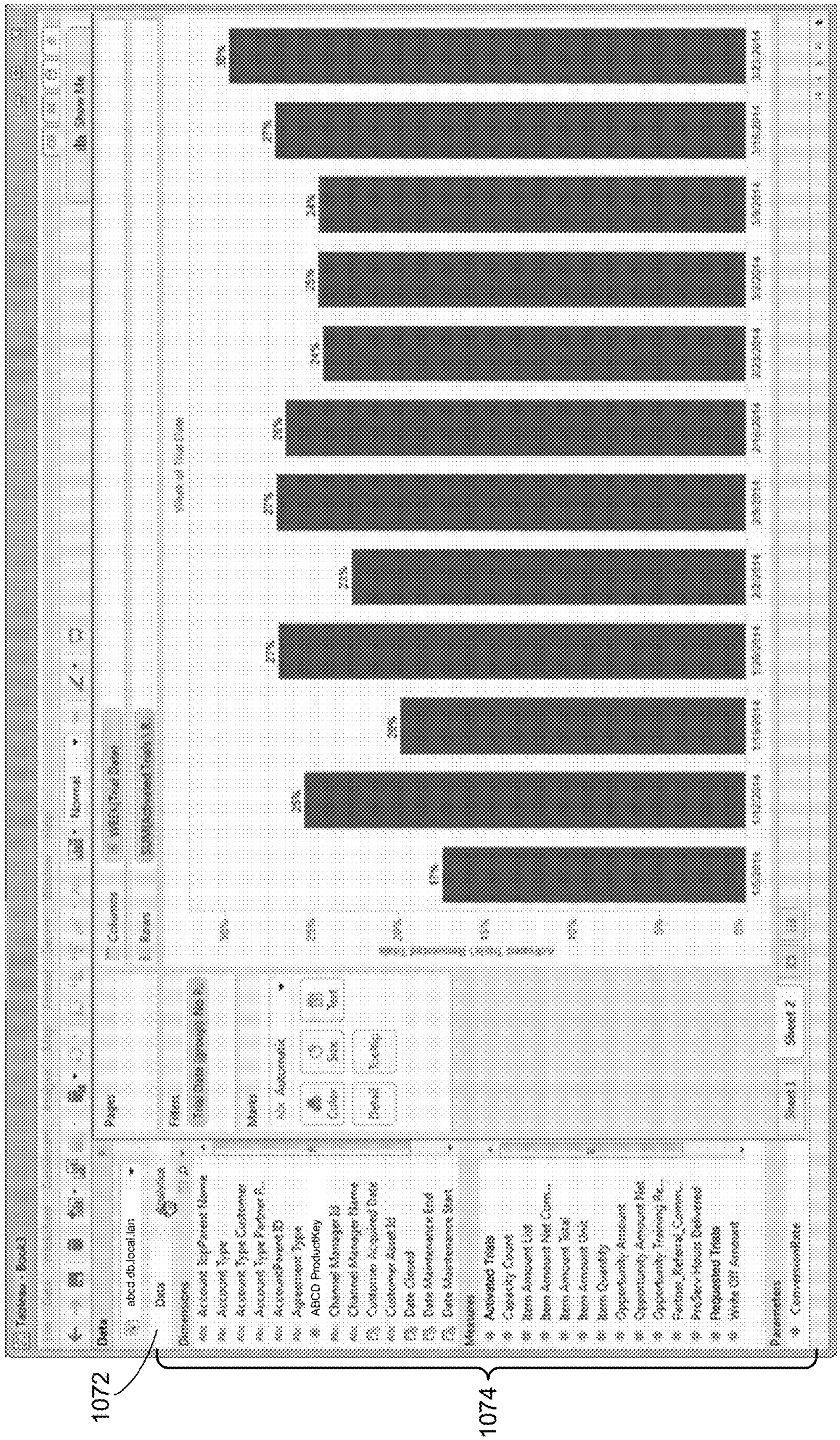
Figure 23:
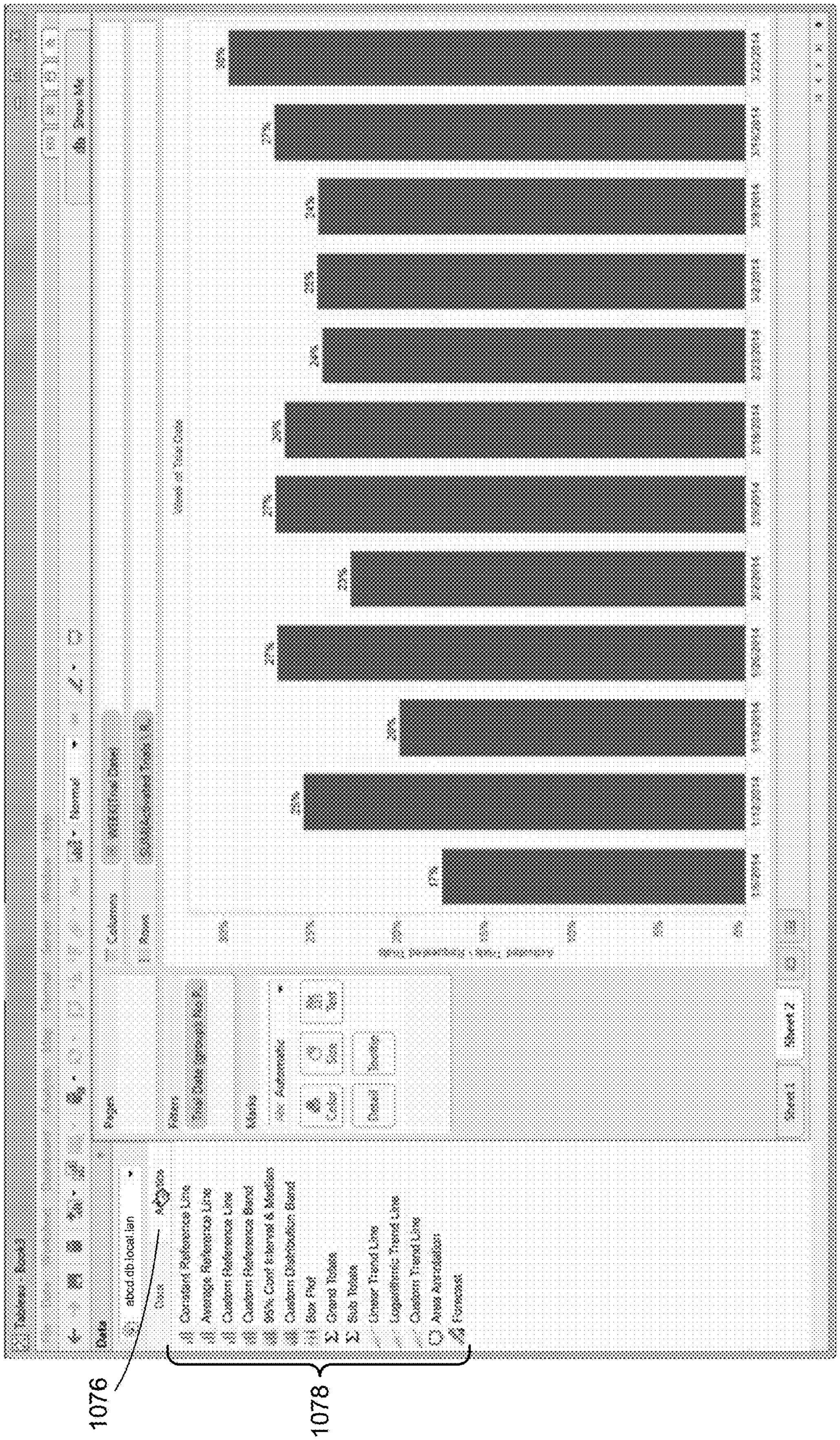
Figure 24:
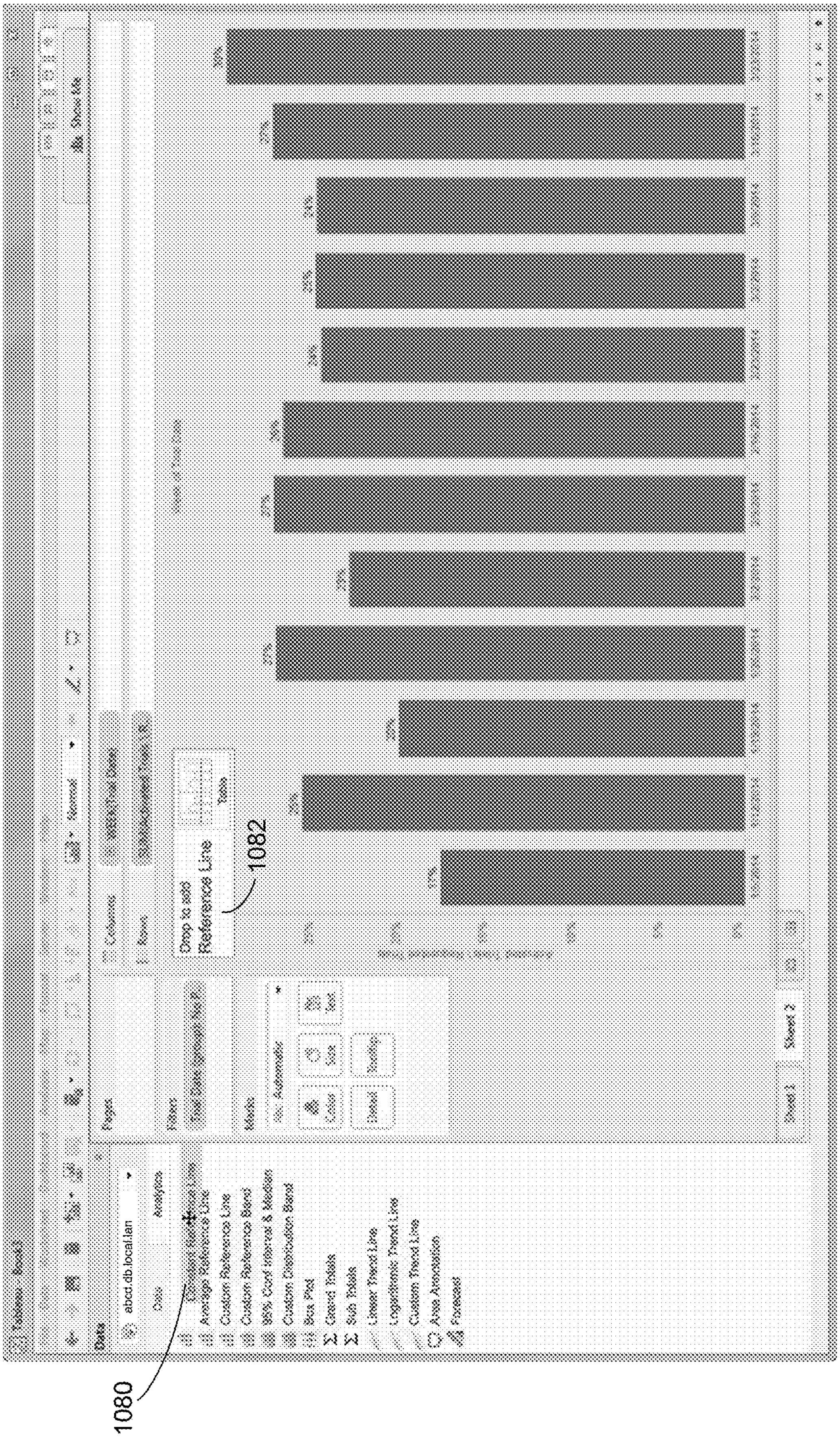
Figure 25:
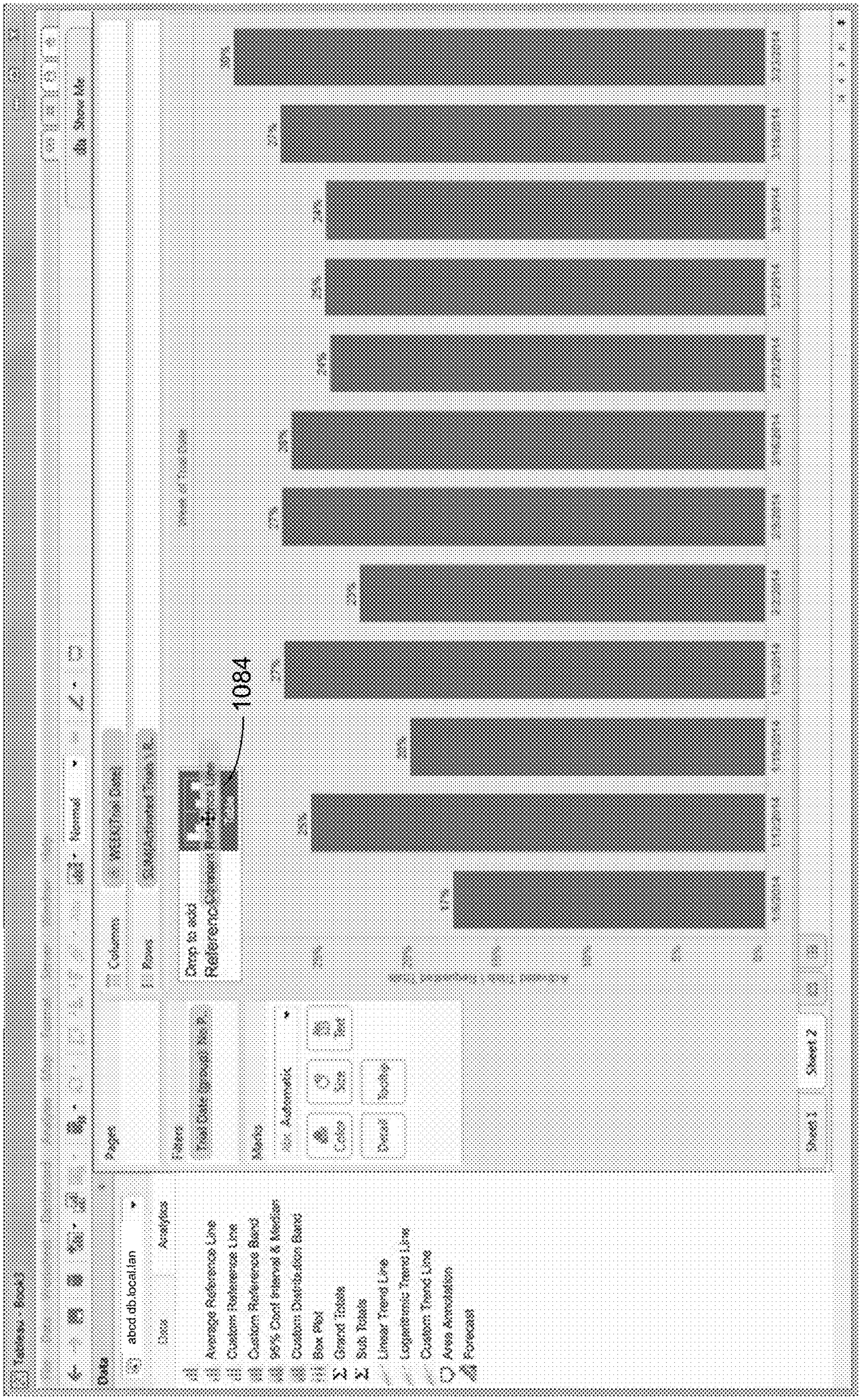

FIGS. 22-36 are a sequence of screen shots that illustrate using analytic functionality for a bar graph. In FIG. 22, the user has the Data tab 1072 open, displaying a set 1074 of data fields (field name or aliases). In FIG. 23, the user has selected the Analytics tab 1076, and a corresponding set of analytic operators 1078 display for user selection. In FIG. 24, the user selects the Constant Reference Line pill 1080, and begins dragging the pill to the drop location 1082. In some implementations, a constant reference line has only one option icon (e.g., "Table"). In some implementations, when there is only a single option, the user can drop the analytic pill 1080 directly onto the visual graphic to create the analytic object (e.g., the constant reference line here). In FIG. 25, the user has brought the reference line icon 1080 over the Table option icon 1084, which is highlighted to indicate that the pill may be dropped at this location.

Figure 26:
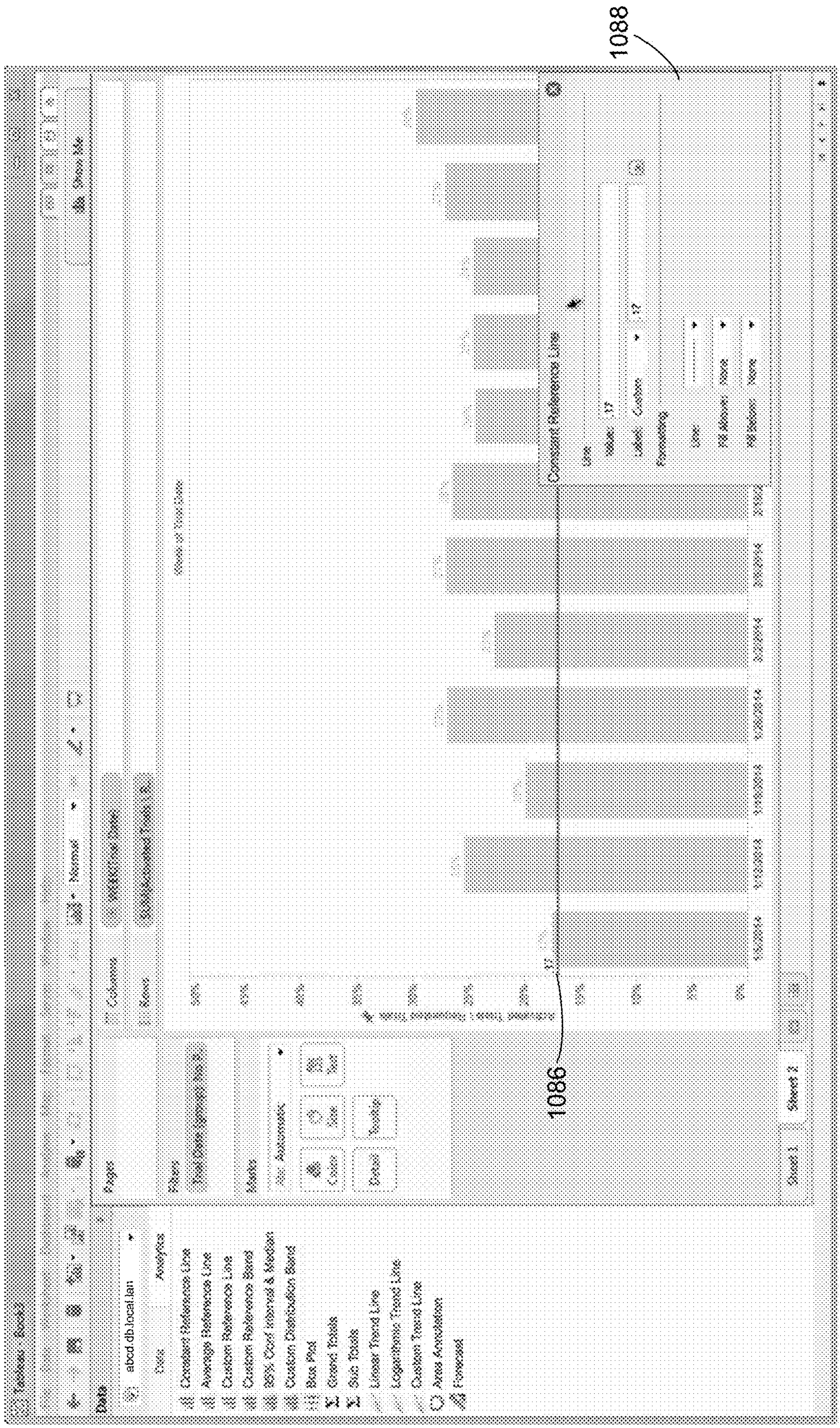

Once the reference line icon 1080 is dropped, the reference line 1086 is created, as illustrated in FIG. 26. In some implementations, an edit box 1088 is displayed immediately so that the user can edit the values that were populated by default. In some implementations, a user has to take an action to bring up the edit box 1088 (e.g., double clicking on the reference line 1086). In the illustrated implementation, the default value 0.17 was selected based on the value of the first vertical bar, but other implementations use other default values (e.g., an average of the values). In this implementation, the default value 0.17 is also used as the default label for the new constant reference line.

Figure 27:
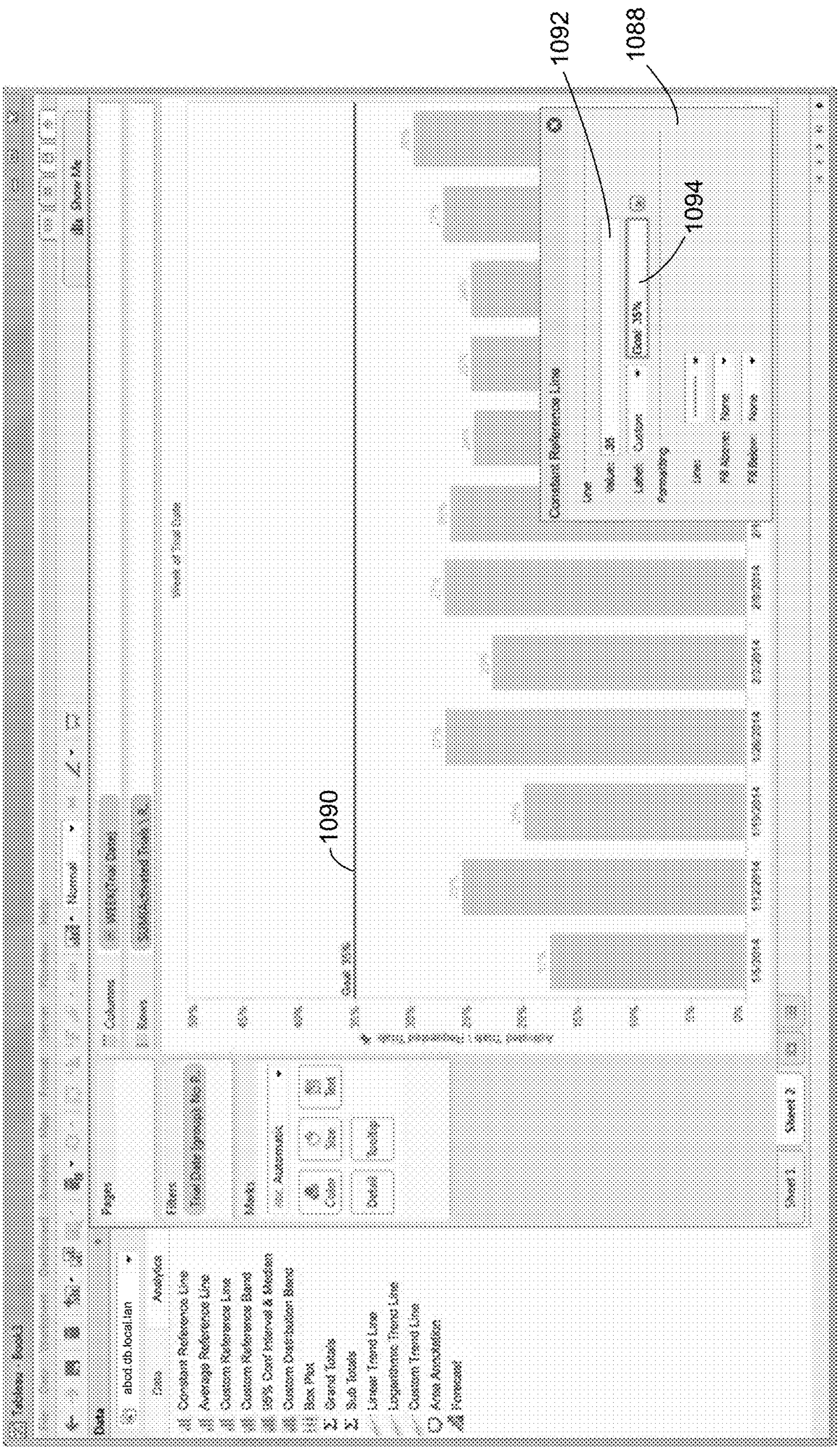

In FIG. 27, the user uses the editor 1088 to change the constant line value to 0.35 in the value box 1092, and changes the label to "Goal: 35%" in the label box 1094. In some implementations, the changes take effect immediately (e.g., by pressing ENTER or moving to a different control in the edit box 1088), resulting in display of an updated constant reference line 1090. In some implementations, the modified reference line 1090 is displayed only after the user chooses to apply the changes (e.g., using an Apply button) or closes the edit box 1088.

Figure 28:
Figure 29:
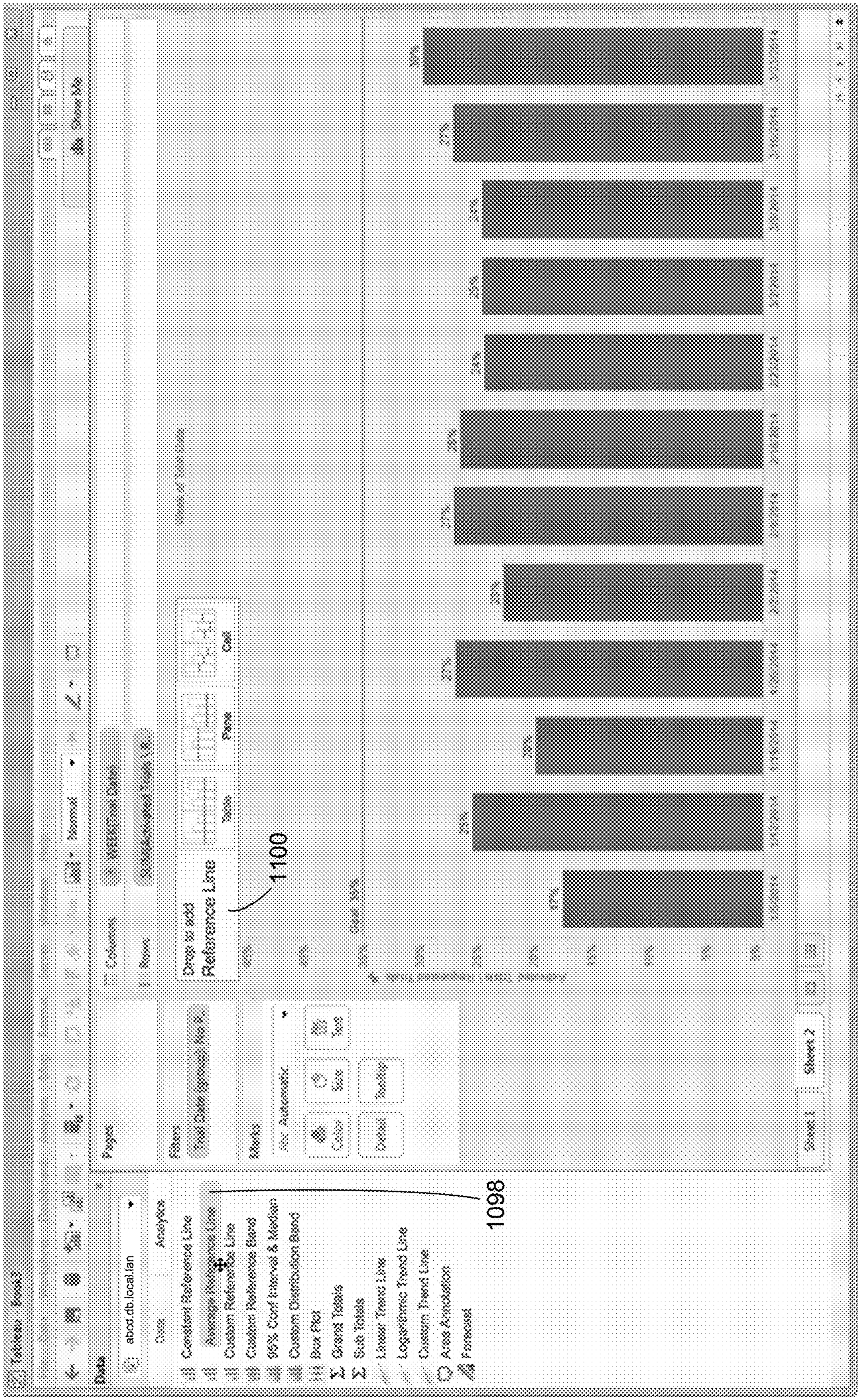
Figure 30:
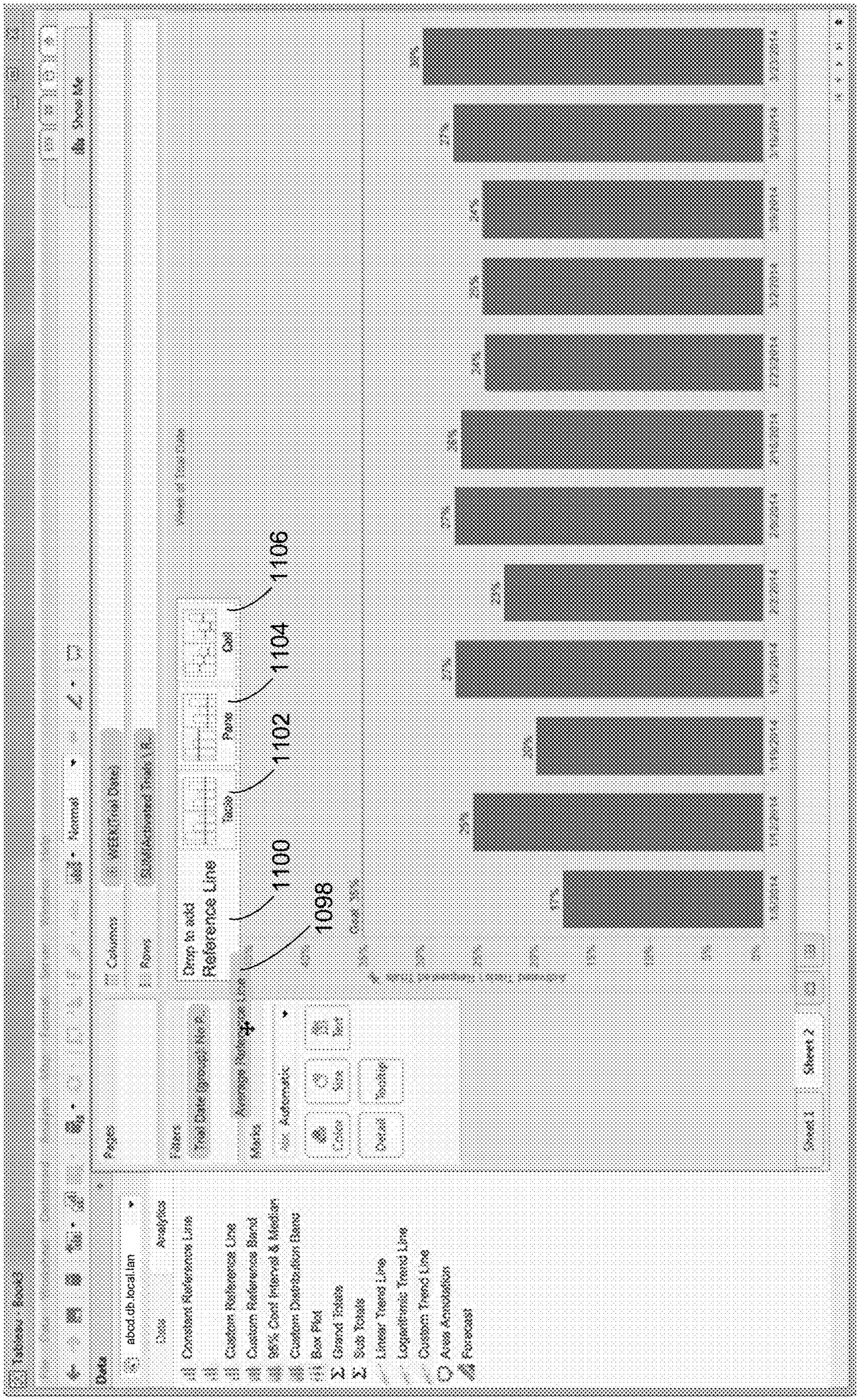

In FIG. 28, the user has closed the edit box 1088, and selected another analytic operator, which is an average reference line icon 1096. As shown in FIG. 29, as soon as the user begins to drag the icon 1098, the drop spot 1100 appears in the data visualization region. In FIG. 30, the user has dragged the average reference line icon 1098 toward the drop location 1100, and may choose between the three option icons 1102, 1104, and 1106. As noted earlier, the Table option 1102 is used to create one average line for the entire table, the Pane option 1104 is used to create a separate average line for each pane, and the Cell option 1106 is used to create a separate average line for each data mark (e.g., each bar). In the data visualization displayed in FIG. 30, there is only one pane, so the Table option 1102 and the Pane option 1104 would produce the same result.

Figure 31:
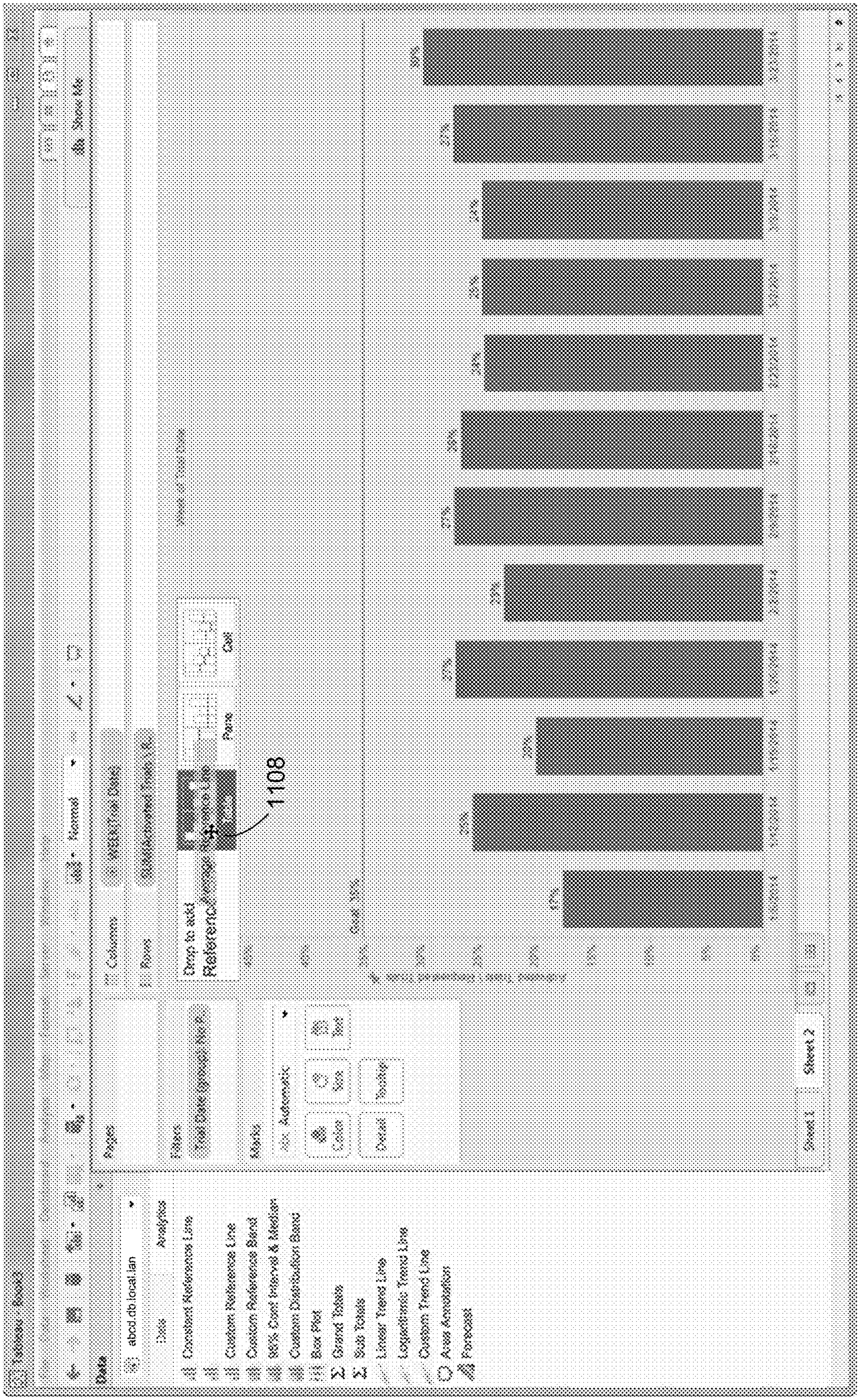
Figure 32:
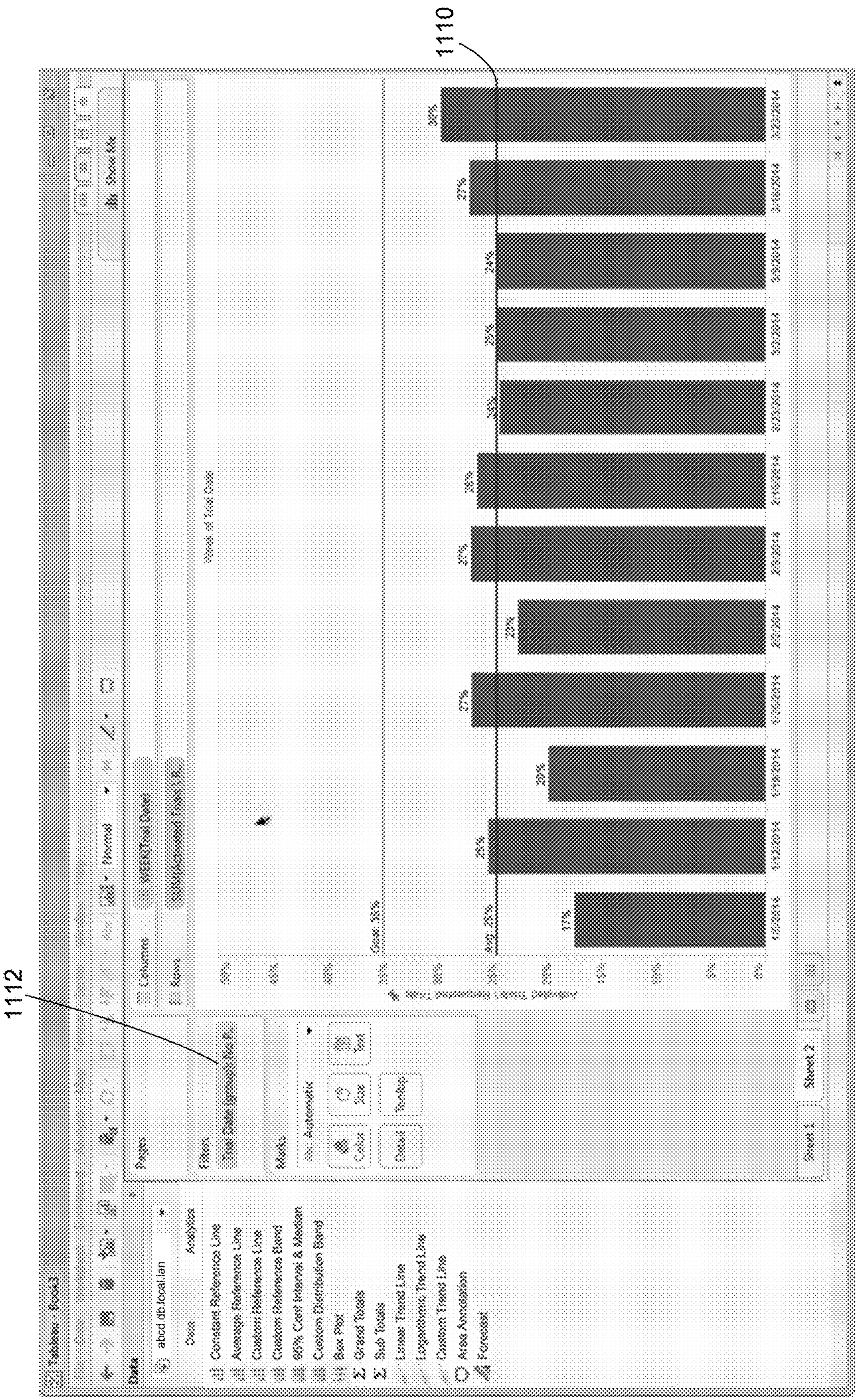

In FIG. 31, the reference line icon 1098 is over the highlighted Table option 1108, indicating that the reference line icon 1098 may be dropped. FIG. 32 illustrates that the average reference line 1110 has been created. The height is the average of the bar heights. Also shown in FIG. 32 is the filter 1112, which has been used to limit the data to a specific time span.

Figure 33:
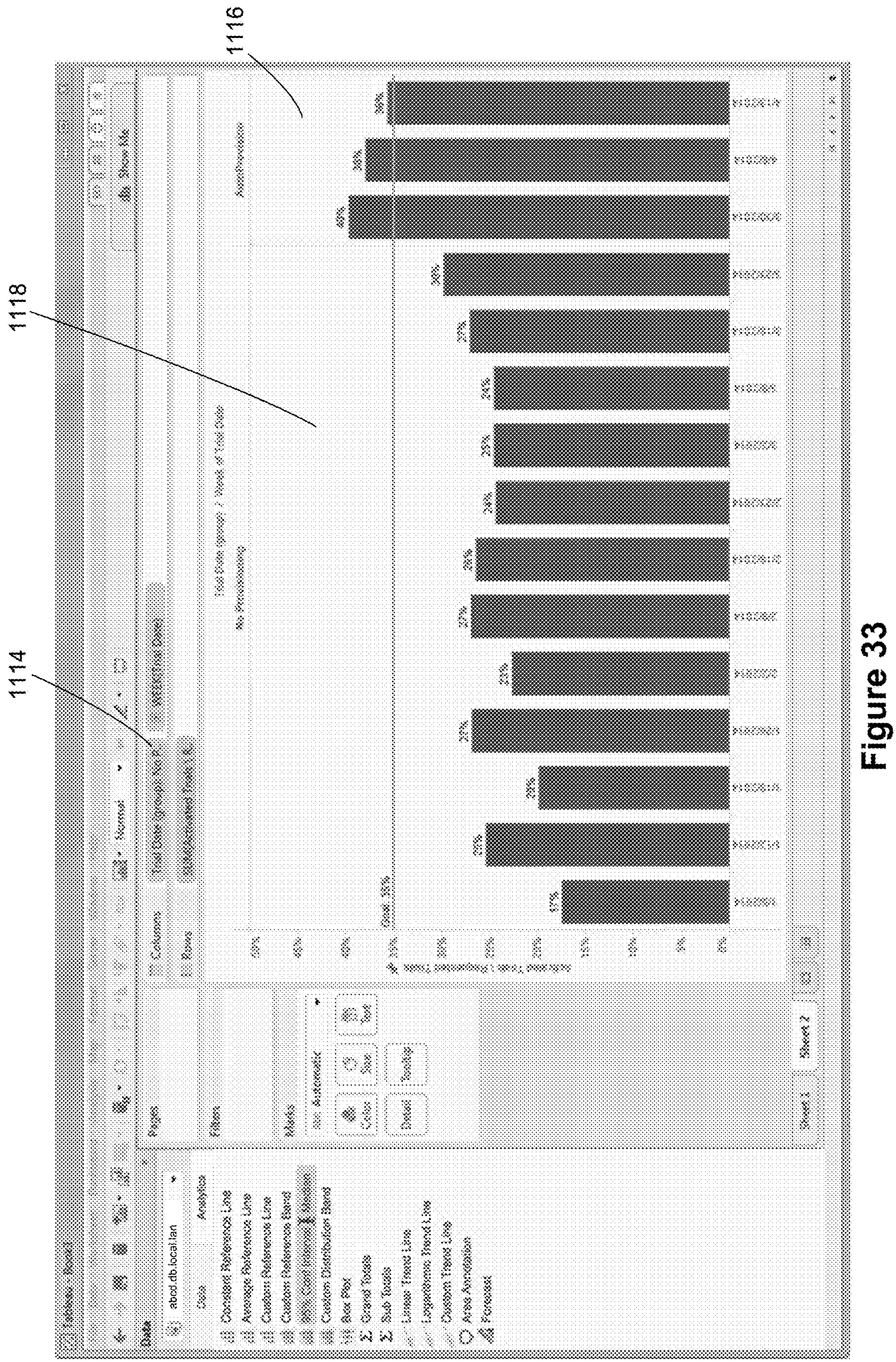

In FIG. 33, the user has removed the filter 1112, but placed a trial date grouping 1114 on the columns shelf 120. The grouping just placed on the columns shelf 120 splits the trial dates into dates before "provisioning" was applied and dates after provisioning was applied (labeled "AutoProvision" in FIG. 33). This creates a first pane 1118 and a second pane 1116.

Figure 34:
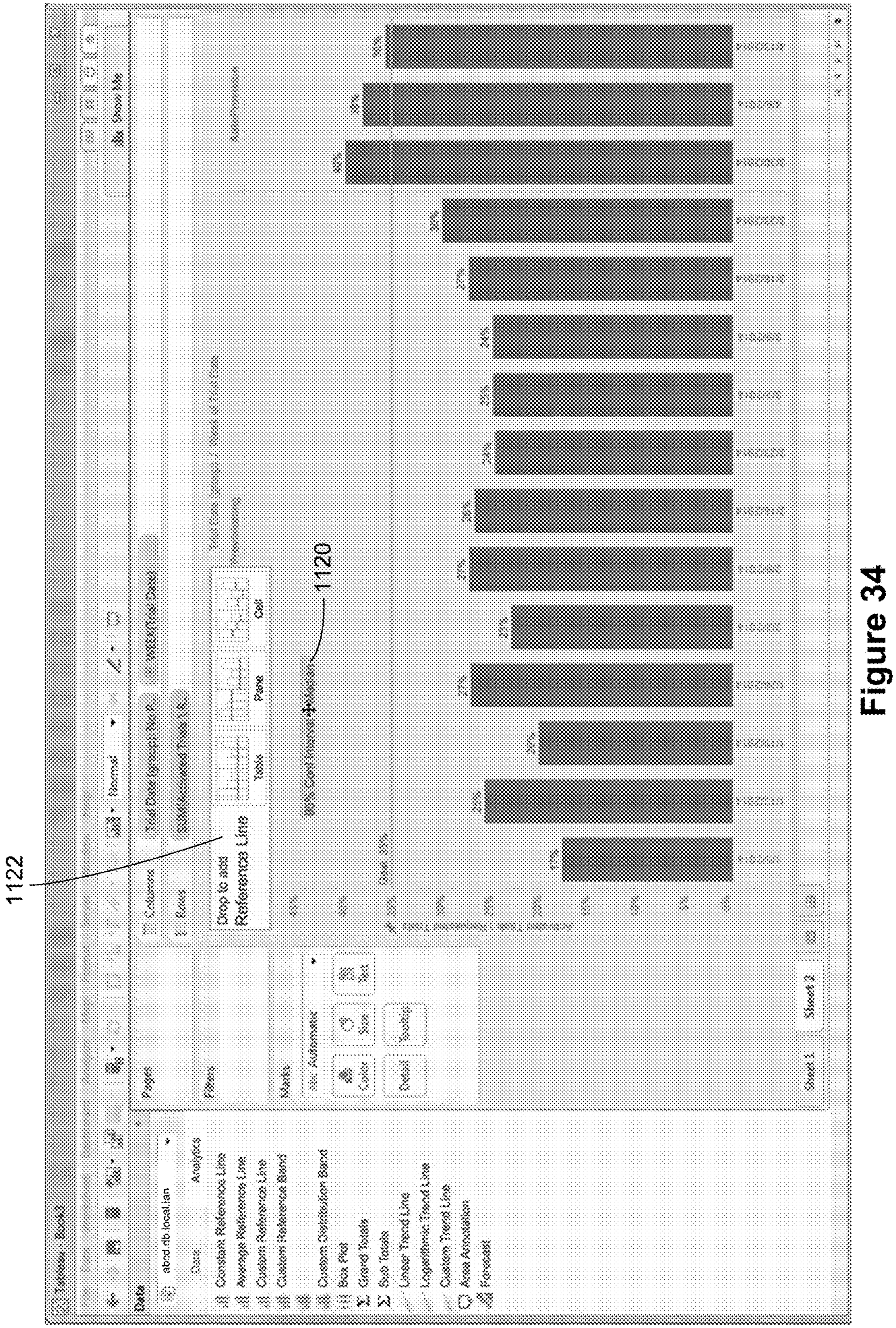
Figure 35:
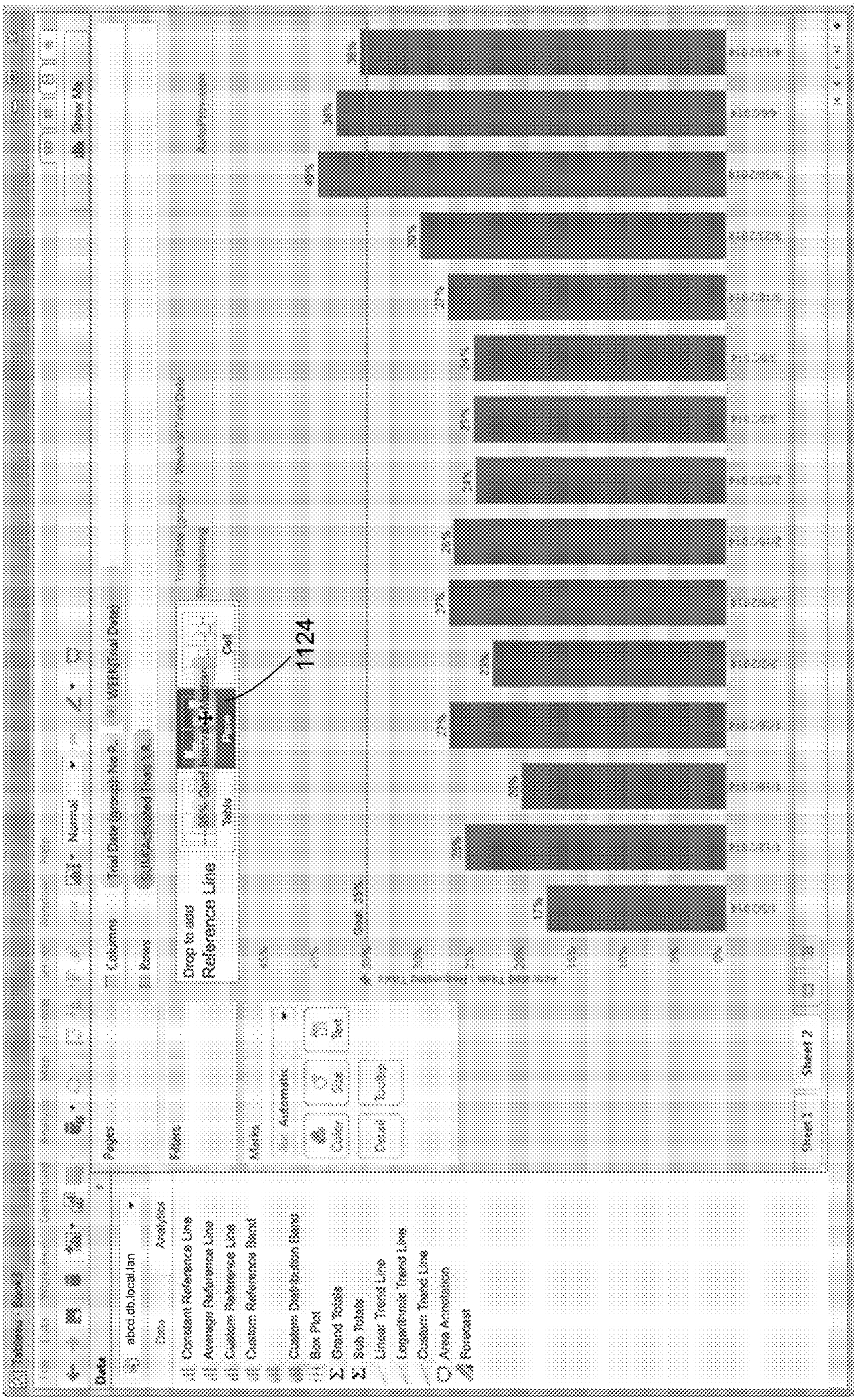
Figure 36:

In FIG. 34, the user is dragging an analytic icon 1120 for median with 95% confidence interval to the drop spot 1122, which has the three option icons Table, Pane, and Cell. In FIG. 35, the user has placed the analytic icon 1120 over the Pane option icon 1124, which is highlighted. After dropping the analytic icon 1120 onto the Pane option icon, the visual graphic in FIG. 36 includes a median 1126 for the "No Provisioning" pane 1118, and a separate median 1130 for the "AutoProvision" pane 1116. The analytic icon 1120 also provides a 95% confidence interval, so the "No Provisioning" pane 1118 has a 95% confidence interval 1128 that is independent of the 95% confidence interval 1132 for the "AutoProvision" pane 1116.

Figure 37:
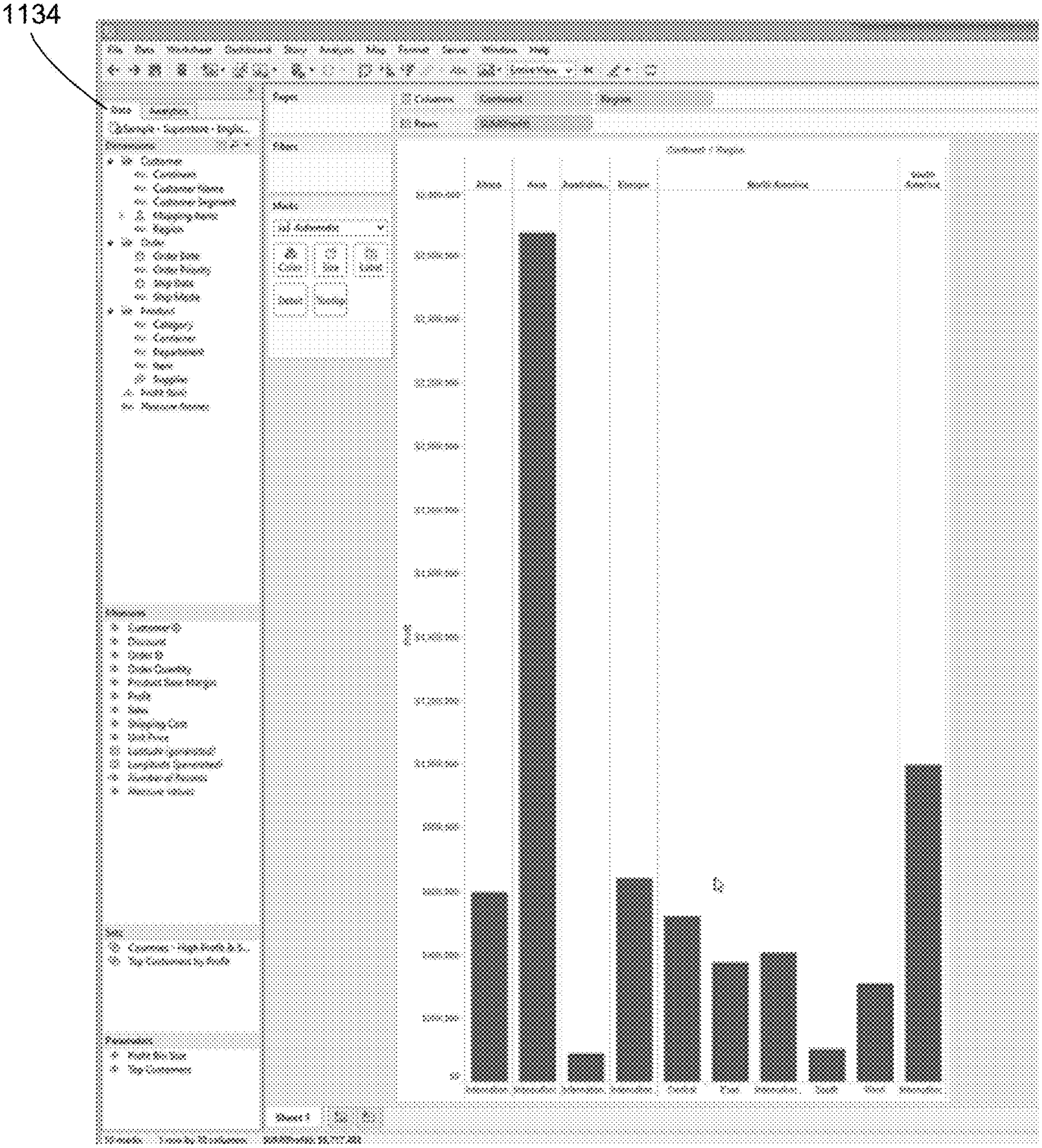
Figure 38:
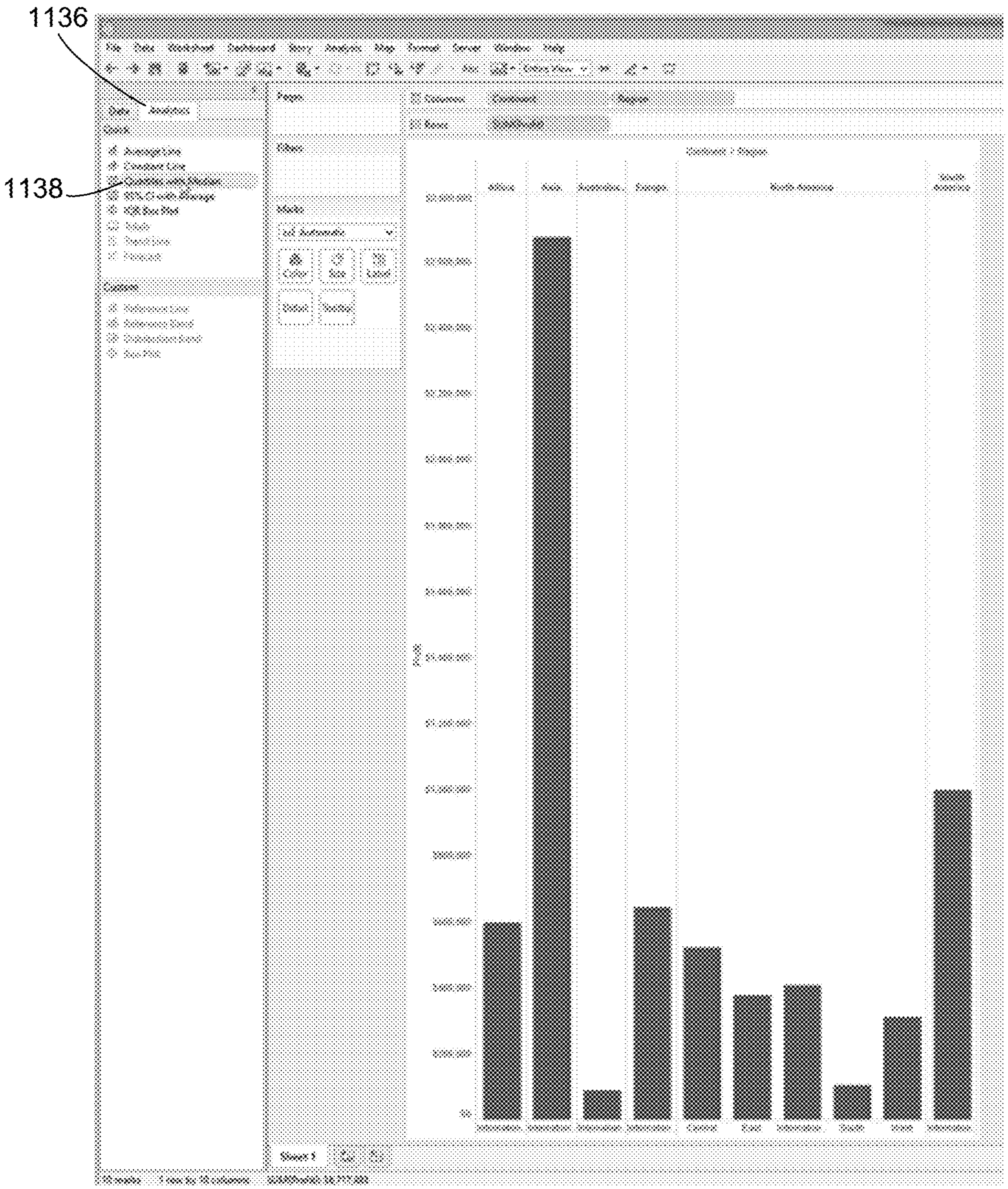
Figure 39:
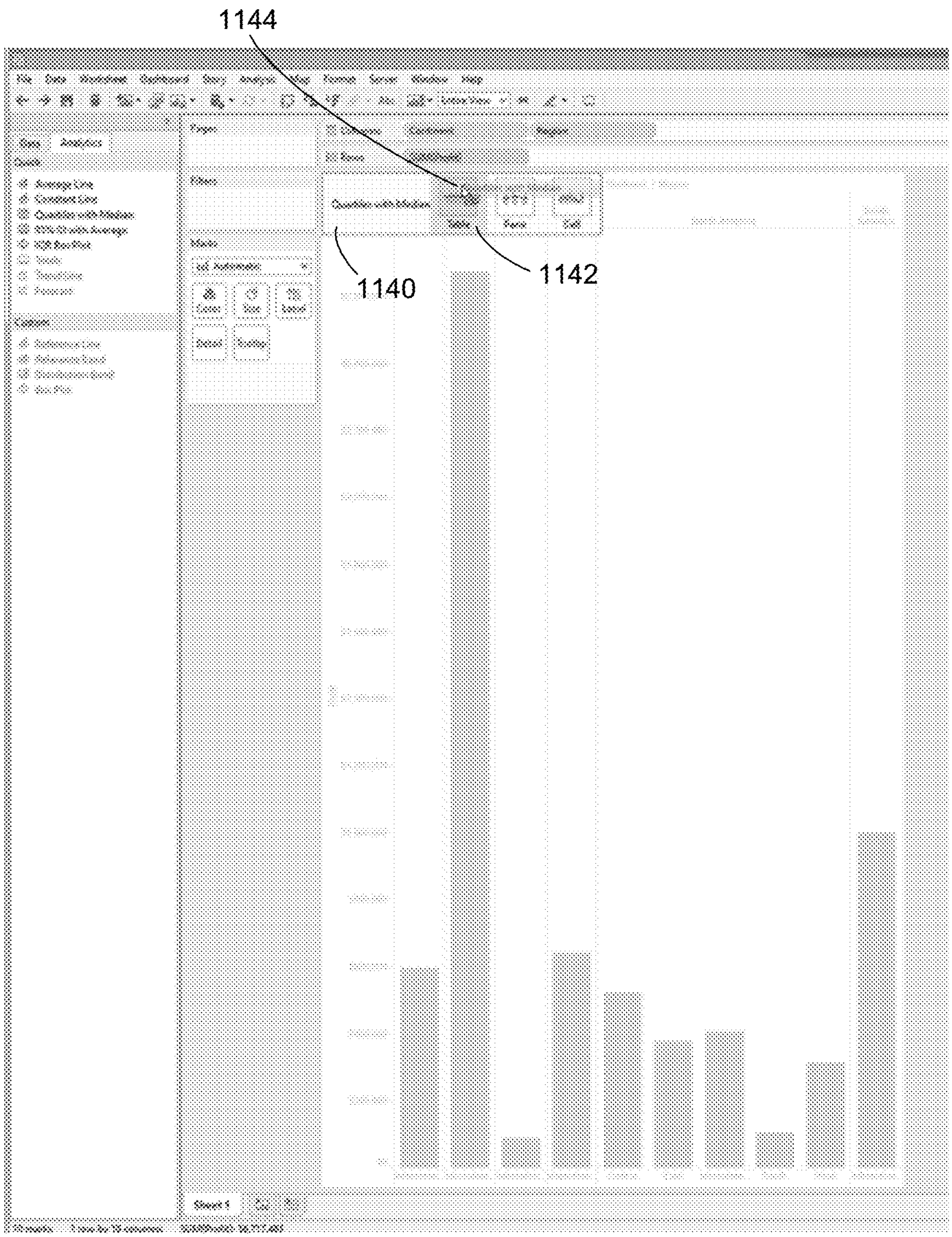
Figure 40:
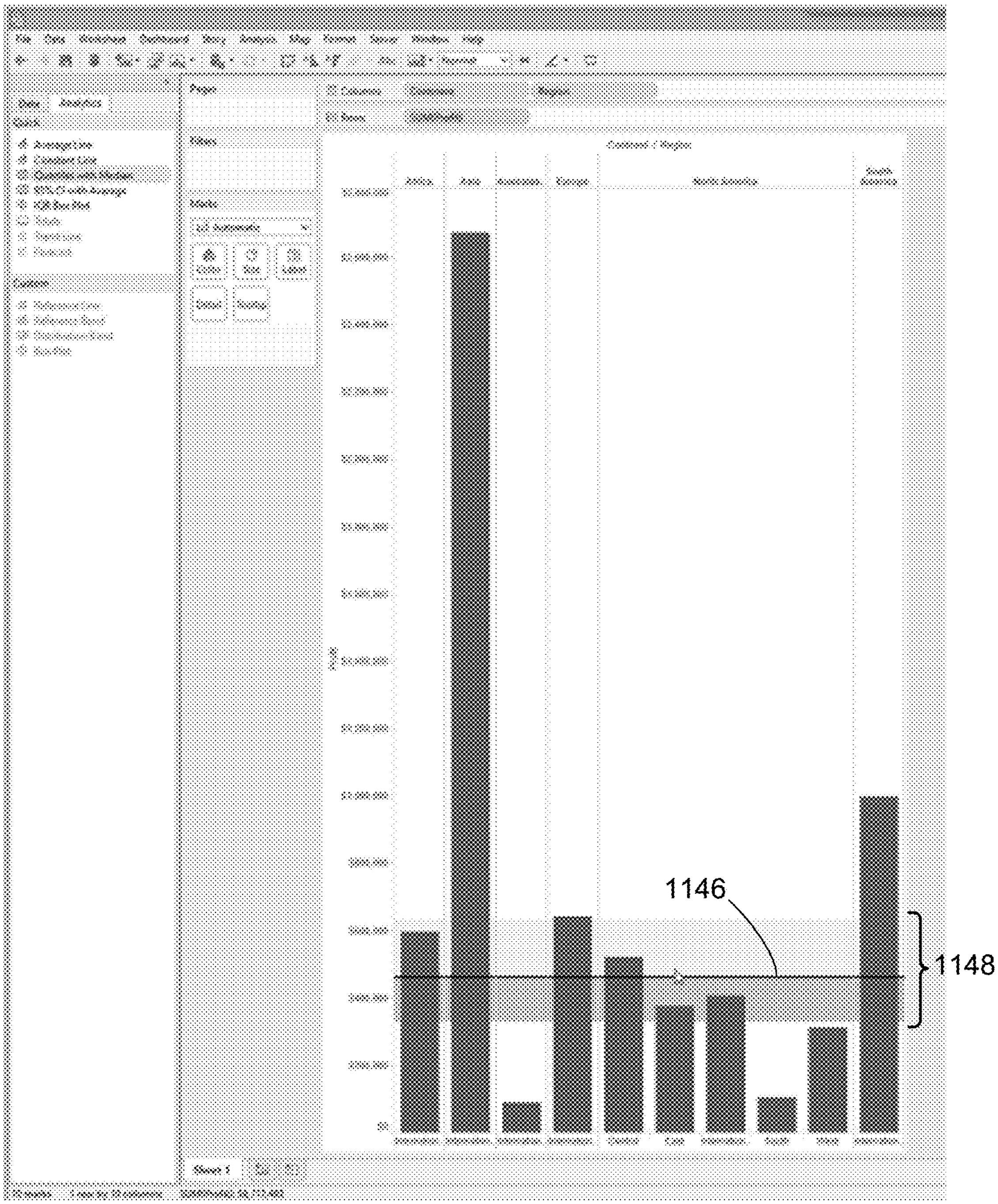

FIGS. 37-50 illustrate several analytic features. FIG. 37 shows a bar graph based on data elements selected from the data pane 1134. In FIG. 38, the user has selected the Analytics pane 1136, and selected the "Quartiles with Median" analytic icon 1138 within the Analytics pane 1136. The user drags the analytic icon pill 1144 to the drop area 1140, and places the analytic icon 1144 over the "Table" option icon 1142. Once the analytic icon 1144 is dropped, the median 1146 and quartiles 1148 are displayed with the data visualization, as illustrated in FIG. 40.

Figure 41:
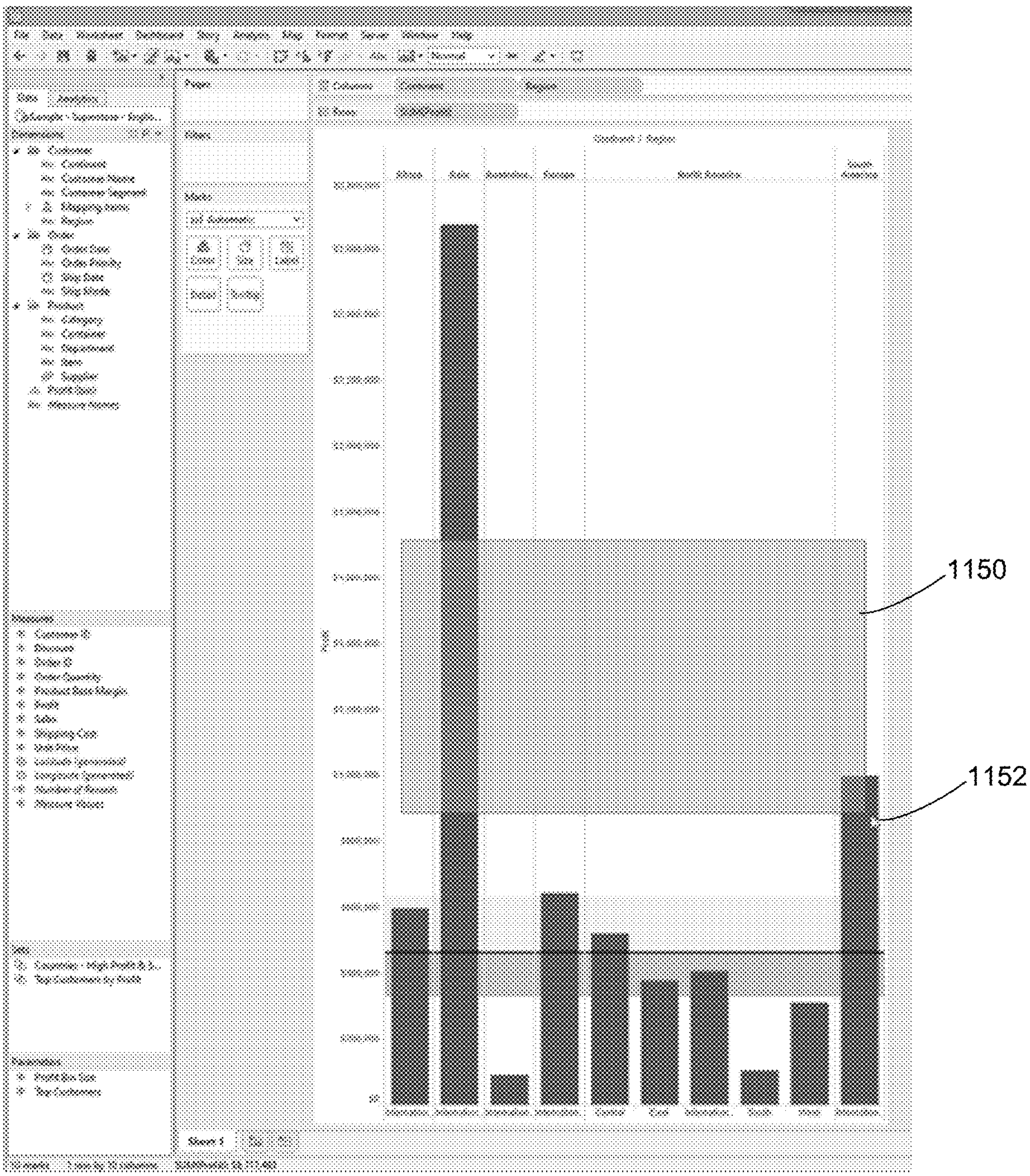
Figure 42:
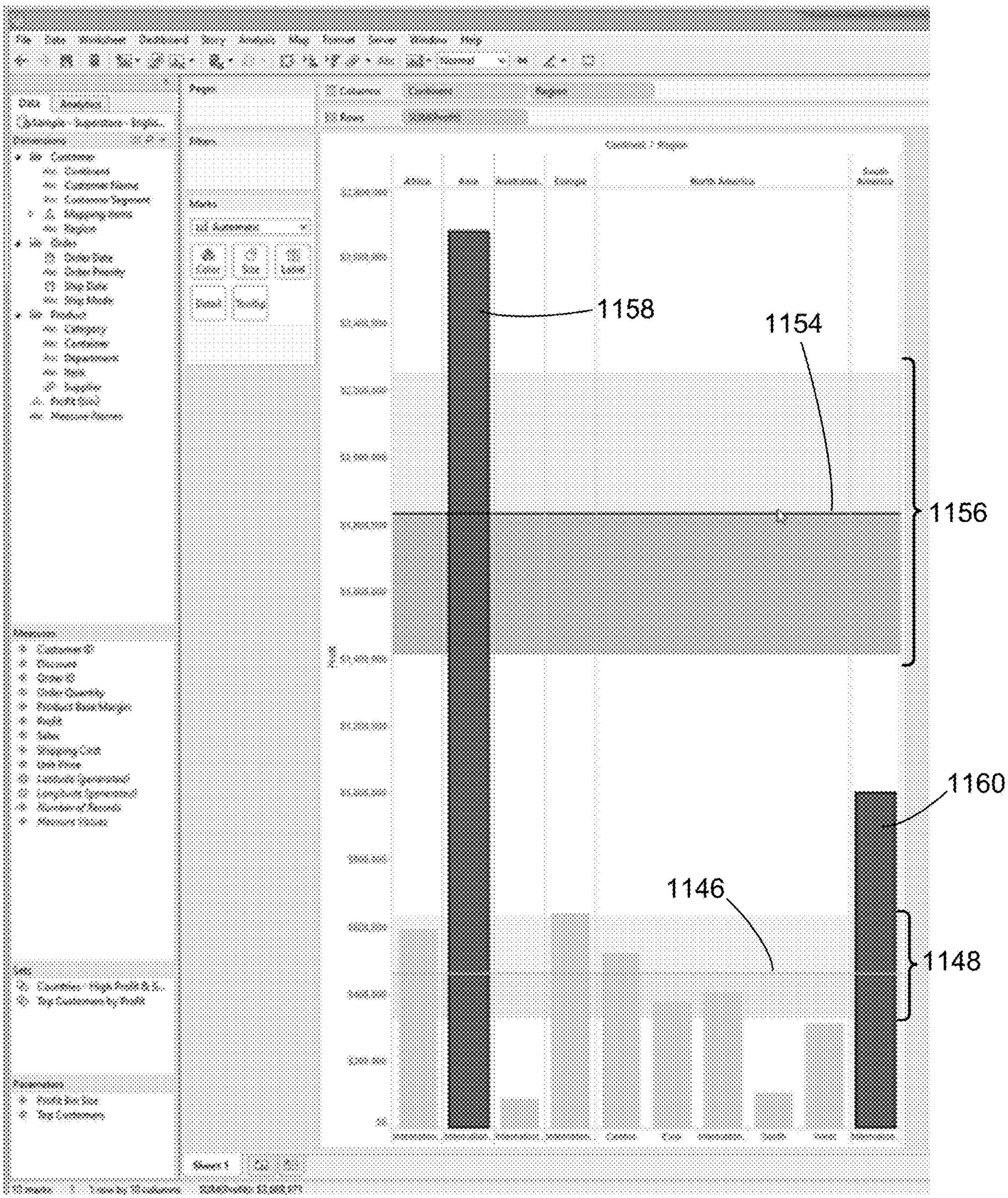

In FIG. 41, the user has used the cursor 1152 to create a selection region 1150, which selects the tallest bar 1158 and the second tallest bar 1160, as illustrated in FIG. 42. These two bars are highlighted to show their selection, whereas the remaining bar marks are dimmed. The previous median 1146 and previous quartiles 1148 are still shown (although dimmed), but a separate median 1154 and separate quartiles 1156 are shown that have been computed for the selected data.

Figure 43:
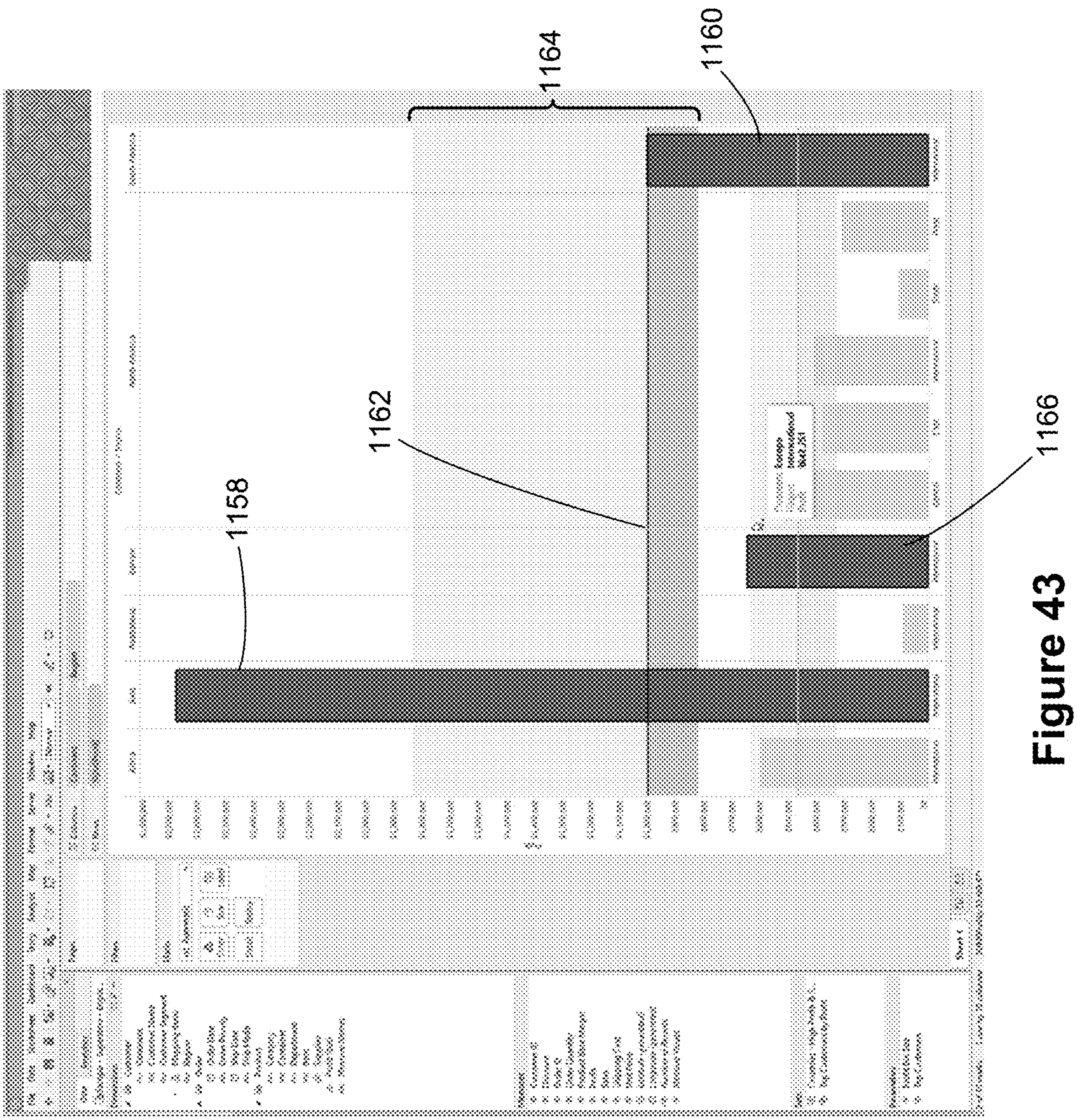

In FIG. 43, the user has selected the addition bar 1166, and thus a new median 1162 and new quartile bands 1164 are displayed, corresponding to the three selected bars.

Figure 44:
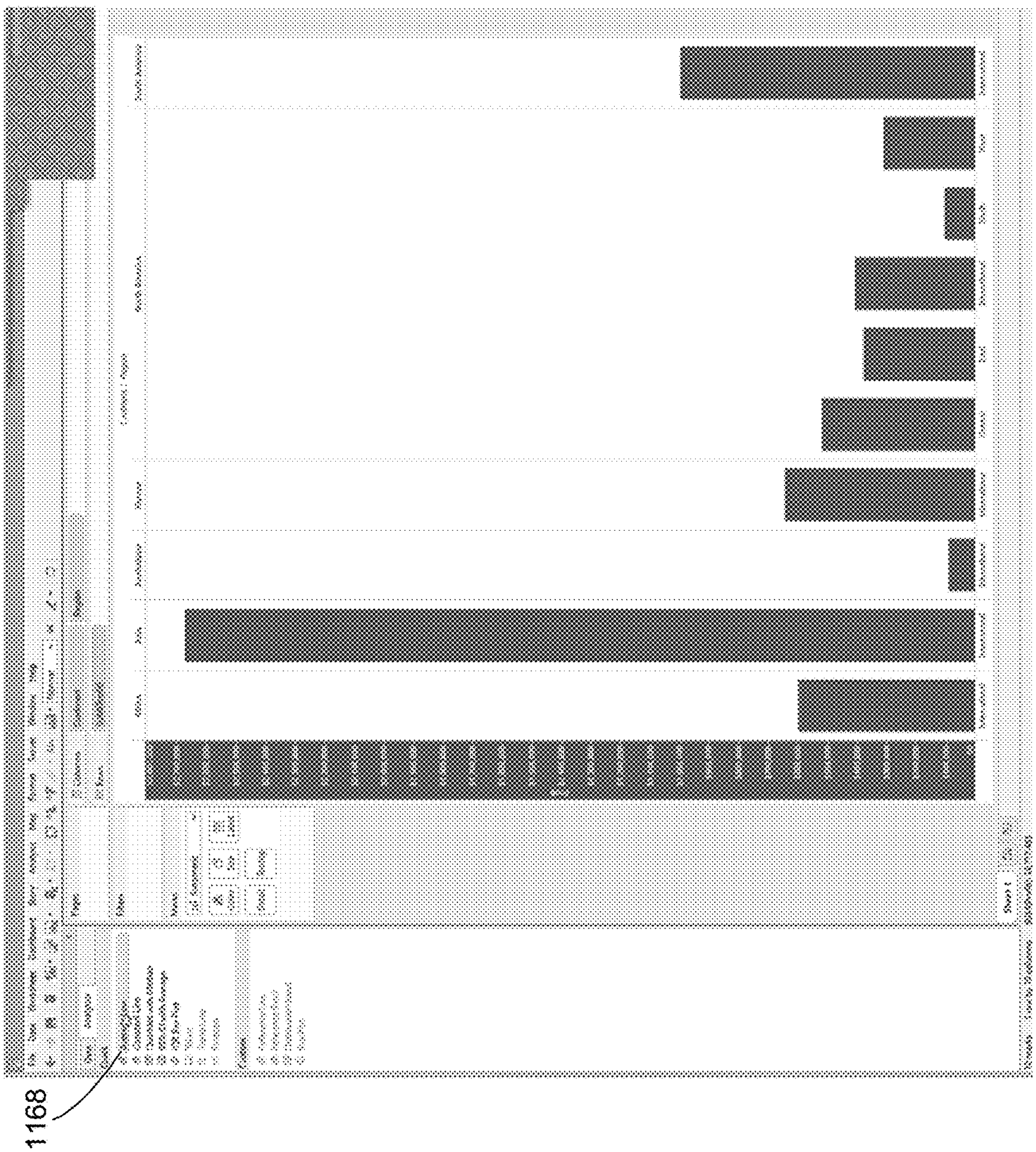
Figure 45:
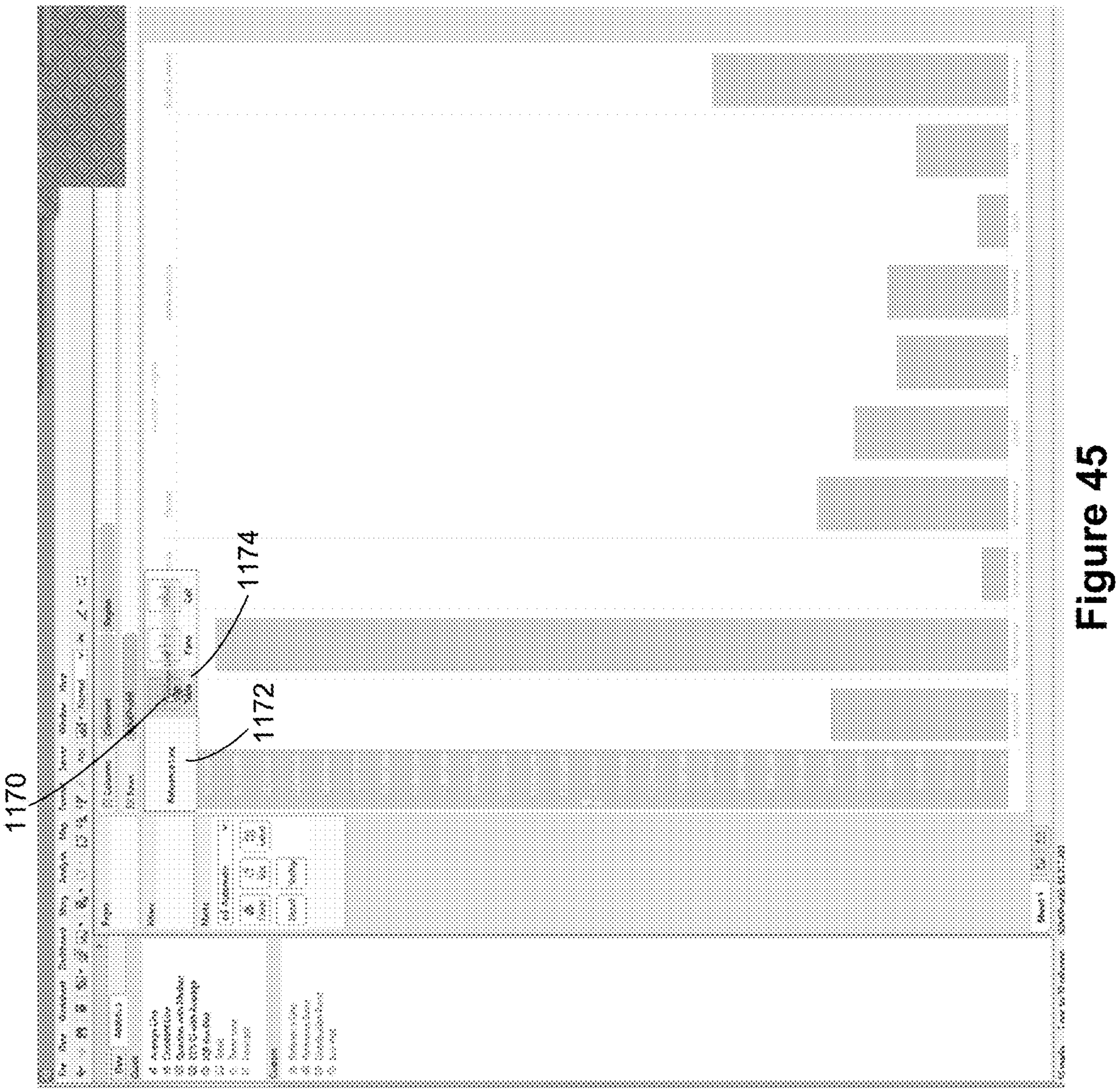
Figure 46:
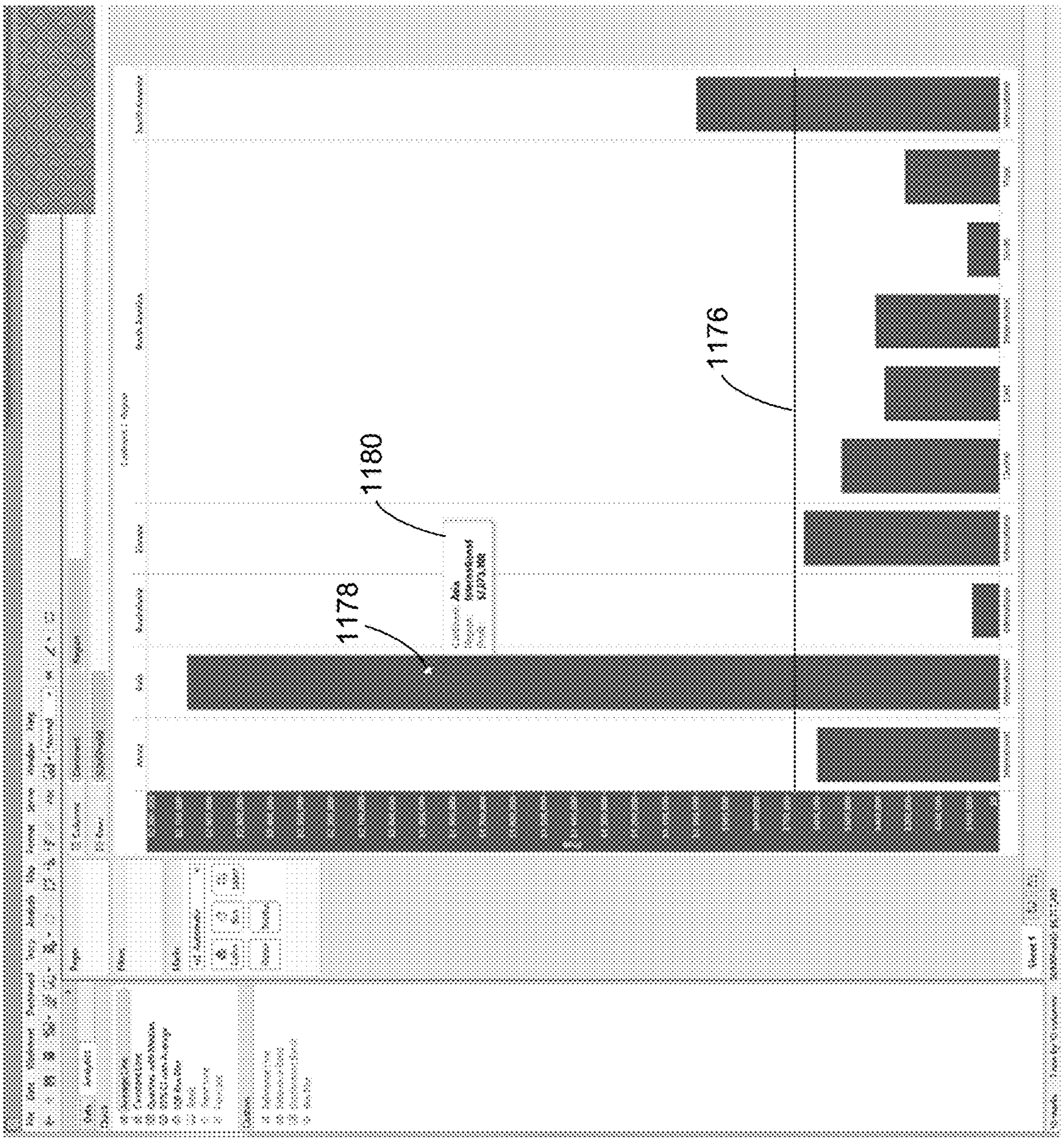

In FIG. 44, the user is viewing the same bar chart as in FIGS. 37-43, but chooses the average line analytic icon 1168 instead. In FIG. 45, the user has moved the analytic icon 1170 for the Average line to the drop area 1172, and positioned it over the Table option icon 1174. After dropping the analytic icon 1170 onto the Table option icon 1174, the average line 1176 displays, as illustrated in FIG. 46. As illustrated in FIG. 46, some implementations display a tooltip 1180 for visual bars (e.g., the bar marks here) when the cursor 1178 is over (or near) one of the marks.

Figure 47:
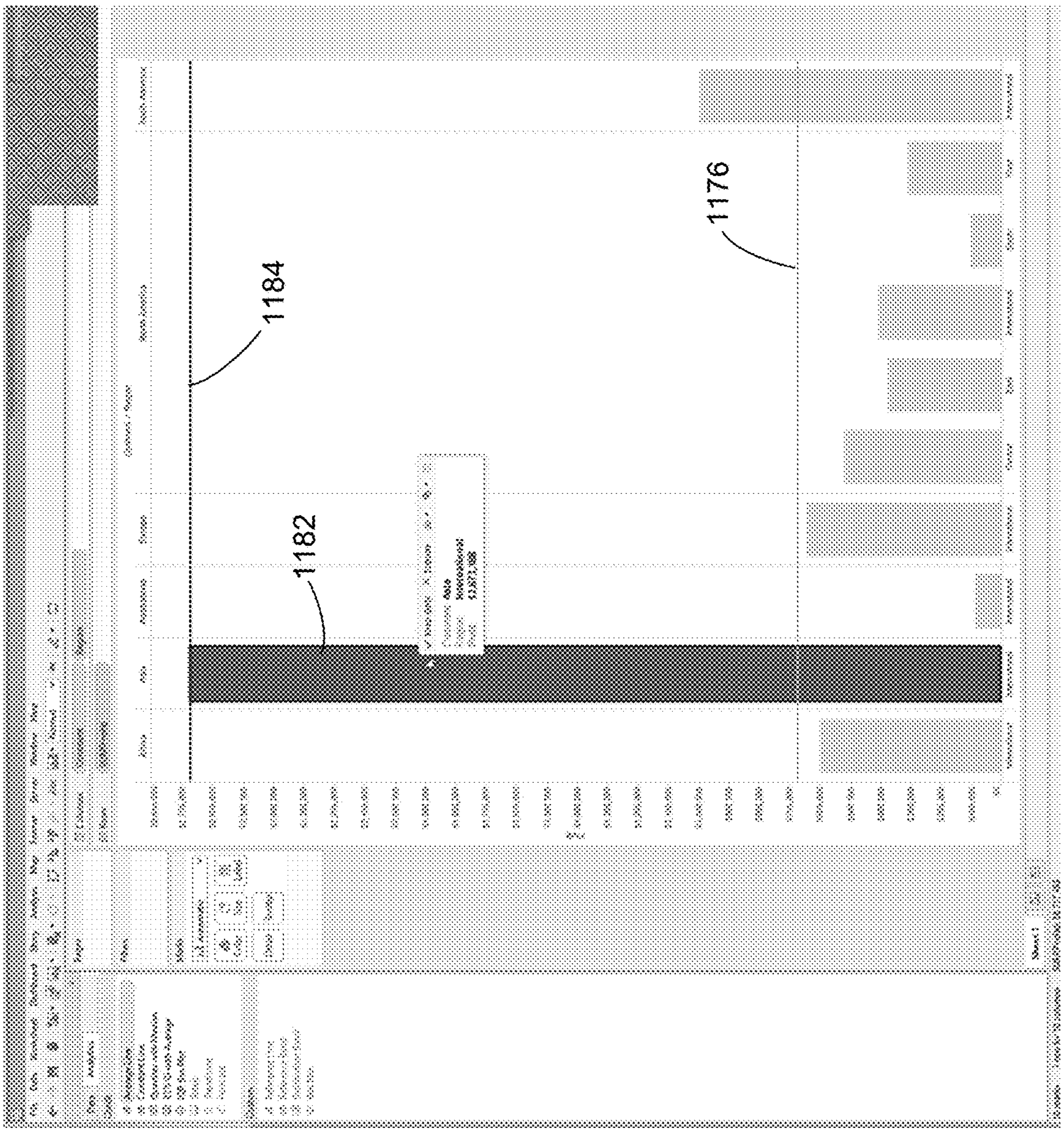

In FIG. 47, the user has selected the tall bar 1182, and thus a new average line 1184 is displayed for the selected set.

Figure 48:
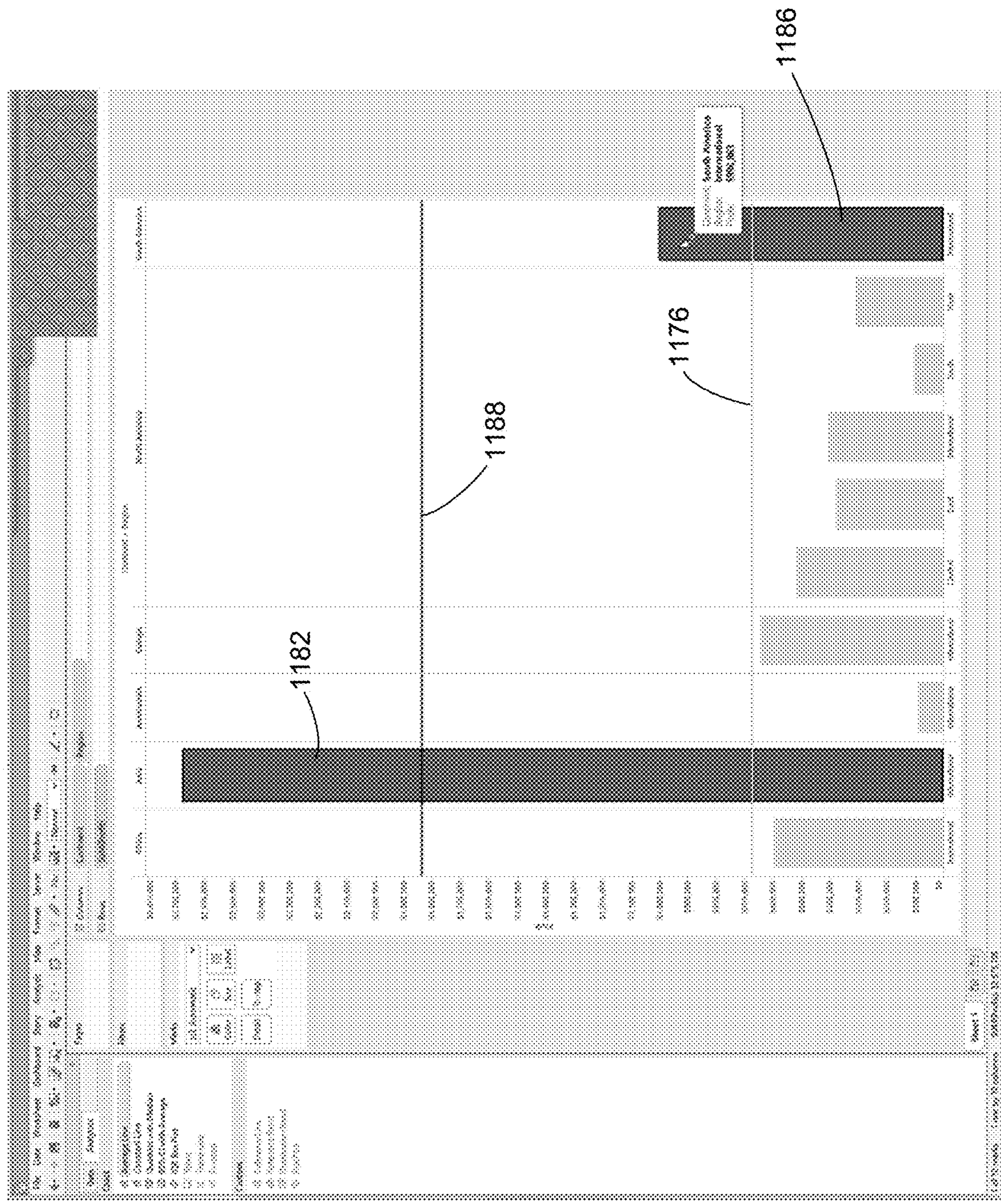
Figure 49:
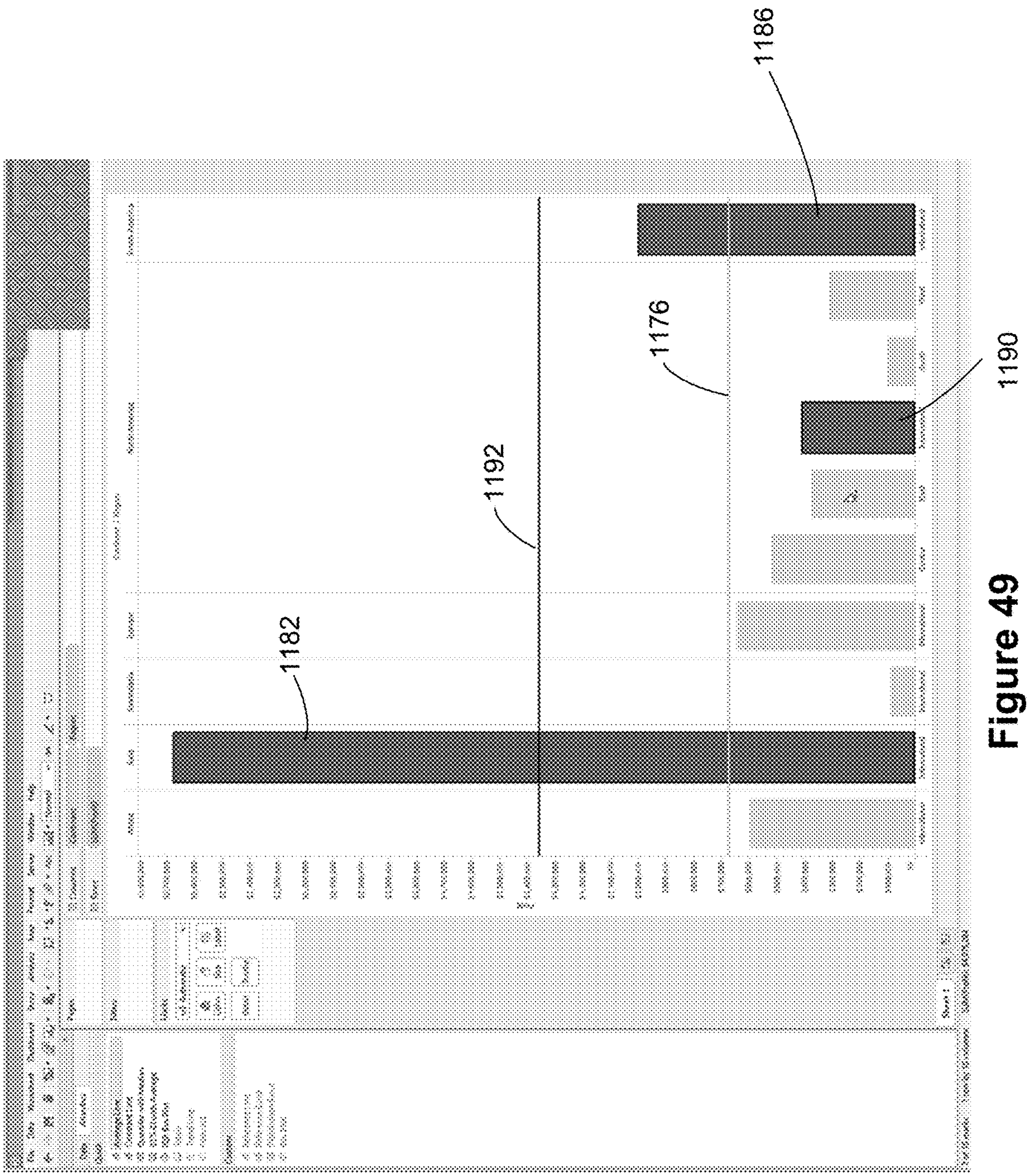
Figure 50:
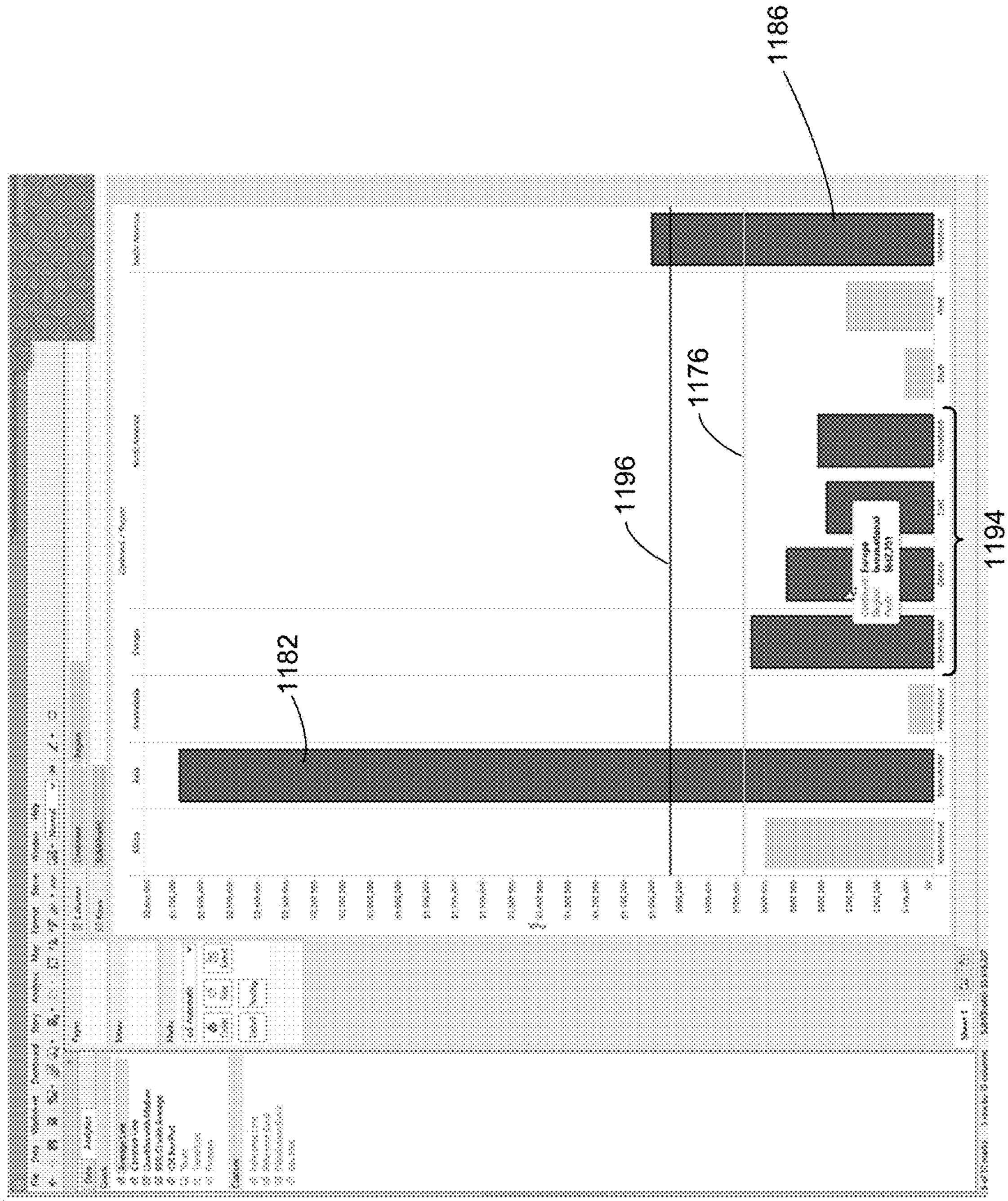

Because there is only one bar selected, the average line exactly matches the height of the one selected bar. In FIG. 48, the user has selected a second bar 1186, and thus the average line 1188 calculated for the selected two bar marks is displayed. In FIG. 49, a third bar 1190 is selected, so the average line 1192 calculated for the three selected lines is displayed. In FIG. 50, additional bar marks 1194 are selected, and the average line 1196 is redrawn based on the selection. Any time the selected set of marks changes, the computed average line for the selected subset is immediately updated, but the original average line 1176 remains displayed. Immediate updates occur without additional user input and within a short period of time (e.g., less than a second)

Figure 51:
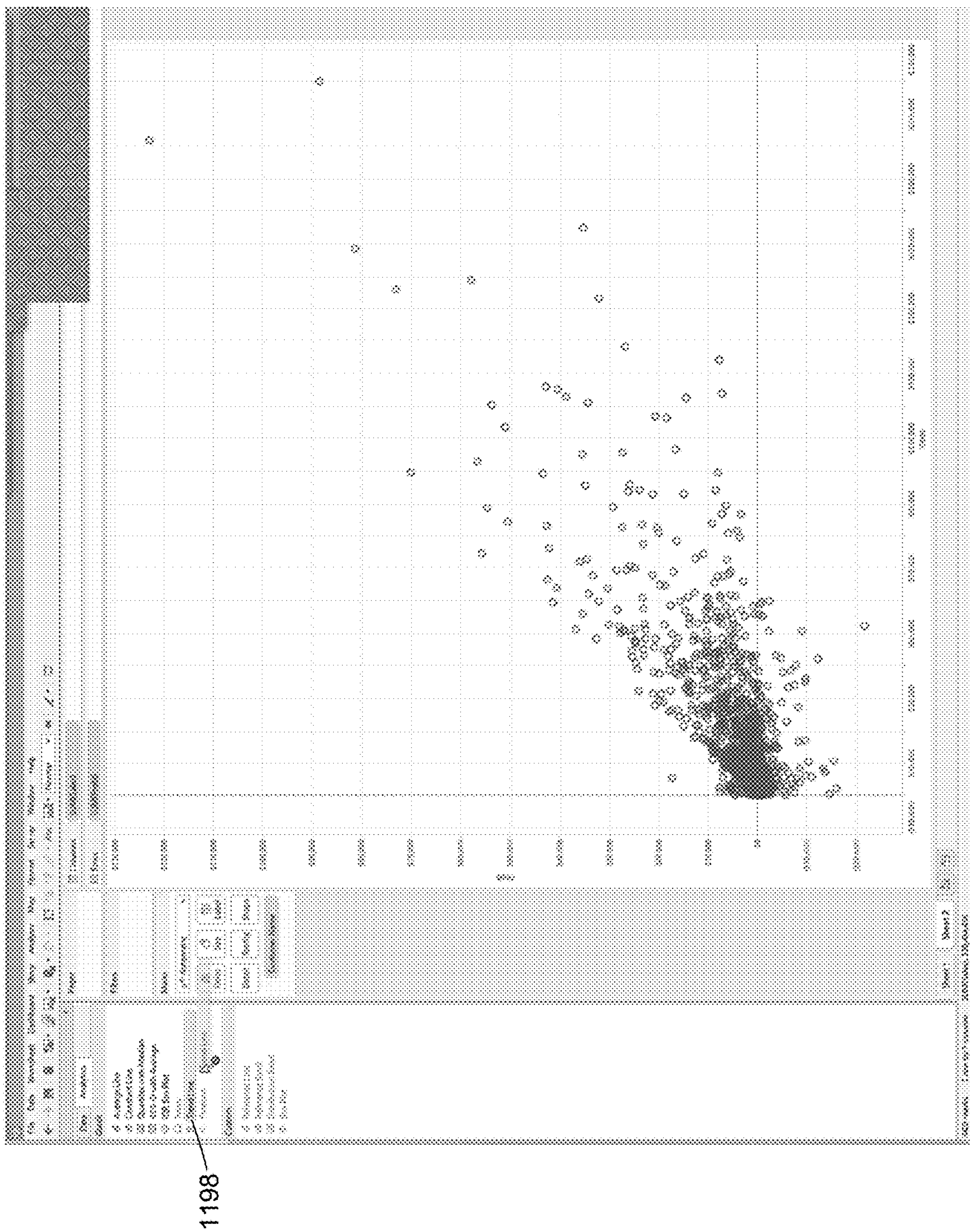
Figure 52:
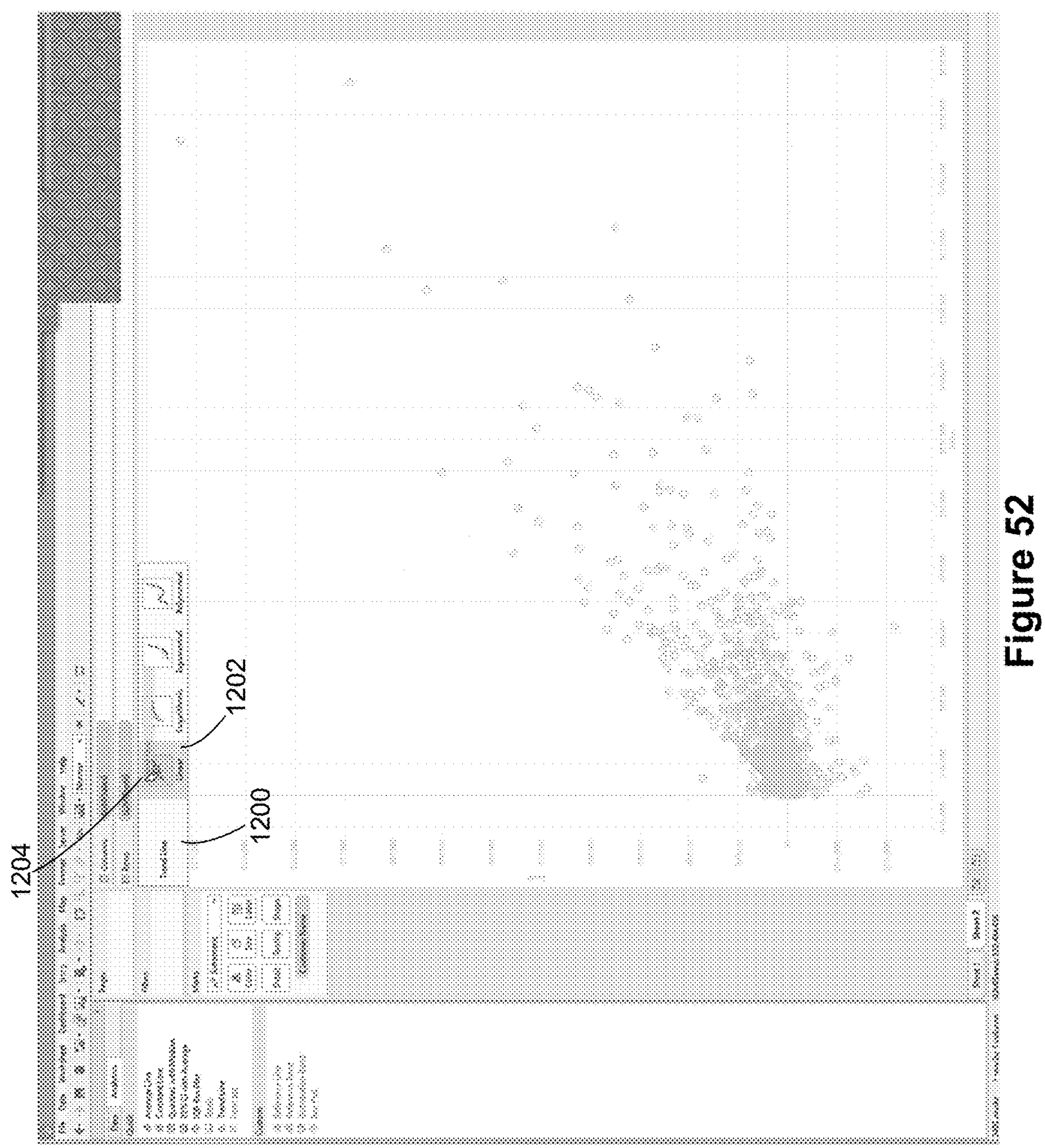
Figure 53:
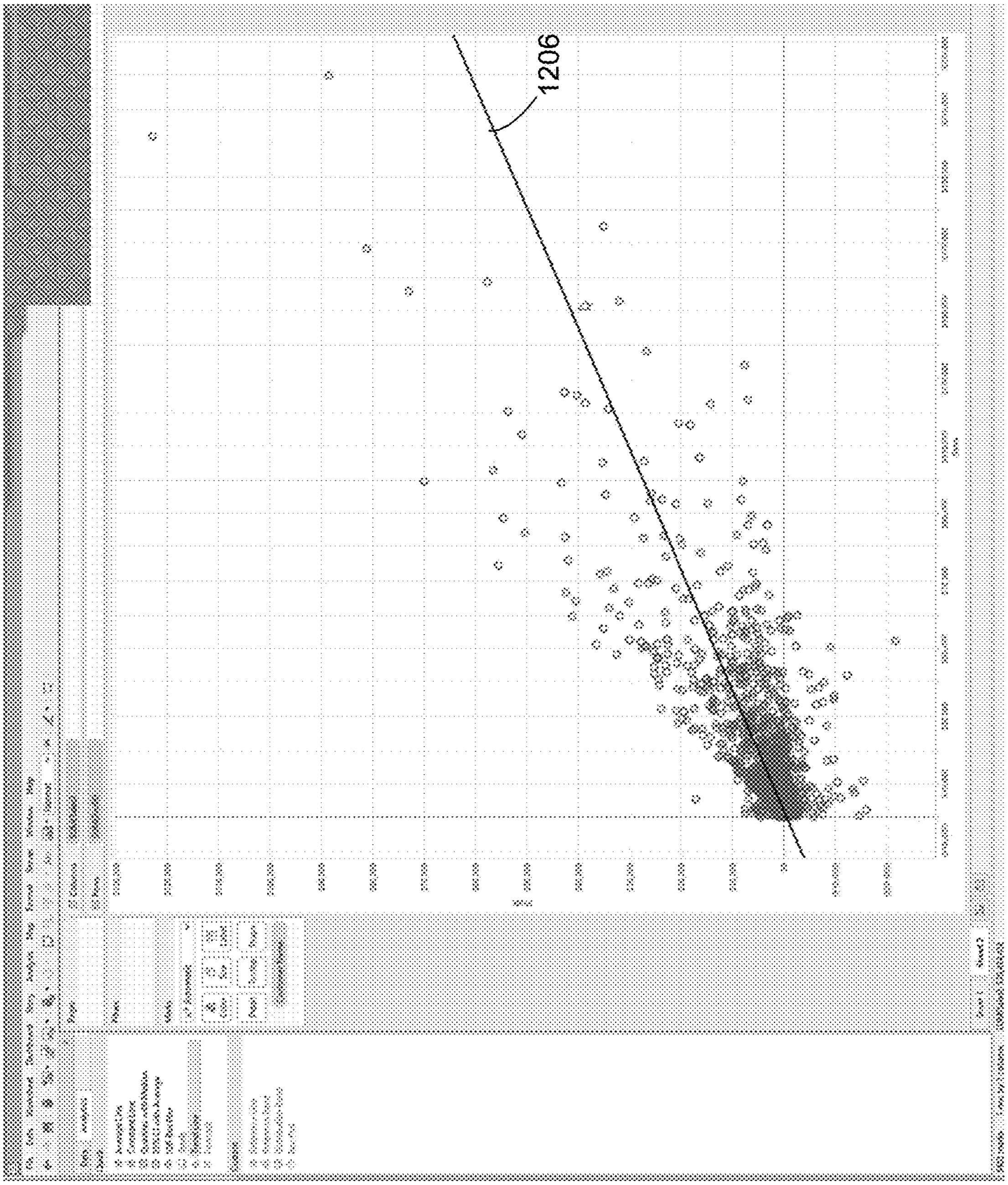
Figure 54:
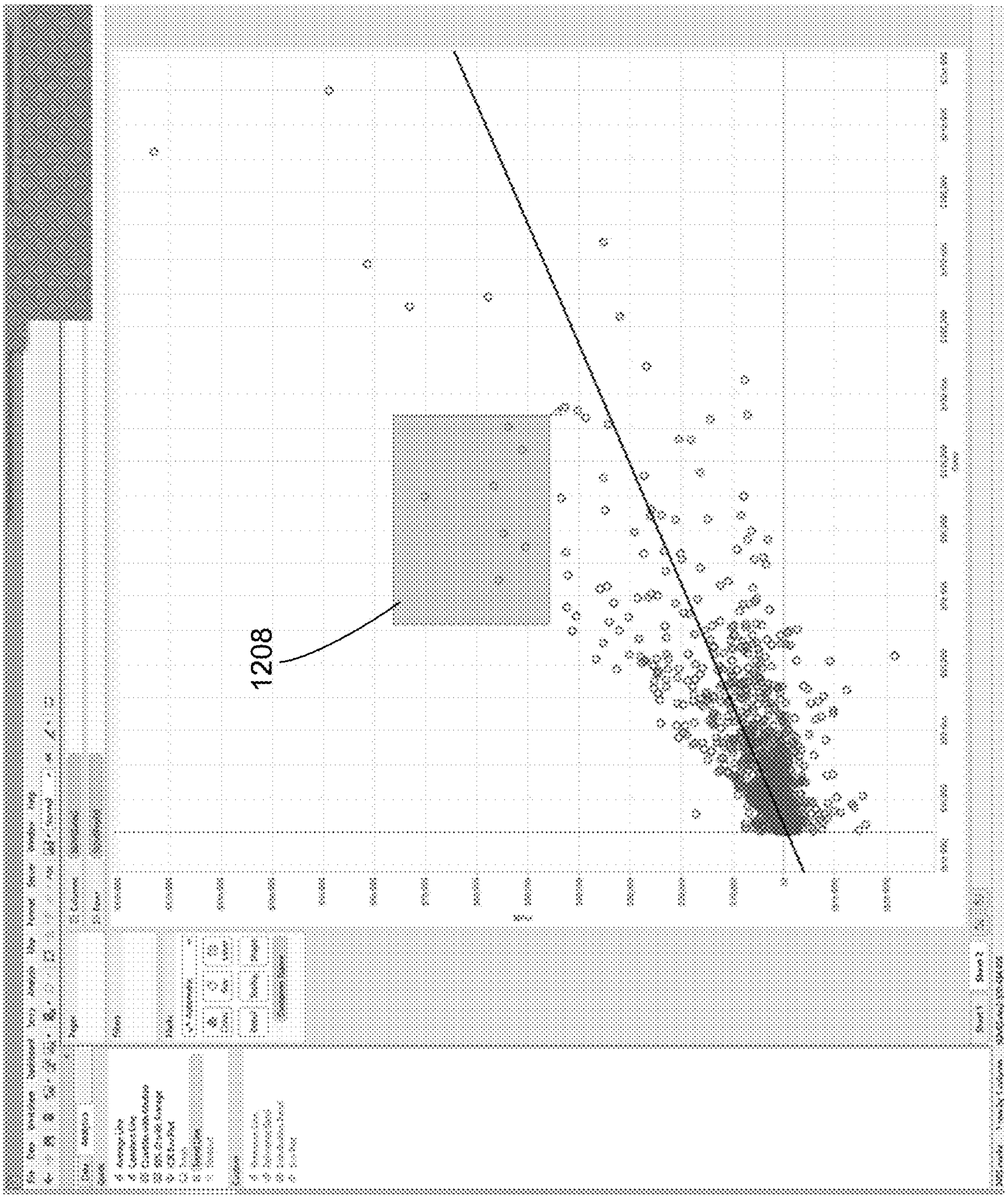
Figure 55:
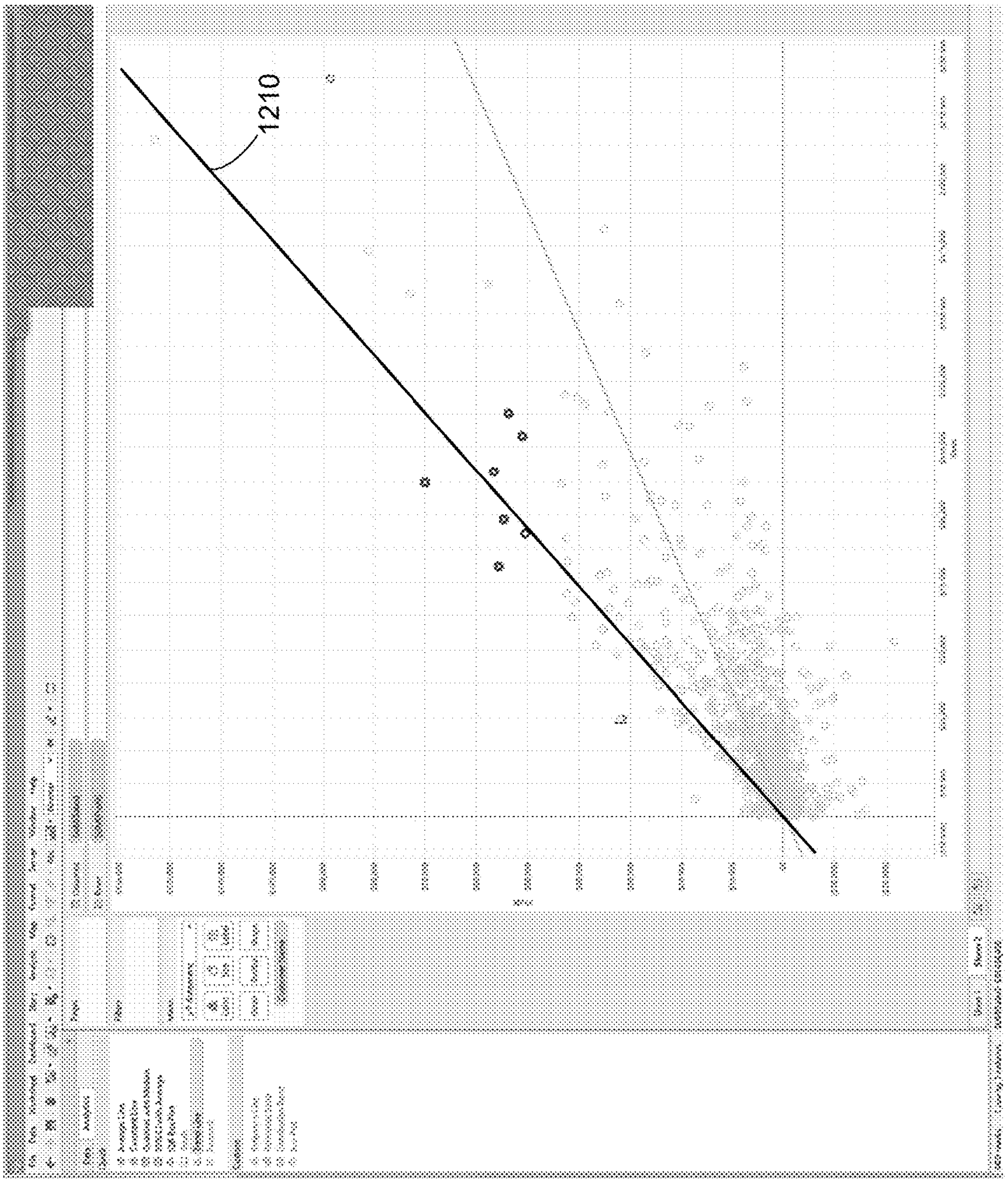

FIGS. 51-60 illustrate the use of adaptive analytics for a scatter plot. In FIG. 51, a scatter plot is displayed based on the selected data source. The user has selected the trend line analytic icon 1198. In FIG. 52, the user has dragged the trend line icon 1204 to the drop spot 1200, and placed the icon 1204 over the Table option icon 1202. When the user drops the icon 1204 onto the Table option icon 1202, the data visualization application creates and displays the trend line 1206 (regression line) for the data. There is only one trend line 1206 for the entire graphic table. In FIG. 54, the user creates a selection rectangle 1208 (e.g., by clicking and dragging with the cursor) to select a subset of the data marks. Once the selection is complete, the data visualization application displays a second trend line 1210 for just the selected subset of marks, as illustrated in FIG. 55. The second trend line is displayed while maintaining display of the first trend line 1206 (which is dimmed or otherwise de-emphasized in some implementations). The user can modify the selected set of points (e.g., by clicking on additional marks), and the display of the second trend line 1210 adapts to the updated selection as the selection occurs (e.g., in a fraction of a second).

Figure 56:
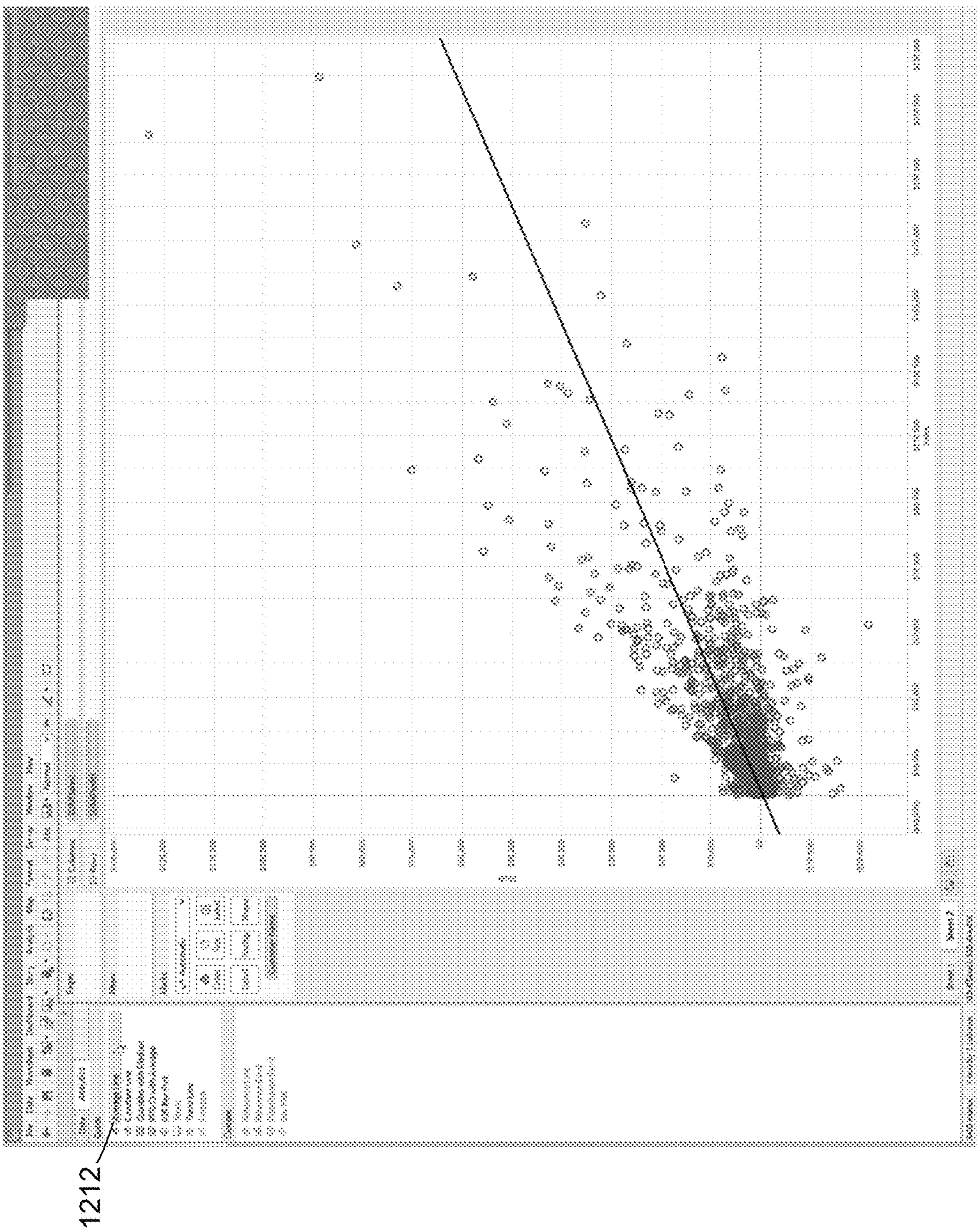
Figure 57:
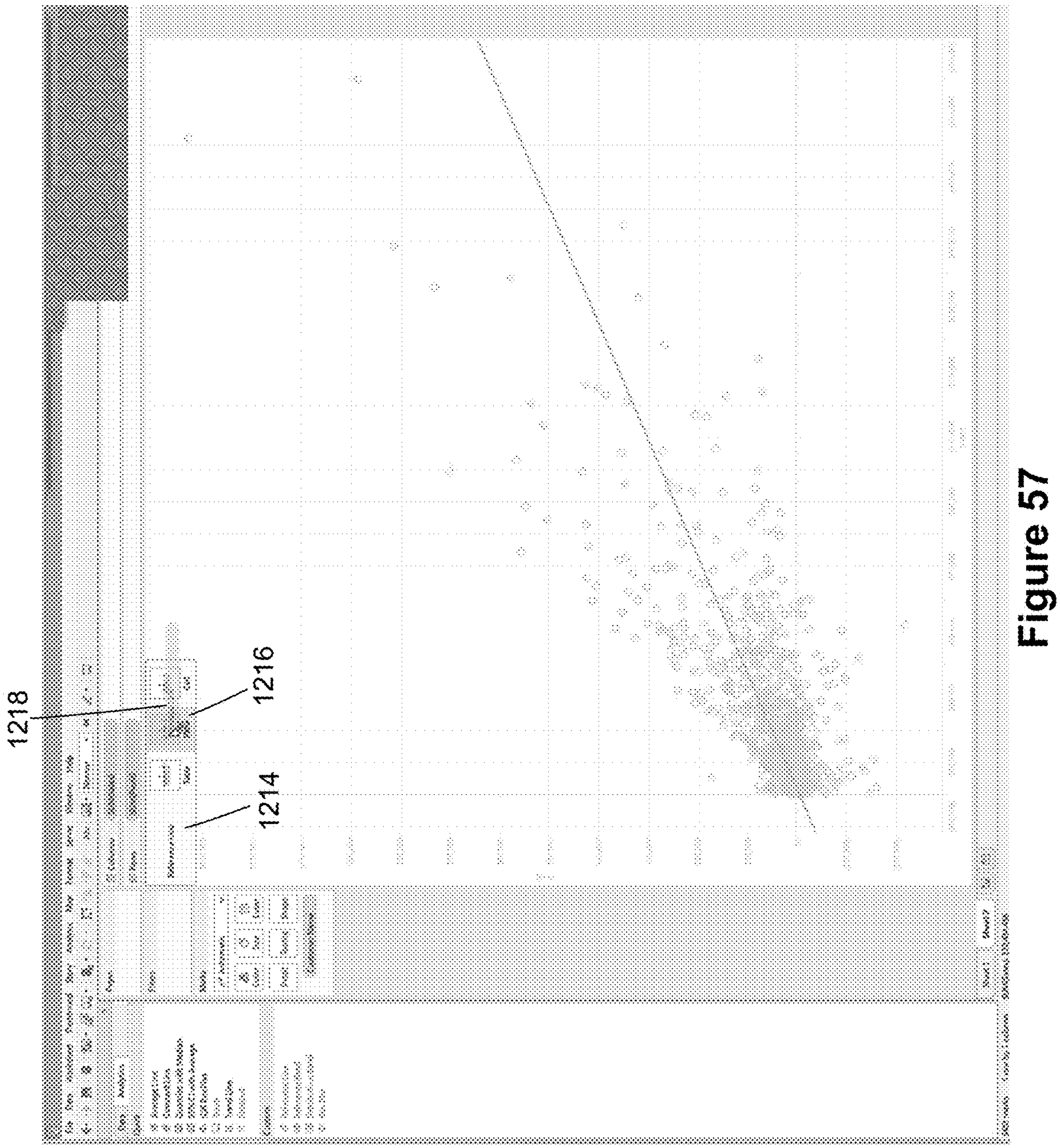
Figure 58:
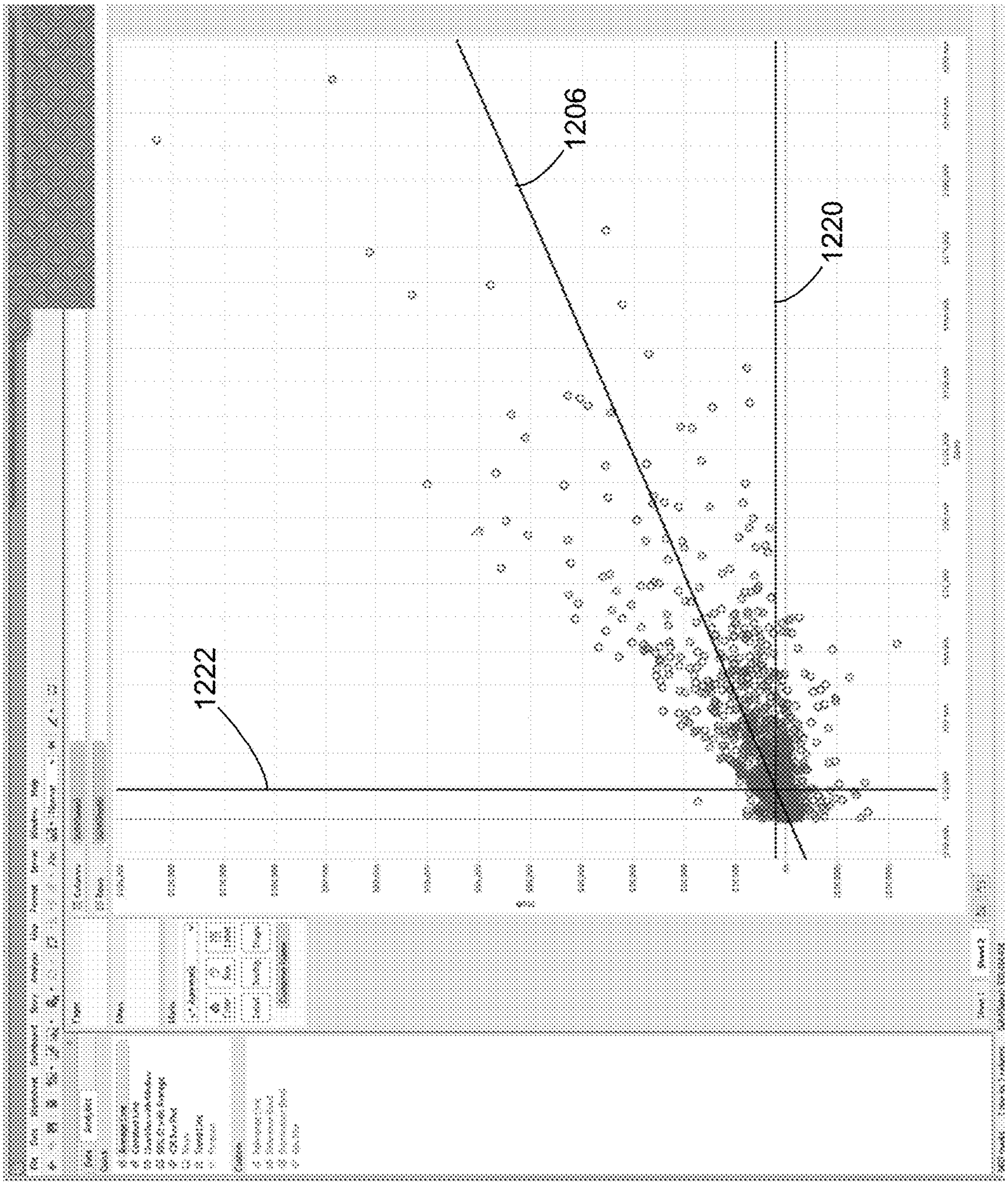

In FIG. 56, the user has selected the average line analytic icon 1212, and in FIG. 5, the user has dragged the average line analytic icon 1218 to the drop spot 1214 and placed it over the Pane option icon 1216. Note that there is only one pane in FIG. 57, so the Pane option would produce the same results as selecting the Table option. After dropping the analytic icon 1218, two average lines 1220 and 1222 are displayed, as illustrated in FIG. 58. Because the scatter plot has measures along both the x-axis and the y-axis, the horizontal average line 1220 represents the average of the y-values, and the vertical average line 1222 represents the average of the x-values. Note that a single drop operation created both of the average lines.

Figure 59:
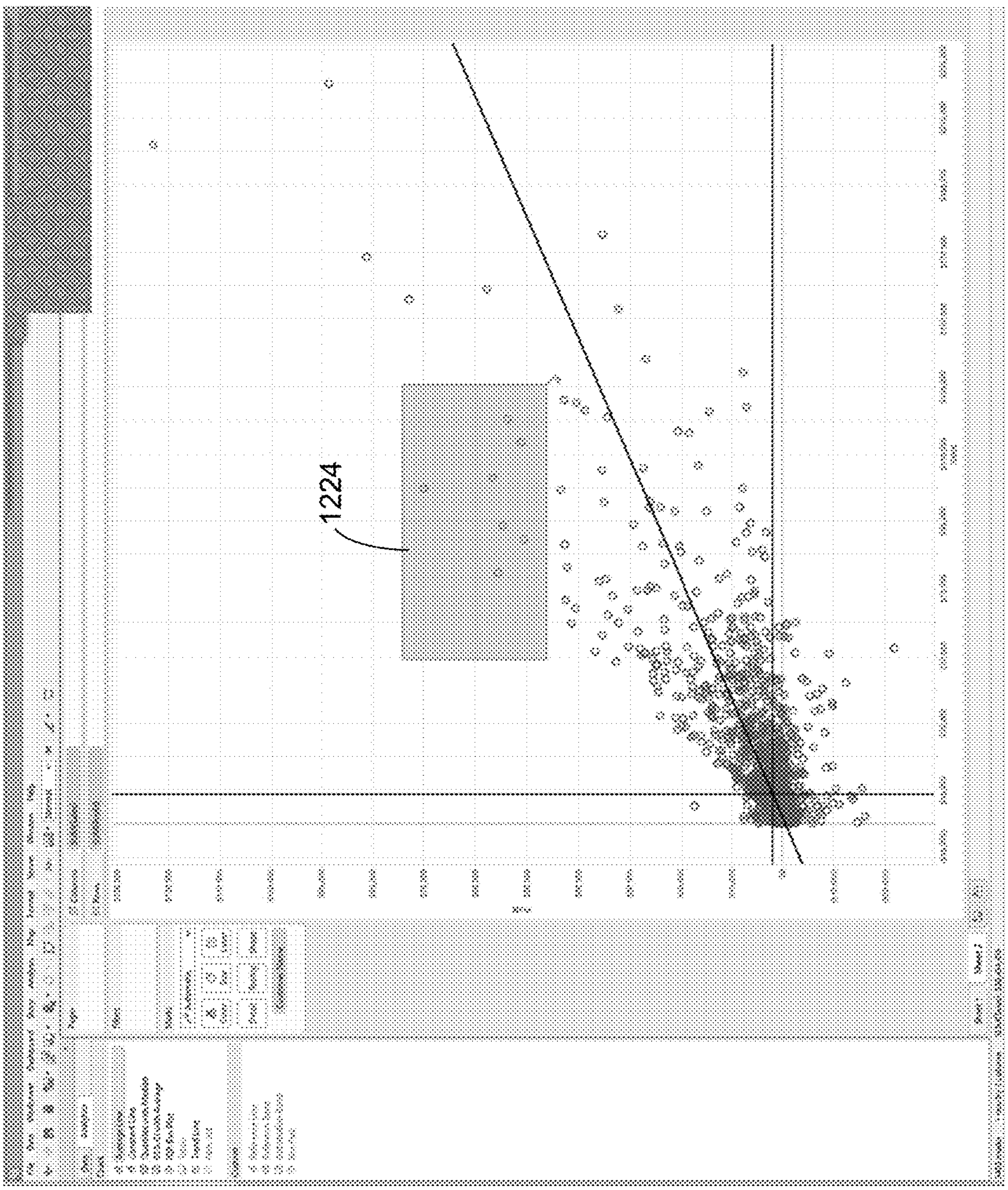
Figure 60:
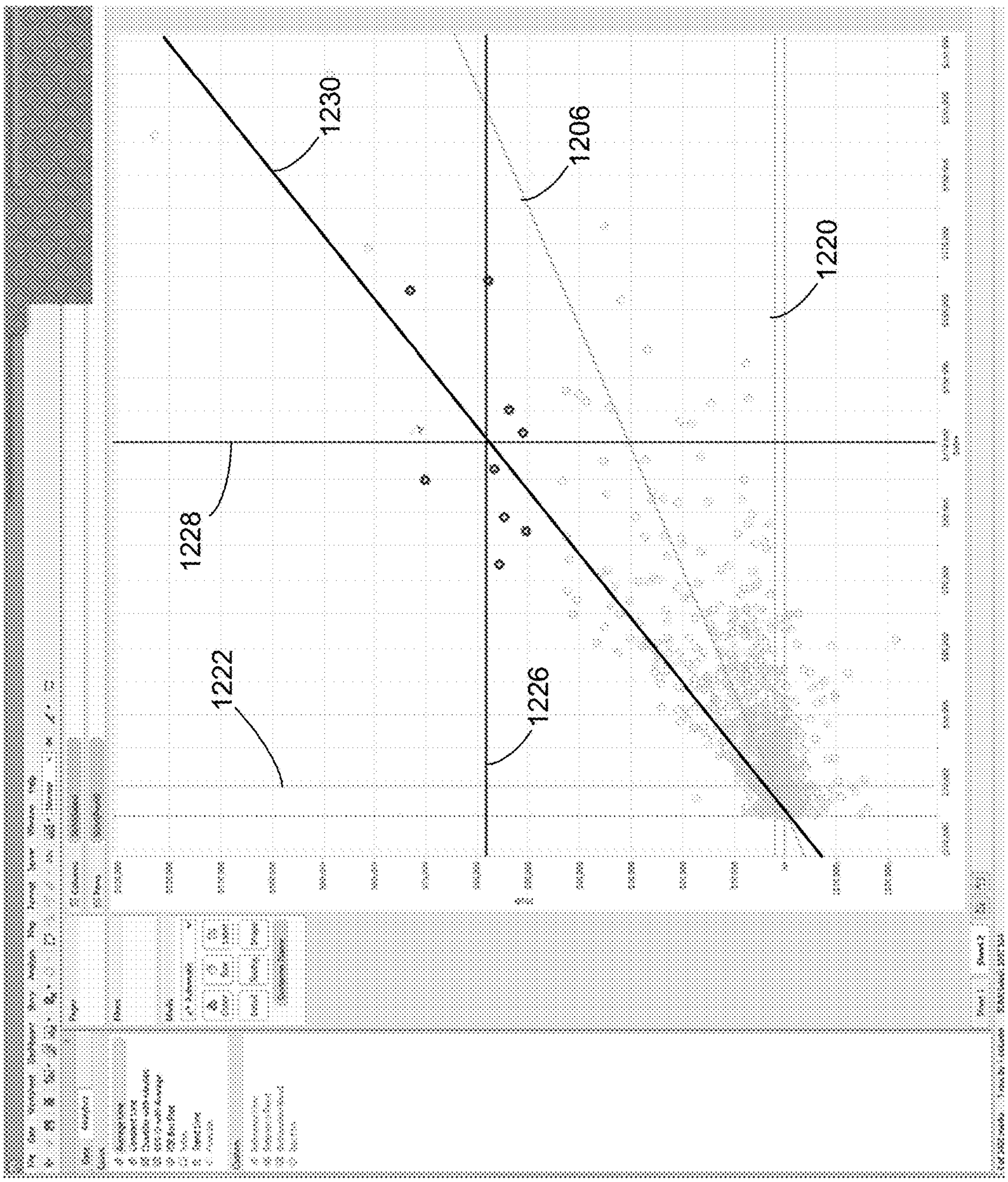

In FIG. 59, the user has selected a subset of the marks using a selection rectangle 59 (e.g., by dragging the cursor). In response, the data visualization application creates and displays the analytic objects for the selected subset, as illustrated in FIG. 60. While maintaining display of the original trend line 1206 and the original average lines 1220 and 1222 (all dimmed), the data visualization application displays a second trend line 1230 for the selected set of marks, as well as a horizontal average line 1226 and a vertical average line 1228.

As illustrated by FIGS. 55 and 60, when the user selects a subset of the marks, the data visualization application creates and displays analytic elements for the selected subset using the same analytic operations that are already applied to the full set of data. The user does not have to re-select the analytic operations.

Figure 61:
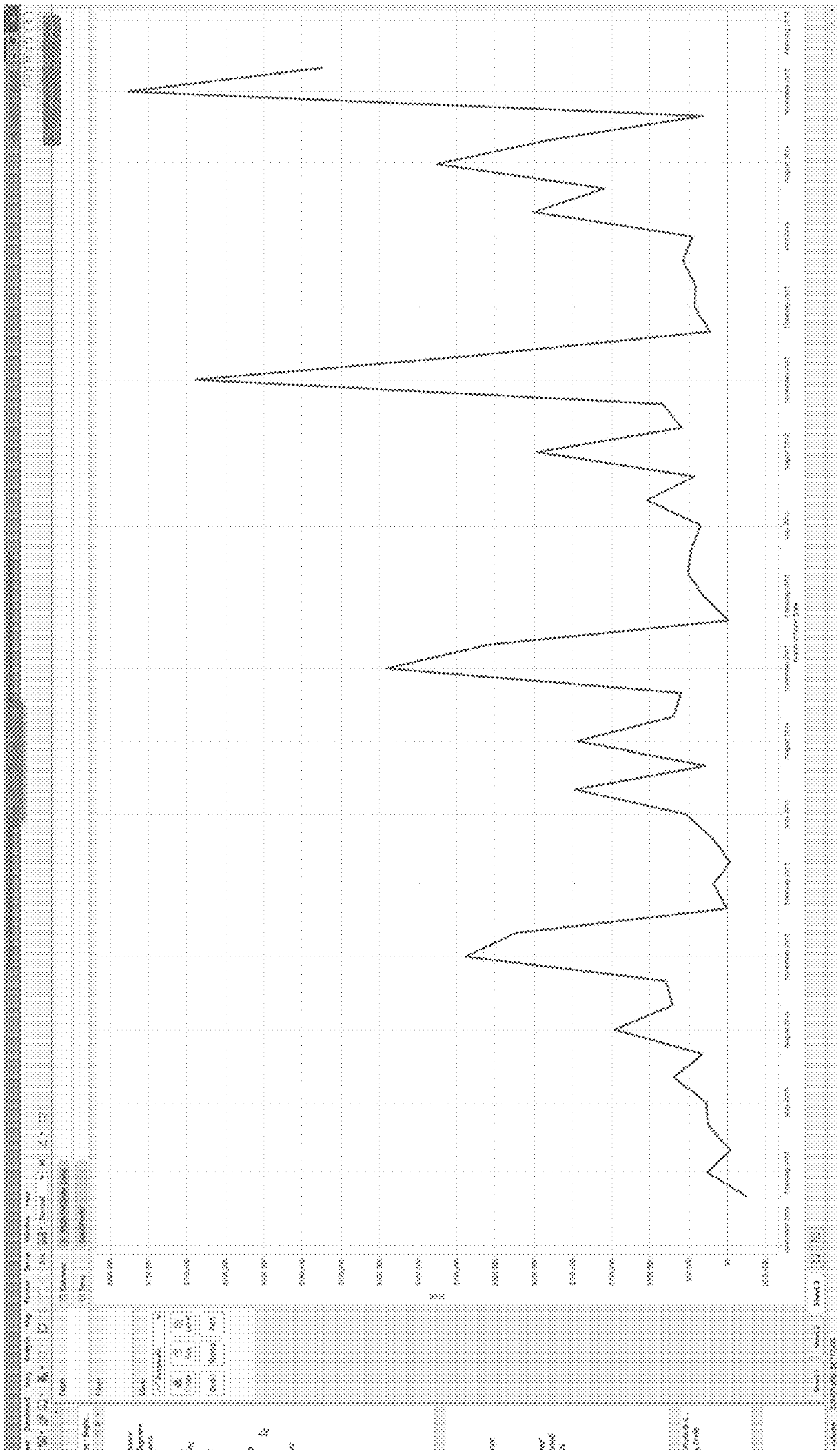
Figure 62:
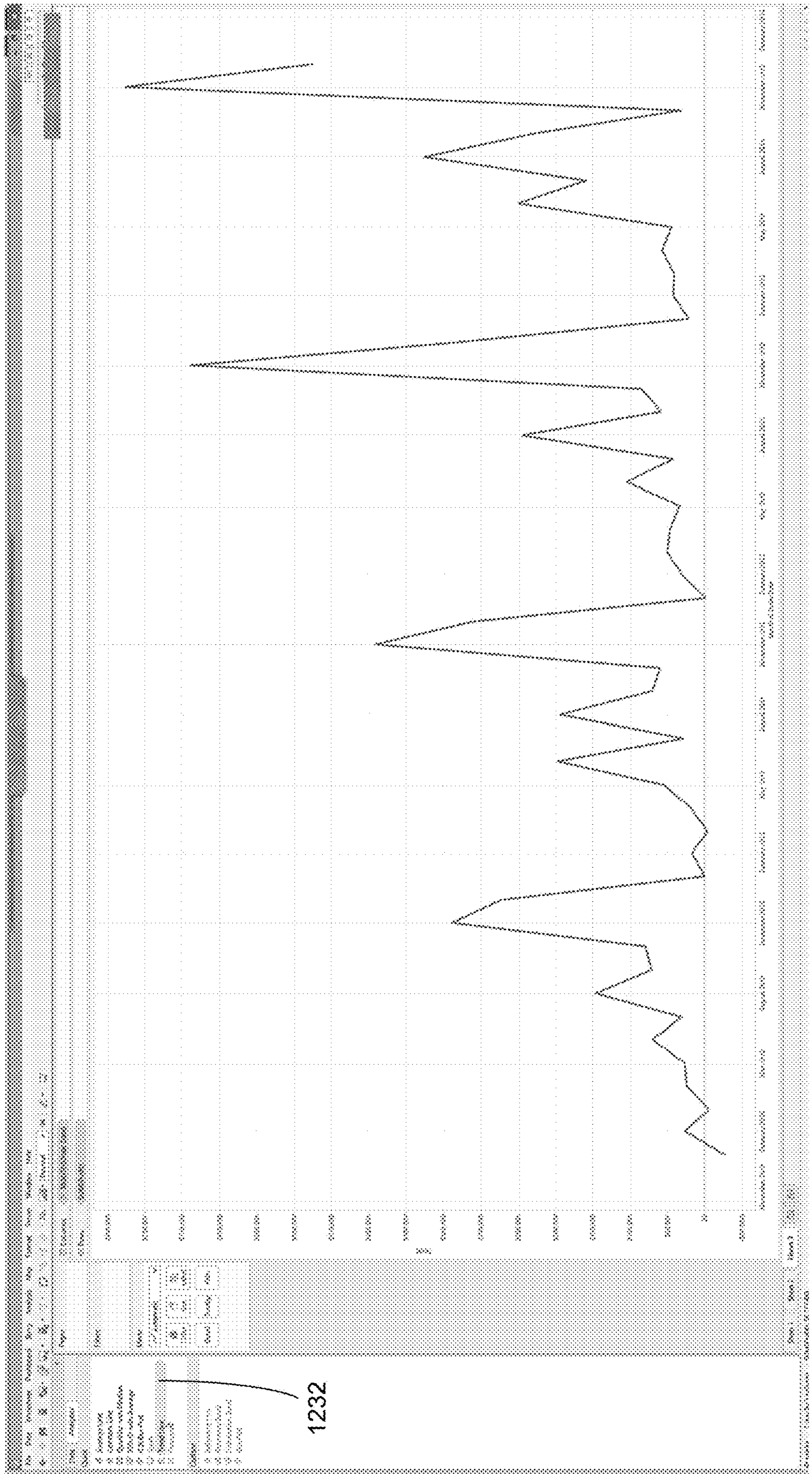
Figure 63:
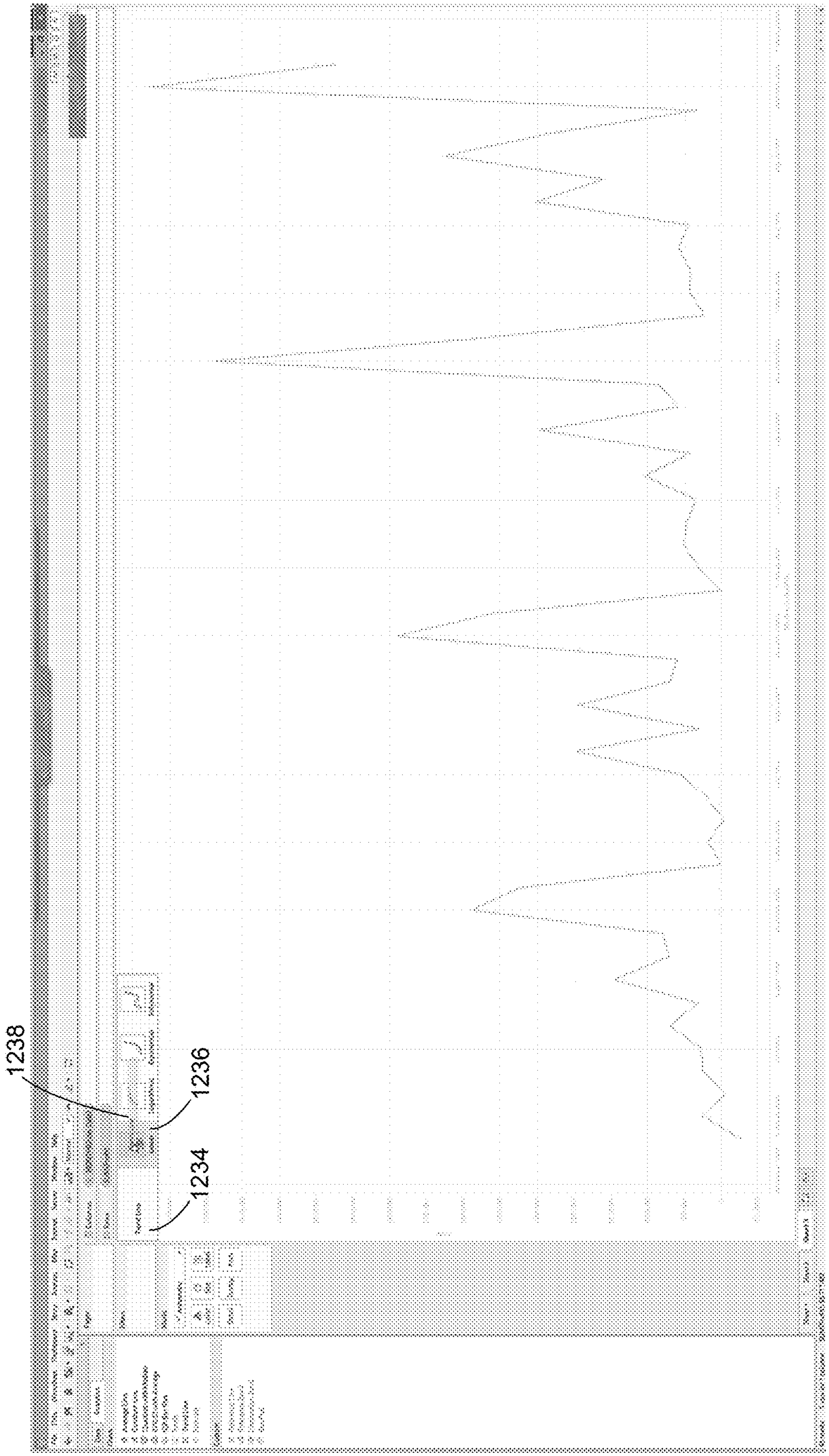
Figure 64:
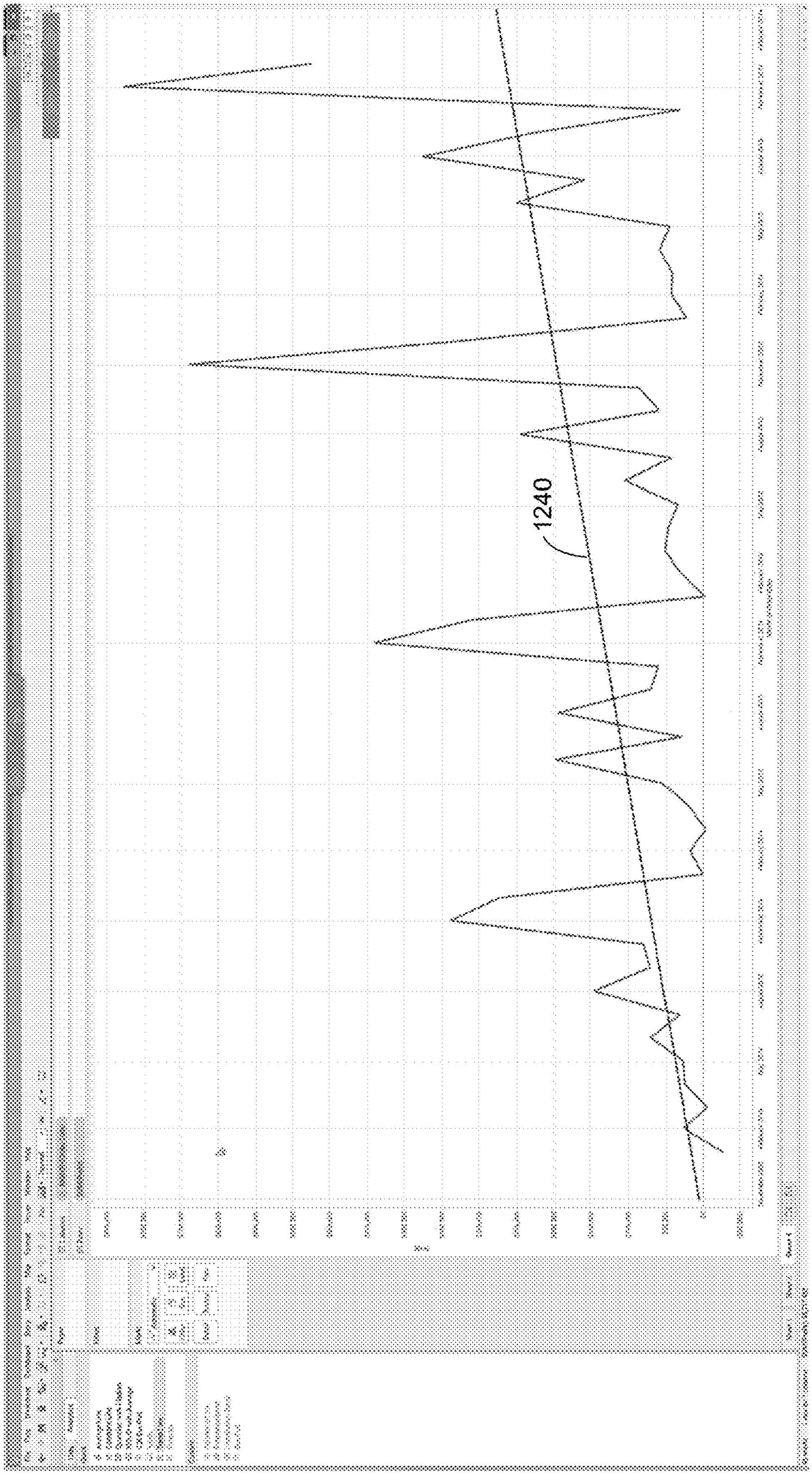

FIGS. 61-70 illustrate the use of adaptive analytics for a line chart. In FIG. 61 the user has selected data elements to form a line chart. As can be seen, the wide swings in monthly profits do not follow a simple pattern. To determine if there is an overall trend, the user selects the trend line analytic icon 1232 in FIG. 62. In FIG. 63, the user has dragged the trend line icon 1238 to the drop spot 1234 and placed it over the "Linear" option icon 1236. When the user drops the trend line analytic icon 1238 on the option icon 1236, the trend line 1240 is displayed, as illustrated in FIG. 64. This shows that the monthly profits are increasing overall.

Figure 65:
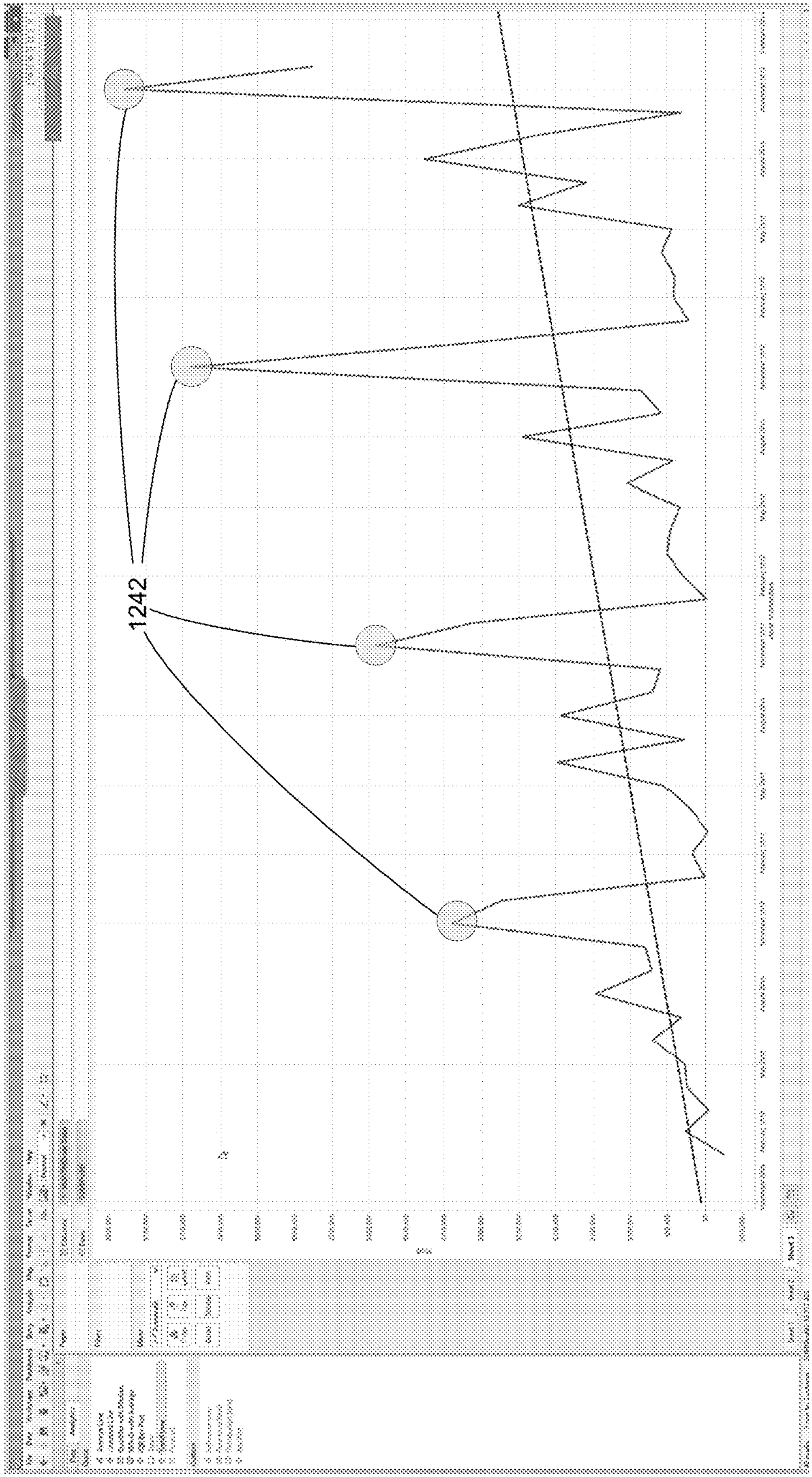
Figure 66:
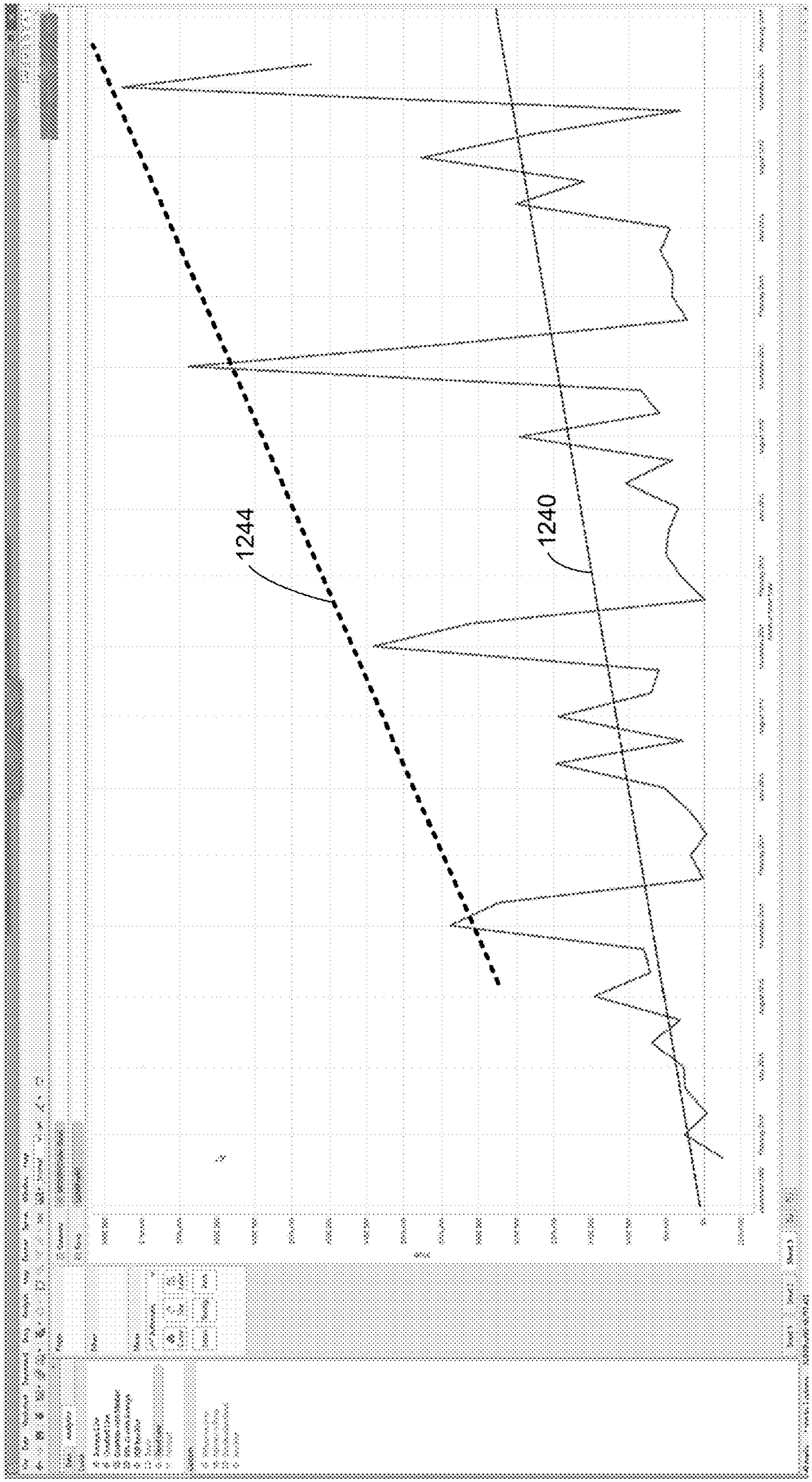

The user notices that there are spikes at the end of each year, and wonders about the trend for just those year-end points. In FIG. 65, the user selects the year-end points 1242 (e.g., using SHIFT+click or CTRL+click). As each of the points 1242 is selected, an updated second trend line for the selection is displayed (not illustrated here). When all four points 1242 are selected, the second trend line 1244 appears as illustrated in FIG. 66. The original trend line 1240 is still displayed as well. By seeing both the overall trend 1240 as well as the spike trend 1244, the user can see that the spikes are growing even faster than the overall trend.

Figure 67:
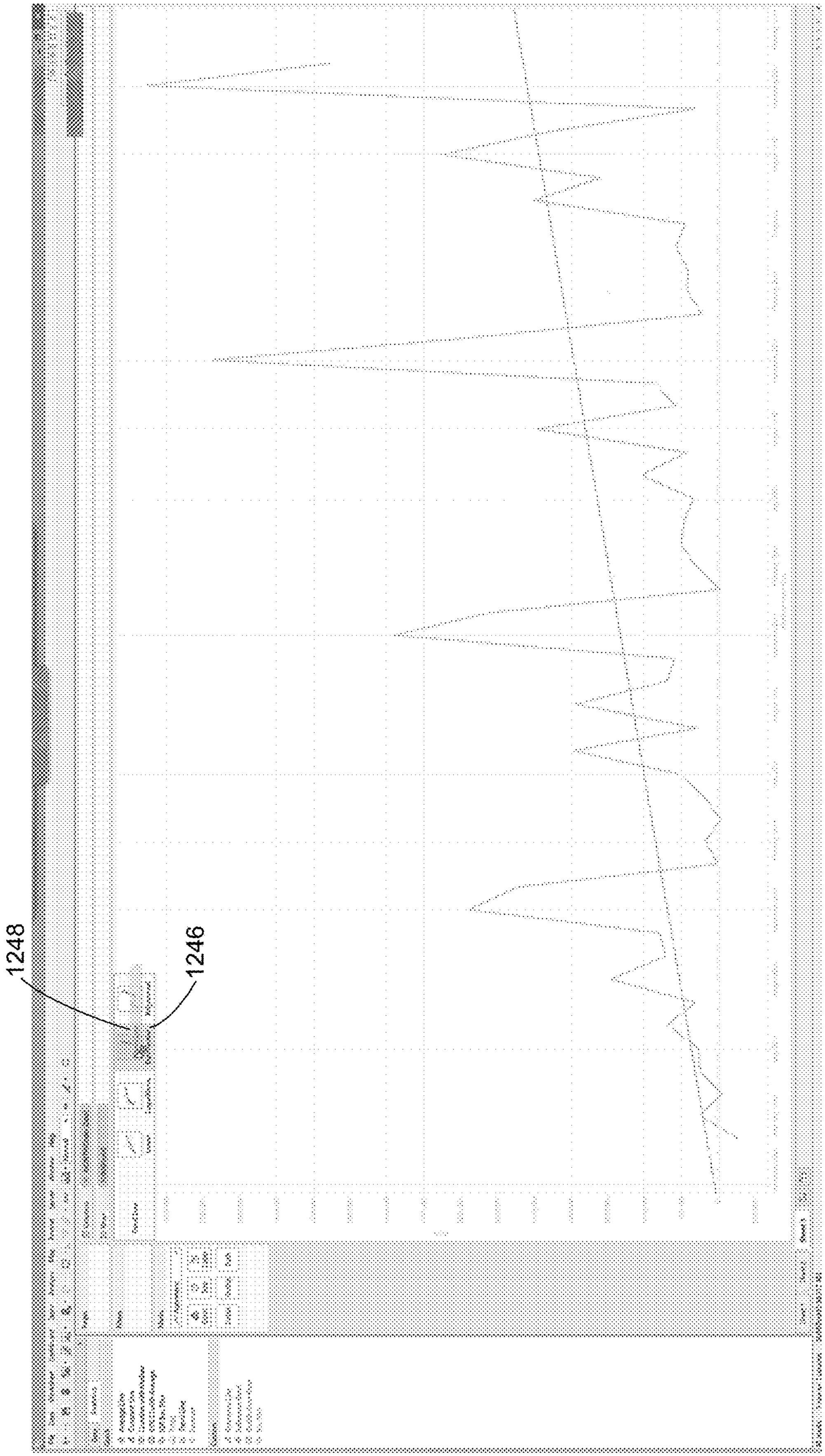
Figure 68:
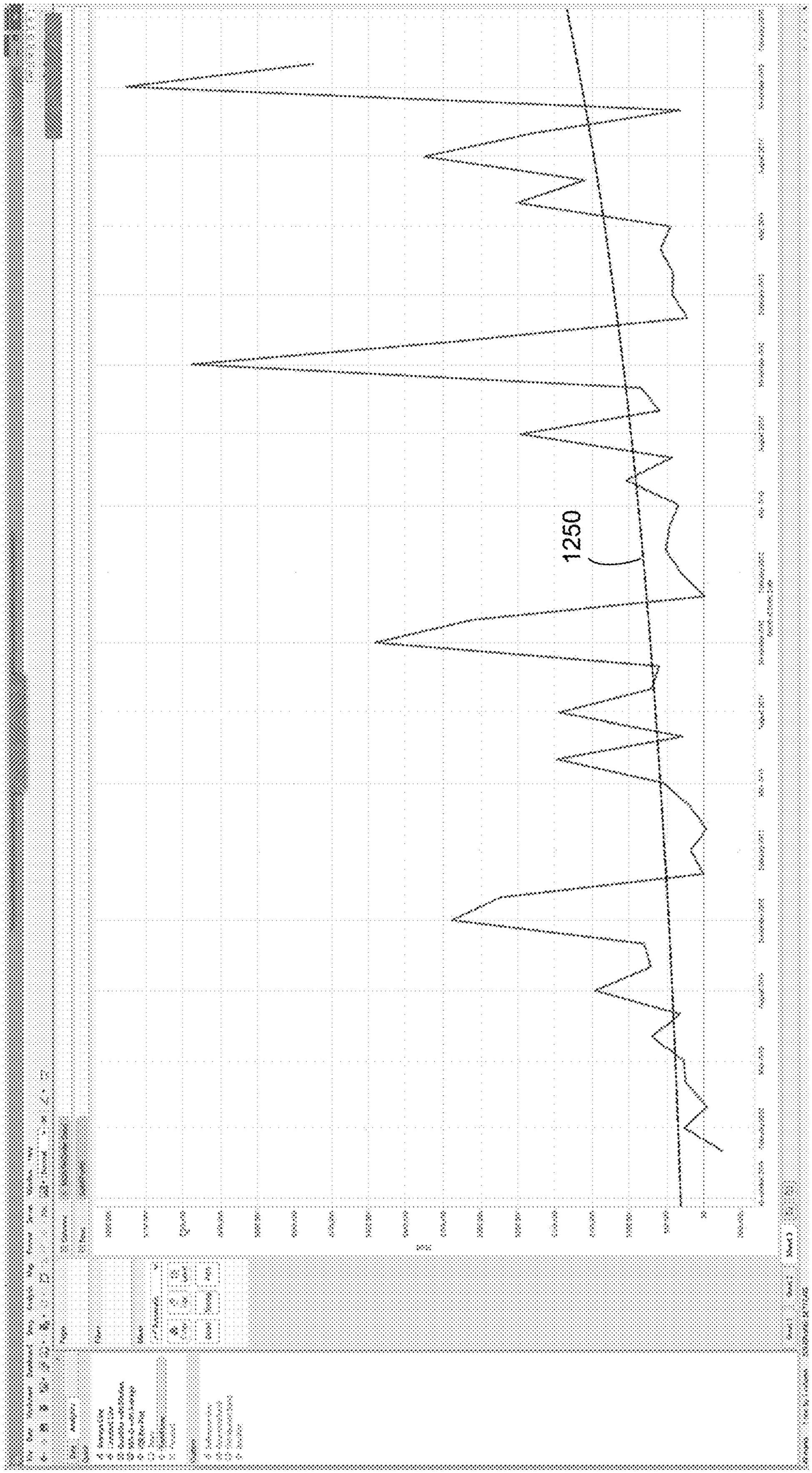
Figure 69:
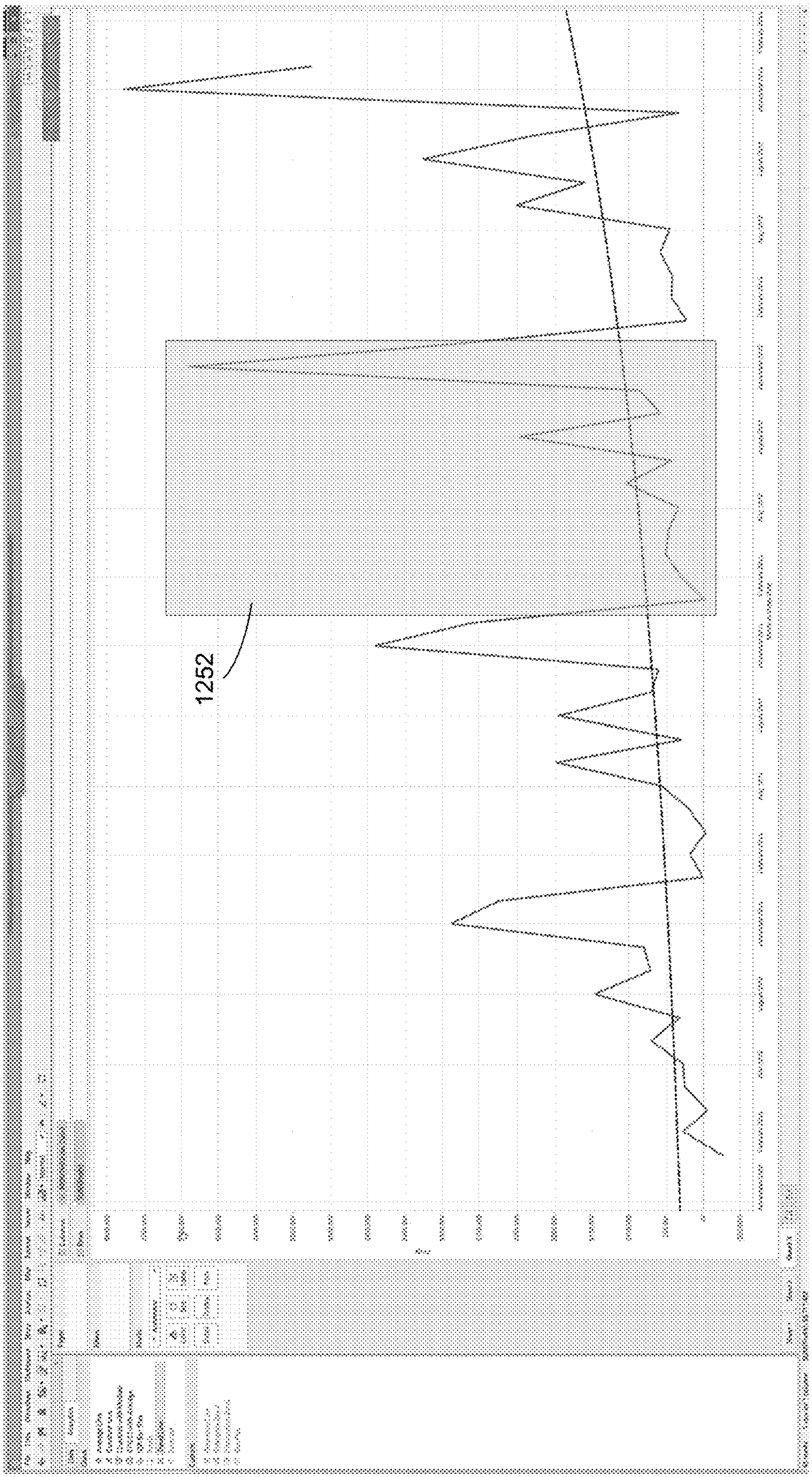
Figure 70:
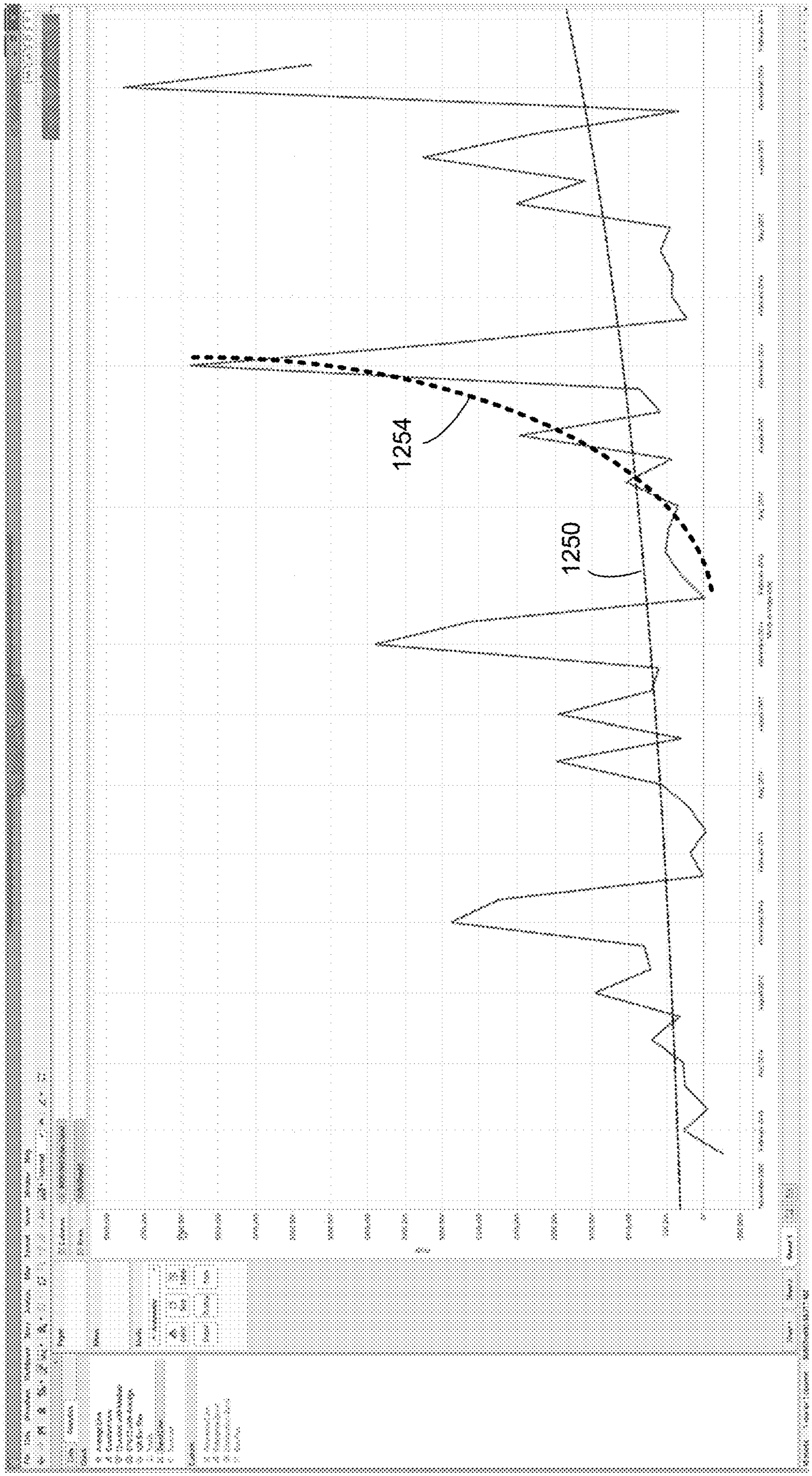

In FIG. 67, the user has decided to model the data with an exponential trend line. The user has dragged the trend line analytic icon 1248 over the exponential option icon 1246. This results in displaying an exponential trend line 1250, as illustrated in FIG. 68. The user wants to compare the overall trend to the trend within a single year, and uses a selection rectangle 1252, as illustrated in FIG. 69. Once selected, a second exponential trend line 1254 is displayed for the selected marks, as illustrated in FIG. 70. The exponential growth within the selection is much greater than the overall growth because it does not account for the significant drop off at the end of each year.

FIGS. 71-92 illustrate analytic functionality on a line chart that has been split into multiple panes. In these figures, the data has been split into separate panes based on region (the columns shelf 120 includes both Region and YEAR (Order Date)).

Figure 71:
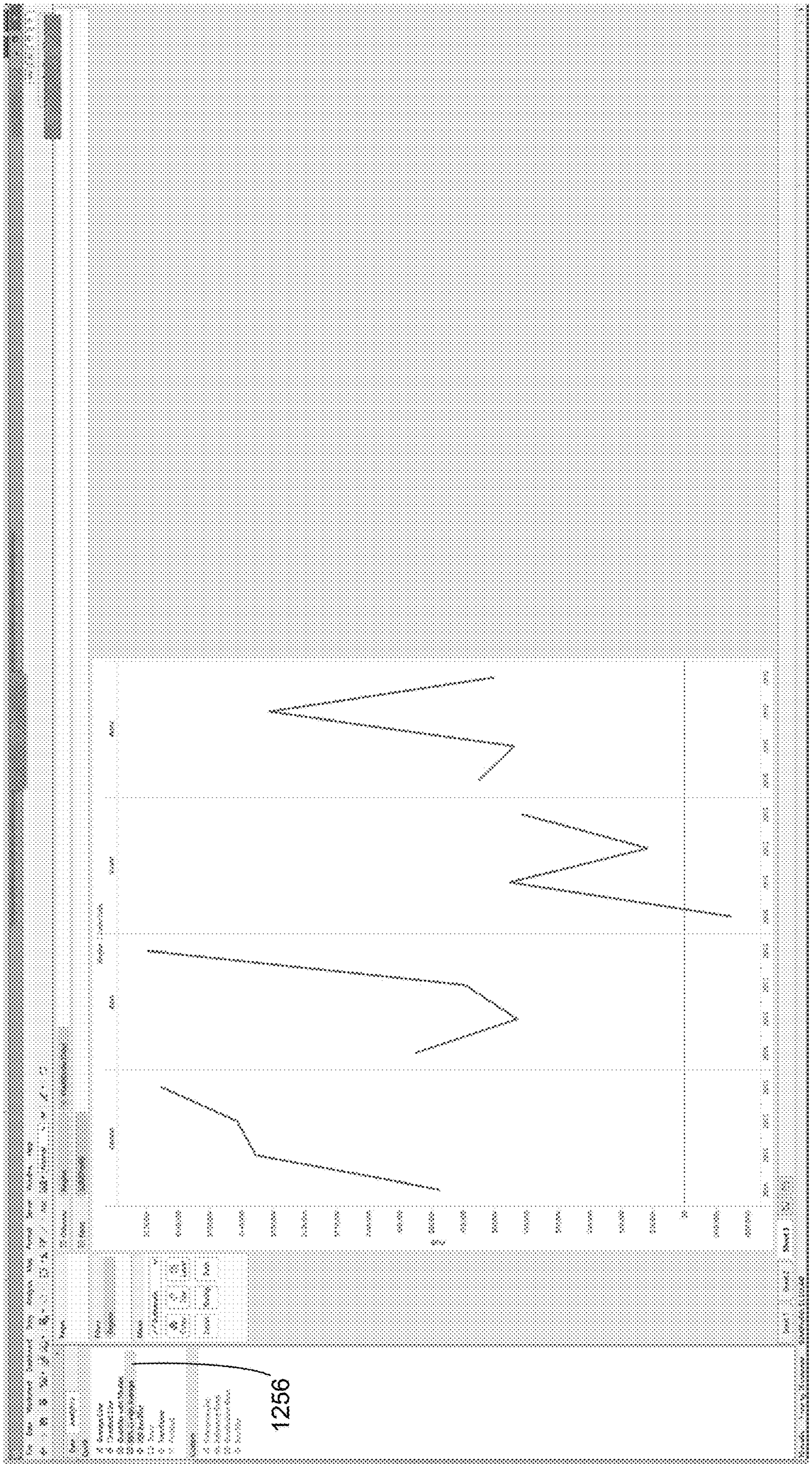
Figure 72:
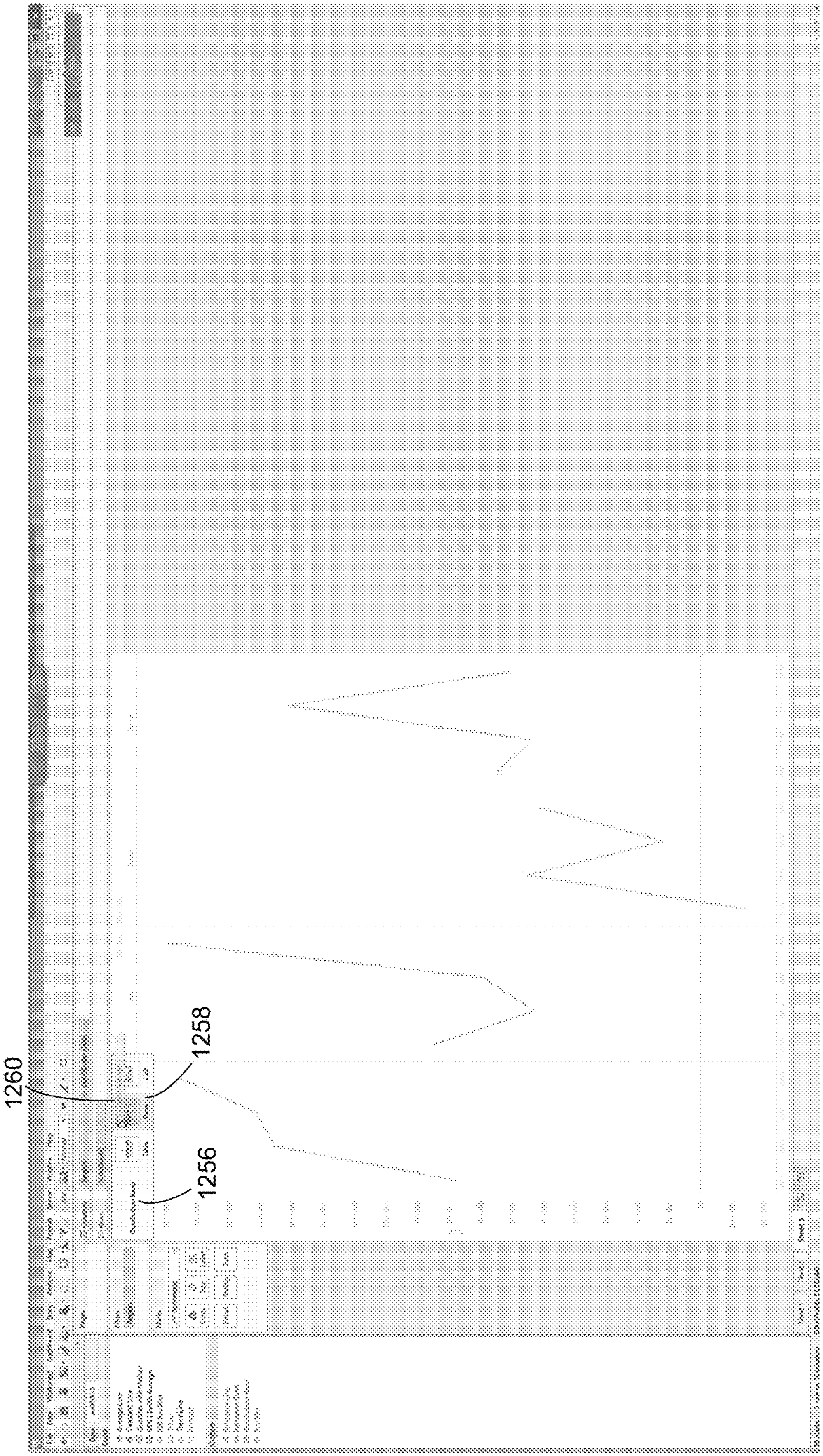
Figure 73:
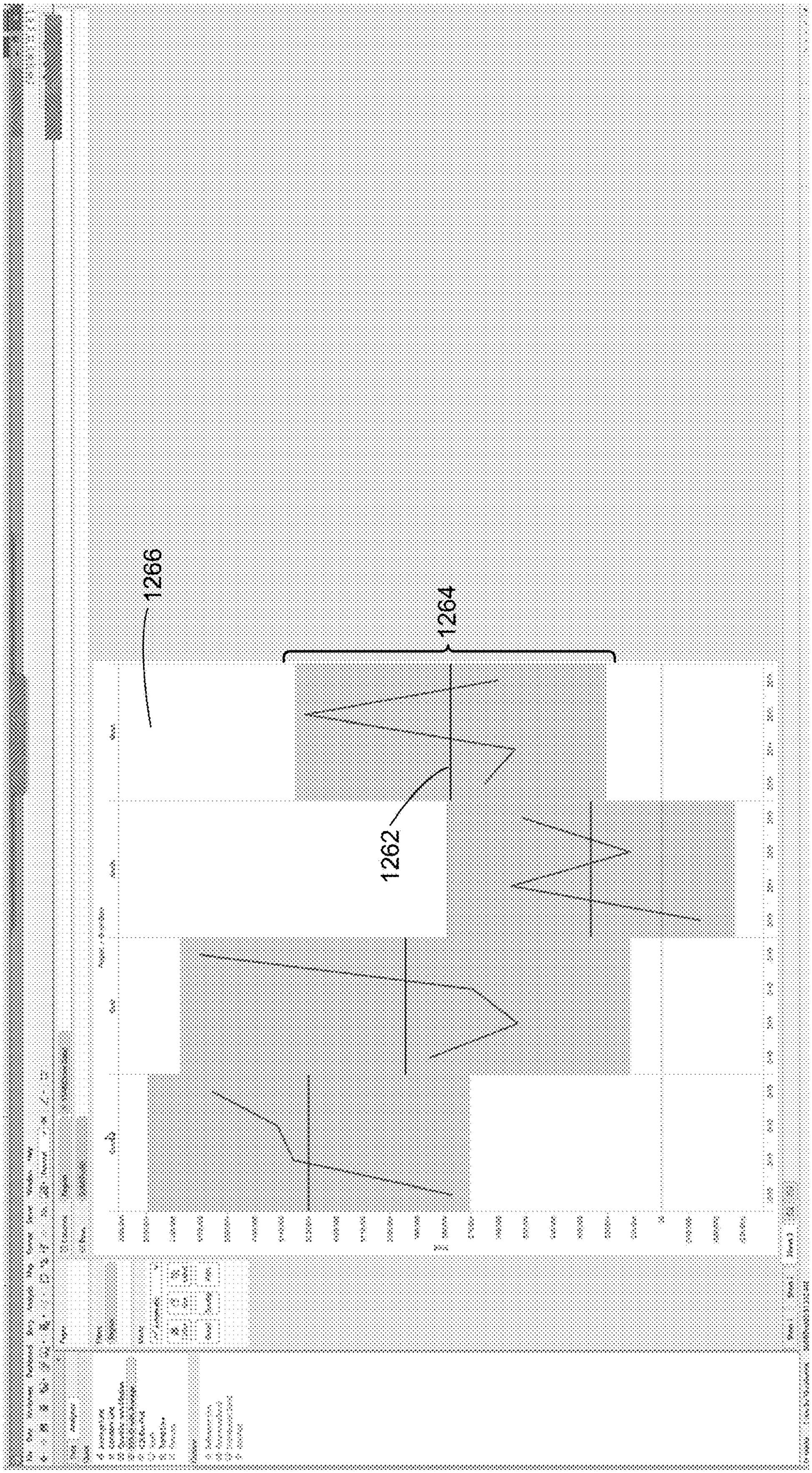

In FIG. 71, the user has selected the analytic icon 1256 for 95% confidence interval with average. In FIG. 72, the user places the analytic icon 1260 over the Pane option icon 1258 in the drop spot 1256, and drops the analytic icon. Because the Pane option was selected, FIG. 73 illustrates that there is separate analytic data displayed for each of the panes. For example, the fourth pane 1266 has its own average line 1262 and 95% confidence interval 1264.

Figure 74:
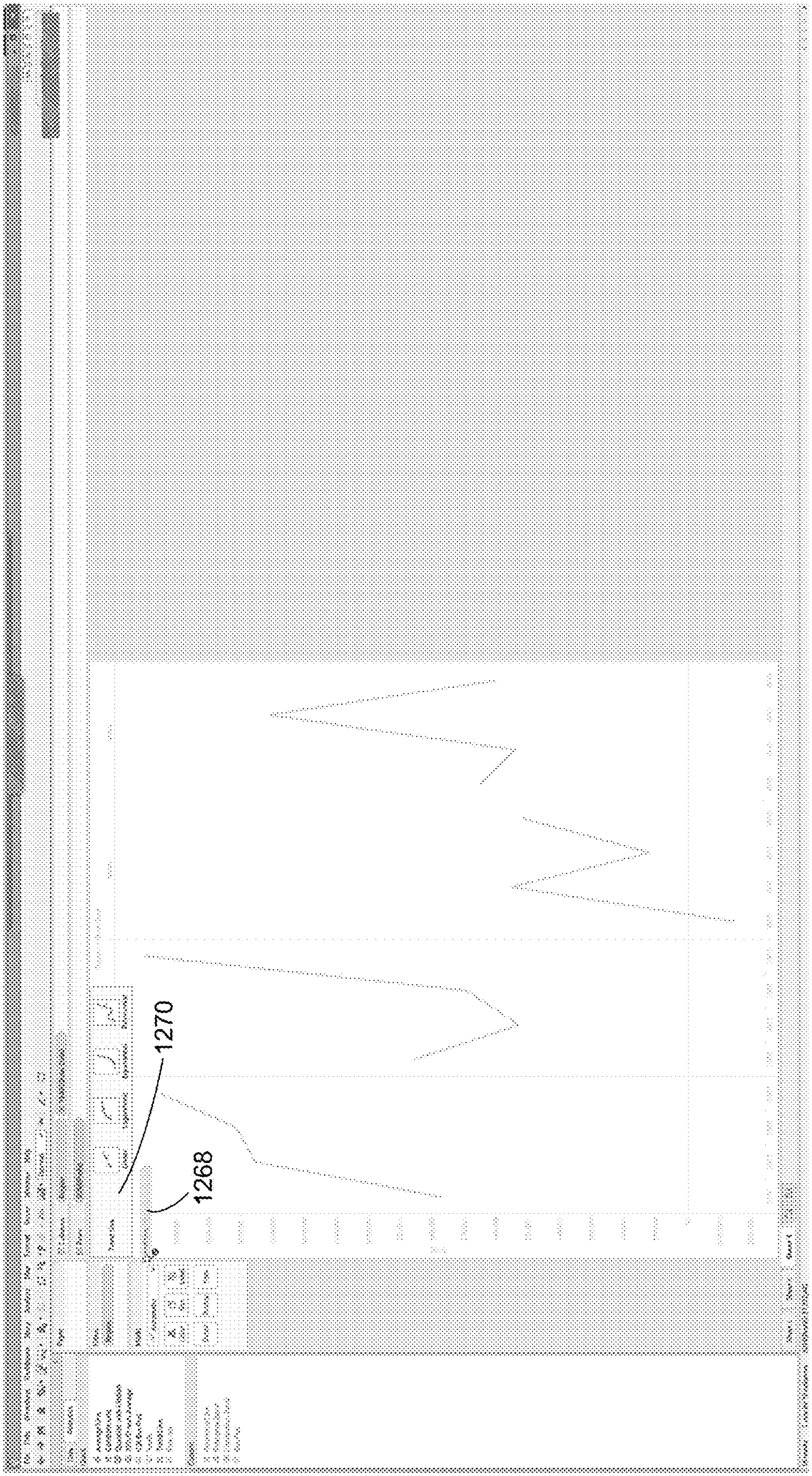
Figure 75:
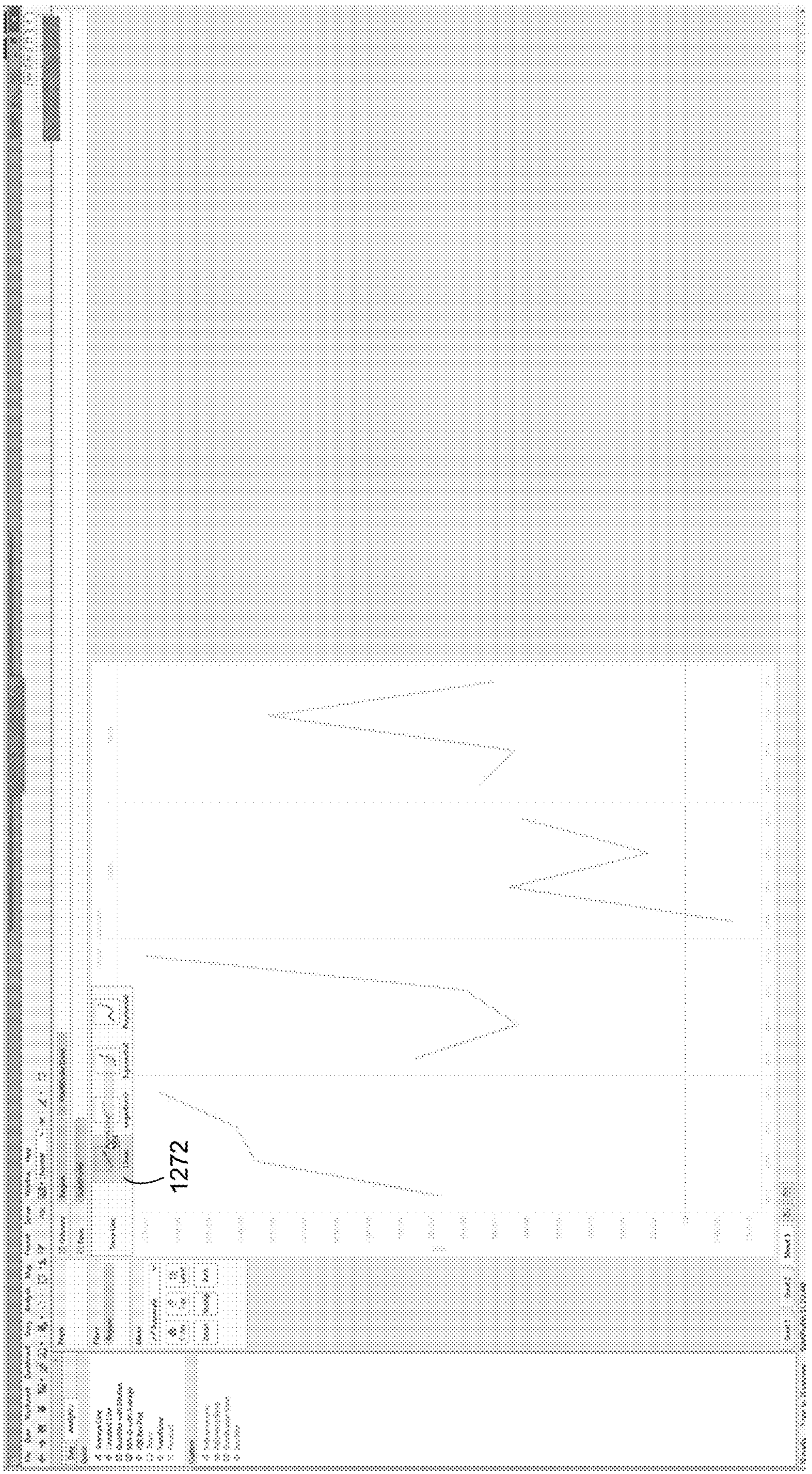
Figure 76:
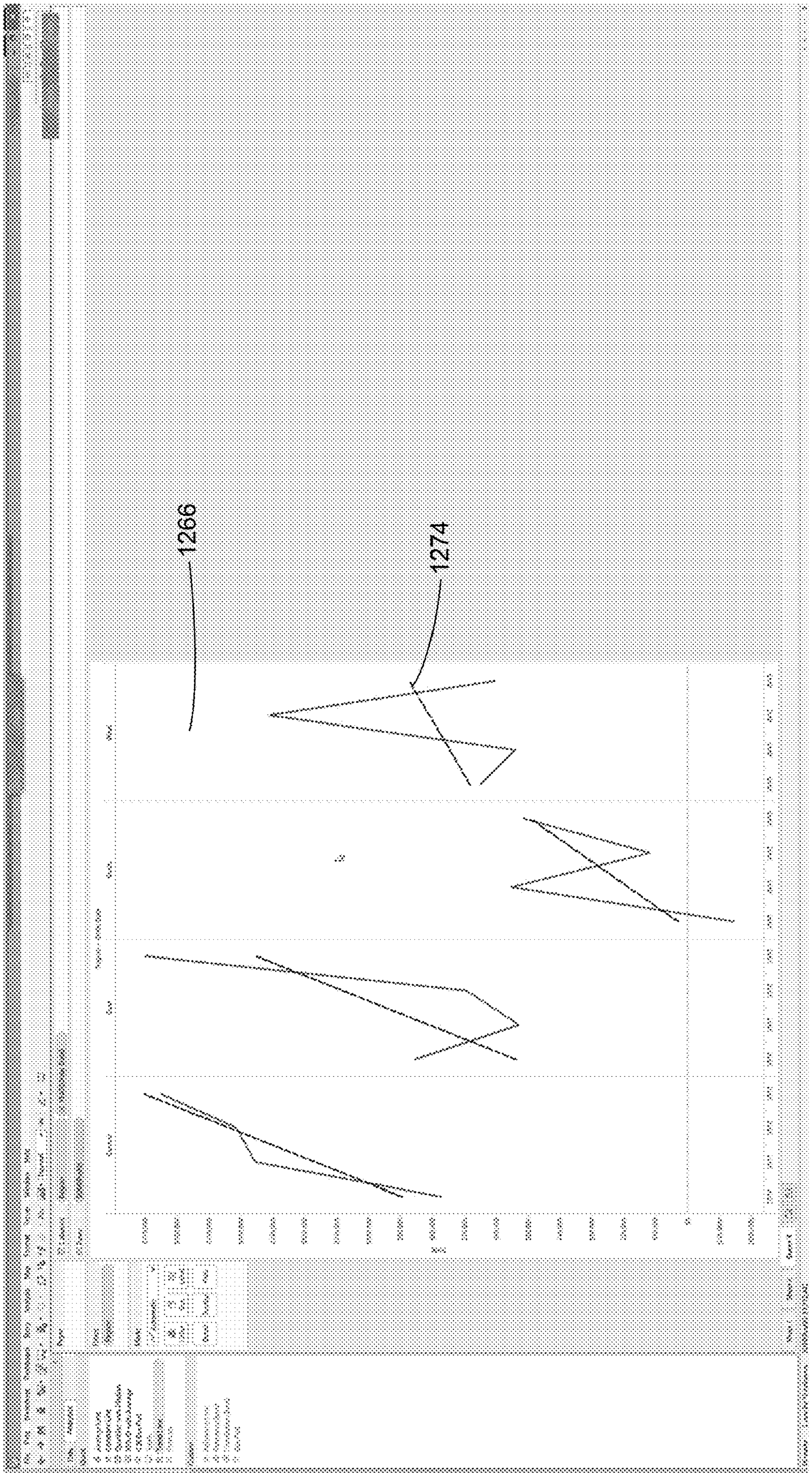

In FIG. 74, the user drags the trend line analytic icon 1268 toward the drop spot 1270, and in FIG. 75 drops the analytic icon 1268 onto the linear option icon 1272. FIG. 76 shows the separate trend lines for each of the panes, including the fourth trend line 1274 for the fourth pane 1266. Note that separate trend lines for each pane are created and displayed automatically because trend lines could not meaningfully span the panes.

Figure 77:
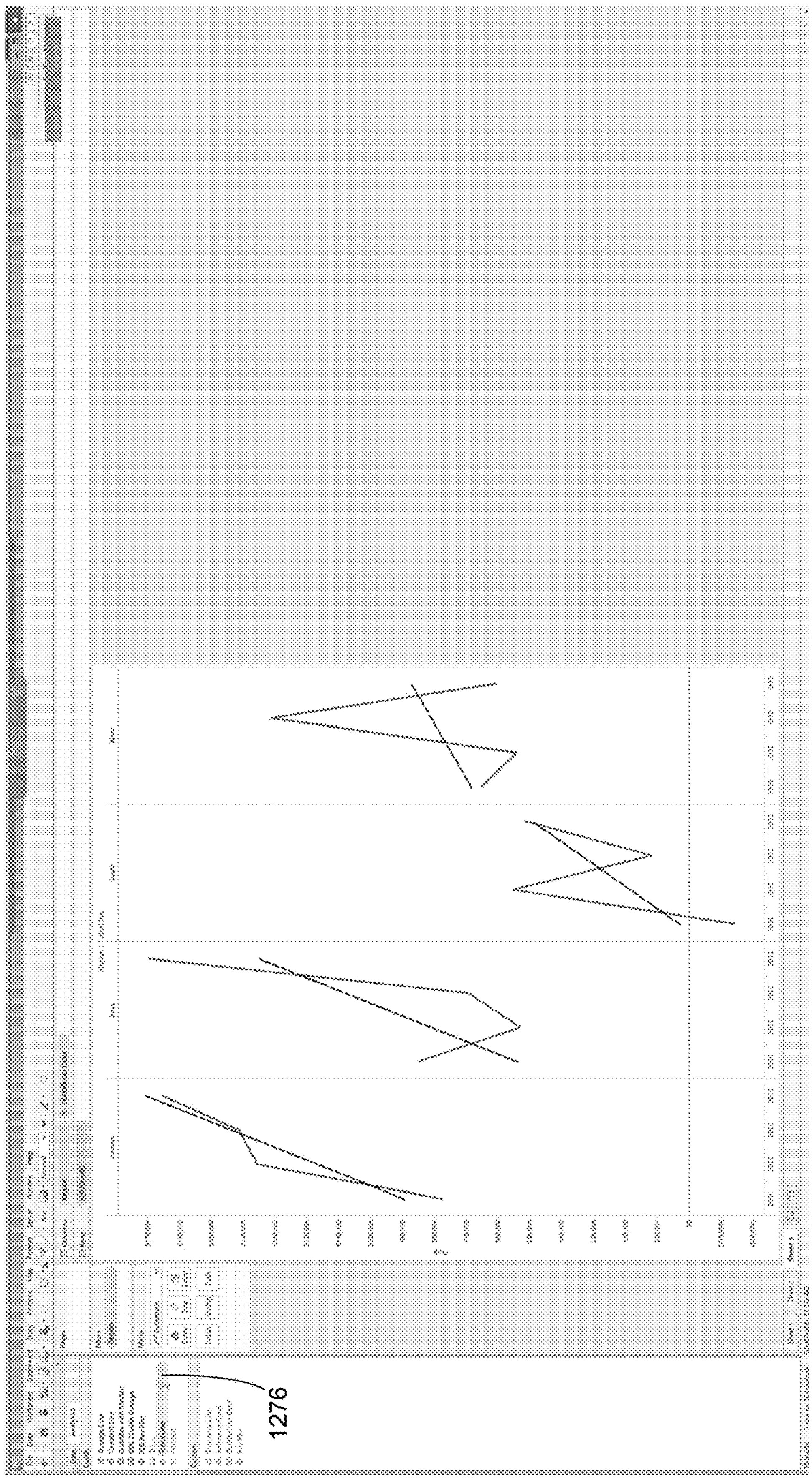
Figure 78:
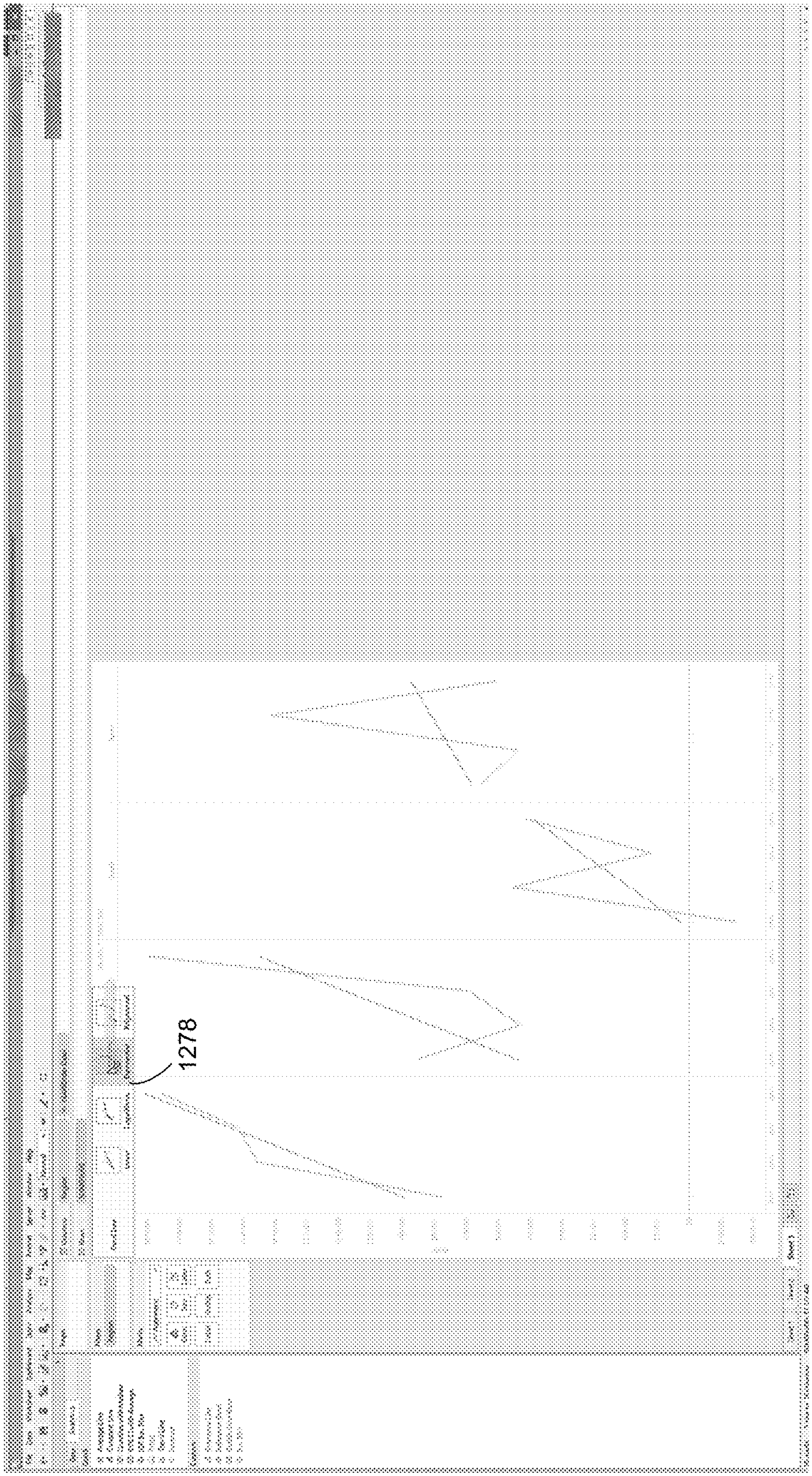
Figure 79:
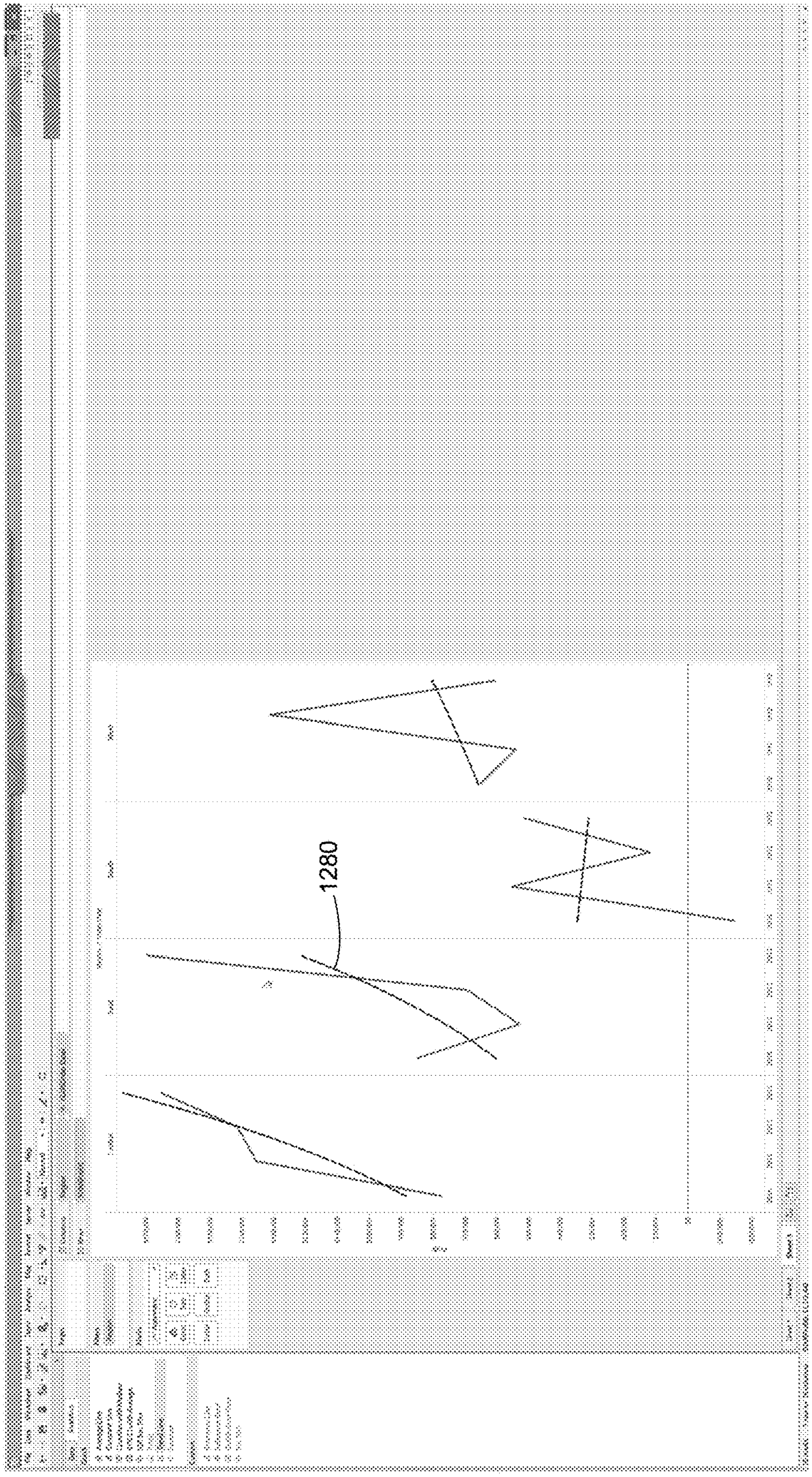

In FIGS. 77 and 78, the user selects the trend line analytic icon 1276 again, but drops it onto the exponential option icon 1278 instead, resulting in exponential trend lines, as illustrated in FIG. 79. The trend line 1280 for the second pane shows a little exponential curvature, but the exponential trend lines are not much different from the linear trend lines shown in FIG. 76.

Figure 80:
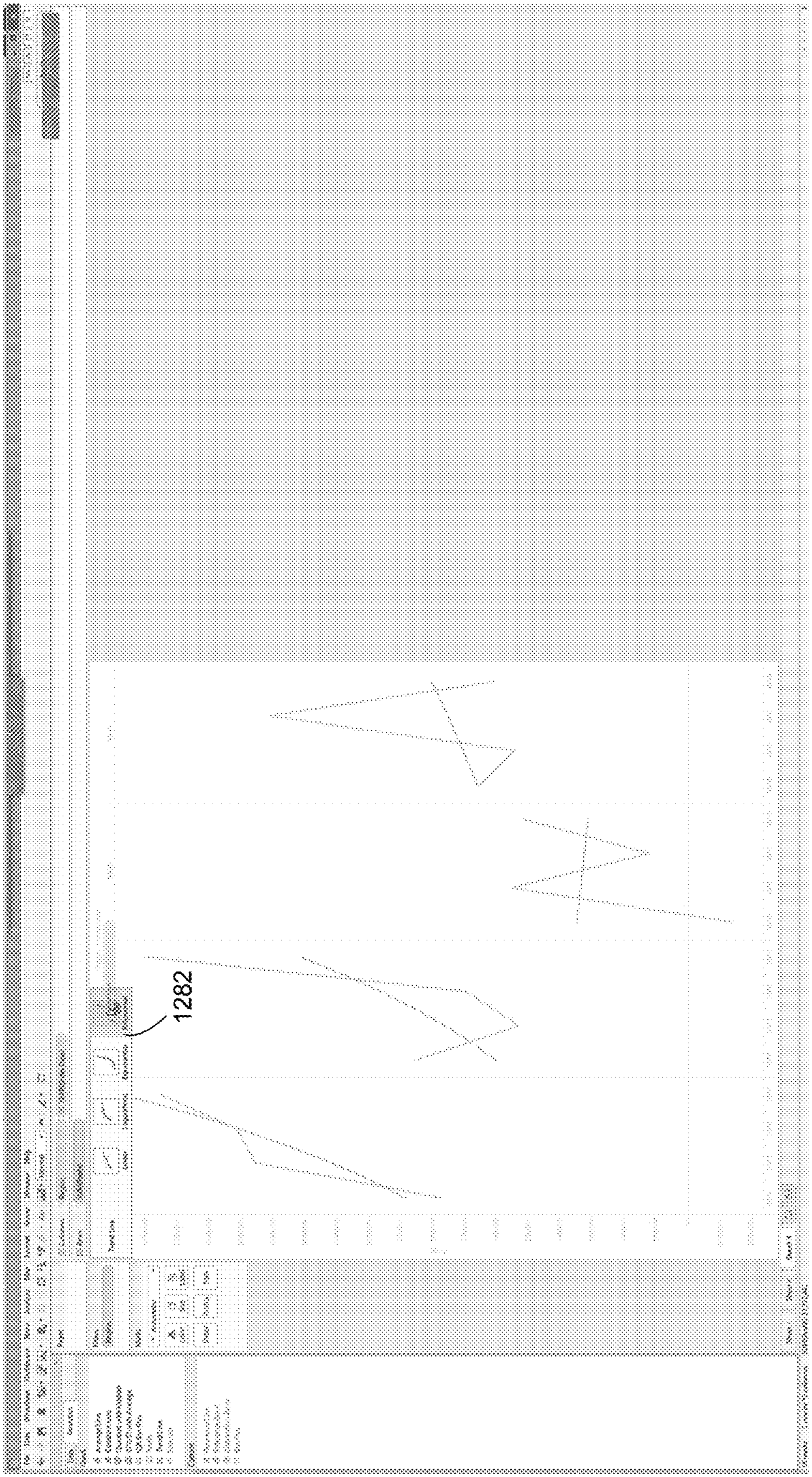
Figure 81:
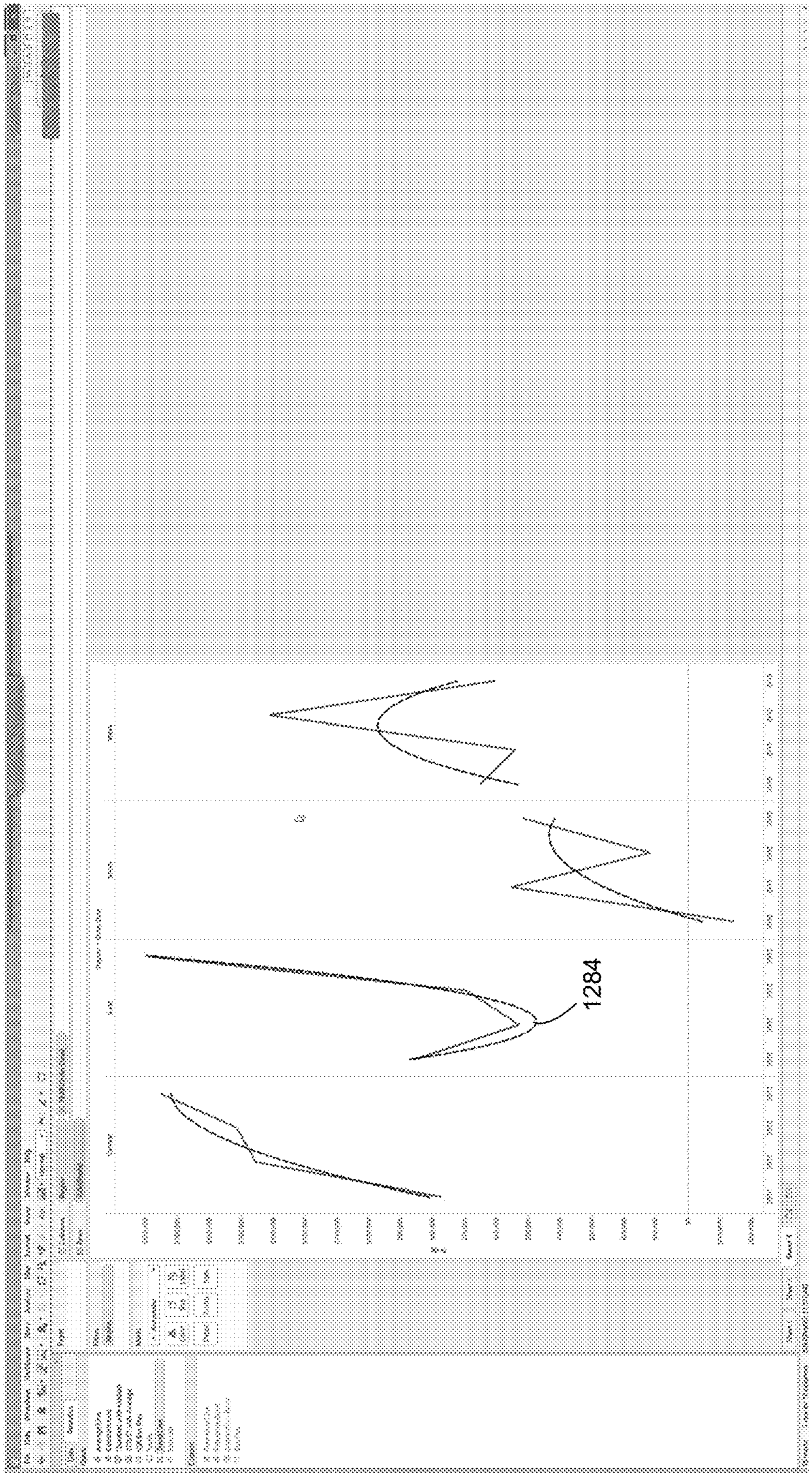

In FIG. 80, the user has selected the trend line analytic icon again, and drops it onto the polynomial option icon 1282, creating the polynomial trend lines displayed in FIG. 81. For some of the panes the polynomial trend line better matches the data, such as the polynomial trend line 1284 for the second pane. In some implementations, the default degree for a polynomial trend line is three (i.e., fit using a cubic polynomial).

Figure 82:
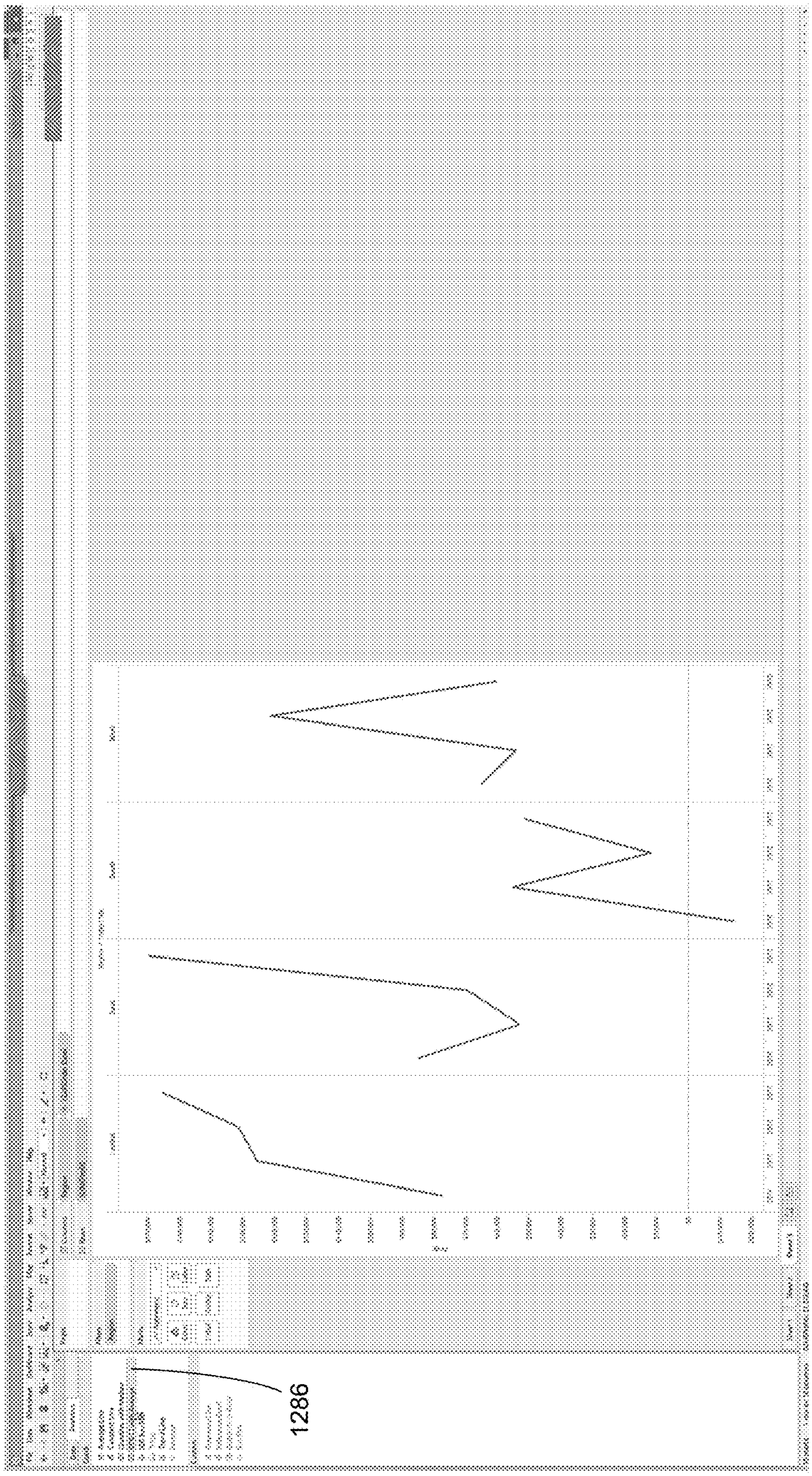
Figure 83:
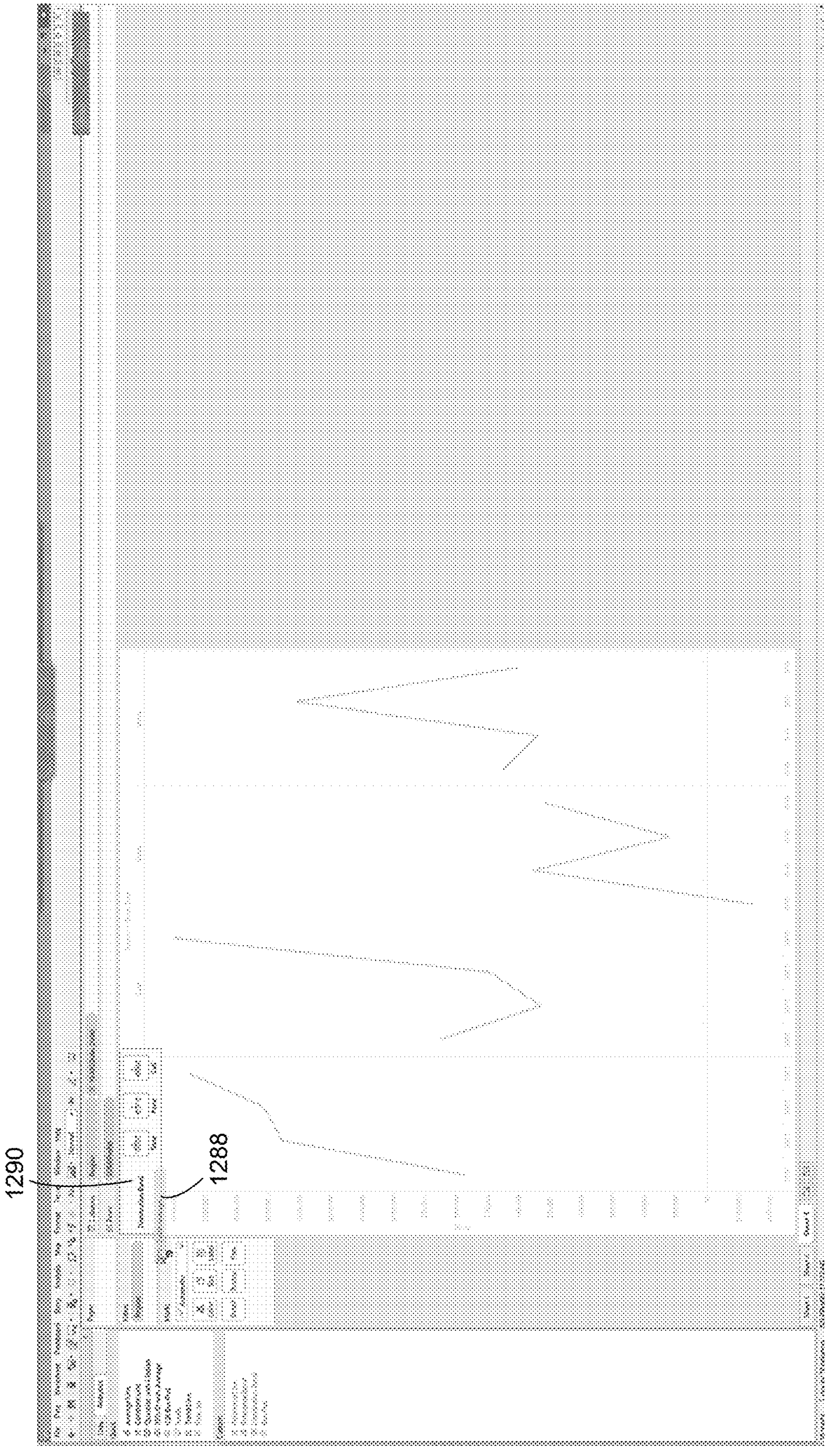
Figure 84:
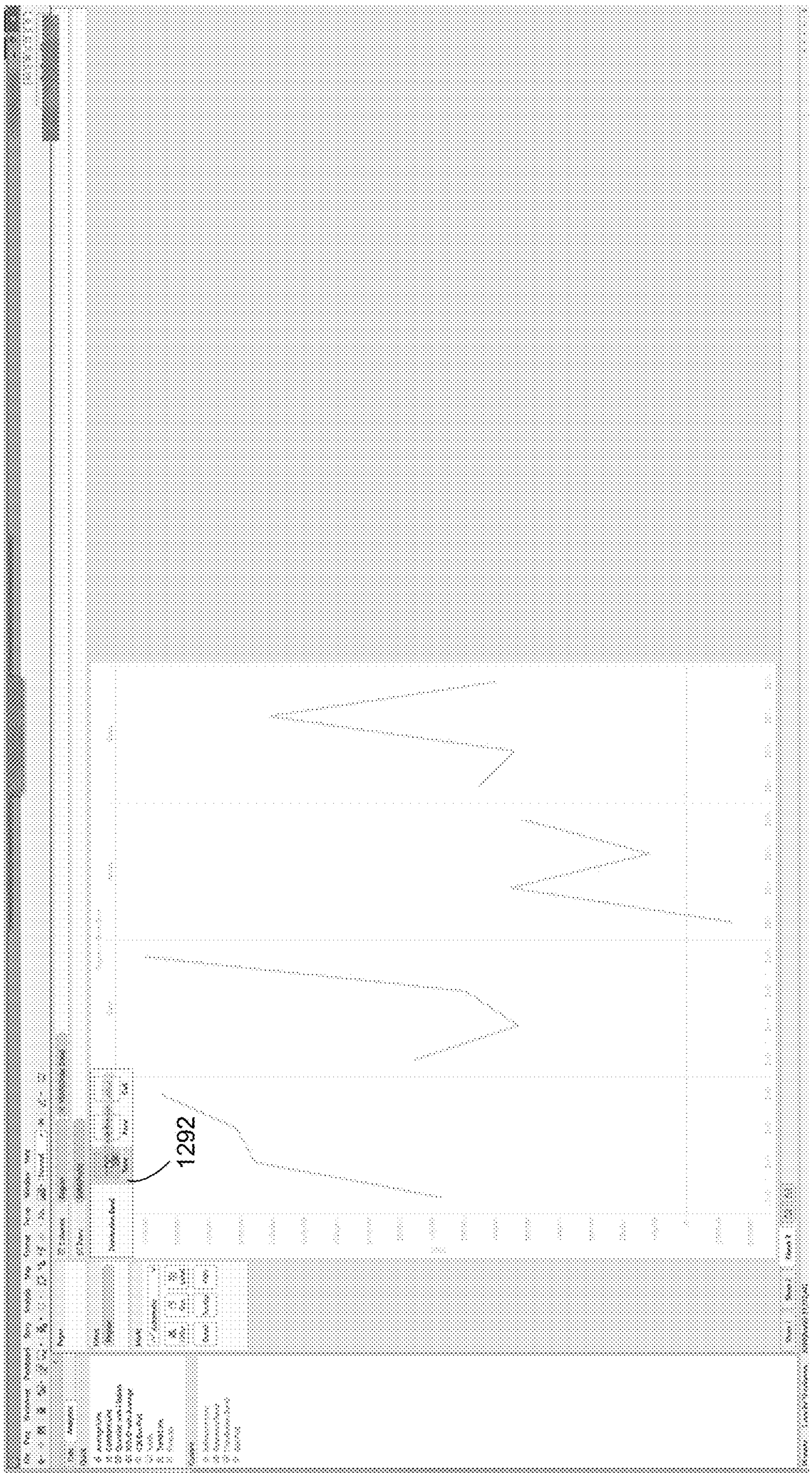
Figure 85:
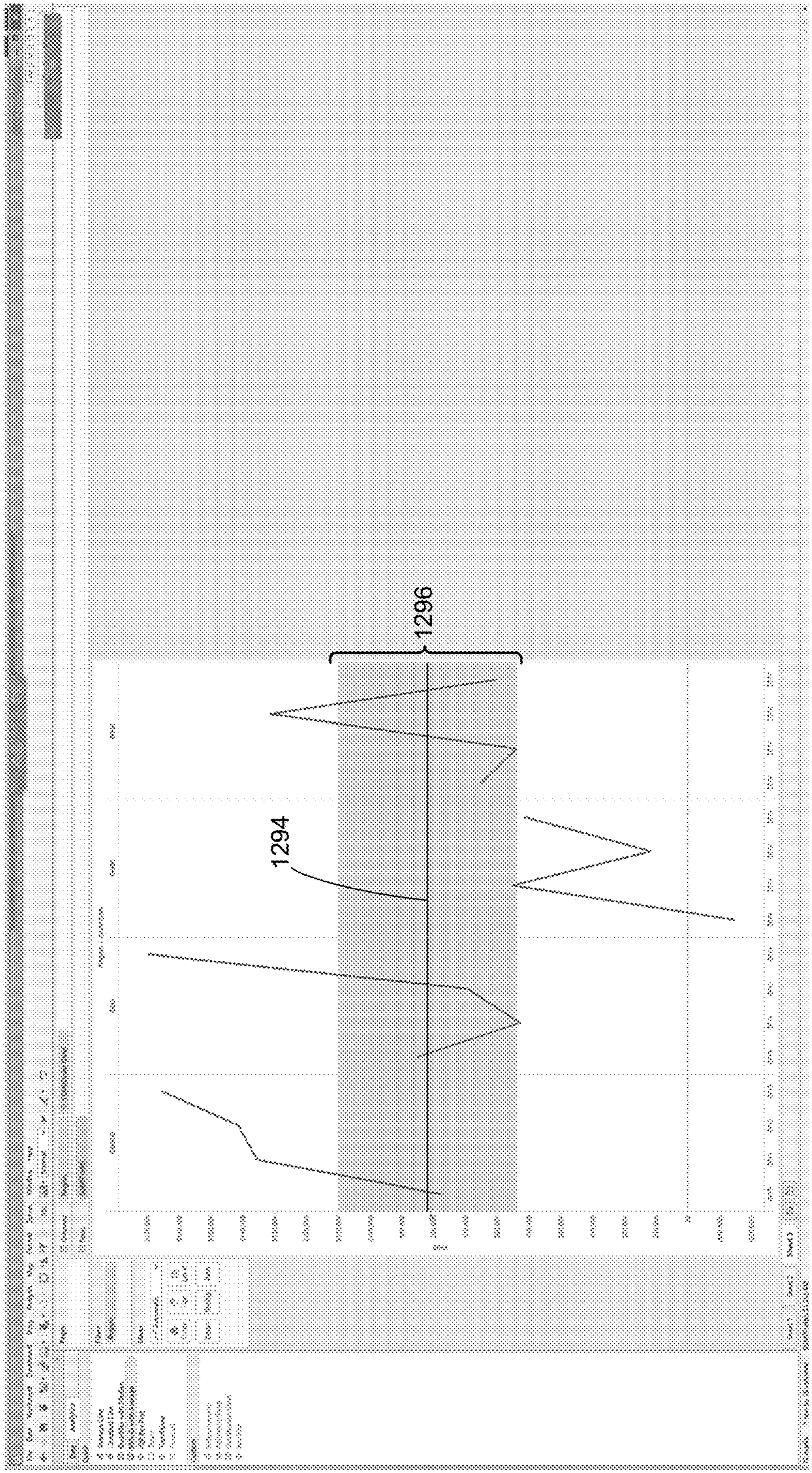

In FIG. 82, the user has selected the analytic icon 1286 for 95% confidence interval with average. In FIGS. 83 and 84, the user drags the analytic icon 1288 to the drop spot 1290, and drops the icon 1288 onto the Table option icon 1292. As illustrated in FIG. 85, this creates and displays a single average line 1294 and 95% confidence interval 1296 for all of the data.

Figure 86:
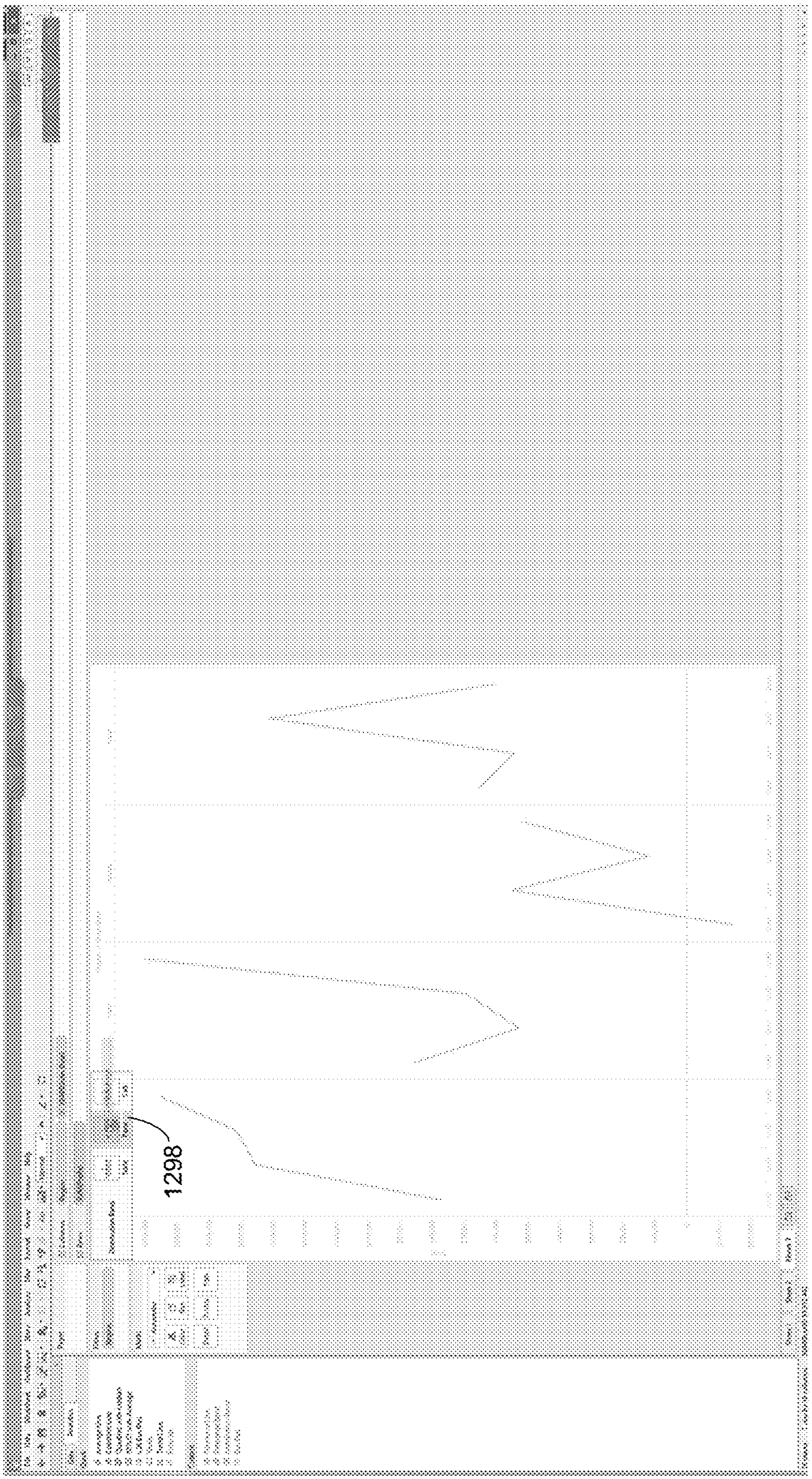
Figure 87:
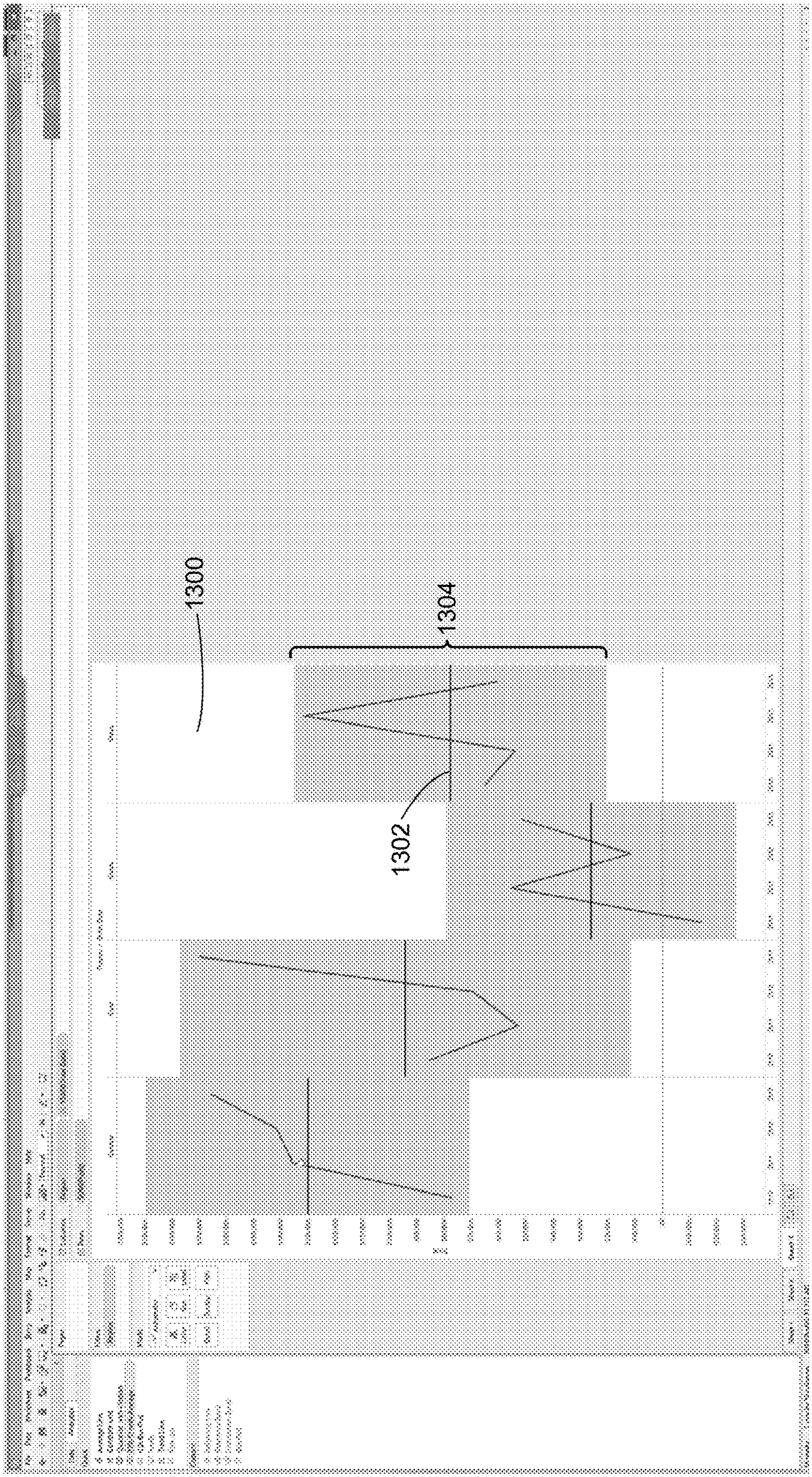

In FIG. 86, the user has selected the trend line analytic icon again, and drags it to the Pane option icon 1298. As illustrated in FIG. 87, this creates and displays a separate average line and a separate confidence interval for each of the panes, including the fourth average line 1302 and the fourth confidence interval 1304 for the fourth pane 1300.

Figure 88:
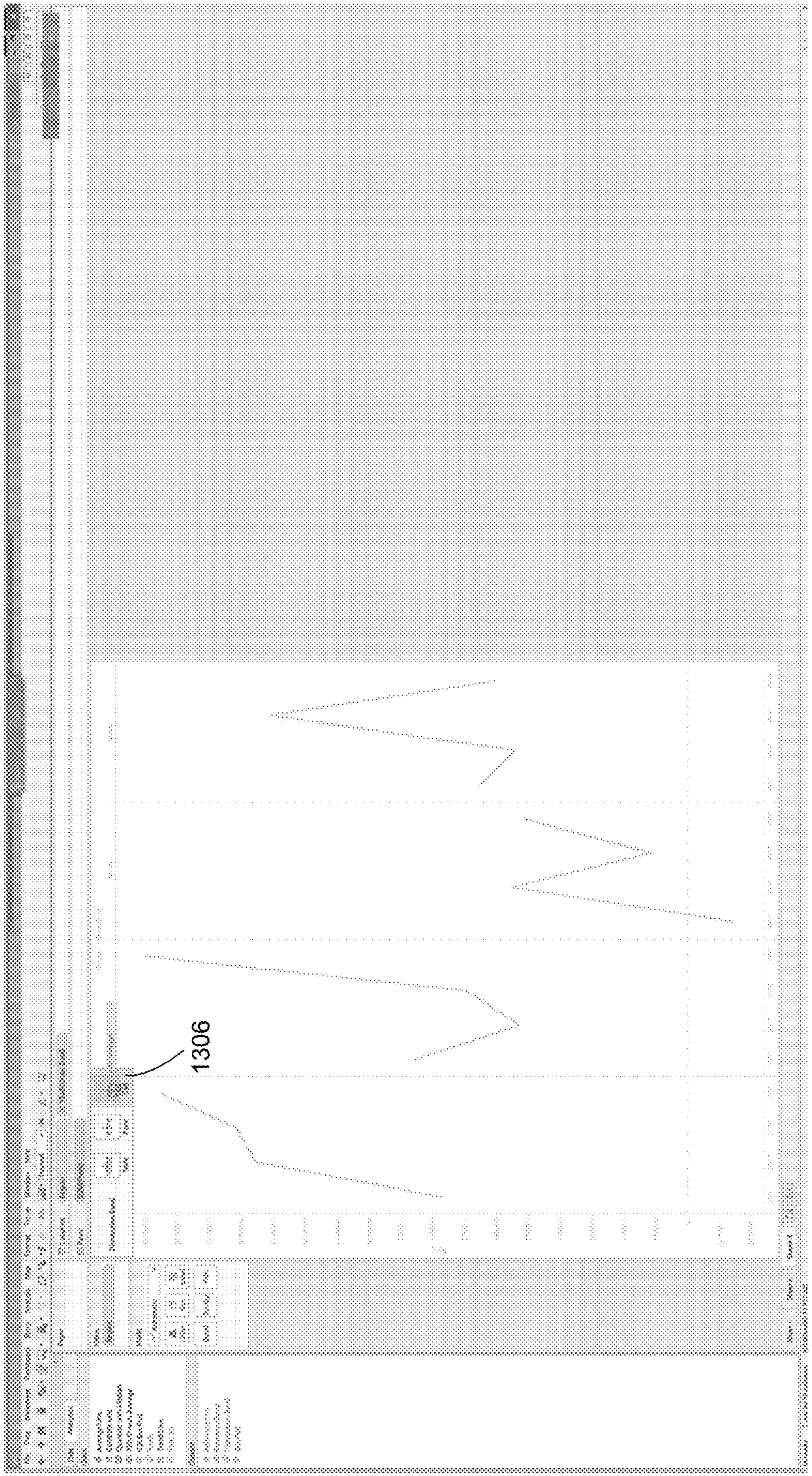

In FIG. 88, the user has selected the analytic icon for 95% confidence interval with average again, and is dropping it onto the Cell option icon 1306. This creates and displays a separate average line and a separate confidence interval for each mark. Because each mark is a single point, the "average" for a single point is the value at that point. The averages are thus displayed as short line segments, such as the last two segments 1310 and 1308. Applying a 95% confidence interval to a single point is not particularly meaningful.

Figure 90:
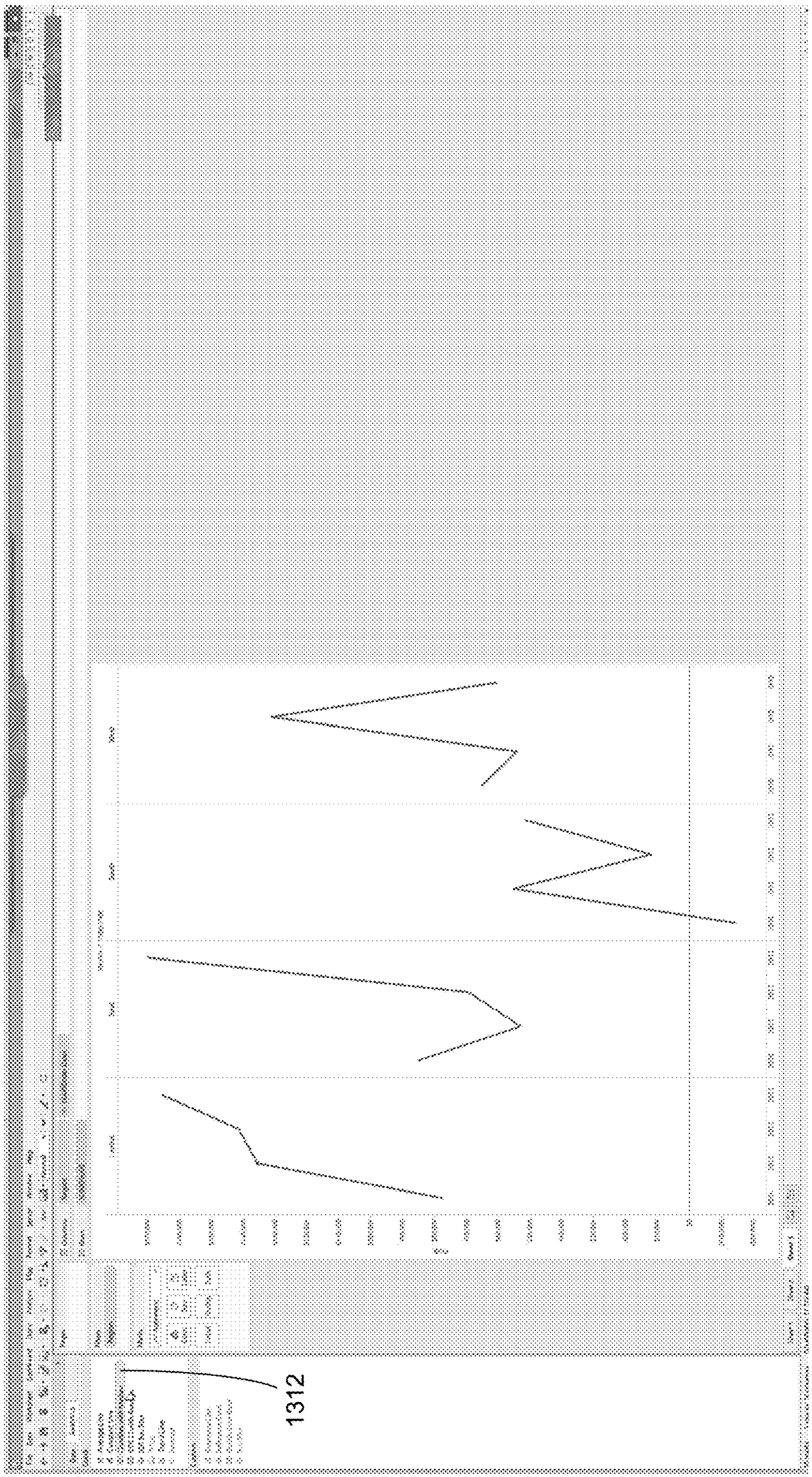
Figure 91:
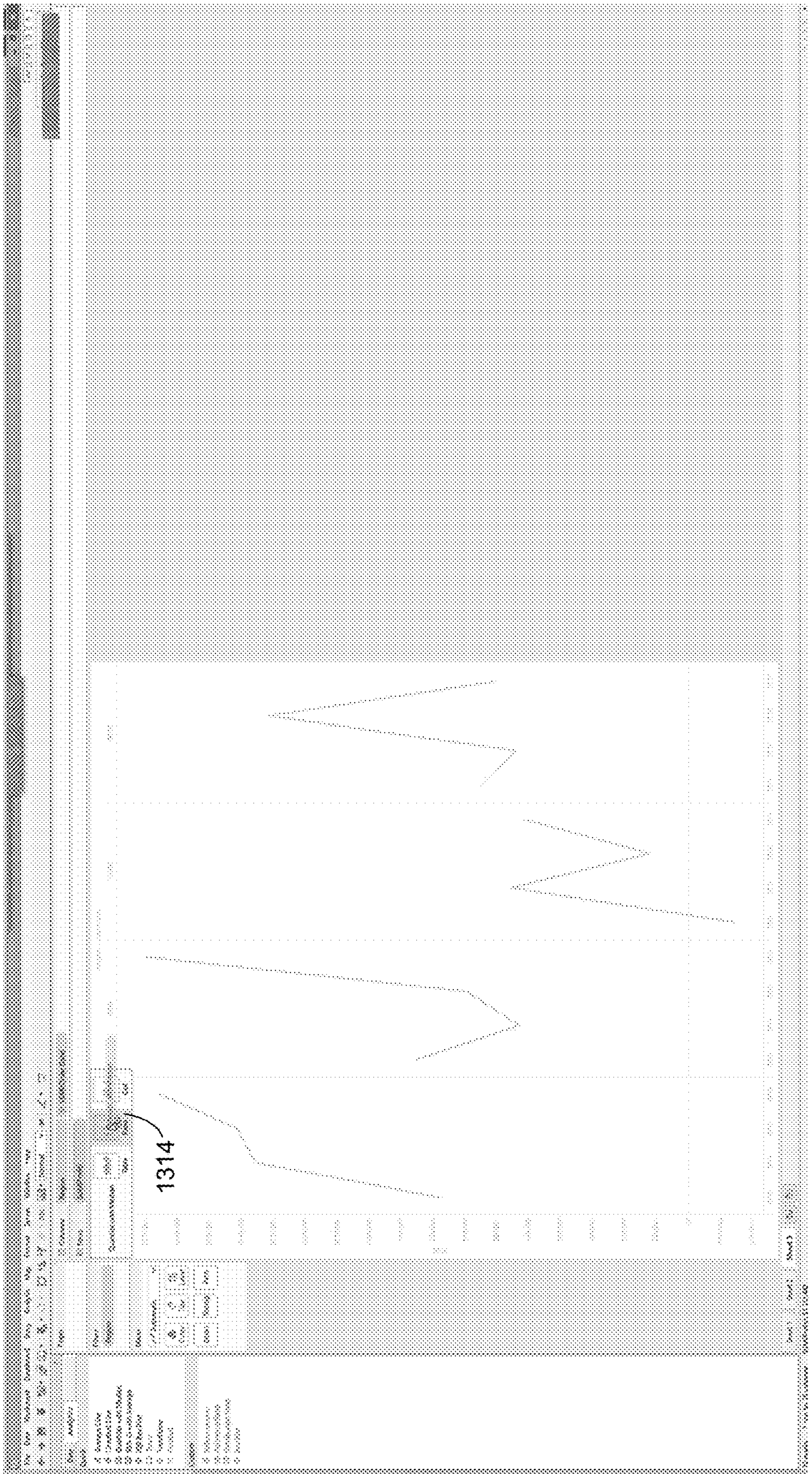
Figure 92:
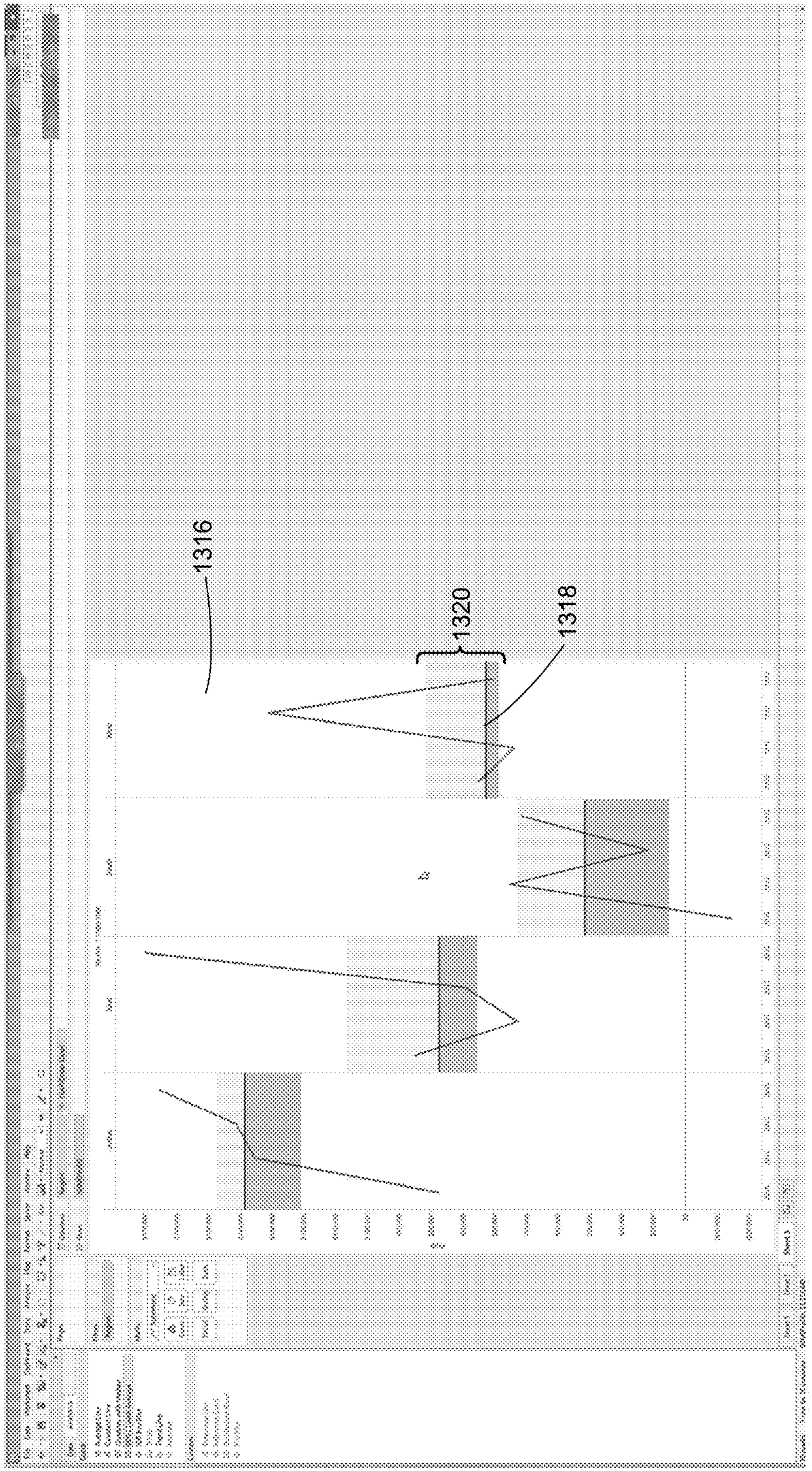

In FIGS. 90 and 91, the user has selected the analytic icon 1312 for quartiles with median, and drops the analytic icon 1312 onto the Pane option icon 1314. The data visualization application thus creates and displays a separate median and separate quartile bands for each pane, including the fourth median 1318 and the fourth quartile bands 1320 in the fourth pane 1316.

Figure 93:
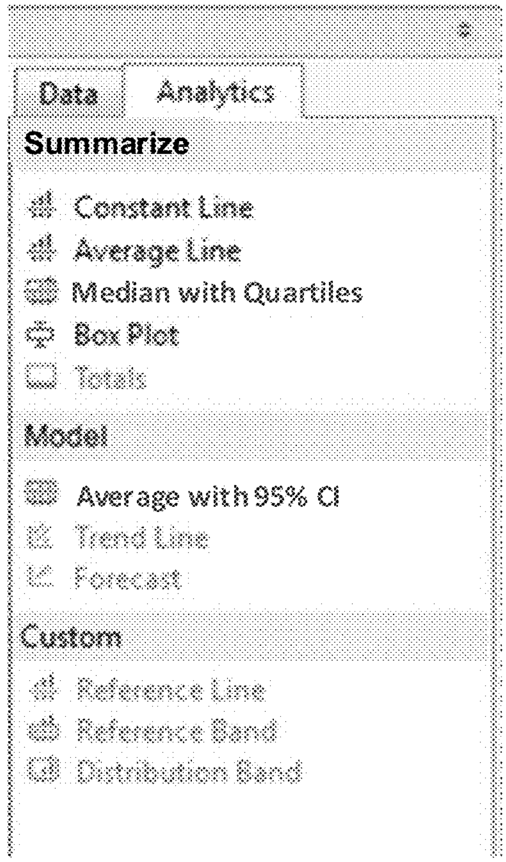

FIG. 93 illustrates the analytic operators that are available in some implementations. In some implementations, the analytic operators are grouped as illustrated here. In some implementations, some of the analytic operators combine basic analytic functions that are commonly used together (e.g., median plus quartiles, average plus 95% confidence interval).

Figure 94:
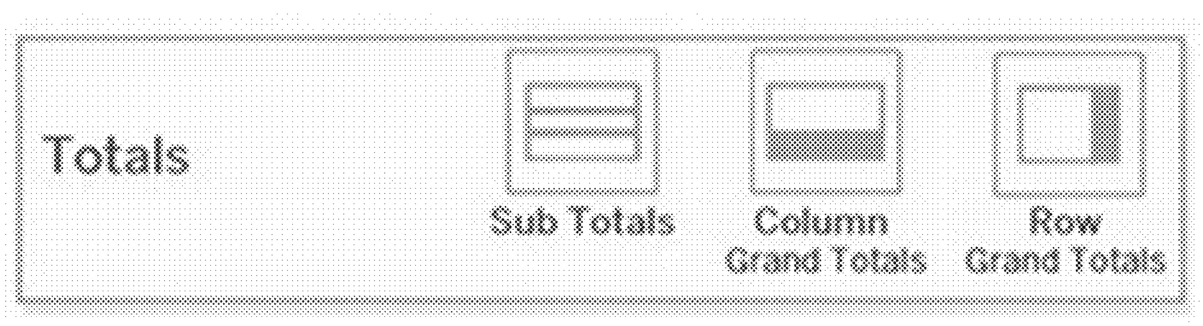

FIG. 94 illustrates the option selection icons that are available in some implementations in the drop area when a user selects the totals analytic icon.

FIGS. 95-117 further illustrate how some implementations treat displayed marks and analytic objects as interactive elements that can be dragged to various parts of the user interface to build new objects, edit calculations, modify display parameters and encodings, and many other ways. A visual object in a data visualization is not just to look at—it is a functional element of the user interface. These figures are based on a data set for carbon dioxide emissions, which was also used above in FIGS. 3-21.

Figure 95:
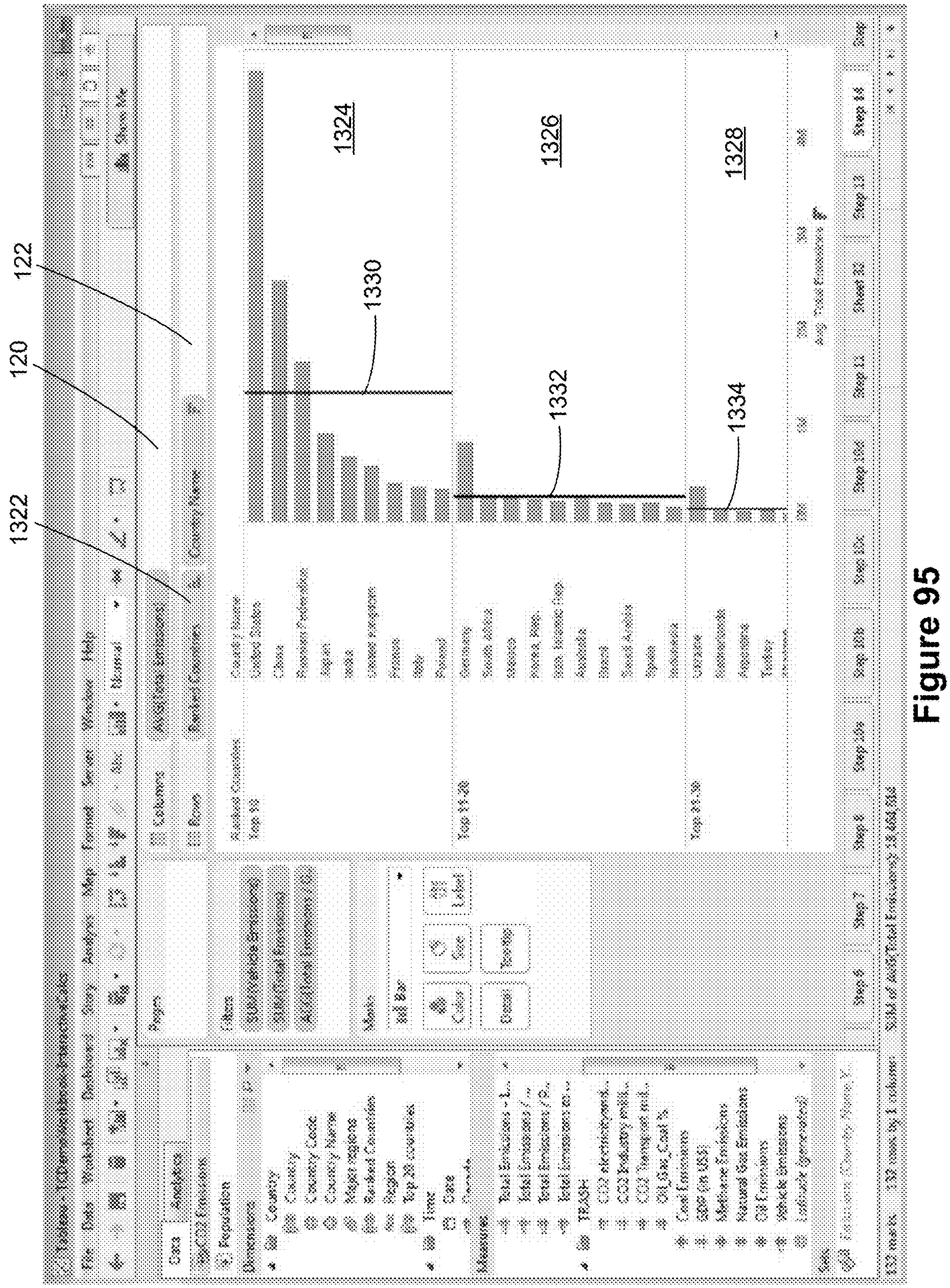

FIG. 95 shows average total carbon dioxide emissions for each country, and the countries are grouped into three categories. This layout has been selected by placing the data element AVG(Total Emissions) on the columns shelf 120, and placing the Ranked Countries grouping 1322 and Country Name on the rows shelf 122. The grouping has created three panes 1324, 1326, and 1328 vertically. The user has added average reference lines per pane, including the first reference line 1330 for the first pane 1324, the second reference line 1332 for the second pane 1326, and the third reference line 1334 for the third pane 1328.

Figure 96:
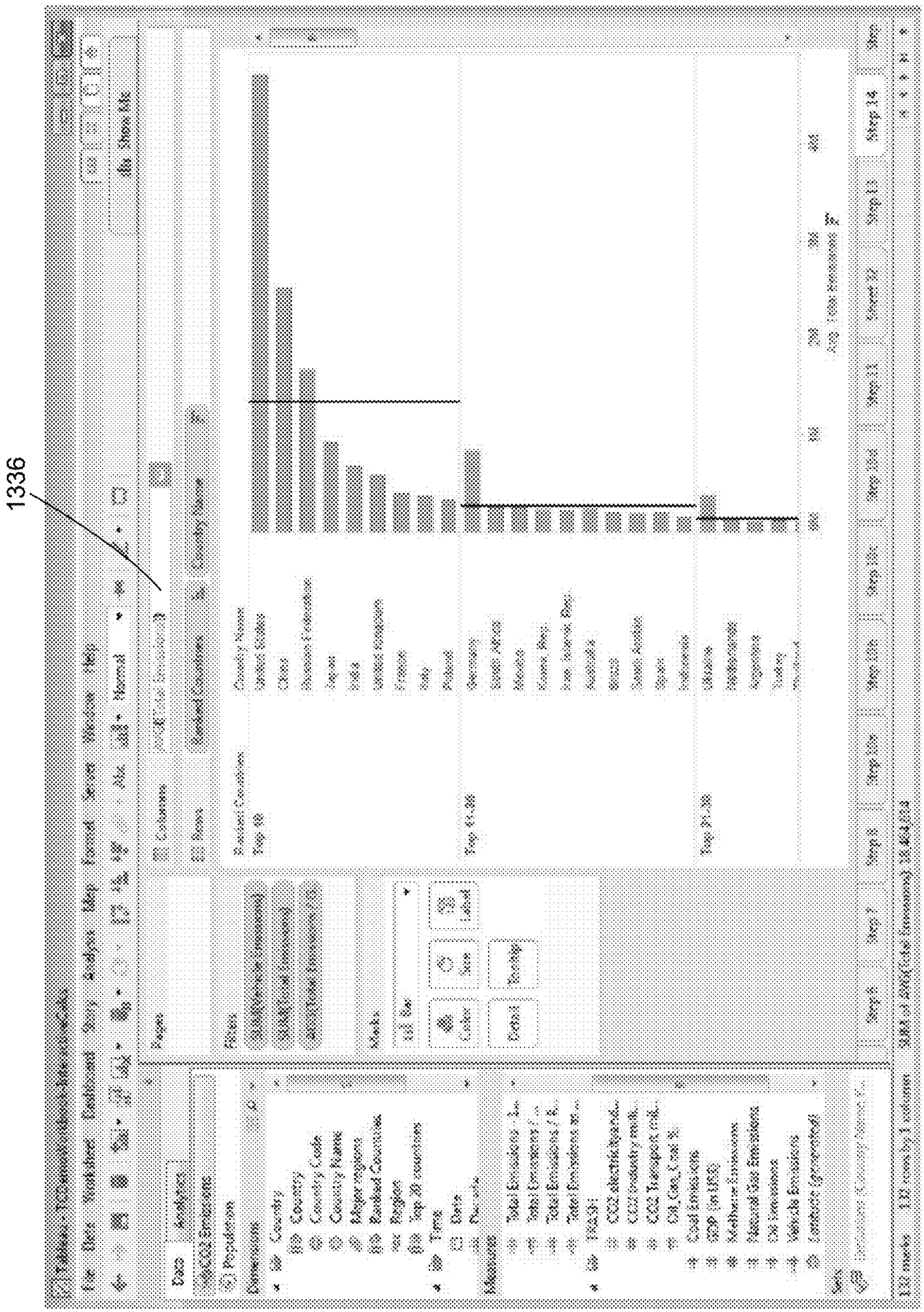

In some implementations, a user can edit data elements to create ad hoc calculations or formulas. In FIG. 96, the user has opened the data element pill 1336 for editing. In some implementations, a user can open the pill 1336 for editing by double clicking on the pill. In other implementations, opening the pill can be accomplished in other ways as well, such as using a context sensitive menu, a drop down menu, or a toolbar icon. On touch screen devices, one or more finger gestures can open the pill 1336 for editing.

The user wants to compute a residual value for each country, which is the difference between the emissions for the country and the average for the ranked countries. In this case, the user is interested in the residuals within each ranked group. The averages are displayed visually in the screen as the average lines, so visually the user wants to subtract the average line from the bars.

Figure 97:
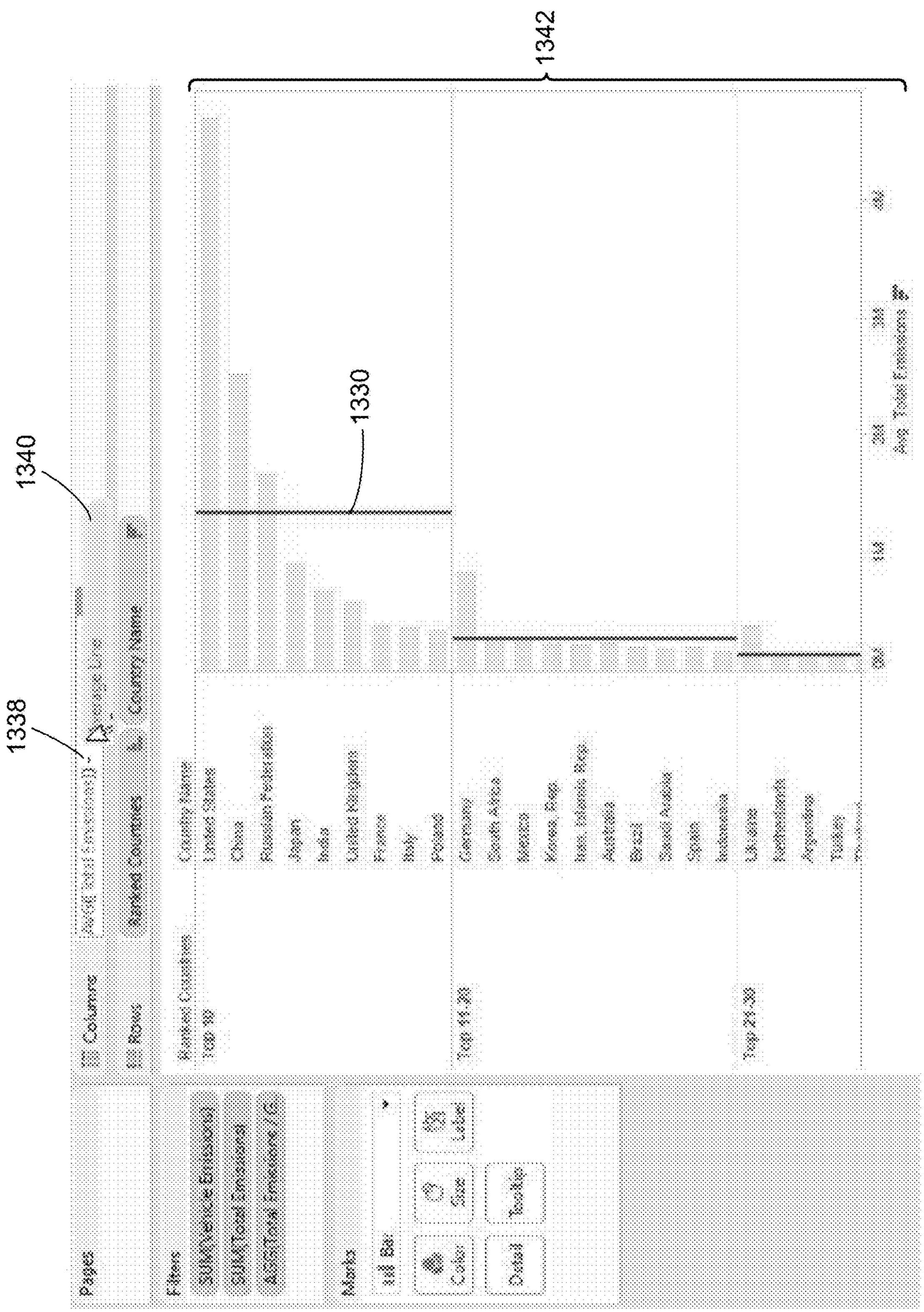

FIG. 97 illustrates how the user can subtract the average line from the bar lengths. As shown in FIG. 97, the user has edited the expression in the pill 1336 by typing in a minus sign 1338. Then the user drags the average line to pill 1336 as well. While dragging, the average line object is displayed as a pill 1340, and the average lines on the visual graphic (e.g., average line 1330) remain displayed.

Figure 98:
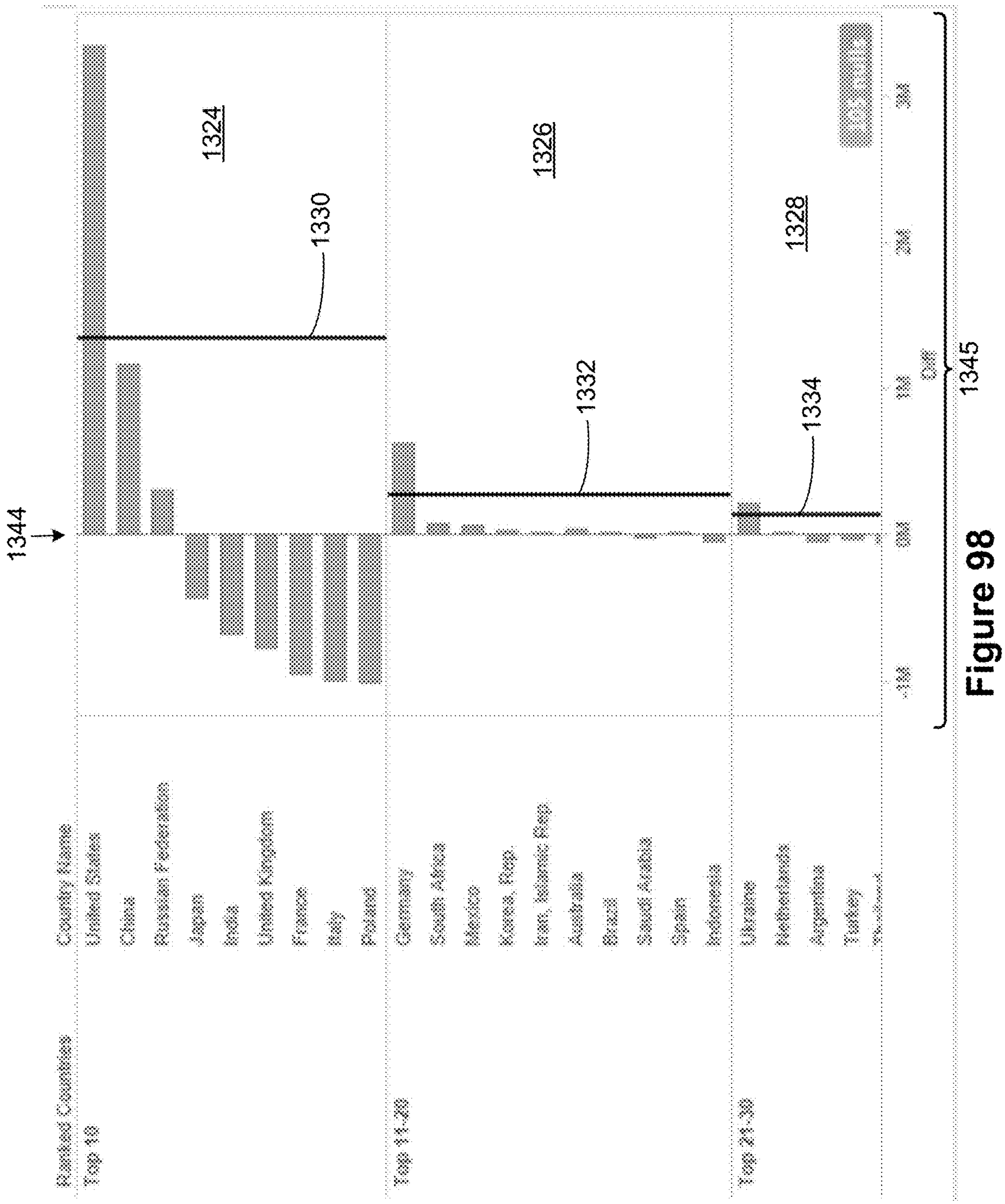

Once the expression in the pill 1336 is saved or applied, the data visualization is regenerated and redisplayed as illustrated in FIG. 98. The average lines are still displayed as before, but the bars extend to the right or left of the origin line 1344 depending on whether the country's emissions are above or below the average. Note that the lower axis and label 1345 have been modified to shift the axis and provide an accurate label. In this implementation, the average lines are displayed at locations according to their values, but in some implementations the average lines are shifted to the origin line 1344 to illustrate visually that the bars are displaying the amount above or below the average lines.

Figure 99:
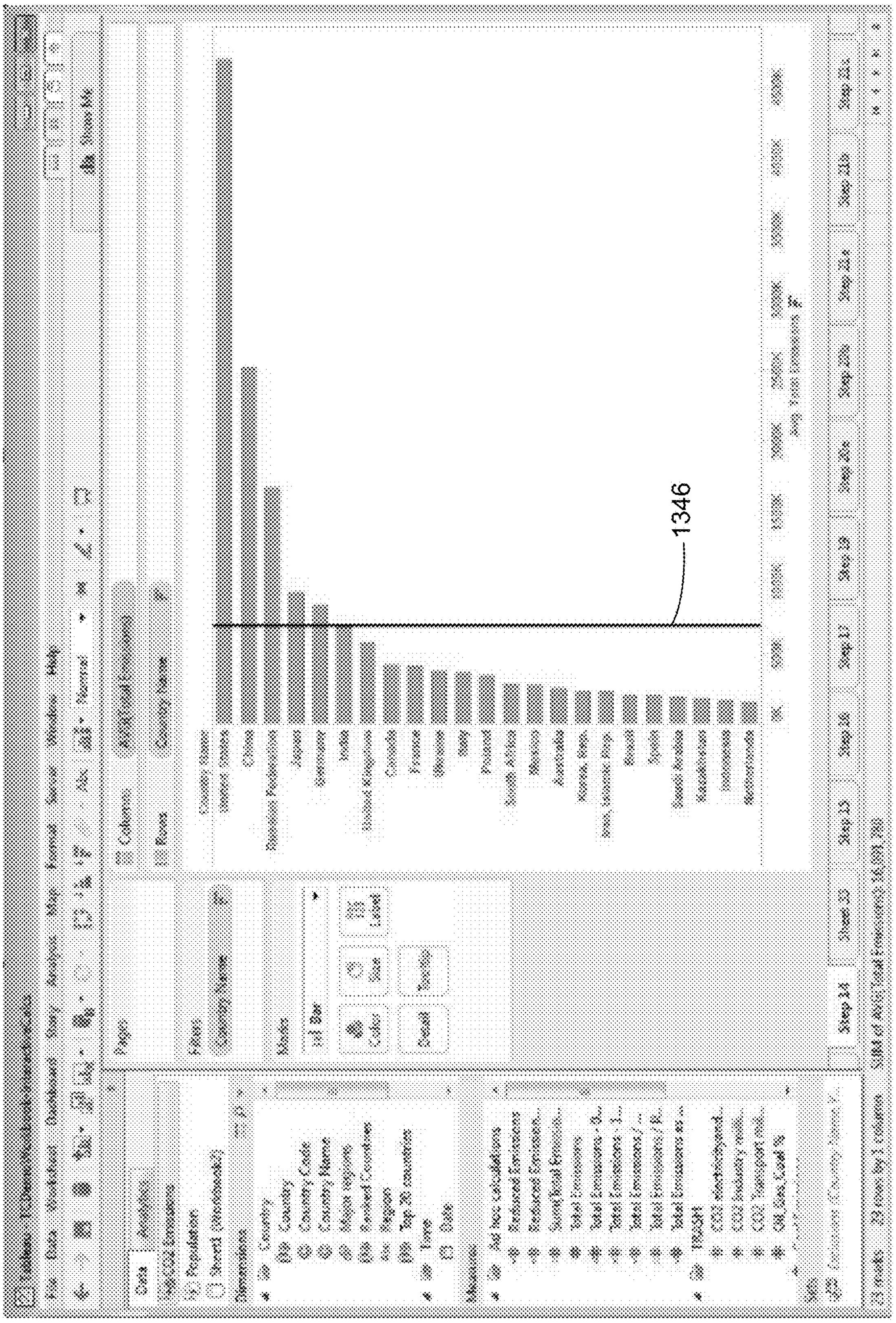
Figure 100:
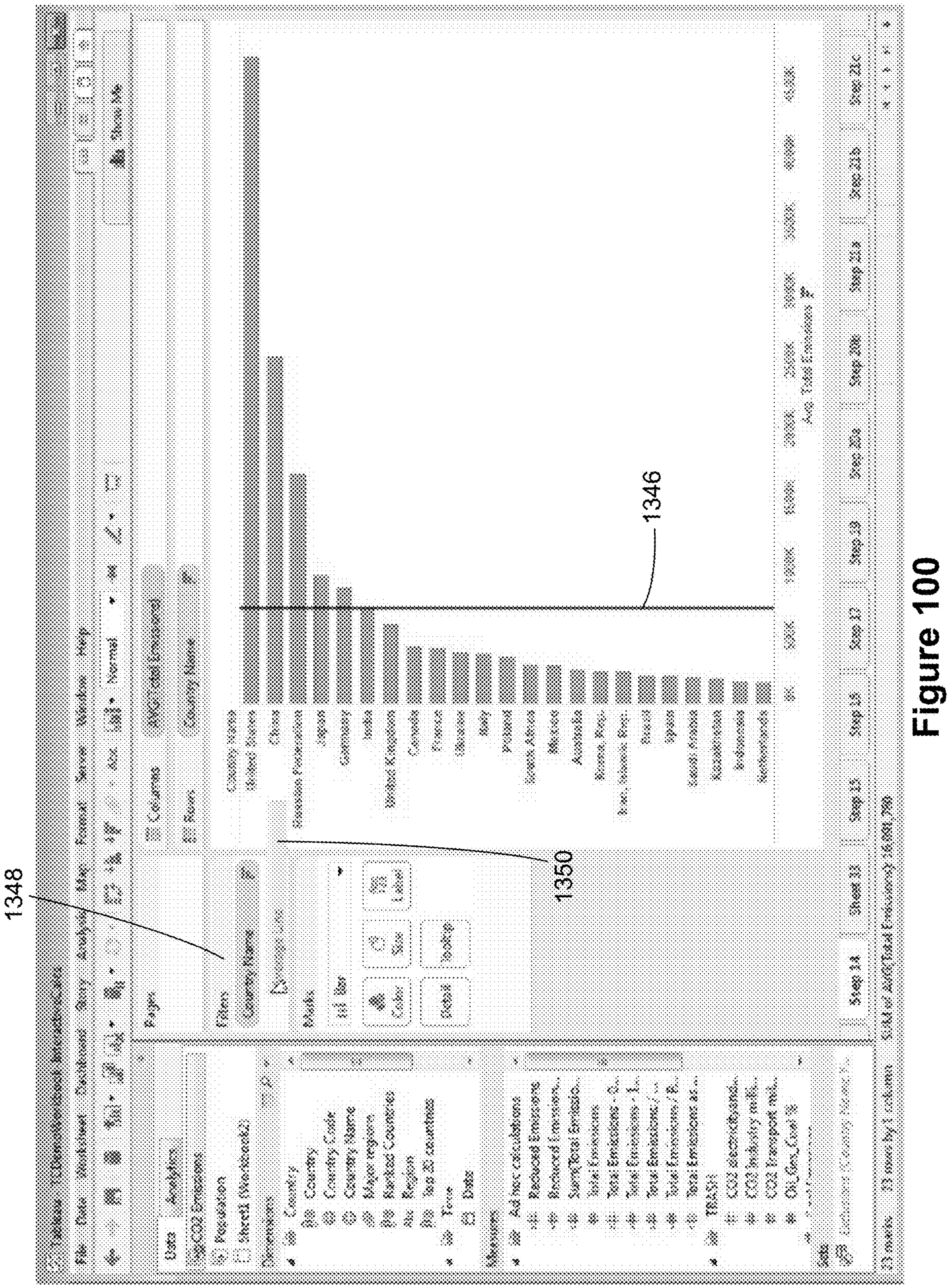
Figure 101:
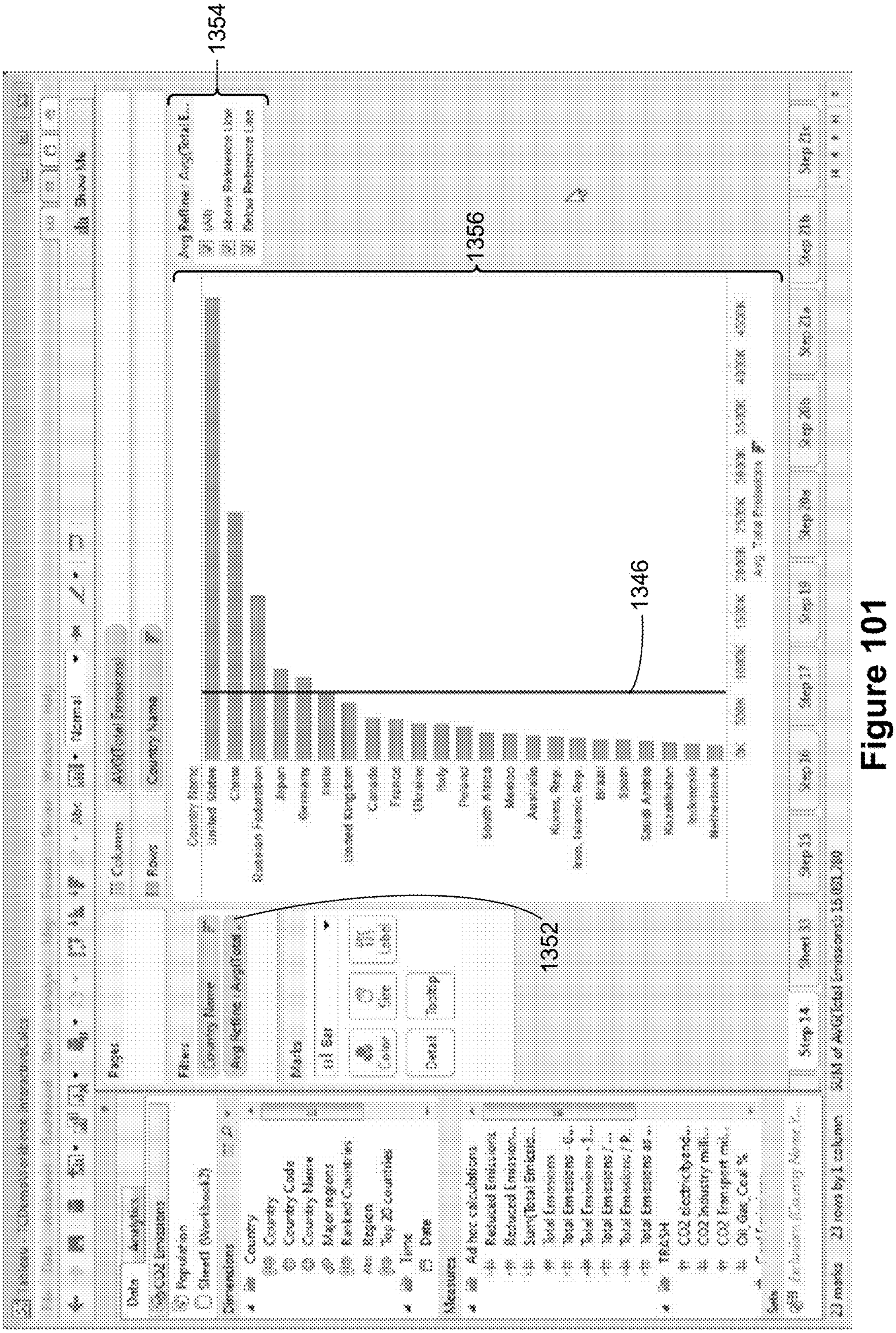

FIG. 99 is a simple bar chart with a single pane, and the user has created an average line 1346. In FIG. 100, the user drags the average line 1346 toward the filter shelf 1348. When dragged, the average line is displayed as a pill 1350, and the visual average line 1346 remains displayed. Once the average line pill 1350 is dropped on the filter shelf, it creates a filter 1352. The details of the filter 1352 are displayed as a filter selection box 1354. The filter can be used to select which countries are displayed, either all countries (the default selection), just the countries whose emissions are above the reference average, or just the countries below the reference average. When initially created, the default is to include all of the countries, as illustrated by the visual graphic 1356.

Figure 102:
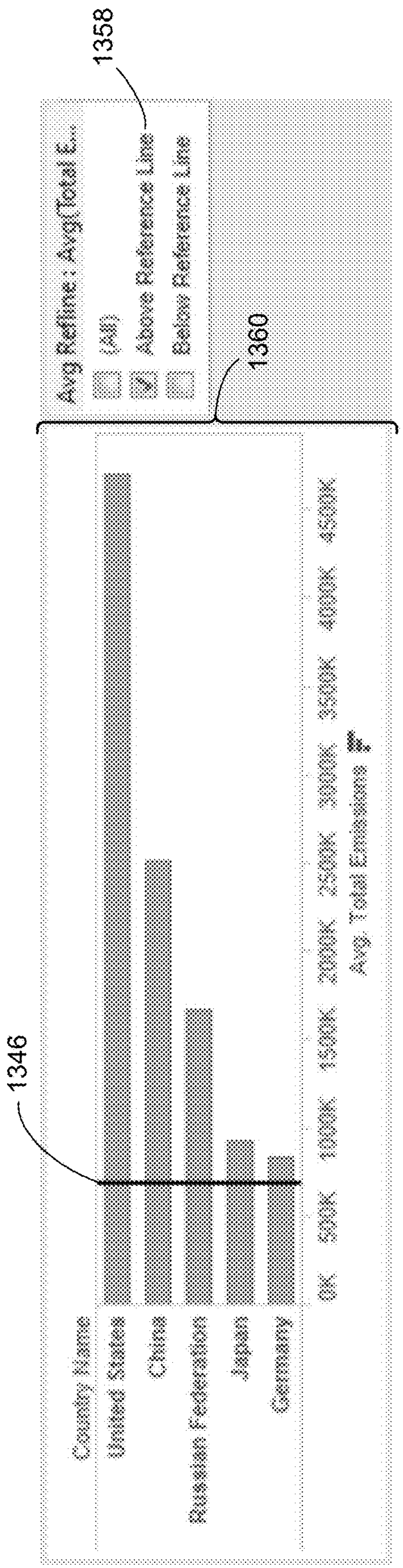

In FIG. 102, the user has used the filter selection box 1354 to select the "Above Reference Line" option 1358, and the visual graphic 1360 is updated to display just the countries whose emissions are above the average. The reference line 1346 remains displayed, but there are only five countries that are displayed.

Figure 103:
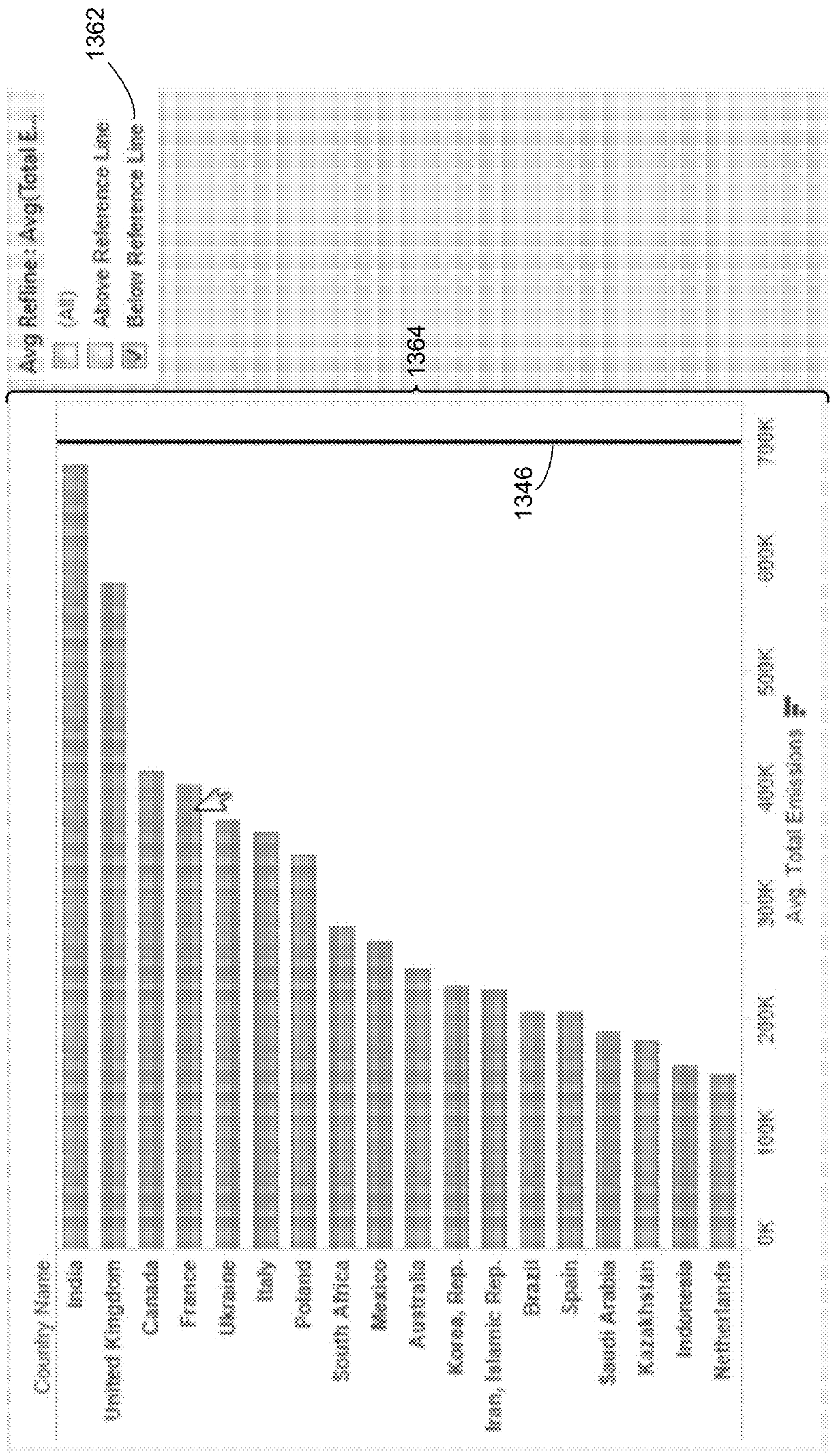

In FIG. 103, the user has used the filter selection box 1354 to select the "Below Reference Line" option 1362, and the visual graphic 1364 is updated to display just the countries whose emissions are below the average. The average line 1346 is displayed. In some implementations, the visual graphic 1364 expands to use the visual space and provide finer detail (e.g., the bar for India in FIG. 103 extends much further to the right than the corresponding bar for India in FIG. 101).

In some implementations, various visual encodings can be specified on the Marks shelf 1367. Visual encodings can define what colors are used for the marks, the size of the marks, labels for the marks, or what data is included in tooltips for the marks. Analytic objects, such as average lines, can be dragged to the marks shelf to create various useful encodings.

Figure 104:
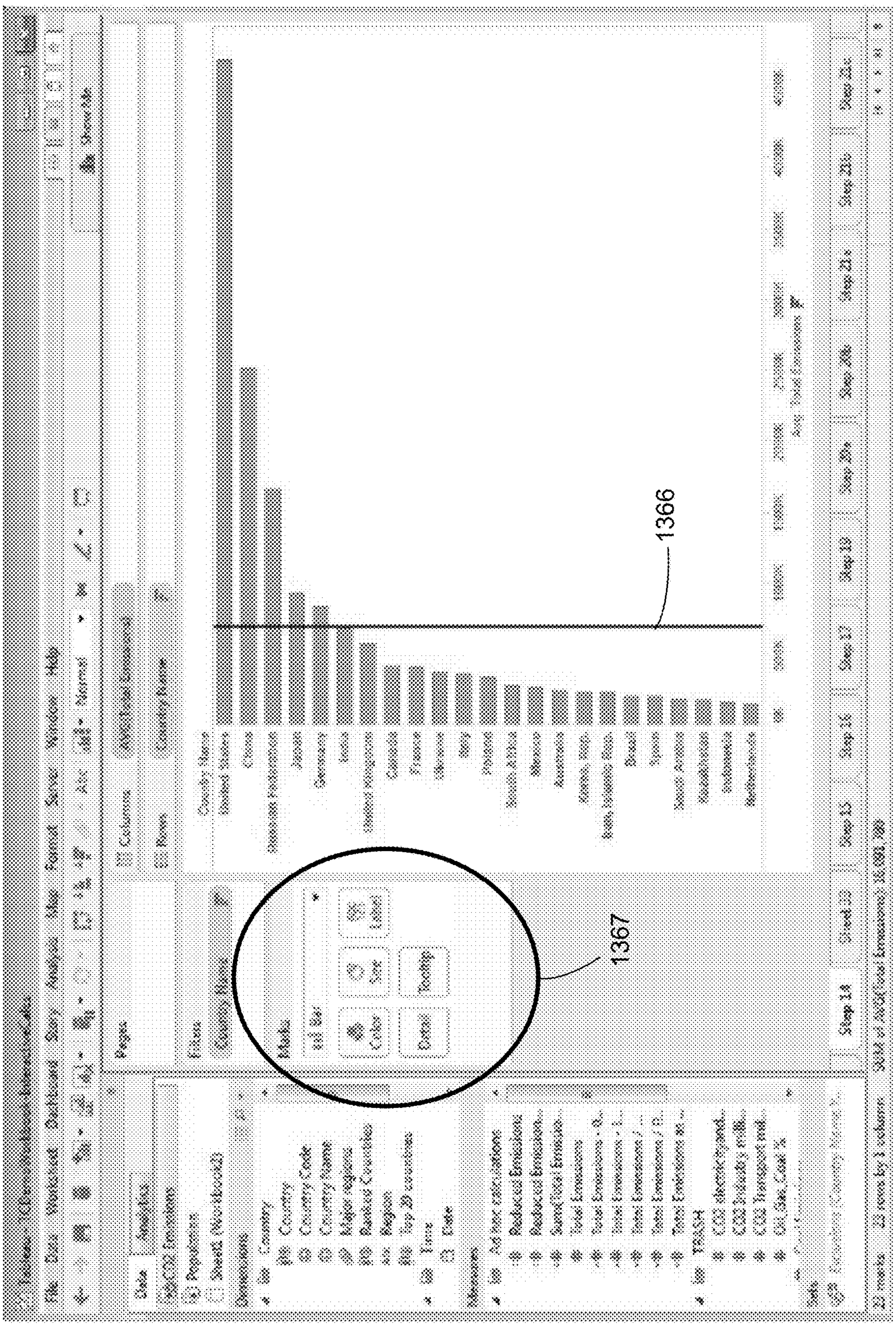
Figure 105:
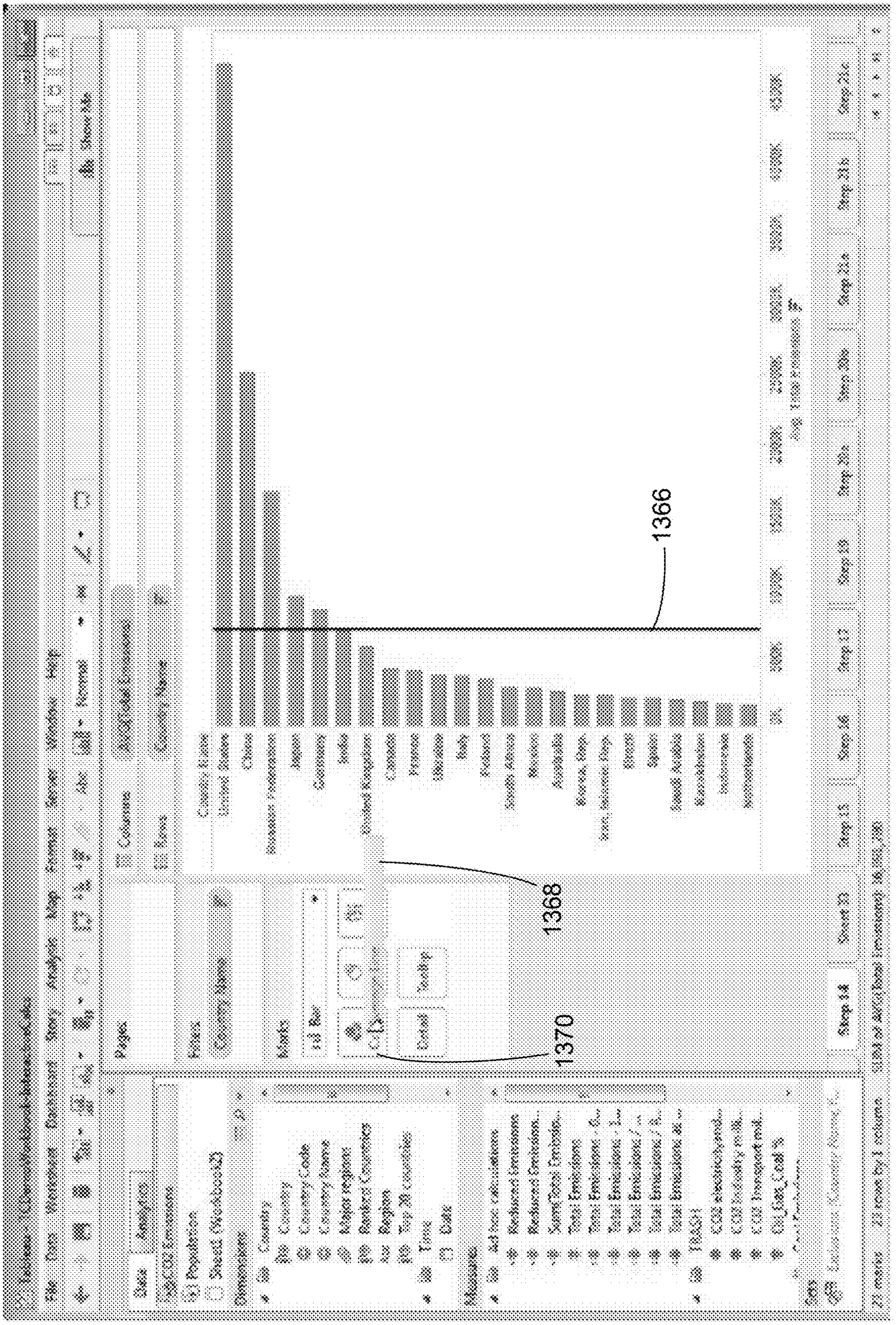

In FIG. 104, the user has added an average line 1366 to a bar chart that represents the total carbon dioxide emissions for each country. In FIG. 105, the user drags the average line to the color encoding shelf (or icon) 1370. While dragged, the average line is displayed as a pill 1368.

Figure 106:
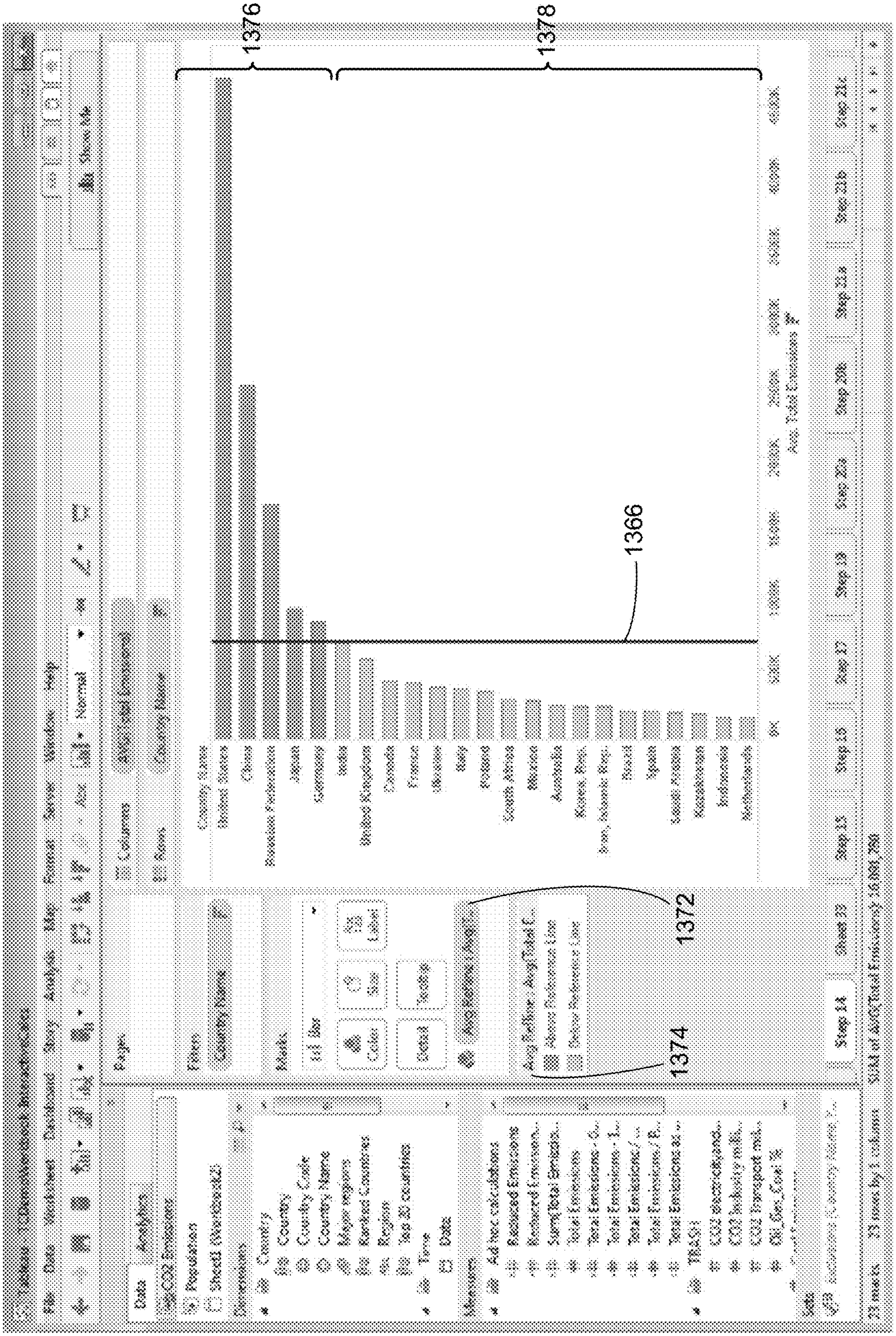

In FIG. 106, the average line is now used for color encoding. In this example, countries whose emissions are above the average are displayed in one color, as shown by the upper five bars 1376, and the countries whose emissions are below the average are displayed in a second color, as illustrated by the lower bars 1378. The Marks shelf 1367 now includes a color encoding designator 1372 and a color encoding legend 1374. In some implementations, the color encoding legend 1374 is editable, so the user can specify what colors to use.

As illustrated above, analytic objects that are displayed in a data visualization may be dragged to various locations in the interface, and used to build formulas, create or modify encodings, and so on. Like analytic objects, visual marks can be dragged to various locations in the user interface. Rather than viewing visual marks as a just an output of a data visualization process, implementations enable a user to use visual marks as part of an interactive process to modify or refine what is displayed. FIGS. 107-115 illustrate some ways that implementations allow a user to use the visual marks.

Figure 107:
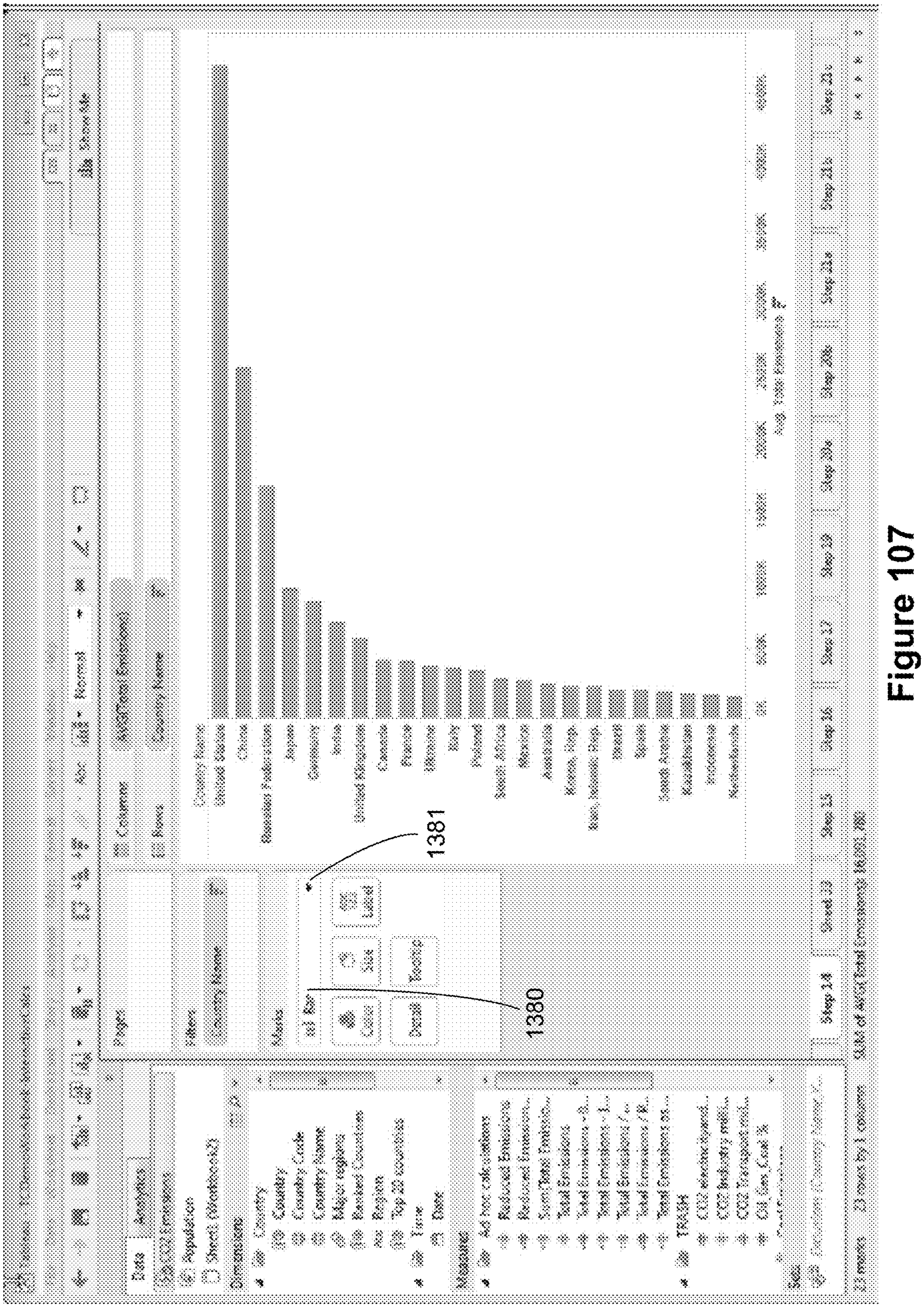
Figure 108:
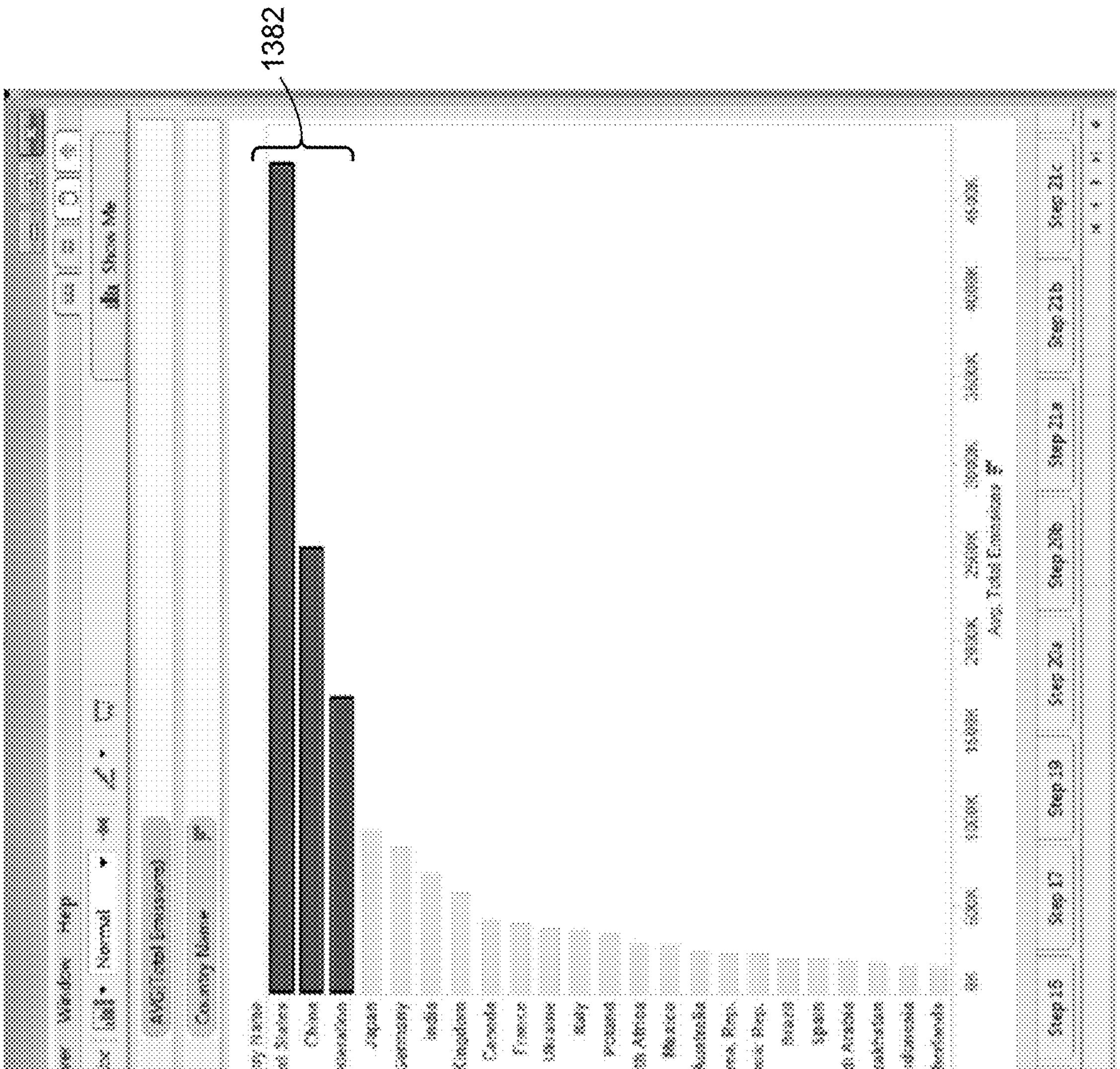

In FIG. 107, the user has created a bar graph, as indicated by the bar selection 1380 in the mark selector control 1381. In FIG. 108, the user selects three of the marks 1382, which are highlighted to indicate the selection. In some implementations, the unselected marks are shown dimmed.

Figure 109A:
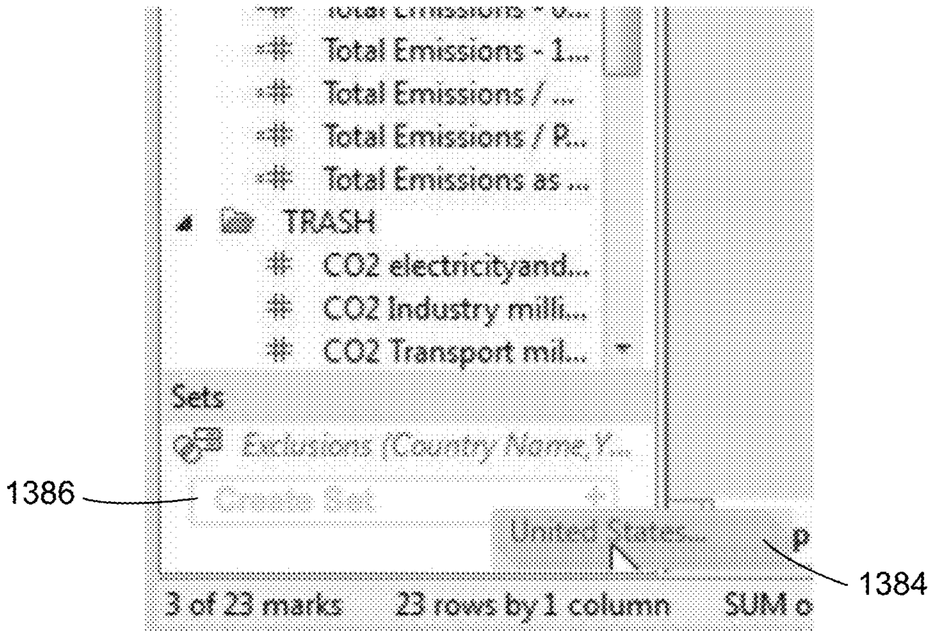
Figure 109B:
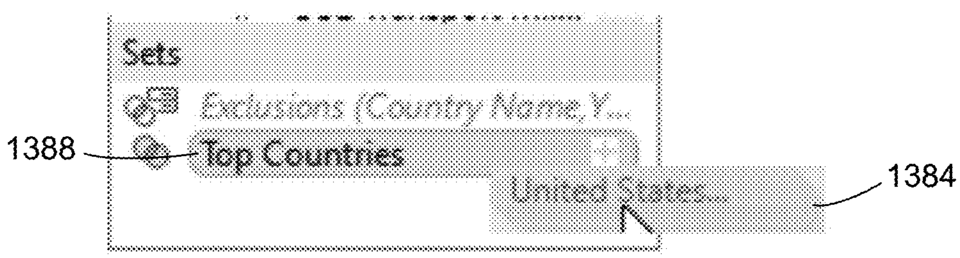

In FIGS. 109A and 109B, the user drags the selected marks to create or update a defined set. Some implementations allow a user to interact with a set like any other dimension field, essentially creating a new field. When the marks are dragged, they are displayed as a pill 1384. In some implementations, the pill 1384 includes a label that indicates one or more of the marks that are selected. In FIG. 109A, the user drags the pill 1384 to the "Create Set" selection box 1386, thereby creating a new set. The user will then be prompted to name the set. In FIG. 109B, the user drags the pill 1384 to an existing set 1388 named "Top Countries," thereby adding the elements to the set.

Figure 110:
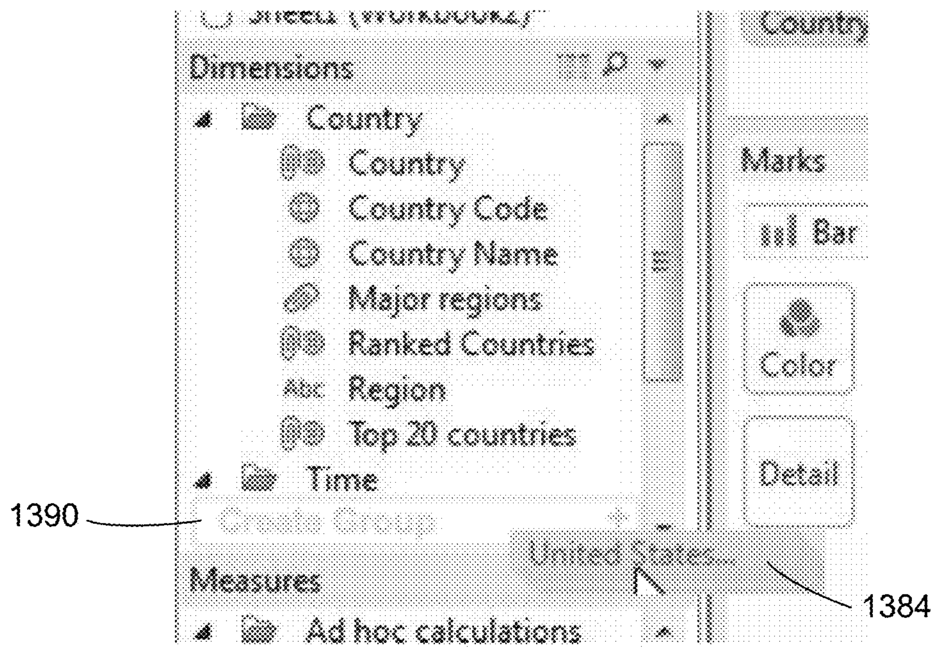

FIG. 110 illustrates that the selected marks can be used to construct a group, which can be used when multiple values should be grouped together for reporting. In this case, dragging the pill 1384 (representing the United States, China, and the Russian Federation) to the Create Group box 1390 creates a new group that contains these three countries. When this group is used later, these three countries will be consolidated into a single record. Groups are commonly used when a data set has inconsistent naming within a dimension. For example, consider a data set that includes addresses for people, and the state names include "California," "Calif," and "CA." When creating a data visualization that summarizes data for each state, the data shows these as three different states. The user can select the marks for these three, and drag them to the Create Group box, thereby creating a single state that includes all these variations. Subsequent visualizations thus show a single state.

Figure 111:
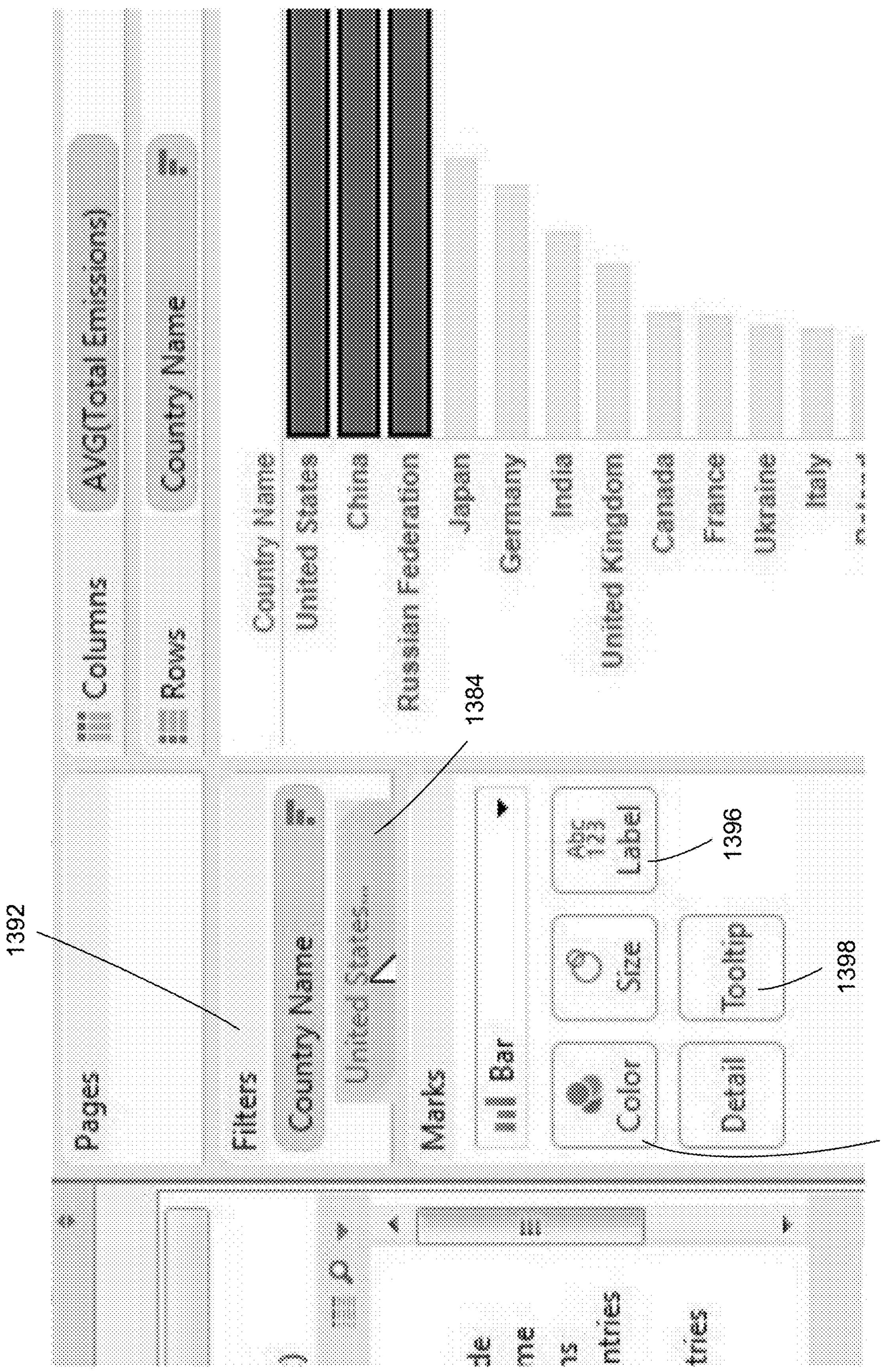

FIG. 111 illustrates that the selected marks (as illustrated by the pill 1384) can be dragged to the filters shelf 1392. In some implementations, when a collection of marks is dragged to the filters shelf, an include/exclude filter is created, which is similar to the filter selection box 1354 shown in FIG. 101. From an analogous filter selection box, the user can select to include all countries, only countries that are in the collection of marks (i.e., the United States, China, and the Russian Federation), or only countries that are not in the collection of marks (i.e., all countries except the United States, China, or the Russian Federation).

Figure 112:
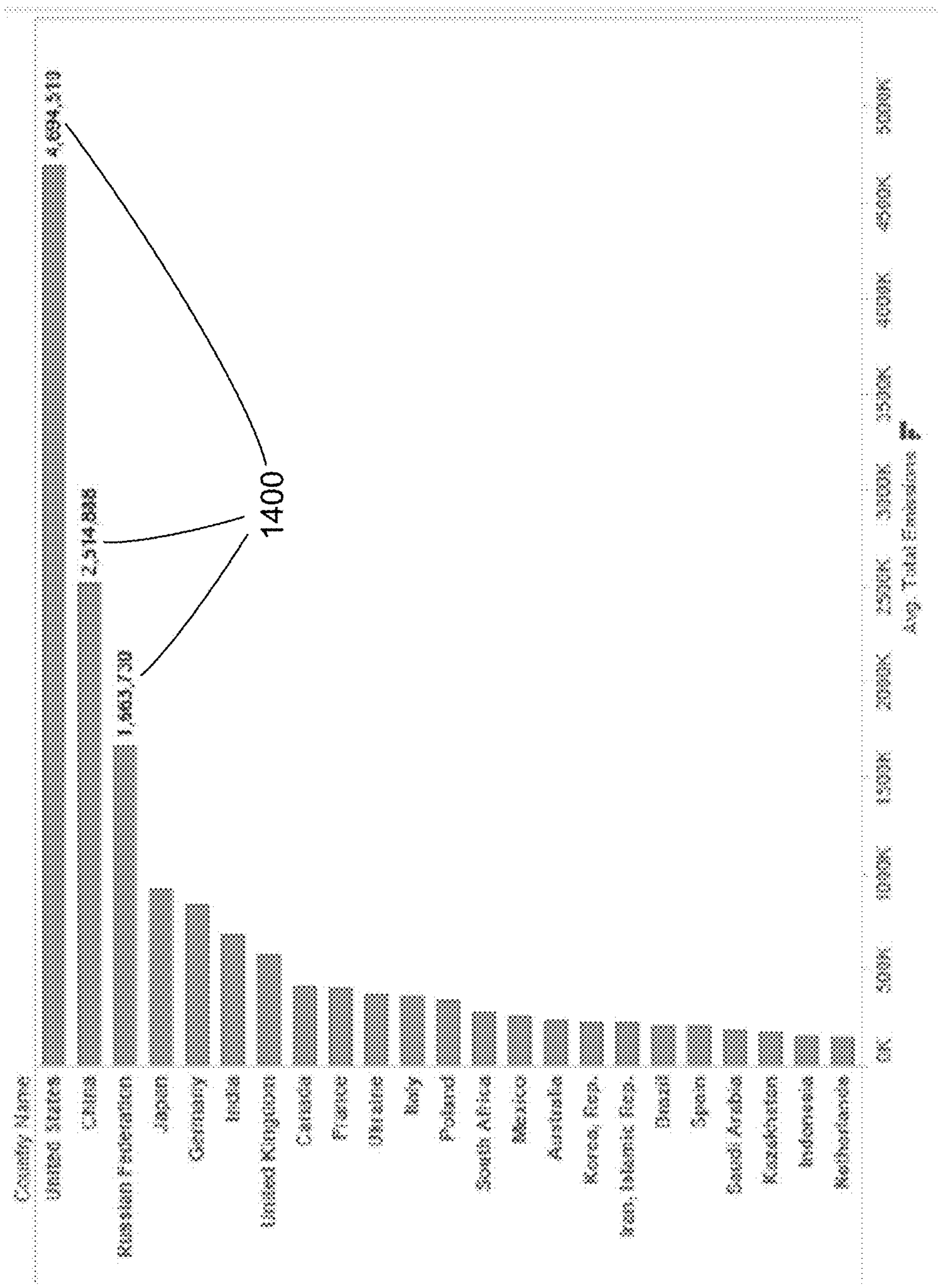
Figure 113:
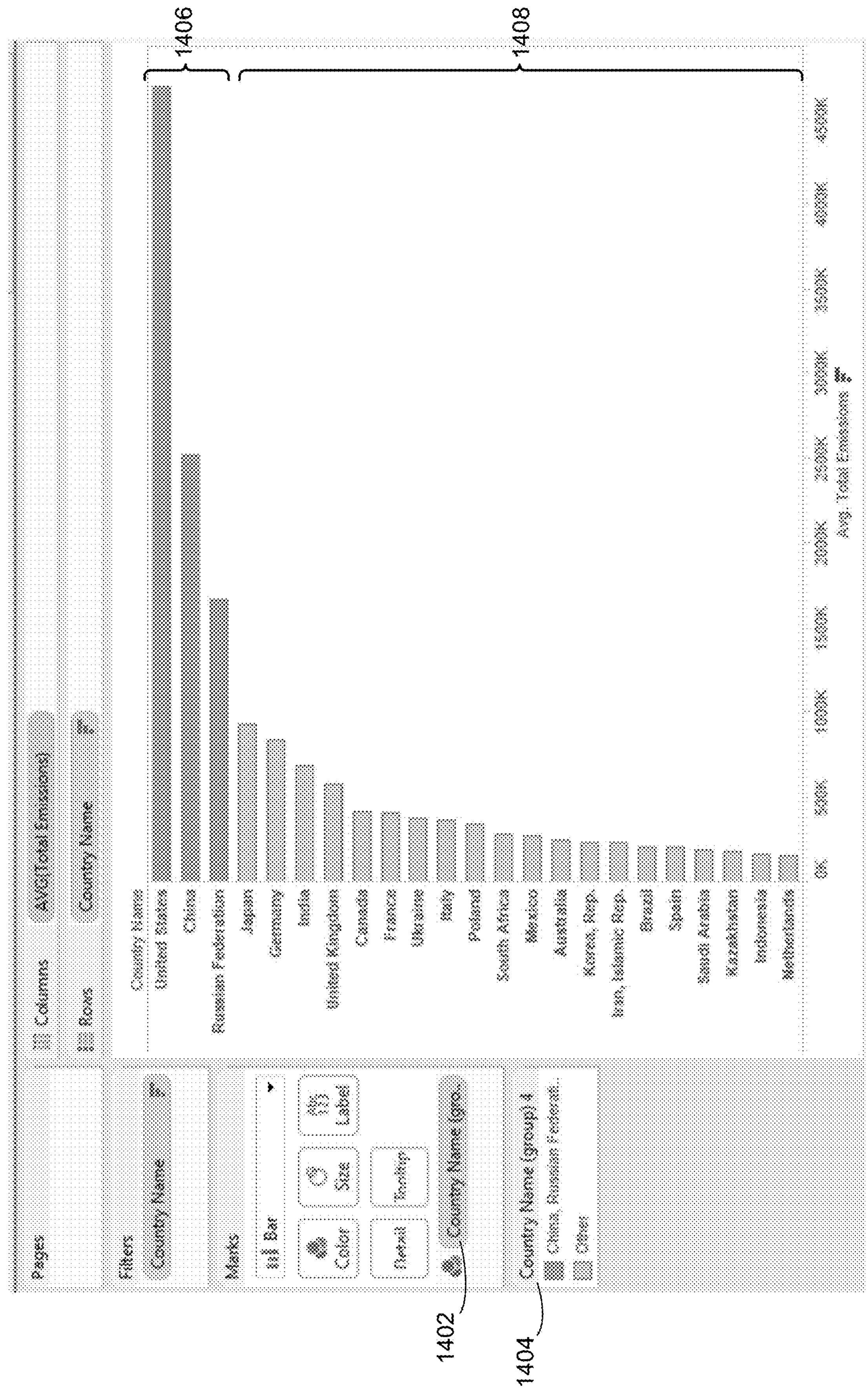

The marks shelf includes icons or sub-shelves for color 1394, labels 1396, and tooltips 1398. As illustrated in FIG. 112, if the pill 1384 for the three countries is dropped onto the label icon 1396, labels 1400 are displayed for just the three identified countries. If the user drops the pill 1384 for these three countries onto the color icon 1394, the bars for the selected countries are displayed in a different color, as illustrated in FIG. 113. The selected bars 1406 are displayed in one color and the remaining bars 1408 are displayed in a different color. In some implementations, the Marks shelf 1367 now includes a color encoding designator 1402 and a color encoding legend 1404. In some implementations, the color encoding legend 1404 is editable, so the user can specify what colors to use.

Figure 114:
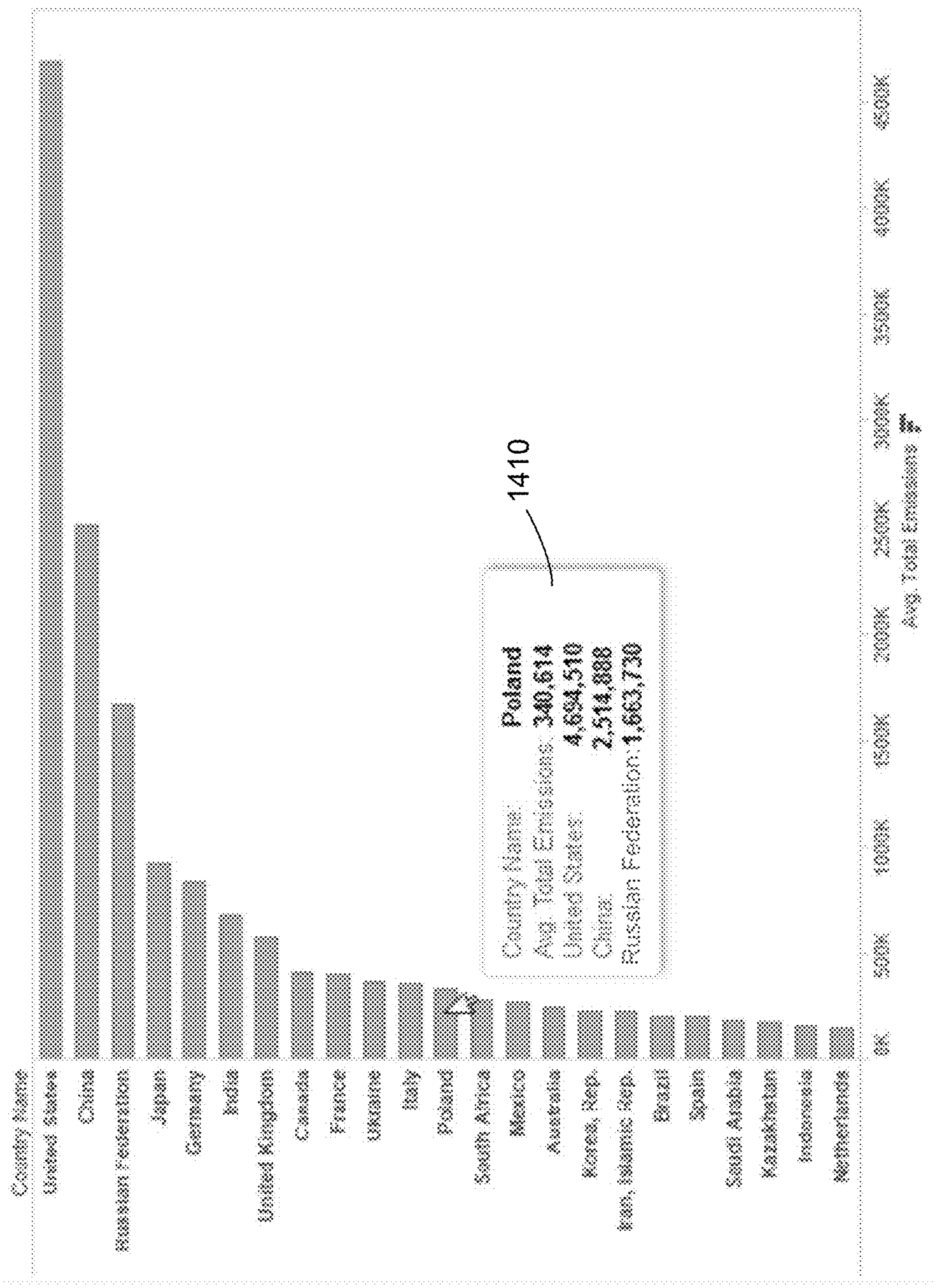

If the pill 1384 for the selected countries is dropped on the Tooltip icon 1398 on the Marks shelf, some implementations include the data for these selected countries in the tooltips, which can be useful for comparing the emissions of each country. This is illustrated in FIG. 114. The user has hovered the cursor over the bar for Poland, so the tooltip 1410 displays the emissions data for Poland. In addition, the tooltip includes the emissions data for the United States, China, and the Russian Federation.

Figure 115:
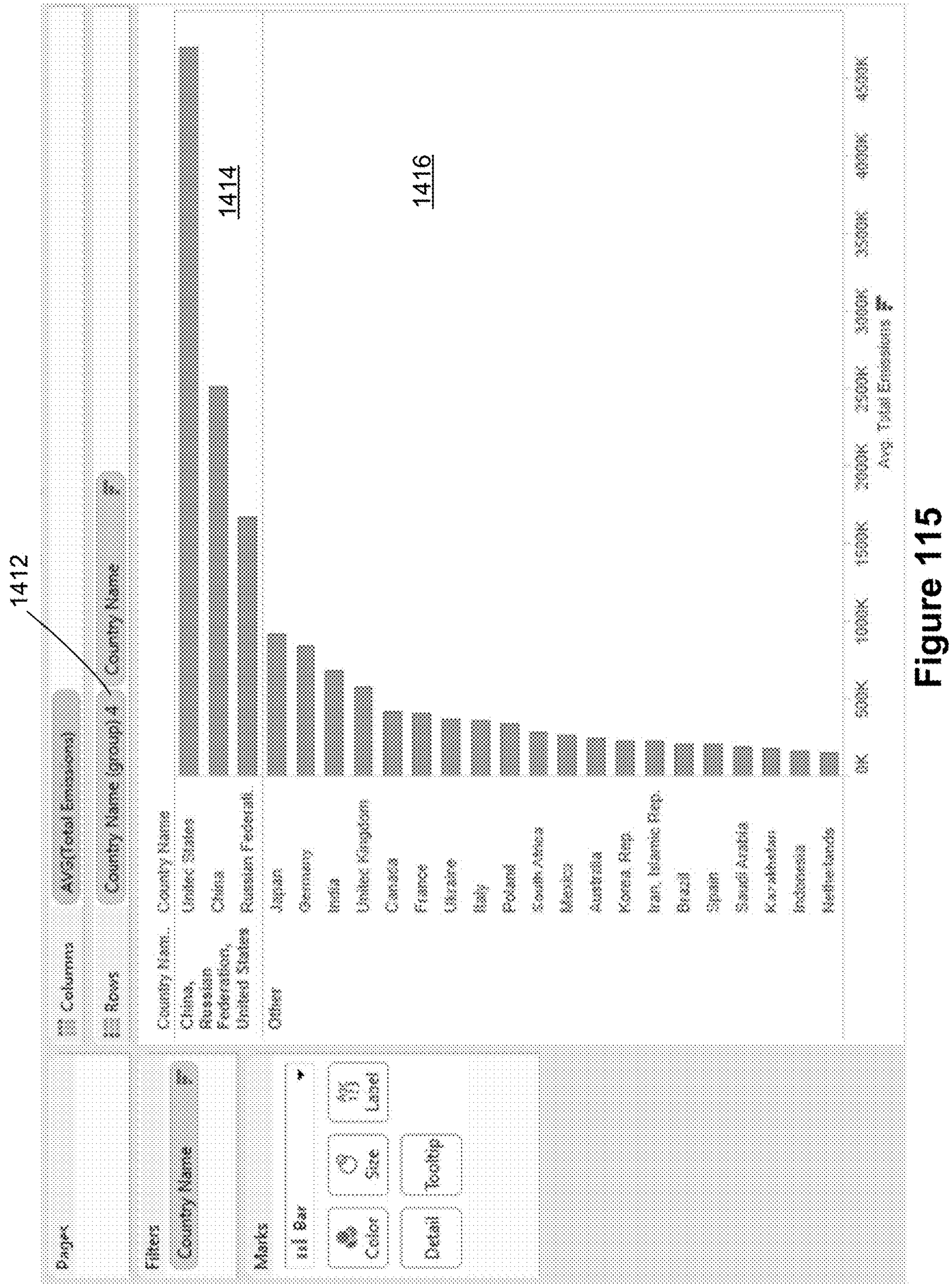

In FIG. 115, the user has dragged the pill 1384 for the three selected countries to the rows shelf 122, which creates a grouping data element 1412. This results in splitting the data visualization into two panes 1414 and 1416, where the first pane 1414 includes the three selected countries, and the second pane 1416 includes all of the other countries.

Figure 116:
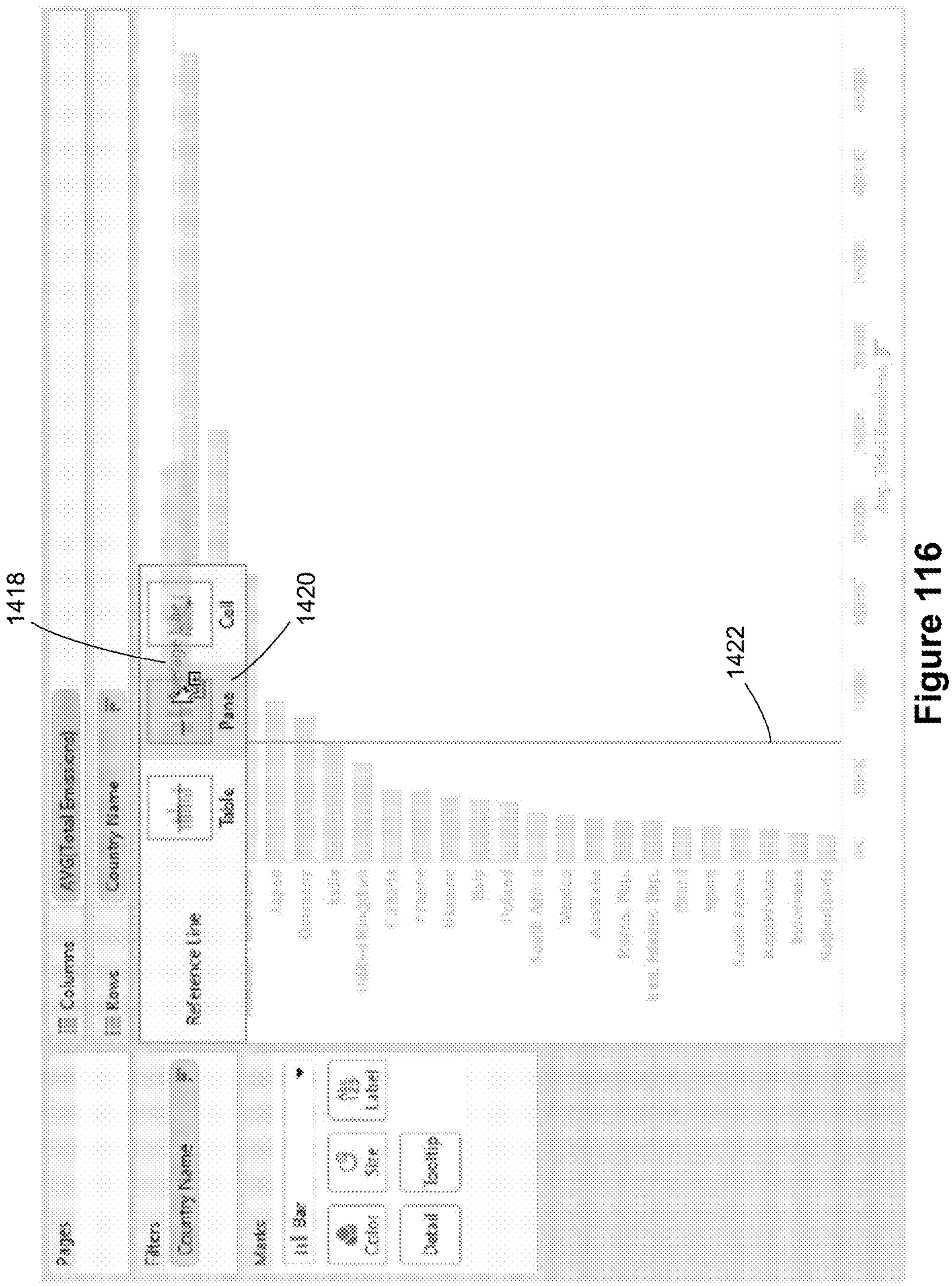

FIGS. 116 and 117 illustrate analytic previews that are provided in some implementations. In these examples, a user has dragged an average line analytic icon 1418 from the Analytics pane to the drop area. In FIG. 116, when the user places the analytic icon 1418 over the Pane option icon 1420, the corresponding average line 1422 is displayed in the data visualization region, even before dropping the analytic icon 1418. In FIG. 117, the user has moved the analytic icon 1418 over the Table option icon 1424, and the corresponding average line 1426 displays. In this pair of examples, there is only one pane, so these two options produce the same results.

Some implementations provide the same preview functionality for each of the analytic operations. Some of the analytic operations take more time to generate and display than other analytic operations, and thus some implementations provide previews for the ones where the preview can be generated and displayed quickly enough (e.g., when the preview can be generated and displayed in less than half a second).

The analytic features provided by disclosed implementations bring "experimentation" to all aspects of data analysis. Analytics capabilities are grouped together in an Analytics pane. This includes some pre-built or pre-configured combinations of analytic features that are analytically useful together (such as a single option that adds two reference lines AND a trend line). Disclosed implementations provide immediate feedback so that users can see what they are building as they build it. In addition, implementations provide incremental building, which allows users to easily experiment and iterate through different perspectives as they successively add new data elements or analytic objects.

Drag and drop for analytics includes several aspects. As illustrated above, a user can drag an icon for an analytic operation to a drop area to create a corresponding analytic object in the data visualization. Going the other way, a user can drag an existing analytic object (e.g., a reference line or band) back to the drop area to place it on a different drop target, thus creating a different type of analytic object. The user can also drag an analytic object out of the data visualization region to remove it from the display, or drag an analytic object to a shelf as illustrated in FIGS. 95-106.

In some implementations, analytic options that are not appropriate for the current visualization are dimmed or otherwise de-emphasized, and thus unavailable for selection. In some implementations, if creating an analytic object would create a substantial delay (e.g., due to complex calculations on a large data set), the user interface provides feedback about the potential delay before the analytic object begins creation. In some implementations, the user interface provides tooltips for individual analytic operations in the Analytics pane and/or tooltips for the groupings.

The disclosed implementations typically provide instant or immediate updates or feedback based on user selection. In practice, "instant" means within a short period of time and without additional user input. For example, "instant" updates may occur within a tenth of a second, a half of a second, or a second. As computer processors become more powerful, instant updates can occur for even more complex operations.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:

at an electronic device with a display:

displaying, on the display, a chart including visual marks representing a set of data, wherein the chart is displayed in accordance with contents of a plurality of displayed shelf regions, and wherein each shelf region determines a respective characteristic of the chart;

generating a visual analytic object by applying a first analytic operation to the set of data represented by the visual marks, and displaying the visual analytic object superimposed over the chart, wherein the visual analytic object is an average line, a trend line, a median line, a constant reference line, an exponential curve, a distribution band, a confidence band, or a quartile band;

detecting user input to select the displayed visual analytic object and place an icon representing the visual analytic object onto a first shelf region of the plurality of shelf regions; and in response to the user input:

updating content of the first shelf region to include an association with the first analytic operation corresponding to the visual analytic object; and updating the chart in accordance with the updated content of the first shelf region, including updating the chart based on values of the set of data represented by the visual marks relative to the first analytic operation corresponding to the visual analytic object.

2. The method of claim 1, wherein the user input comprises a drag and drop operation.

3. The method of claim 1, wherein an image is displayed on the icon and the displayed image identifies a type of the visual analytic object.

4. The method of claim 1, wherein updating the chart based on values of the set of data represented by the visual marks relative to the first analytic operation corresponding to the visual analytic object includes:

updating each visual mark based on whether a respective value in the set of data represented by the respective visual mark is greater than or less than a corresponding value of the first analytic operation corresponding to the visual analytic object.

5. The method of claim 1, wherein updating the content of the first shelf region to include the association with the first analytic operation comprises modifying a formula for a data element in the first shelf region.

6. The method of claim 5, wherein modifying the formula for the data element comprises adding to the formula a mathematical operator and a reference to the visual analytic object.

7. The method of claim 1, wherein updating the content of the first shelf region to include the association with the first analytic operation comprises placing in the first shelf region a data element whose formula is based on the first analytic operation.

8. The method of claim 1, wherein the first shelf region is a color encoding shelf, and wherein updating the chart based on values of the set of data represented by the visual marks relative to the first analytic operation comprises displaying a first subset of the visual marks in a first color based on positioning of the visual marks in the chart relative to the visual analytic object, and displaying the remaining visual marks in a second color distinct from the first color.

9. The method of claim 1, wherein the first shelf region is a label encoding shelf, and wherein updating the chart based on values of the set of data represented by the visual marks relative to the first analytic operation comprises displaying labels for a first subset of the visual marks based on positioning of the visual marks in the chart relative to the visual analytic object.

10. The method of claim 1, wherein the first shelf region is a filter shelf, and wherein updating the chart based on values of the set of data represented by the visual marks relative to the first analytic operation comprises displaying a first subset of the visual marks based on positioning of the visual marks in the chart relative to the visual analytic object, and filtering out the remaining visual marks from the chart.

11. The method of claim 10, wherein the visual analytic object is a line, which partitions the chart into a first region and a second region, and wherein the first subset of the visual marks comprise visual marks positioned in the first region.

12. The method of claim 10, further comprising:

displaying a quick filter box that enables a user to select displaying all of the visual marks, displaying only the first subset of the visual marks, or displaying only visual marks not in the first subset.

13. A client device, comprising:

one or more processors;

memory;

a display; and one or more programs stored in the memory and configured for execution by the one or more processors, the one or more programs comprising instructions for:

displaying, on the display, a chart including visual marks representing a set of data, wherein the chart is displayed in accordance with contents of a plurality of displayed shelf regions, and wherein each shelf region determines a respective characteristic of the chart;

generating a visual analytic object by applying a first analytic operation to the set of data represented by the visual marks, and displaying the visual analytic object superimposed over the chart, wherein the visual analytic object is an average line, a trend line, a median line, a constant reference line, an exponential curve, a distribution band, a confidence band, or a quartile band;

detecting user input to select the displayed visual analytic object and place an icon representing the visual analytic object onto a first shelf region of the plurality of shelf regions; and in response to the user input:

updating content of the first shelf region to include an association with the first analytic operation corresponding to the visual analytic object; and updating the chart in accordance with the updated content of the first shelf region, including updating the chart based on values of the set of data represented by the visual marks relative to the first analytic operation corresponding to the visual analytic object.

14. The client device of claim 13, wherein updating the content of the first shelf region to include the association with the first analytic operation comprises modifying a formula for a data element in the first shelf region, and wherein modifying the formula for the data element comprises adding to the formula a mathematical operator and a reference to the visual analytic object.

15. The client device of claim 13, wherein updating the content of the first shelf region to include the association with the first analytic operation comprises placing in the first shelf region a data element whose formula is based on the first analytic operation.

16. The client device of claim 13, wherein the first shelf region is a color encoding shelf, and wherein updating the chart based on values of the set of data represented by the visual marks relative to the first analytic operation comprises displaying a first subset of the visual marks in a first color based on positioning of the visual marks in the chart relative to the visual analytic object, and displaying the remaining visual marks in a second color distinct from the first color.

17. The client device of claim 13, wherein the first shelf region is a label encoding shelf, and wherein updating the chart based on values of the set of data represented by the visual marks relative to the first analytic operation comprises displaying labels for a first subset of the visual marks based on positioning of the visual marks in the chart relative to the visual analytic object.

18. The client device of claim 13, wherein the first shelf region is a filter shelf, and wherein updating the chart based on values of the set of data represented by the visual marks relative to the first analytic operation comprises displaying a first subset of the visual marks based on positioning of the visual marks in the chart relative to the visual analytic object, and filtering out the remaining visual marks from the chart.

19. The client device of claim 18, wherein the visual analytic object is a line, which partitions the chart into a first region and a second region, and wherein the first subset of the visual marks comprise visual marks positioned in the first region.

20. A non-transitory computer readable storage medium storing one or more programs configured for execution by a client device having one or more processors, memory, and a display, the one or more programs comprising instructions for:

displaying, on the display, a chart including visual marks representing a set of data, wherein the chart is displayed in accordance with contents of a plurality of displayed shelf regions, and wherein each shelf region determines a respective characteristic of the chart;

generating a visual analytic object by applying a first analytic operation to the set of data represented by the visual marks, and displaying the visual analytic object superimposed over the chart, wherein the visual analytic object is an average line, a trend line, a median line, a constant reference line, an exponential curve, a distribution band, a confidence band, or a quartile band;

detecting user input to select the displayed visual analytic object and place an icon representing the visual analytic object onto a first shelf region of the plurality of shelf regions; and in response to the user input:

updating content of the first shelf region to include an association with the first analytic operation corresponding to the visual analytic object; and updating the chart in accordance with the updated content of the first shelf region, including updating the chart based on values of the set of data represented by the visual marks relative to the first analytic operation corresponding to the visual analytic object.

* * * * *